US006208414B1

(12) United States Patent
Killpatrick et al.

(10) Patent No.: US 6,208,414 B1
(45) Date of Patent: Mar. 27, 2001

(54) MODULAR LASER GYRO

(75) Inventors: Joseph E. Killpatrick; Dale Berndt, both of Hennepin, MN (US)

(73) Assignee: Honeywell Inc., Minneapolis, MN (US)

( * ) Notice: Subject to any disclaimer, the term of this patent is extended or adjusted under 35 U.S.C. 154(b) by 0 days.

(21) Appl. No.: 08/976,902

(22) Filed: Nov. 24, 1997

Related U.S. Application Data

(63) Continuation of application No. 08/801,727, filed on Oct. 17, 1996, now abandoned, which is a continuation of application No. 08/161,555, filed on Nov. 29, 1993, now abandoned.

(51) Int. Cl.[7] .............................. G01B 9/02; H05B 7/10

(52) U.S. Cl. .............................................. 356/350; 372/94

(58) Field of Search .............................. 356/350; 372/94

(56) References Cited

U.S. PATENT DOCUMENTS 4,282,495 * 8/1981 Ljung .................................. 356/350
4,299,490 * 11/1981 Cahill et al. ......................... 356/350
4,755,057 * 7/1988 Curby et al. ......................... 356/350
5,100,235 * 3/1992 Priddy et al. ........................ 356/350
5,225,899 7/1993 Fritze et al. .
5,249,031 9/1993 Fritze et al. .
5,299,211 3/1994 Berndt et al. .
5,363,194 11/1994 Killpatrick et al. .
5,371,754 12/1994 Berndt et al. .
5,390,019 2/1995 Fritze et al. .
5,406,369 4/1995 Killpatrick et al. .

OTHER PUBLICATIONS

IEEE Plans '90 Position Location and Navigation Symposium Record, Las Vegas, USA, Mar. 20–23, 1990, pp. 528–536, by J. M. Oelschlaeger et al.

IEEE Plans '90 Position Location and Navigation Symposium Reocrd, Las Vegas, USA, Mar. 20–23, 1990, pp. 543–548 by G. L. Curran et al.

* cited by examiner

*Primary Examiner*—Stephen C. Buczinski
(74) *Attorney, Agent, or Firm*—Albert K. Kau

(57) ABSTRACT

A modular laser gyro incorporating a laser gyro with a digital control processor. The digital control processor safely and quickly starts the laser gyro. The microprocessor also executes tests on the gyro and provides a health signal. Optional start-up operations may be performed including the calibration of volts per mode and system configuration. Various information including gyro parameter load commands, gyro control commands, gyro status commands, and gyro calibration and diagnostic commands may be provided to an inertial navigation system. A high voltage start circuit includes a high voltage start module and high voltage pulse generator apparatus. The high voltage start circuit is contained within a modular laser gyro housing. A direct digital dither drive for a dither motor controls the dithering of the gyro to prevent lock in of the laser beams. A dither stripper controls the stripping of the dither signal. A bias drift rate improvement system, as well as a random drift rate improvement system reduces errors. A lifetime prediction mechanism incorporates a memory model that stores worst case performance parameters and evaluates them against predetermined failure criteria. An active current control controls lasing current to prolong life and enhance performance. A single transformer power supply powers the modular gyro.

29 Claims, 80 Drawing Sheets

BUILT-IN TEST EQUIPMENT (BITE) STATUS RECIVER

CYCLIC BIT FUNCTIONS.

CALCULATING VOLTS/MODE

HIGH VOLTAGE PULSE AMPLIFER SCHEMATIC

T2CAP INTERRUPT

Read Out Counter Monitor

TEMPERATURE SENSOR LIMIT TEST

MODULAR LASER GYRO

This application is a continuation of Ser. No. 08/801,727, filed Oct. 17, 1996, abandoned, which is a continuation of Ser. No. 08/161,555 filed Nov. 29, 1993, abandoned.

This invention relates generally to laser gyros, and, more particularly, to a modular laser gyro.

RELATED APPLICATIONS

The following issued U.S. Patents and U.S. patent applications are related to the present application and are assigned to the same assignee as the present application.

U.S. Pat. No. 5,225,889, "Laser Gyro Direct Dither Drive", issued Jun. 6, 1993.

U.S. patent application Ser. No. 07/931,941, entitled "Laser Gyro Microprocessor Start Up Control", filed Aug. 18, 1992 now U.S. Pat. No. 5,363,194.

U.S. patent application Ser. No. 07/922,612, entitled "Laser Gyro Microprocessor Configuration and Control", filed Jul. 17, 1992, now U.S. Pat. No. 5,406,369.

U.S. patent application Ser. No. 07/900,403, entitled "Laser Gyro Bias Drift Improvement and Random Drift Improvement", filed Jun. 18, 1992, now U.S. Pat. No. 5,438,410.

U.S. patent application Ser. No. 08/134,368, entitled "Laser Gyro Microprocessor Based Smart Mode Acquisition and High Performance Mode Hopping", filed Oct. 1, 1993.

U.S. patent application Ser. No. 07/922,611, entitled "Laser Gyro Built-In Test Method and Apparatus", filed Jul. 17, 1992, now U.S. Pat. No. 5,390,019.

U.S. patent application Ser. No. 07/805,122, entitled "Laser Gyro Dither Stripper", filed Dec. 11, 1991, U.S. Pat. No. 5,249,031.

U.S. patent application Ser. No. 08/009,165, entitled "Laser Gyro Single Transformer Power Supply", filed Jan. 26, 1993, now U.S. Pat. No. 5,371,754.

U.S. patent application Ser. No. 07/902,372, entitled "Laser Gyro Life Prediction", filed Jun. 16, 1992. U.S. patent application Ser. No. 07/936,155, entitled "Laser Gyro High Voltage Start Module and High Voltage", filed Aug. 27, 1992, now U.S. Pat. No. 5,299,211.

BACKGROUND OF THE INVENTION

Ring laser angular rate sensors, also called laser gyros, are well known in the art. One example of a ring laser angular rate sensor is U.S. Pat. No. 4,751,718 issued to Hanse, et al., which is incorporated herein by reference thereto. Present day ring laser angular rate sensors include a thermally and mechanically stable laser block having a plurality of formed cavities for enclosing a gap. Mirrors are placed at the extremities of the cavities for reflecting laser beams and providing an optical closed-loop path.

The activation of the laser gyro's various subsystems at start-up may have ramifications for the life of the laser mirrors and other system components. A method is needed to orchestrate the various subsystems at start-up given each subsystem's start-up constraints.

Therefore, it is the motive of this invention to provide a modular laser gyro with a start-up method that provides a synchronized and effective start-up procedure that results in minimum delay and minimum adverse effects.

Laser gyros that utilize microprocessors for their control require that inertial navigation information, control information, test information, and status information be communicated to external systems including an inertial navigation system or a test system. The inclusion of a microprocessor in the laser gyro allows the implementation of new capabilities such as sending autonomous control functions and self testing along with self calibration and self diagnostics. This new capability requires the transmission and reception of a broad spectrum of data, some of which occurs at a high frequency rate.

Therefore it is another motive of this invention to provide a modular laser gyro with an improved communications and control method and apparatus.

Prior art high voltage power supplies for laser gyros used a 2,500 VDC large external power supply placed outside of the laser gyro housing. The external supply required high voltage feed-throughs into the laser gyro housing through a high voltage feed-through connector. The external high voltages also require special cabling and shielding: such high voltage feed-throughs are expensive. Such high voltage feed-through connectors are also difficult to construct while still maintaining a hermetically sealed housing for the laser gyro. Existing high voltage plastic seals may only maintain a vacuum to $10^{-6}$ Torr. In contrast, relatively inexpensive low voltage connector seals may handle a $10^{-9}$ Torr hermetic seal.

It is, therefore, another motive of the invention to provide a modular laser gyro incorporating voltage supply lines that can utilize an inexpensive, hermetic connector.

Associated with such sensors is an undesirable phenomenon called lock-in which has been recognized for some time in the prior art. In the prior art, the lock-in phenomenon has been addressed by rotationally oscillating or dithering such sensors. The rotational oscillation is typically provided by a dither motor. Dither motors of the prior art usually have a suspension system which includes, for example, an outer rim, a central hub member and a plurality of dither motor reeds which project radially from the hub member and are connected between the hub member and the rim. Conventionally, a set of piezoelectric elements serving as an actuator is connected to the suspension system. When actuated through the application of an electrical signal to the piezoelectric elements, the suspension system operates as a dither motor which causes the block of the sensor to oscillate angularly at the natural mechanical resonant frequency of the suspension system. This dither motion is superimposed upon the inertial rotation of the sensor in inertial space. Such dither motors may be used in connection with a single laser gyro, or to dither multiple laser gyros. The prior art includes various approaches to recover inertial rotation data free from dither effects.

It is, therefore, another motive of the invention to provide a modular laser gyro incorporating an improved dither drive and dither stripper which electrically removes (strips) this dither motion from the gyro output.

One technique for maintaining a constant path length is to detect the intensity of one or both of the laser beams and control the path length of the ring laser such that the intensity of one or both of the beams is at a maximum. U.S. Pat. No. 4,152,071 which issued May 1, 1979 to T. J. Podgorski, and is assigned to the assignee of the present invention, illustrates a control mechanism and circuitry as just described. Path length transducers for controlling the path length of the ring laser are well known, and particularly described in U.S. Pat. No. 3,581,227, which issued May 25, 1971 to T. J. Podgorski, U.S. Pat. No. 4,383,763, which issued May 17, 1983 to Hutchings et al and U.S. Pat. No. 4,267,478, which issued May 12, 1981 to Bo H. G. Ljung, et al. All these patents are incorporated herein by reference.

In the aforementioned patents, the beam intensity is either detected directly as illustrated in the aforementioned patents, or may be derived from what is referred to as the double beam signal such as that illustrated in U.S. Pat. No. 4,320,974, which issued on Mar. 23, 1982 to Bo H. G. Ljung, and is also incorporated herein by reference.

Herein "mode" is defined as the equivalent of one wavelength of the laser beam. For a helium-neon laser, one mode is equal to 0.6328 microns which is equal to 24.91 microinches.

In path length control systems of the prior art, the path length control finds mirror positioning for which the lasing polygon path length, i.e., the ring laser path length, is an integral number of wavelengths of the desired mode or frequency, as indicated by a spectral line, of the lasing gas. With proper design, the path length control forces the path length traversed by the laser beams to be a value which causes the laser beams to be at maximum power.

As is also known in the prior art, ring laser gyros are subject to small bias drift errors, and noise called random drift errors. Both of these errors may result in significant inaccuracies if the ring laser gyros are operated for extremely long periods of time.

Now referring to FIG. 56 which shows the results of experiments conducted by Honeywell Inc. of Minneapolis, Minn. which imply the existence of a ring laser gyro bias drift that is periodic. The typical bias magnitude change 20 C was on the order of (+/−) 0.01°/hr about a mean value shown as line 21A in FIG. 56. Bias magnitude changes, shown as curve 22B, were observed to be sinusoidal in nature with respect to mirror position shown as the X axis 19 in FIG. 56. The plot in FIG. 56 shows the bias magnitude change curve 22B in relation to the single beam signal curve 24B. The single beam signal curve 24B is derived from the magnitude of the AC component of the laser intensity monitor signal. Experimentally the bias was found to be 90° out of phase, as shown by magnitude 26B, with the single beam signal curve 24B (SBS), but equal in period. Typically the average bias crossings 25 and 27 of the BIAS sinusoid curve 22B occur at the minimum or maximum of the SBS signal curve 24B.

The bias curve 22B is shown varying sinusoidally during one period of movement of the two mirrors 13 and 15. One period of movement is equivalent to two wavelengths. Even though the mirrors are moving, the system maintains a constant laser path 16 in the laser gyro 10, as shown in FIG. 1A.

The plot of FIG. 56 implies that as one mirror is moved "out" one wavelength and the other mirror is moved "in" one wavelength, for a total of two wavelength changes, the bias in the modular laser gyro 10 varies over one complete period. Ideally, the bias will vary uniformly as the mirrors are moved from an average bias point 25 to a negative maximum bias point 26B through an average bias again at point 27 to a maximum bias at point 28B to return to an average bias at point 5629. Those skilled in the art having the benefit of this new disclosure will recognize that with respect to the average bias 21A the integral of the bias curve 22B over one period of the curve from point 25 to point 5629 is zero, which implies that the total bias over the entire period is the average bias indicated by line 21A.

It is another motive of the present method and apparatus of the invention to exploit the above described phenomena to accomplish a bias drift improvement and random drift rate improvement.

It is highly desirable to know when the components of an inertial navigation system will fail. Life prediction is possible based on historic modular laser gyro performance data at particular temperatures. Lifetime prediction may be used to estimate when a device should be serviced for routine maintenance purposes. The ability to predict modular laser gyro lifetime allows modular laser gyro maintenance at highly desirable times such as nighttime or scheduled maintenance periods.

The capability of predicting lifetime is based on experimental and theoretical data showing that the output power of the modular laser gyro and a derived parameter, volts per mode is a function of both temperature and operating time. Typically, the longer a modular laser gyro is operational the lower the laser power output. Even though this power output diminishes slowly with time, after a considerable life the laser power output decreases below what is considered an acceptable level of laser power output. The acceptable level of laser power output is determined when the modular laser gyro is manufactured. Furthermore, it is also known that the power output of a modular laser gyro may fluctuate within a given temperature range. Therefore, it is desirable to look at a minimum power for a particular time of aging and a particular temperature range.

As a result it is another motivation of the invention to provide a highly reliable method of determining when a modular laser gyro may fail based on historic performance data for certain modular laser gyro performance parameters.

In operating a modular laser gyro it is important to maintain the laser beam current in each leg of the modular laser gyro between an anode and a cathode within a desired operating range such as, for example, about 0.15 ma to about 1.0 ma. In the prior art, large resistors called ballast resistors are employed to maintain stability of the plasma within the desired current range. Unfortunately, such ballast resistors tend to be very large resulting in a large amount of wasted power. Further, it is necessary to select these ballast resistors for each individual modular laser gyro out of a range of selectable ballast resistors. This selection or calibration of each modular laser gyro, results in higher production costs and less reliable current control than that which is provided by the present invention. Ballast resistors used in the prior art must be carefully selected in order to match the current in both legs to within better than one percent (1%) in order to reduce bias characteristics in the ring laser modular laser gyro. Further still, current control circuits of the prior art require high voltages and wide bandwidth circuits in order to achieve a high performance modular laser gyro.

It is another motive of the invention to overcome the deficiencies of the prior art by providing an active current control apparatus which does not require selected ballast resistors, uses conventional active elements and medium performance operational amplifiers, and yields a high performance modular laser gyro with no plasma oscillations over the entire operating range of desirable currents. Furthermore, through the use of a microprocessor based controller, the active current control apparatus of the invention maintains a high degree of accuracy and reliability in a modular laser gyro system application.

As a basis for designing the active current control apparatus of the present invention, design data was taken on a GG1320 model number modular laser gyro as manufactured by Honeywell Inc. of Minneapolis, Minn. The data taken was within the operating window of laser beam current with cathode current as a function of ballast resistor and with capacitance as a parameter. Since the 1320 model modular laser gyro operates in the negative resistance region of the current-voltage characteristic, stray capacitance near the anodes may significantly affect the operating window.

Operating windows as a function of current were obtained for the regions wherein plasma oscillations occurred. Ballast resistors as low as zero ohms and capacitance less than 15 pF had a very small effect on the operating window. This data was useful in defining the requirements for high voltage and low capacitance semiconductor devices employed in the instant invention.

Prior art modular laser gyro power supplies incorporated at least four large external power supply transformers. These transformers included a start transformer at 2,500 VDC, a run transformer at 750 VDC, a dither transformer and a PLC transformer at 330 VDC.

It is another motive of the invention to provide a modular laser gyro incorporating a single power supply transformer.

An integral part of a ring-modular laser gyro is the laser beam source or generator. One type of laser beam generator comprises electrodes and a discharge cavity in combination with a plurality of mirrors which define a closed path. The path is usually triangular but other paths such as rectangular may be used.

Present day ring-modular laser gyros employ a gas discharge cavity filled with a gas which is excited by an electric current passing between the electrodes ionizing the gas and creating a plasma. As is well understood by those skilled in the art, the ionized gas produces a population inversion which results in the emission of photons, and in the case of He—Ne, a visible light is generated which is indicative of the plasma. If the gas discharge cavity is properly positioned with respect to the plurality of mirrors, the excited gas may result in two counter-propagating laser beams traveling in opposite directions along an optical, closed-loop path defined by the mirrors.

In some embodiments of modular laser gyros, a unitary body provides the gas discharge cavity including the optical closed-loop path. Such a system is shown in U.S. Pat. No. 3,390,606 by Podgorski, which is assigned to the same assignee as the present invention. There an optical cavity is formed in a unitary block. A selected lasing gas is used to fill the optical cavity. Mirrors are positioned around the optical cavity at appropriate locations such that counter-propagating beams are reflected so as to travel in opposite directions along the optical cavity. A gas discharge is created in the gas filled optical cavity by means of an electrical current flowing in the gas between at least one anode and at least one cathode which are both in communication with the gas filled optical cavity.

It should be noted that prior art ring-modular laser gyro systems often have a pair of anodes and a single cathode which produce two electrical currents flowing in opposite directions. Each of the electrical discharge currents create plasma in the gas. Each current is established by an applied electrical potential, of sufficient magnitude, between one cathode and one anode. Alternately, the RLG may have two cathodes and one anode.

Various factors both external and internal to the RLG may effect beam intensity. Temperature is one external factor. A change in a cavity parameter is an example of an internal factor. In the prior art, RLGs are commonly operated with essentially a constant power or constant current input which results in a variable beam intensity due to external or internal factors. A certain magnitude of operating current is selected which under a specified range of external and internal conditions produces a beam whose intensity is adequate for satisfactory operation. However, it has been determined that the useful life of the cathode is a function of the magnitude, over time, of the current it must carry; the greater the magnitude the shorter the useful life of the cathode. In addition, the useful operating life of internal elements of the RLG, such as mirrors, is a function of the magnitude of the operating current; the higher the current, the shorter the operating life. These internal and external factors have caused RLGs to be operated with a higher current than necessary during part of their operating life in order to produce a beam intensity satisfactory for operation under all conditions, thus shortening the potential operational life of the RLG.

It is highly desirable for a modular laser gyro to be able to execute self tests in order to provide the inertial navigation system using the modular laser gyro to estimate its reliability and functionality. Therefore, it is another motive of this invention to provide a built in test capability into a modular laser gyro orchestrated by an integrated microcontroller.

In prior art designs, start up path length control was accomplished with the aid of a predetermined set point of the pick off voltage and the use of a voltage sweep. The desired set point was specified when the laser gyro was constructed. The laser gyros of the prior art had difficulty adjusting to two common effects, temperature fluctuations and fluctuations in system response due to aging. Therefore, it is a further motivation of the invention to provide a dynamic compensation mechanism capable of acquiring a particular laser mode, calculating volts per mode, and changing laser modes.

SUMMARY OF THE INVENTION

The invention provides a modular laser gyro. The modular laser gyro comprises a gyro block with a first anode, a second anode, and a cathode, controlled by an active current control, which is controlled by a microcontroller. The gyro block also includes a temperature sensor, a dither pickoff, a dither drive, a path length control pickoff, and a path length control transducer. The block also has photodiodes providing readout logic with inertial navigation signals. The microcontroller used in the modular gyro has a first and second pulse width modulator, an A/D converter, a microprocessor with built-in test functions, a high speed asynchronous receiver transmitter, and a lookup table. A path length control apparatus provides a path length control transducer with control information that receives information from the path length control pickoff. The path length controller communicates with the microcontroller and a digital logic apparatus. The digital logic apparatus is provided with a one shot to obtain dither pickoff data. The digital logic and readout as well as the microcontroller provide external systems with inertial navigation data. Data also provided are laser intensity monitor information, readout intensity monitor information, block temperature, and other test data. A sample strobe is provided to the microcontroller to link the modular gyro with an external inertial navigation system. The modular gyro includes a high voltage start means and is powered by a single transformer power supply.

The invention also provides a modular laser gyro in combination with a method of starting up a modular laser gyro. In the modular laser gyro, the dither drive, laser discharge, active current control circuit, path length control circuit, BDI drive circuit, dither stripper circuit, and gyro built-in test, all must be initialized. The various functions of the modular laser gyro are started under the control of a microcontroller. The microcontroller assures a proper starting sequence with correct timing, which assures a quick start of the modular gyro.

The invention also provides a modular laser gyro configuration and control mechanism that utilizes an onboard microcontroller with a high speed Universal Asynchronous Receiver Transmitter (UART) that interfaces through a transmit line and a receive line to an external system. The microprocessor communicates through a set of predetermined registers that have a structure lending itself to high speed data communications. The microprocessor sends a command tag along with inertial navigation data and status data. The external system communicates to the modular laser gyro through a similar mechanism. The modular laser gyro includes a nonvolatile memory personality storage module that stores gyro operating parameters for start-up and operation.

The invention provides a modular laser gyro high voltage start circuit including a high voltage pulse generator and high voltage module that allow the external gyro voltage supply to provide low voltages of +5 VDC and +15 VDC, with an inexpensive hermetic connector. The high voltage pulse generator amplifies a five volt pulse at 60 KHz duty cycle to provide an output of 280 volt pulses at approximately a 50% duty cycle. The high voltage pulse generator features first and second transistors for shaping an output waveform. The high voltage pulse generator uses a PN junction high voltage diode with a high forward voltage drop and a resistor divider to drive the first transistor while holding the first transistor out of saturation. The high voltage pulse generator also uses a low voltage diode to create a dead band such that the first and second transistors are never on at the same time. The high voltage module comprises two high voltage blocking diodes which protect the modular laser gyro active current control circuitry during start-up. Two small ballast resistors and a parallel 8 times voltage multiplier provide an at least 2500 VDC output. The high voltage start circuit is configured to be contained in a second volume which is smaller than the first volume of a modular laser gyro block.

The invention further provides a direct digital dither drive apparatus for a modular laser gyro. The direct digital drive apparatus of the invention comprises a low pass filter, a high pass filter, and an output for providing a filtered signal and an input connected to a pulse width modulated digital drive signal. The direct digital drive further comprises an amplifier for amplifying the filtered signal from the low pass filter wherein the amplifier is coupled at an input to the output of the low pass filter and a means for driving the dither motor in response to the amplified signal is coupled to the amplifier output, wherein the driving means includes an active pull-up means including means for providing a dead band operating characteristic so as to substantially eliminate current spikes on the power supply signal and provide a highly efficient driver that consumes low power.

A modular laser gyro dither stripper apparatus for a modular laser gyro is further provided by the present invention. The dither stripper apparatus of the invention comprises a microcontroller based stripping apparatus that senses a dither analog signal from a dither pickoff. The dither analog signal is converted to a digital form and is compensated by a closed loop system using a microcontroller to adjust the signal gain. The dither signal is compared against a value and an error signal is produced. The dither signal is then subtracted from the laser readout to provide a dither stripped readout signal of inertial navigation information. The stripped signal is further processed to complete the closed loop gain control function of the invention.

The invention further provides a bias drift improvement for a modular laser gyro that exploits the inherent periodic nature of the bias drift of the laser in the modular laser gyro system. A microprocessor controls a path length control circuit that continuously adjusts the position of path length control mirrors. The mirrors are stepped through a range of positions that represent two laser modes. The microprocessor adjusts the position of the two path length control mirrors such that total path length remains constant. The invention improves bias drift by forcing the modular laser gyro system to operate at varying path length control positions. Each position has a varying bias that was shown to be periodic over two laser modes. By operating the laser system over a range of two laser modes the periodic bias error of the modular laser gyro is canceled out over time. Laser gyros may be measured on a test bed to determine the random drift rate over the range of mirror positions attained over the bias drift cycle. Gyros with excellent random drift rates may be operated with the mirrors at the tested set position with the lowest random drift rate.

The invention further provides a lifetime prediction method for a modular laser gyro based on the measurement of certain gyro performance parameters. The parameters measured are laser intensity, readout intensity, the derived quantity volts per mode, and other gyro parameters. The performance parameters are monitored as a function of time over the lifetime of the modular laser gyro. The method fits the last 1000 hours of performance data to a predetermined linear, quadratic or higher order polynomial fit curve. When the modular laser gyro operates it may be polled to respond with its minimum estimated lifetime. The modular laser gyro warns the inertial navigation system using the modular laser gyro upon impending system failure. The method weights data to a particular modular laser gyro based on predetermined critical operating temperatures. The method of the invention creates a history of lifetime performance characteristics based on these critical temperatures. The modular laser gyro warns the inertial navigation system as it fails by sending different "levels of warning" depending on how much time is left in the estimated lifetime of the modular laser gyro.

The present invention further provides an active current control apparatus for a modular laser gyro. The modular laser gyro includes a first electrode of a first polarity, such as, for example, an anode and another electrode of a second, opposite polarity, such as, for example, a cathode. The active current control apparatus includes a means for generating a control signal representative of a current value, such as, for example a microprocessor controller. Means for supplying actively controlled current to the anode of the modular laser gyro in response to the control signal is coupled to the control signal.

It is yet a further object of the invention to provide a modular laser gyro with an active current control apparatus, wherein the modular laser gyro includes a first anode and a second anode. The means for supplying actively controlled current to the anode of the modular laser gyro comprises a first current source leg and a second current source leg, wherein the first current source leg is coupled to the first anode and the second current source leg is coupled to the second anode, and currents in each current leg source are matched to within about 1 or less.

Another object of the invention is to provide a modular laser gyro with a nearly ideal current source that has substantially infinite impedance over the entire frequency spectrum of interest. In particular, one example has an impedance looking back into the output of greater than 106 ohms at DC and at least $10^3$ ohms at 40 MHz.

Another object of the invention in an alternate aspect of the invention is to provide a modular ring laser gyro with an active current control apparatus wherein a microprocessor including a plurality of analog-to-digital inputs samples the output voltage of the active current control apparatus. Then, in turn, the microprocessor responds to the sampled output by controlling a pulse width modulated DC/DC converter which adjusts the modular laser gyro cathode voltage to minimize power dissipated in the modular laser gyro and associated electronics.

The invention further provides a modular laser gyro with a single transformer power supply. The power supply receives a single 15 volt DC supply that is converted to a 320 volt DC supply, a 280 volt DC supply and a 500 volt DC supply. The invention implements a Royer Oscillator by providing a transformer with four windings each center-tapped. Two control transistors control the output of the transformer. The invention also provides a high speed output controlled start-up to prevent meta-stability in the Royer Oscillator.

The invention further provides a method of self testing a modular laser gyro and testing a modular laser gyro upon request from an external system. The modular laser gyro has a system communication protocol that is used to implement the execution of a number of modular laser gyro tests. The modular laser gyro reports the states of a test register which represents the health of the modular laser gyro. The test register indicates the health of the dither drive readout counter, laser drive current for leg 1 of the active current control, laser drive current for leg 2 of the active current control, temperature sensor during high limit tests, temperature sensor during low limit tests, and sample strobe. The modular laser gyro provides a high speed interface for the communication of test information. The modular laser gyro also has a number of built in monitors including the laser drive monitor, the dither drive monitor, and the temperature sensor monitor.

In one aspect of the invention a sampling method and apparatus for sampling a dither signal is disclosed in combination with a modular ring laser gyro. The method comprises the step of sensing a plurality of peak amplitudes $P_1$, $P_2$, $P_3$ . . . $P_n$ each of the plurality of peak amplitudes having a corresponding times $t_1$, $t_2$, $t_3$ . . . $t_n$ while simultaneously sensing a plurality of ring laser gyro output angles at each of the corresponding times $t_1$, $t_2$, $t_3$ . . . $t_n$. A value of the change in stripped gyro angle, $\Delta\phi$, is calculated as $\phi=(\phi_n-\phi_{n-1})-(\alpha_n-\alpha_{n-1})K$, where K is a correction factor. K may include correction coefficients for gain, phase angle, nonlinearity, temperature bias and scale factors. In the aforesaid relationship, the subscript "n" corresponds to a value at time $t_n$.

Alternatively, the stripped gyro angle output may be calculated as $\phi=\phi_n-\alpha_n K$.

In another aspect of the invention, the method further comprises the step of summing values of $\Delta\phi$ with the sign of $\alpha_n$ into an integrator to correct the value of K.

A dither stripper apparatus for a laser gyro is provided by the present invention. The dither stripper apparatus of the invention comprises a stripping apparatus that senses a dither analog signal from a dither pickoff. The dither analog signal is converted to a digital form and is compensated by a closed loop system to adjust the signal gain.

It is another motive of the present invention to provide a modular gyro with a dither stripping apparatus which operates at a maximum sensitivity for all measurements with a maximum positive value followed by maximum negative value and vice versa.

The present invention advantageously provides a modular gyro with a dither stripper which is much more robust for input noise issues and much faster in response time as compared to prior art devices.

It is a further object of the invention to provide a modular laser gyro that utilizes a digital controller to mode hop.

Other objects, features and advantages of the present invention will become apparent to those skilled in the art through the Description of the Preferred Embodiment, claims, and drawings herein, wherein like numerals refer to like elements.

BRIEF DESCRIPTION OF THE DRAWINGS

FIG. 1C shows a simplified diagram of a modular ring laser gyro system wherein some of the components shown in FIG. 1B, such as the dither pickoffs, have been deleted for ease in explaining the mode hopping apparatus.

FIG. 34A shows a block diagram of a microcontroller based apparatus for implementing the dither stripper method of the present invention using multiple analog to digital converters.

DESCRIPTION OF THE PREFERRED EMBODIMENT

Figure 1A:
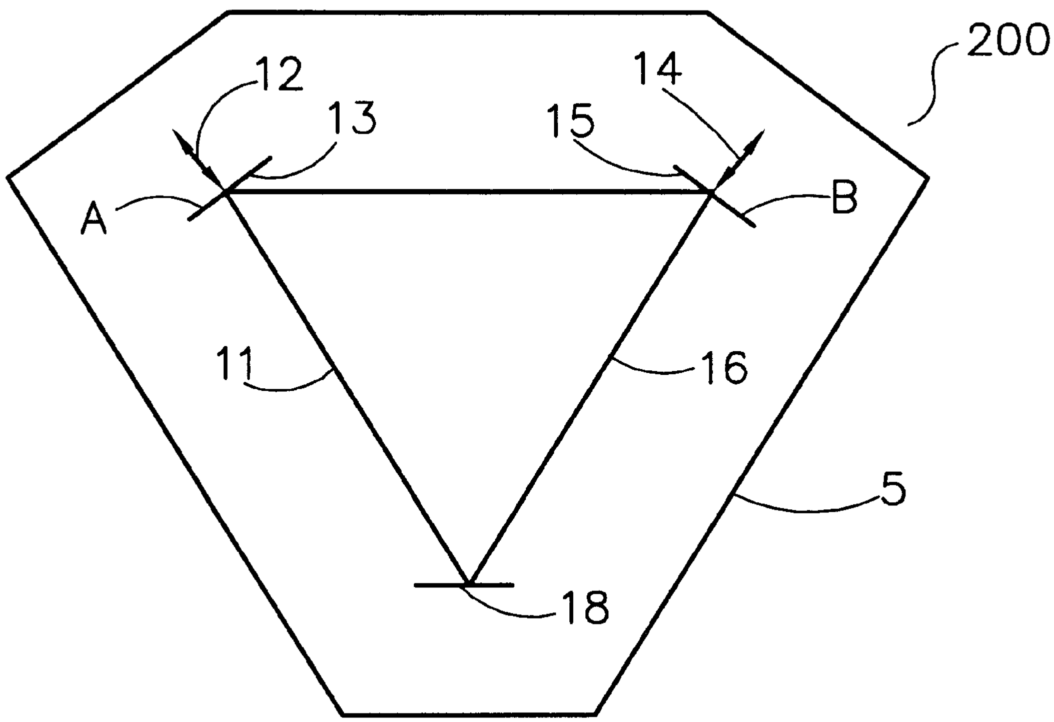
FIG. 1A shows a modular laser gyro of the method of the invention.
Figure 1B:
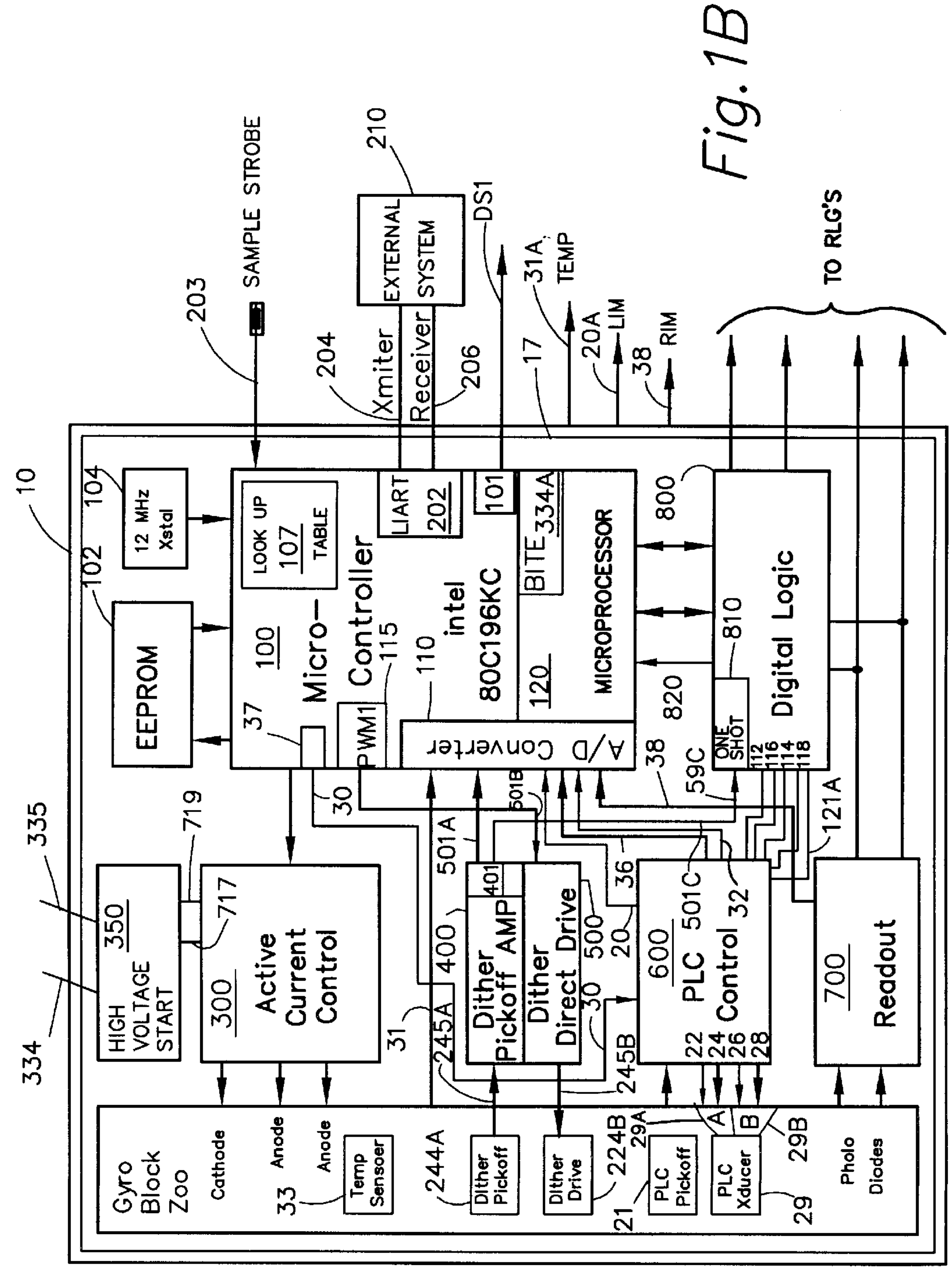
FIG. 1B shows a microprocessor controlled modular laser gyro of the method of the invention.

Referring now to FIG. 1B which shows a block diagram of one embodiment of a modular laser gyro employing the novel features of the present invention. The instant invention will be explained by way of example embodiments. Those skilled in the art having the benefit of this disclosure will appreciate that the examples herein are by way of illustration of the principles of the invention and not by way of limitation. Modular laser gyro 10 includes a housing 17 contained within which are a microcontroller 100, a modular laser gyro block 200, an active current control apparatus 300, dither pickoff amplifier 400, direct digital dither drive 500, a path length control (PLC) device 600, a readout 700, and digital logic 800. Digital logic 800 may advantageously comprise a gate array register configured in accordance with well known logic techniques. The microcontroller 100 further includes a communications device such as a universal asynchronous receiver/transmitter (UART) 202 which communicates to an external processing system 210 through transmit line 204 and receive line 206. The modular laser gyro 10 further comprises a high voltage start module 350 providing power to the laser block 200 and active current control 300. The controller 100 may be a microprocessor or microcontroller.

In one embodiment of the invention the microcontroller 100 comprises an INTEL™ model no. 80C196KC microcontroller. The microcontroller is commercially available and includes at least two timers, a real time clock, high speed logic, and content addressable memory (CAM).

Figure 2:
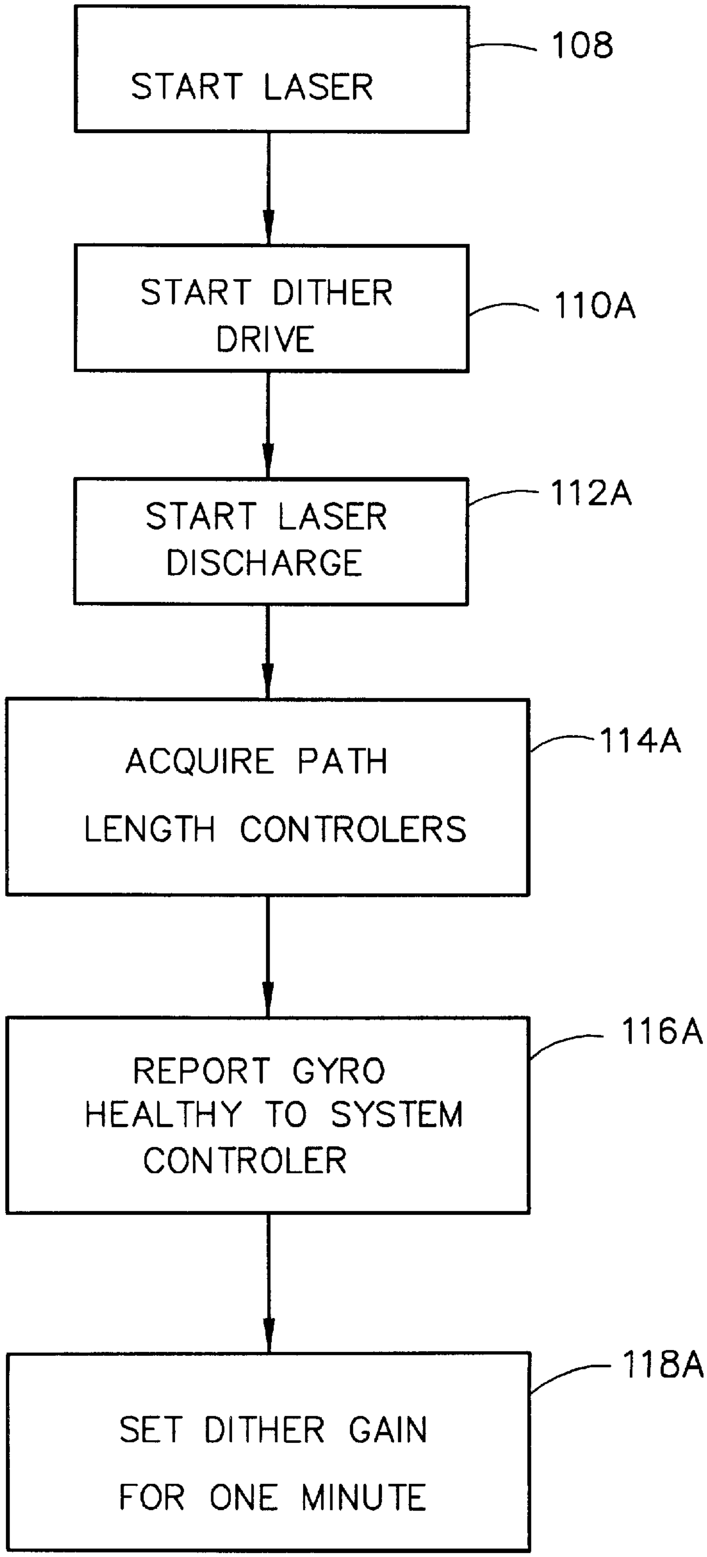
FIG. 2 shows a start-up procedure process flow diagram.

Now referring to FIG. 2 which shows a method of starting the modular laser gyro with a microcontroller in accordance with one aspect of the invention. The modular laser gyro 10 start-up procedure has three fundamental phases including (1) starting the laser dither drive, (2) starting the laser discharge, and (3) acquiring the path length controllers. After the laser discharge is started the path length controllers may be acquired to perform some calibration functions. In an alternative embodiment of the invention the dither, laser discharge, and path length control may all be started simultaneously.

In the method shown in FIG. 2 the gyro is started in process block 9108. The start-up procedure then starts the dither drive in process block 9110. The laser discharge in process block 9112 is started. The path length controllers are then acquired in process block 9114. If all the systems described above start-up, the gyro reports a health status in process block 9116.

In one preferred embodiment of the invention the operating parameters of the modular laser gyro are stored in a nonvolatile memory look up table 107 as shown in FIG. 1B. These operating points are used by each of the start processes of the invention to start the gyro 10 at the last known operating points. Use of the last known operating points helps all the systems of the gyro to come up in a minimal amount of time with an immediate high level of performance. In one alternate embodiment of the invention the gain of the dither is set high for one full minute after the successful starting of the gyro as shown in process block 9118.

During the acquire PLC step 9114 the volts per mode of the modular laser gyro may be calibrated. This is an optional step which is further described hereinbelow.

Figure 3A:
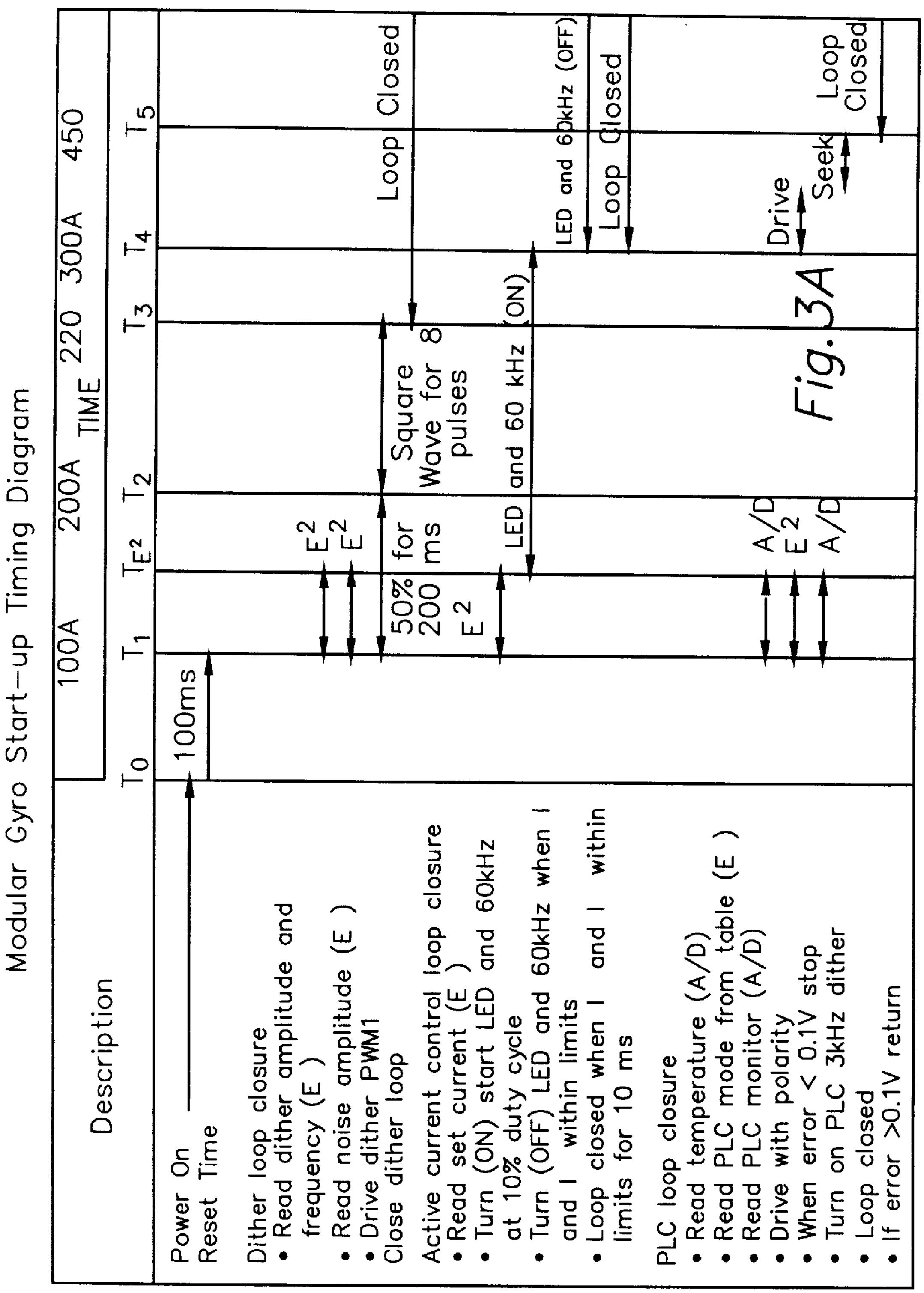
FIGS. 3A and 3B show a modular laser gyro start-up timing diagram showing start-up timing sequences.

Now referring jointly to FIG. 1B and FIG. 3A which shows a modular gyro start-up timing diagram. Actual timing parameters are given herein for one example embodiment of the invention and are not intended as a limitation of the invention to the stated timing parameters. The timing diagram has a set of procedures whose names are labeled on the left of FIG. 3A. Each procedure executes at certain times shown to the right in the timing diagram portion of FIG. 3A. Each operation is shown with a corresponding execution time. Each corresponding execution time indicates whether the operation listed will start.

The gyro 10 is powered on at event 3301 at time T equals 0. The gyro 10 goes through a reset sequence in 3302 for approximately 100 milliseconds beginning at time $T_0$. During this period of time internal microcontroller hardware functions are initialized, microcontroller IO ports, and EEPROM 102 information are read into microcontroller scratchpad RAM. The gyro 10 enters the dither closure loop event 3304 which begins at time $T_1$. At event 3305 the gyro 10 reads a dither amplitude and frequency from the EEPROM 102 from time $T_1$ to time $T_E^2$. The gyro 10 then executes event 3306 to read the noise amplitude from the EEPROM 102 from time $T_1$ to time $T_2$. The gyro then drives the dither to a 50% duty cycle through pulse width modulator signal 501 starting from time $T_1$ through time $T_2$. This 50% duty cycle occurs for about 200 milliseconds. The gyro dither loop is closed at event 3308.

The modular laser gyro start-up method of the invention then executes event 3309 to enter the active current control loop. The gyro 10 then executes event 3310 which initializes the active current control set current that was previously read from the EEPROM. The set current is written to a microcontroller I/O port. The gyro then executes event 3312 to turn on a start LED and a 60 Khz 10% duty cycle signal at time $T_E^2$ through time $T_4$. The gyro 10 then waits for $T_4$ to turn off the LED and 60 KHz 10% duty cycle signal when current in legs one and two, $I_1$ and $I_2$ respectively are within limits. This event determines $T_4$ in event 3314. Event 3315 is executed when current in legs one and two, $I_1$ and $I_2$, are within limits for 10 milliseconds.

The gyro 10 then executes event 3317 to enter the path length control loop. The gyro executes event 3319 to read the temperature during the time period $T_1$ to $T_E^2$ which is always being done in the background and is filtered to 8/10 of a second time constant. At start time, i.e. <1 second, this filter time constant is 0.08 seconds and then after 10 seconds is 0.08 seconds. The gyro then executes event 3321 to read the path length control mode from the path length control mode table from the EEPROM 102 from time $T_1$ to time $E_2$. The gyro 10 then executes event 3323 to read the path length control monitor voltage from the A/D converter from time $T_1$ to time $T_E^2$. The gyro 10 then executes event 3325 to drive the path length controllers with the proper polarity. The gyro 10 then executes event 3327 to continue to seek the correct path length. The path length control start-up loop is closed at event 3331 at time $T_5$. If this control point uses more than 0.05 volts per second then the initialization has failed.

Figure 3B:
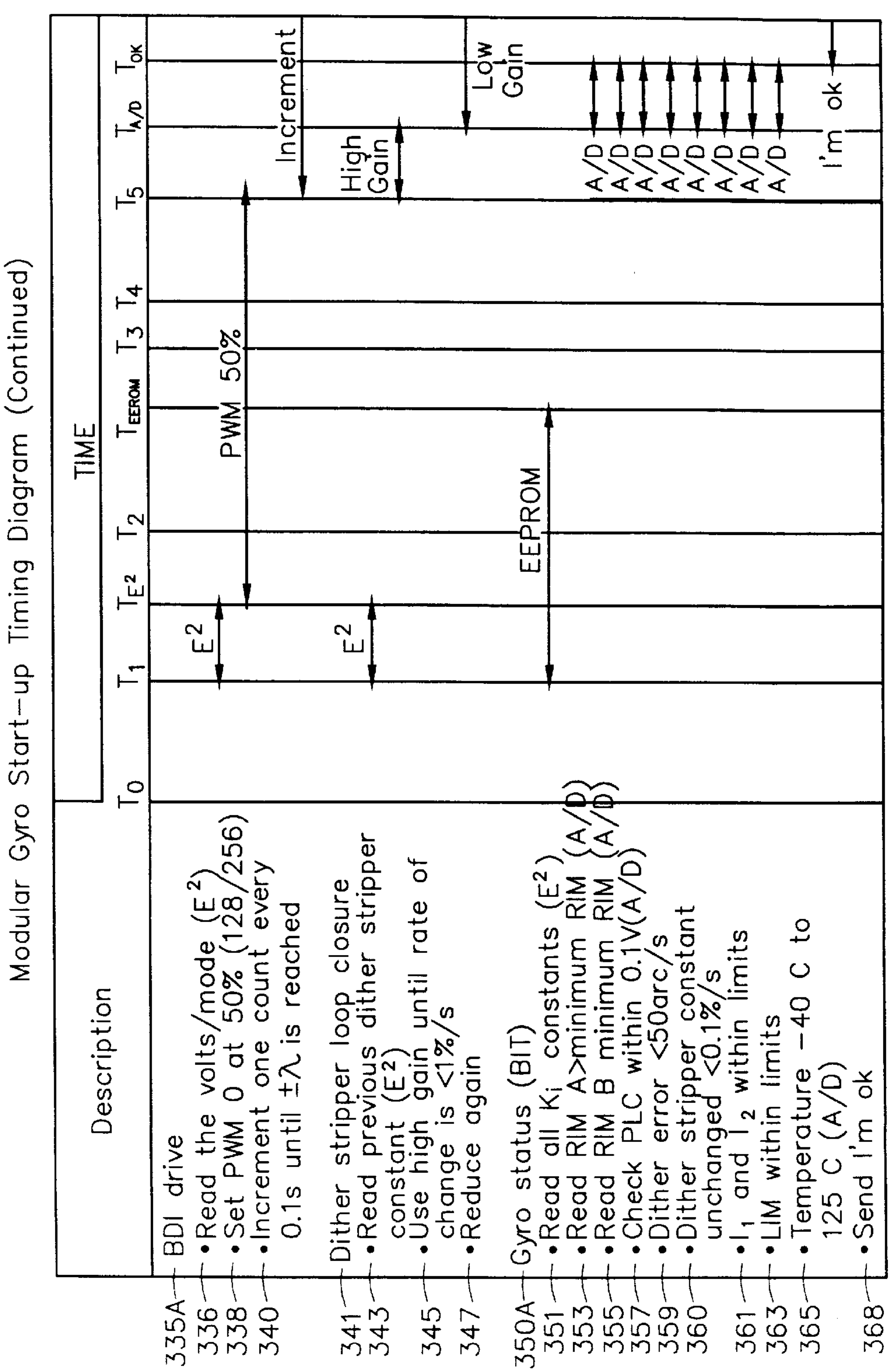

Now referring to FIG. 3B which shows the bias drift improvement (BDI) drive event at 3335 starting at time $T_1$. The process proceeds to then execute step 3336 to read the volts per mode at time $T_1$ to $T_E^2$. The gyro then executes event 3338 to set the pulse width modulation at 50% duty cycle for the bias drift improvement from $T_E^2$ to $T_5$. The gyro 10 then executes event 3340 to begin bias drift improvement incrementation 1 count every 0.1 seconds. The gyro has now been successfully started.

The gyro 10 then executes the dither stripper loop in step 3341 which reads an initial value of a dither stripper constant of about 10,000 from the EEPROM 102 in event 3343. The gyro 10 then executes event 3345 to use a high gain from time $T_5$ to TA/D. The gyro then reduces the gain at event 3347 at time TA/D to increase the filtering and reduce the time constant.

Gyro built-in test (BIT) events are executed in event 3350. The gyro 10 executes event 3351 from time $T_1$ to time $T_{EPROM}$ and then executes events from 3353 through 3368 in the A/D conversion window $T_{A/D}$ to $T_{OK}$. Built-in test functions are then done some of which include the following: read the readout intensity monitor (RIM) for the A mirror in event 3353, read the readout intensity monitor for the B mirror at event 3355, check the path length controllers in event 3357, check dither error in event 3359, check that the dither stripper constants are within operating range in event 3360, check that the leg currents are within limits in event 3361, check that the LIM signal is within limits in event 3363, check that the temperature is within limits in event 3365, and in event 3368 at time TOK send the "OK" or "not OK" health status signal.

Figure 4A:
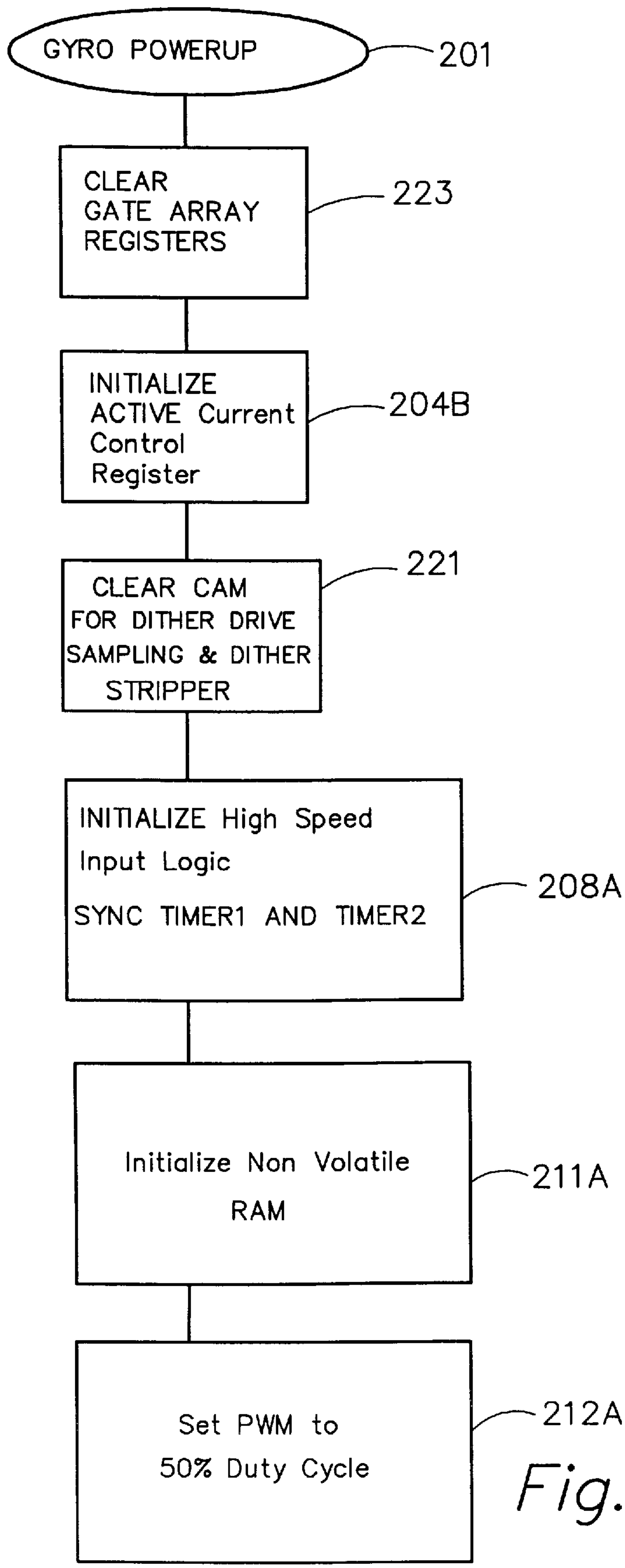
FIG. 4A shows an initial portion of a start-up sequence of a modular laser gyro of the invention from modular laser gyro power up to setting the pulse width modulation to a 50% duty cycle.

Now referring to FIG. 4A which shows a detailed start-up sequence process for the modular laser gyro of FIG. 1B following the timing diagrams of FIGS. 3A and 3B. The process begins by starting the gyro 10 by powering it up in process flow step 4201. The process then flows to step 4223 to clear the gate array registers. The process then flows to 4204 where the active current control register is initialized. The process then flows to process block 4221 where content addressable memory (CAM) in the microcontroller is cleared for the dither drive sampling and dither stripper sampling functions. The process then flows to 4208 where the high speed input logic is initialized and timers 1 and 2 are synchronized. The high speed input logic is used to capture a sample strobe signal from the system controller. The sample strobe 203 is used to synchronize multiple gyros in the system. The modular laser gyro is always triggering on the low-high transition of the sample strobe.

The process then flows to step 4211 to initialize the non-volatile ram, EEPROM 102, which contains initialization constants and run parameters for the modular laser gyro's various algorithms. The process then flows to step 4212 where the pulse width modulation of the bias drift improvement circuit is set to a 50% duty cycle to disable the bias drift signal.

Figure 4B:
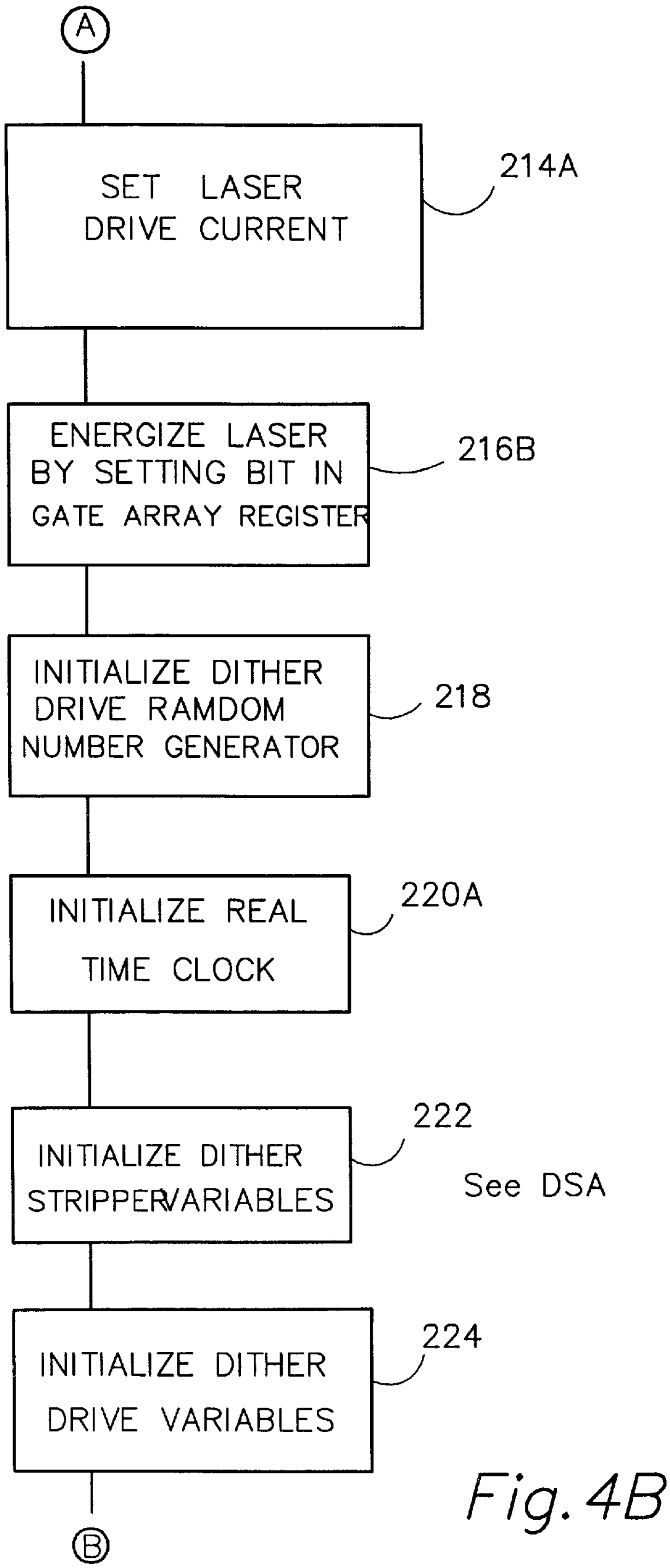
FIG. 4B shows a portion of a method for starting a modular laser gyro from setting a laser drive current to initializing dither drive variables.

Now referring to FIG. 4B which continues the initialization method of the modular laser gyro. The process then flows to process block 4214 to set the laser drive current to a value stored in the EEPROM 102. The initialization process then flows to step 4216 where the laser is energized by setting an energizing bit in the gate array register. The process then flows to 4218 to initialize the dither drive random number generator. The process then flows to 4220 to initialize the real time clock. The process then flows to 4222 to initialize the dither stripper variables used in the dither stripper method of the invention. The process then flows to step 4224 to initialize the dither drive variables.

Figure 4C:
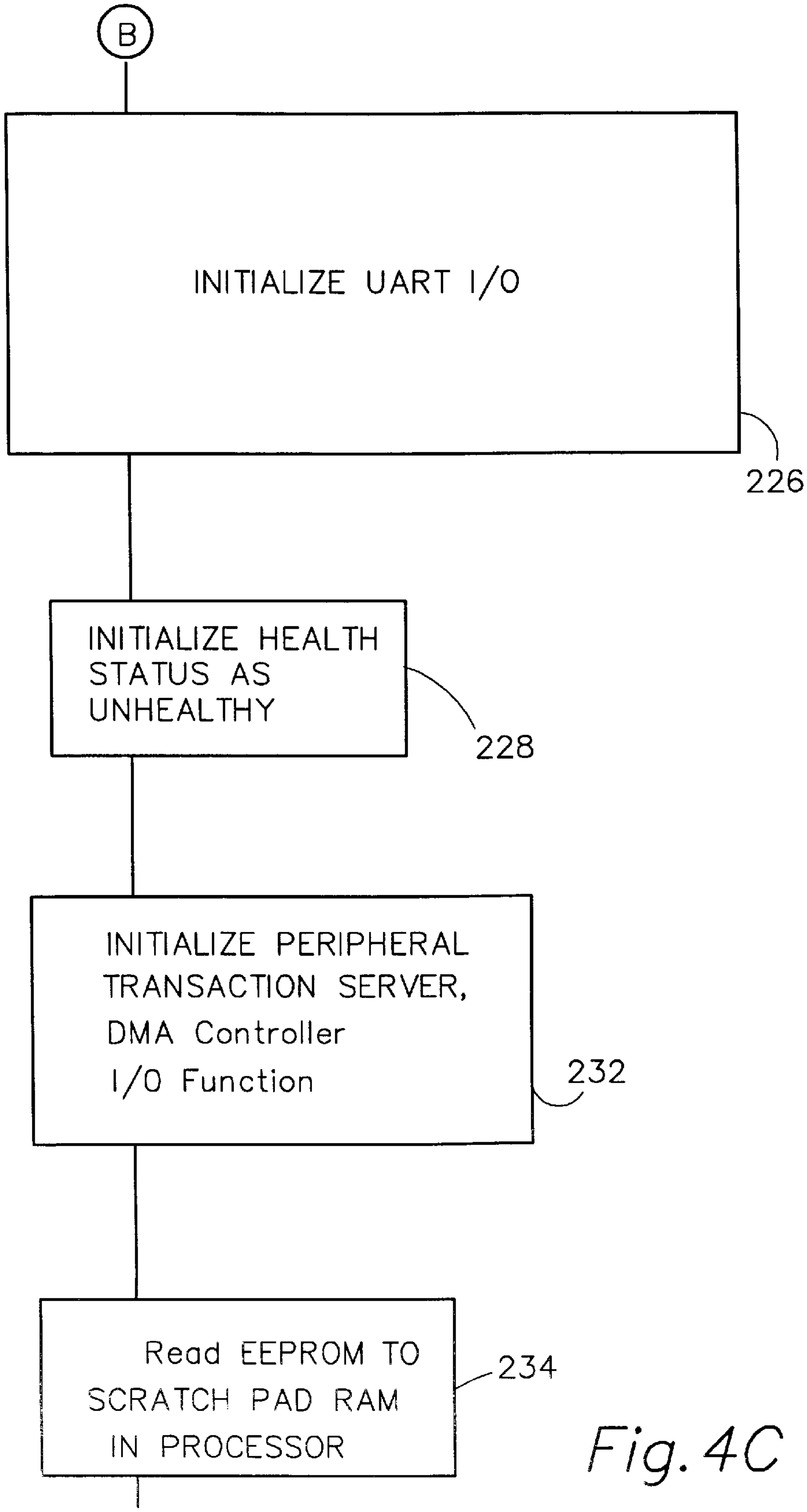
FIG. 4C shows a part of a method of the invention for starting a modular laser gyro from initializing a UART IO system to reading an EEPROM in a scratch pad RAM.

Now referring to FIG. 4C which continues the initialization method of the modular laser gyro. The process then flows to step 4226 to initialize the UART IO which sends and receives data from the external processing system 210 controlling the modular gyro. The UART 202 communicates inertial navigation data in the form of delta theta data and communicates built-in test function data and command status data through two bi-directional IO lines 204 and 206.

The process then flows to process step 4228 to initialize the status of the modular gyro to unhealthy. The process then flows to test the gyro. The process then flows to process step 232 to initialize the peripheral transaction server DMA controller and all IO functions including the peripheral transaction serial IO through the UART. The process flows to step 234 where the EEPROM is read to scratch pad ram in the microprocessor 120.

Figure 4D:
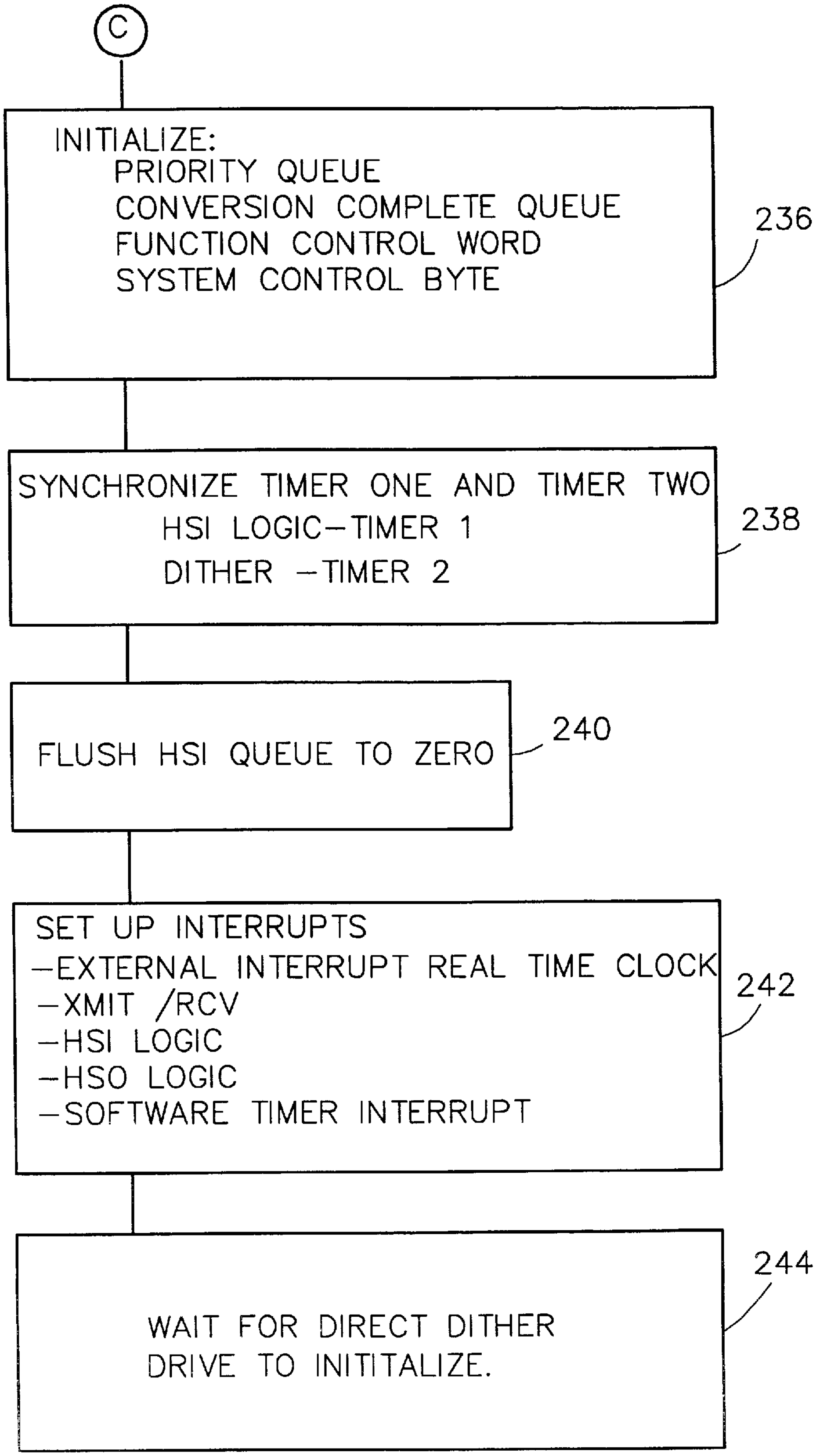
FIG. 4D shows a part of a method of starting a modular laser gyro from initializing a priority queue to waiting about 200 milliseconds for a dither drive to initialize.

Now referring to FIG. 4D which shows the process of initializing the modular laser gyro continuing with step 236 which initializes a priority queue, a conversion complete queue, a function control word, and a system control byte. The process then flows to step 238 to synchronize the two timers of the invention HSI timer 1 and the dither stripper timer 2. The process then flows to step 240 to flush the high speed interrupt queue to zero. The process then flows to 242 to set up the interrupts for the real time clock, the transmit receiver, the high speed input logic, and high speed output logic and software interrupt. The process then flows to 244 to wait a predetermined amount of time for the direct dither drive to initialize.

Figure 4E:
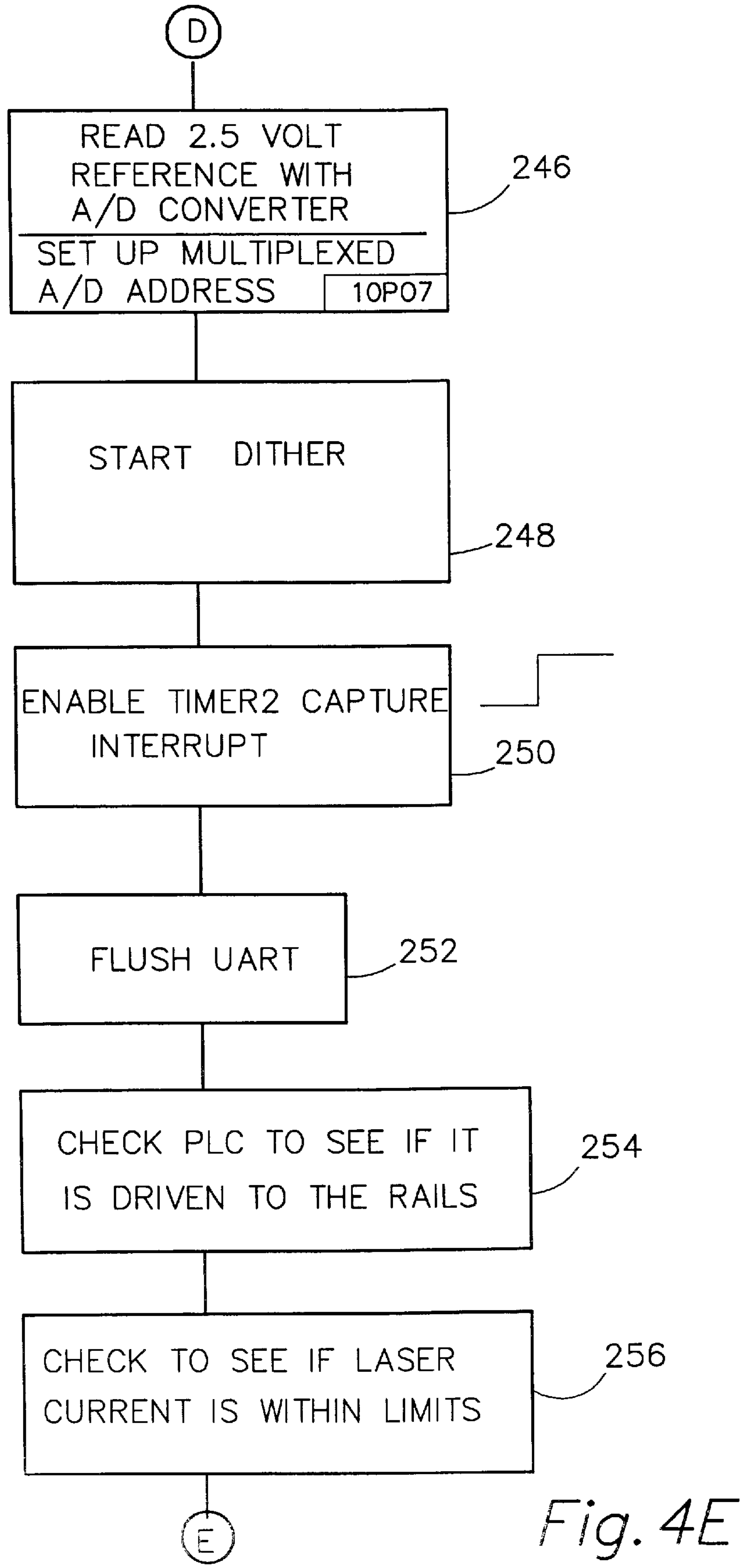
FIG. 4E shows a part of a method of starting a modular laser gyro from a step of reading a 2.5 volt reference to checking to verify whether a laser current is within limits.

Now referring to FIG. 4E where the process of initializing the gyro continues by reading a 2.50 volt reference with the A/D converter and setting up a single multiplexed A/D converter address in IO port 7. The process then flows to 248 to start the dither drive. The process then flows to 250 to enable the $T_2$ CAP interrupt which captures the timing of the gyro system clock. The process then flows to 252 to flush the UART. The initialization process then flows to step 254 to check the path length controllers to see if they have been driven to the rails. The process flows to 256 to see if the laser current is within prescribed limits.

Figure 4F:
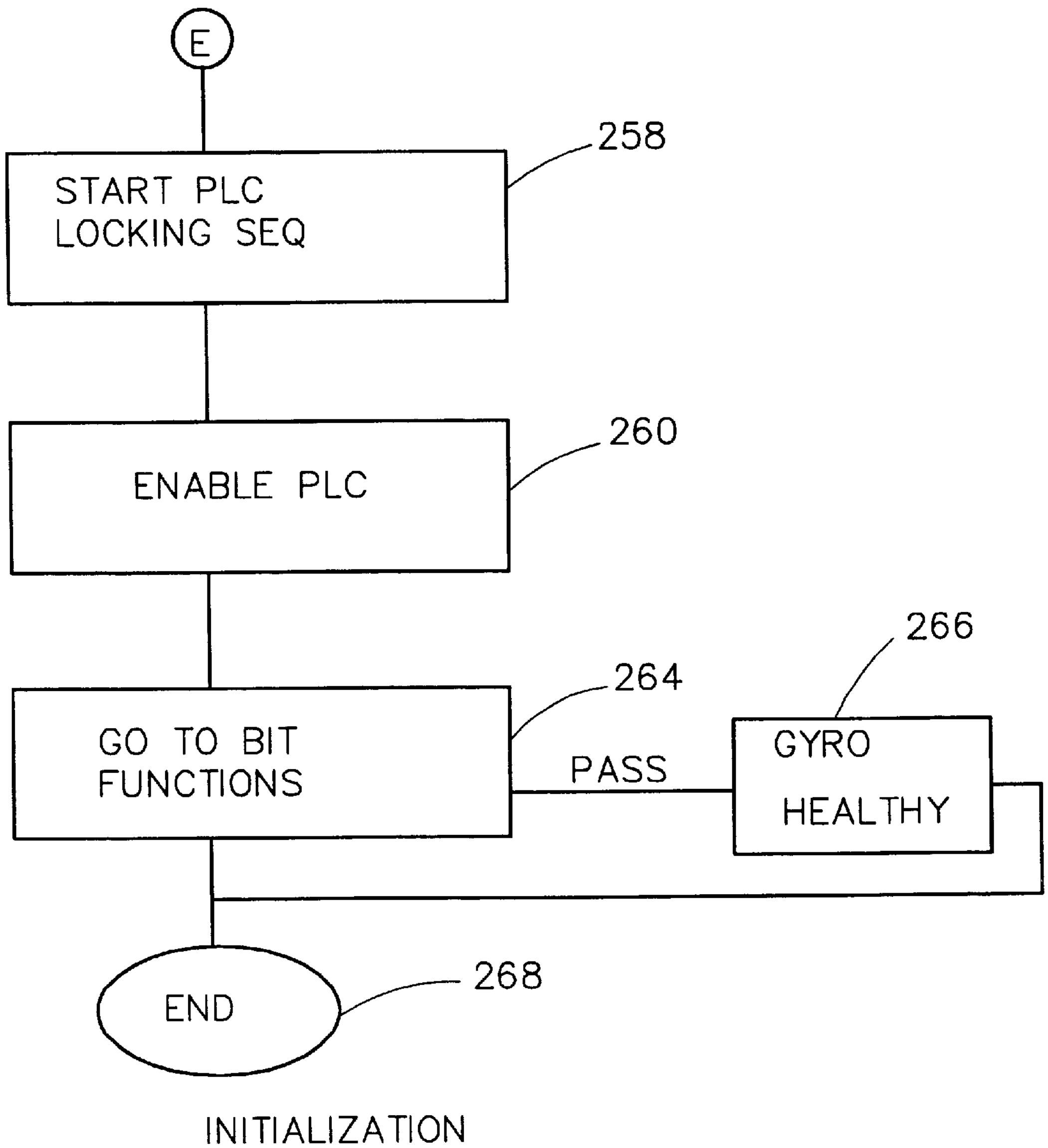
FIG. 4F shows a part of a method of starting the modular laser gyro from starting the path length control locking sequence to executing the built in test functions.

Now referring to FIG. 4F which shows the process continuing with starting a path length control locking sequence. The path length control locking sequence controls the mirror positions to "lock on" to a selected mode in response to a PLC signal. The process then flows to process step 260 to enable the peripheral transaction server. The process then flows to process step 264 to execute built-in test functions and set the gyro health to healthy in step 266 if all tests have been passed. The initialization process ends at step 268.

Active Current Control

Figure 5:
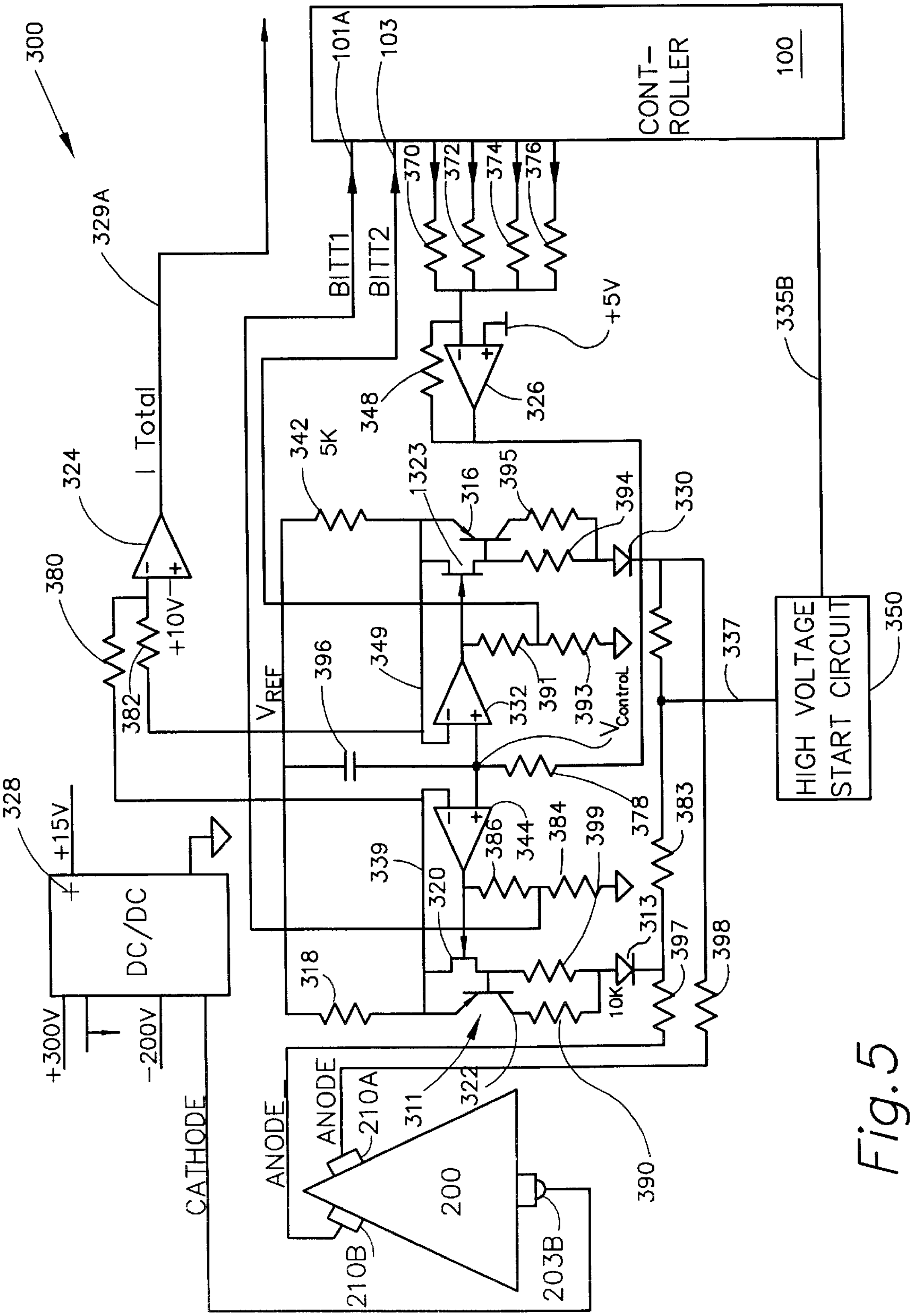
FIG. 5 schematically shows a circuit diagram of one example of an active current control circuit employed in the present invention.

Refer now to FIG. 5 where a more detailed circuit diagram of one example of an active current control apparatus is shown. The gyro block 200 is illustrated as a triangular block having two anodes 5210A, 5210B and a cathode 203. Those skilled in the art will understand that the modular laser gyro block may comprise other polygonal shapes, such as rectangular. Those skilled in the art will also recognize that various combinations and numbers of electrodes including anodes and cathodes may be used in the modular laser gyro without departing from the scope of this invention.

The modular laser gyro of one embodiment of the invention includes an active current control apparatus. The active current control apparatus 300 in this example includes first, second, third and fourth amplifying means 344, 332, 324, 326, first and second output transistor means 311, 316, first and second field effect transistor (FET) means 320, 1323, DC/DC conversion means 328 and high voltage start circuit means 350. The active current control apparatus 300 is coupled to microcontroller 100 and the modular laser gyro block 200.

The fourth amplifying means 326 is coupled to a gain resistor 348 at its inverting input. Also coupled to the inverting input are four input resistors 370, 372, 374 and 376. The controller 100 operates to generate a digital control signal onto the four input resistors. The fourth amplifying means 326 substantially functions as a digital-to-analog converter wherein the four input resistors correspond to a four bit input in which the first input resistor 370 is the most significant bit and the fourth input resistor 376 is the least significant bit. The fourth amplifying means translates the digital control input from the controller 100 into a proportionate analog signal which is applied through resistor 378 to node $V_{control}$. Thus, the active current control 300 may be controlled to within 4 bits of accuracy at node $V_{control}$ which correspond to a 10 volt to 5 volt swing at $V_{control}$.

$V_{control}$ is further coupled to the non-inverting inputs of the first and second amplifying means 344, 332. Each of the first and second amplifying means 344 and 332 drives a field effect transistor 320, 1323 which, in turn, control transistors 311, 316 through which current flows to one of the anodes 5210A and 5210B on gyro block 200. Each of the first and second amplifying means and their associated components may be considered as one "leg" of the active current control. The output of the first amplifier 344, for example, is connected to the gate of a field effect transistor (FET) 320. FET 320 may advantageously be a DMODE FET having a threshold of from about −2 to −4 volts or an equivalent device. FET 320 may advantageously be, for example, an N channel FET such as a JFET or MOSFET with sufficiently low gate impedance to allow substantially all of the current in precision resistors 318, 342 to flow to anodes 5210A and 5210B. FET 320 controls the base drive to high frequency transistor 311. Feedback line 339 provides negative feedback to the first current control amplifier 344. The source of FET 320 is connected to feedback line 339. The drain of FET 320 is connected to the base of the first output transistor 311. The emitter of the first output transistor 311 is connected to the feedback line 339 and through resistor 318 to a first terminal of capacitor 396. The second terminal of capacitor 396 is connected to the node $V_{control}$.

In one embodiment of the invention, when fully charged, capacitor 396 maintains a nominal voltage potential of about +10 volts at its first terminal. The first output transistor 311 has its collector 322 connected through a resistor 390 to the anode of diode 313. Diodes 313 and 330 are high voltage diodes rated at, for example, about 5,000 volts, and serve to protect the active current control circuitry during start-up of the modular laser gyro. The base of output transistor 311 is connected to the source of FET 320 and a resistor 399. Resistor 399 is also connected to the anode of diode 313. The cathode of diode 313 is connected through resistor 397 to anode 5210B. The second amplifying means 332 is similarly arranged with its associated components, namely, FET 1323, the second output transistor 316 and resistance components 391, 393, 394, 395, 398, 342 and the second diode 330 which is connected at its cathode to the second anode 5210A. The first amplifying means 344 comprises a first leg of the driving circuit and the second amplifying means 332 and its associated components comprise a second leg of the circuit. Both legs operate in a similar manner to supply substantially equal current to the modular laser gyro. The first and second amplifying means 344, 332 may advantageously comprise operational amplifiers having less than about a 1 MHz bandwidth, such as, for example, model number LM 2902. The first and second transistors 311, 316 may advantageously be slightly reversed biased by 10 volts from base to collector in one example embodiment of the invention. This reverse bias reduces the effective capacitance between the base and collector, thereby improving the transistors' high frequency response.

A third amplifier means 324 may advantageously, optionally be included to provide an output signal 329 which is representative of the sum of the current in each leg of the modular laser gyro. The current sum is designated "I Total". An inverting input of the third amplifier means 324 is connected through resistor 380 to feedback line 339, and through resistor 382 to feedback line 349.

In this example, the cathode 203 of the modular laser gyro is kept at a constant voltage of, for example, in the range of about −425 to −460 volts through DC/DC converter means 328. In operation, DC/DC converter means 328 converts an input voltage of about +15 volts from an external power source to, for example, an output voltage of nominally in the range of about −450 to −490 volts.

Also optionally included in this example of an active current control are built in test lines BIT 1 and BIT 2. BIT 1 and BIT 2 are coupled to first and second analog-to-digital inputs 101A and 103, respectively, of controller 100. BIT 1 and BIT 2 provide test signals which are employed by controller 100 to determine whether or not the active current control is in the proper operating range and that the operational amplifiers 344, 332 are not locked up at the high or low power supply limits. These limits are also called positive and negative rails respectively herein.

One example of a built-in-test that may be employed with the present invention is a high limit test coupled with a low limit test. The high limit test uses the controller 100 to supply a digital command signal to the fourth amplifying means 326 that corresponds to a predetermined upper limit for total current. The BIT 1 and BIT 2 signals are then read by the controller 100 and compared by well known comparison means to a nominally acceptable maximum value. Similarly, the low limit test may test the active current control apparatus for a nominally acceptable minimum value. In this way the circuit apparatus may be tested to assure that the apparatus and the modular laser gyro are operating within acceptable limits and are not, for example, operating in a range too near the rails. For example, if one of the legs in the modular laser gyro failed to ignite, this condition would be an indication that one of the operational amplifiers 344, 332 was locked up at the positive rail.

It is important to the operation of each leg of the active current control to carefully select the resistors at the output of the current supply legs. For the first leg, resistors 390, 399 and 397 must be selected according to the equations listed hereinbelow. Similarly, care must be taken in selecting resistors 395, 394 and 398 in the second leg of the active current control. In the first leg, for example, resistors 390 and 399 must be selected such that the voltage on collector 322 of transistor 311 remains relatively constant over the operating range of the current in the modular laser gyro. In one example of the invention, resistors 390, 399 and 397 and their counter parts 394, 395 and 398 are selected to operate for a worst case BETA of 10 for PNP transistor 311, 316 at low currents and low temperatures of about −55 degrees centigrade. The selection of these resistors minimizes power dissipation in the transistors 311 and 316. In one example, current is supplied in the range of about 0.15 to 1 ma per leg. These limits are established by the impedance characteristics of the gas discharge and the current limits of the power supply.

It should be noted here that the active current control of the invention takes advantage of the negative resistance inherent in the modular laser gyro tube. That is, as the gyro demands higher current the voltage from the anode to the cathode drops. The invention selects a ratio for R1 and R2 such that the base drive current through R2 increases as current demand for the modular laser gyro tube increases. The resistors R1 and R3 are particularly selected to minimize the power dissipation in transistor 311 at the maximum current. The following equations illustrate a method employed by the current invention to select resistors R1, R2 and R3 in order to operate with a Beta of 10 or less in the PNP transistor 311.

1. A quadratic fit to current-voltage characteristics over the RLG negative resistance region $I_A$=0.15 to 1 ma is done using the following equation:

$$V_T=K_O+K_1I_A+K_2I_A^2+\Delta V_{TEMP}+\Delta V_{PROCESS}$$

where:

$V_T$=Tube Voltage;

$V_{TL}$=Tube Voltage at low Temperature;

$V_{TH}$=Tube Voltage at high Temperature;

$V_C$=Cathode Voltage;

$I_A$=Anode Current (one leg);

$V_{CE}$=the transistor collector-emitter voltage; and $K_0$, $K_1$ and $K_2$ are constants for the quadratic fit equation which are specific to the I-V characteristics of the laser discharge in the modular laser gyro being modeled by these equations.

The conditions for R2 are set as follows:

2. R2>$V_C-V_{TL}/I_{Amin}$
3. R2>$dV_T/dI_A$ at lowest current.
4.

$$\frac{R2}{R1}<\beta\min$$

R1and R3 must satisfy the following equations:

5.

$$R1+R3=\frac{V_C-V_{TL}-V_{CE_{max}}}{I_{A_{max}}}$$

6.

$$R1+R3=\frac{V_C-V_{TH}-V_{CE_{min}}}{I_{A_{min}}}$$

7. It is important to note that a PNP transistor has a larger BETA characteristic at −55° C. and lower current when compared to an NPN transistor. Therefore, PNP transistors are preferably used as the current source transistors.
8. In one example an SOT—23 packaged transistor dissipates less than 100 mw at −55° C. for maximum current.
9. In one example an MMBT6520 transistor was employed having the following frequency characteristic:

$F_\tau$=40 MHz where $C_{cb}$<6 pF

10. Collector reverse biased by >10 volts to reduce base-collector capacitance.
11. From operating window data taken at Honeywell Inc. it has been found for certain modular laser gyros that if R3>0K for $C_{cb}$<6 pF, then the operating window is reduced <5%. All the above conditions are met with:

R1=50K, R2=421K, and R3=30K in one embodiment of the invention.

The Active Current Control apparatus of the invention may be built with $V_C$ Fixed or Variable to reduce power consumption. A fixed $V_C$ approach with proper selection of R1, R2, and R3 allows operation with low Beta. The negative resistance of the IV characteristic is used as an advantage to increase base drive at high currents.

Figure 46:
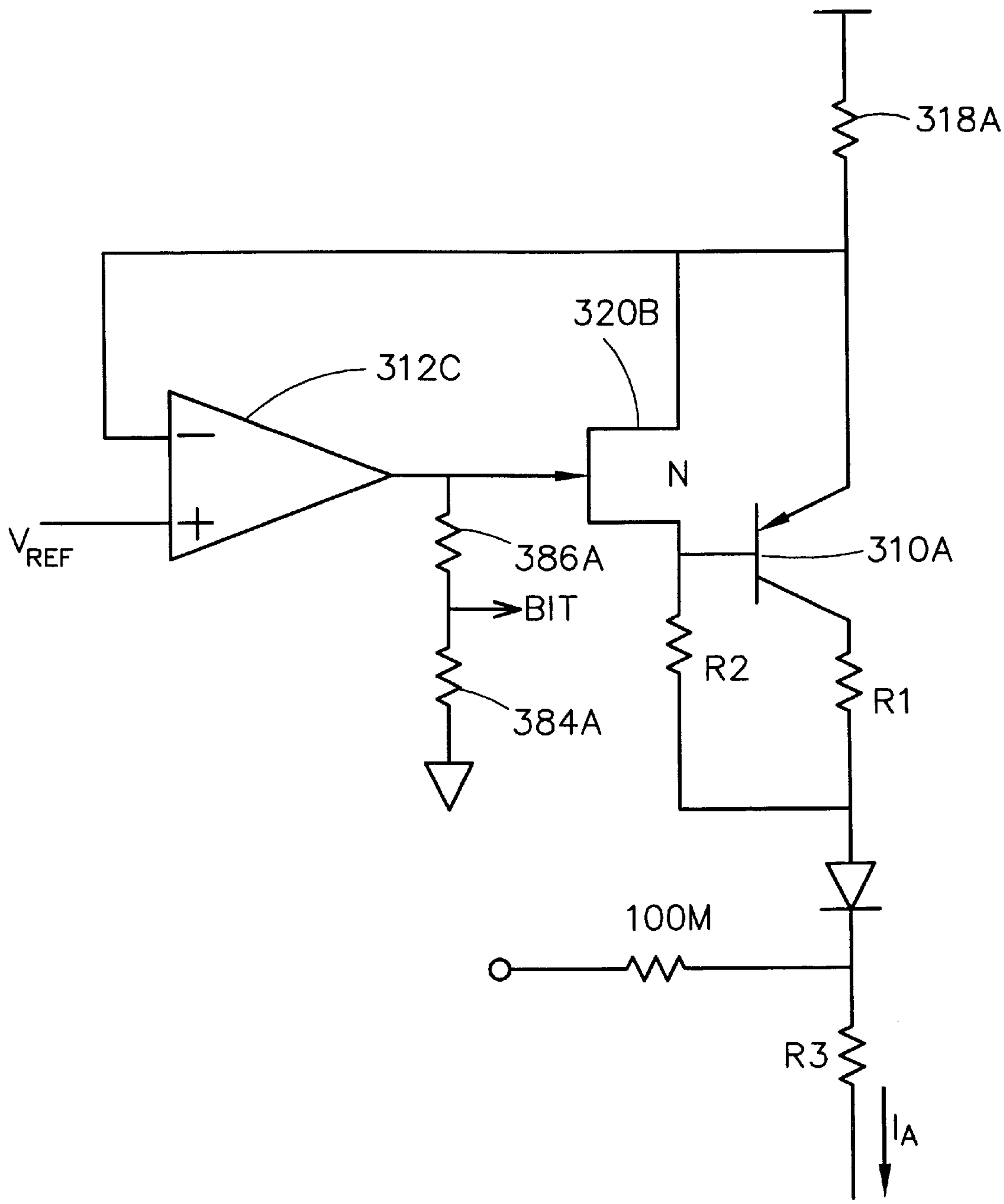
FIG. 46 shows schematically one leg of an active current control apparatus mode in accordance with the present invention.

Referring now to FIG. 46, an example of one current source leg of an embodiment of the active current control of the invention is shown for the purposes of illustrating the selection of resistors R1, R2 and R3. It should be noted here that the active current control of the invention takes advantage of the negative resistance inherent in the modular laser gyro tube. For example, as the gyro demands higher input current, the voltage from the anode to the cathode drops. The invention selects a ratio for R1and R2 such that the base drive current through R2 increases as the current demand for the modular laser gyro increases. The resistors R1 and R3 are particularly selected to minimize the power dissipation in transistor 2110A at the maximum current. The following equations illustrate a method employed by the current invention to select resistors R1, R2 and R3 in order to operate with a Beta of 10 or less in the PNP transistor 2110A.

Path Length Control

Figure 6:
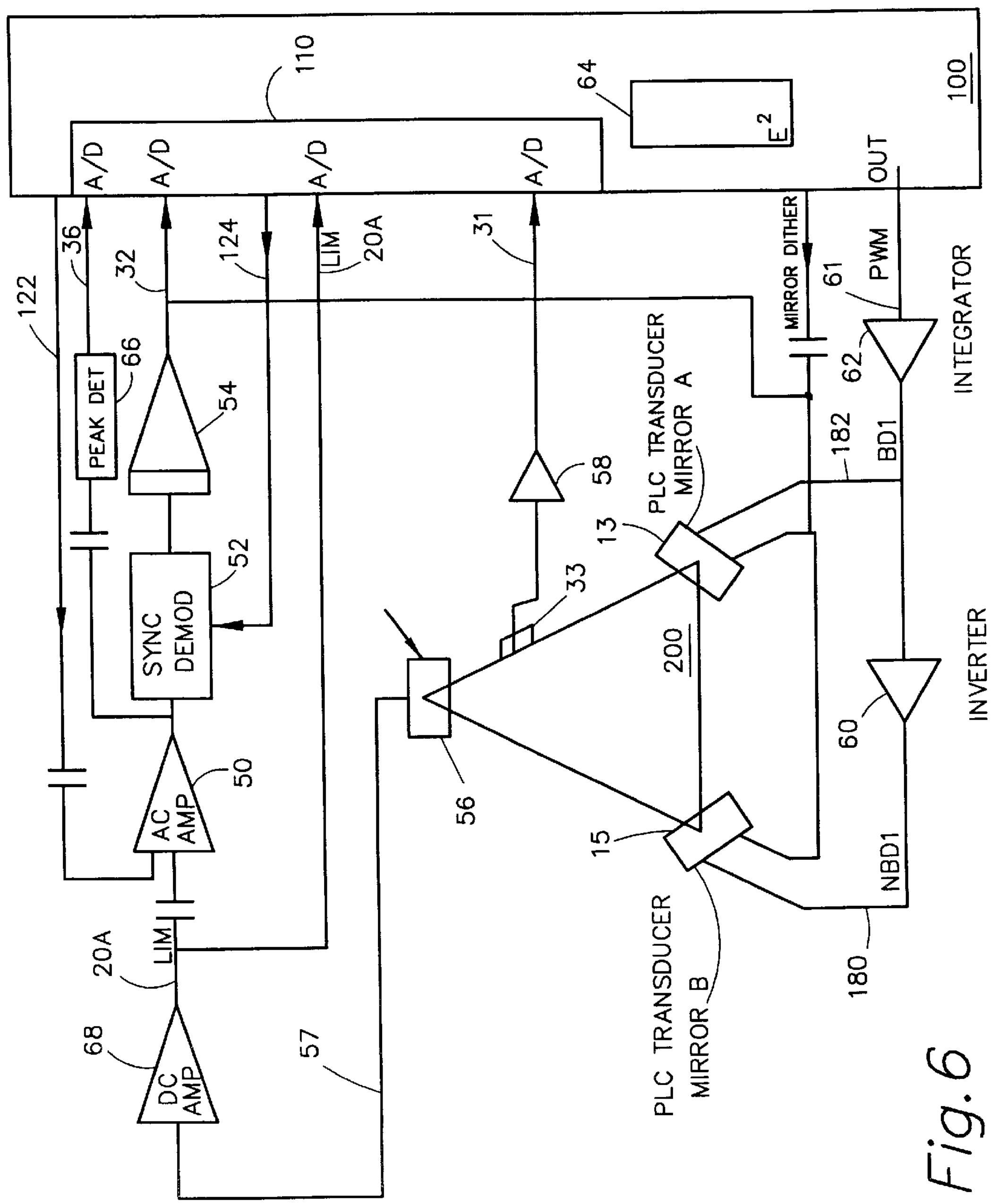
FIG. 6 shows one embodiment of the invention used to implement the bias drift improvement method employed in the invention showing a microprocessor controlling a path length control circuit with pulse width modulation.

Now referring to FIG. 6 which shows the apparatus of the invention used to control the path length transducers of the invention. The apparatus of the invention controls the path length transducers for mirror A and mirror B of the laser block 200. The laser block has a number of sensors including a temperature sensor 33 which sends a temperature signal which is amplified by temperature sensor amplifier 58 which provides a temperature signal 31 to the on board A/D converter 110.

The laser block 200 also has a power detect signal 57 which is picked up from photo diode 56 connected to DC amplifier 68 which provides the laser intensity monitor (LIM) signal 20. The gyro block 200 transducer mirrors A and B 13, 15 provide the principle means by which path length control is implemented. As the laser path is adjusted with the path length control transducers the laser intensity monitor signal 20 may vary. The invention provides a number of components that help process the laser intensity monitor signal into a useful set of signals, including the laser intensity monitor signal 20, a path length control monitor signal (PLCMON) 32 and a single beam signal (SBS) 36.

The AC amplifier 50 receives the AC component of the laser intensity monitor 20. The output of the AC amplifier 50 is sent to a synchronous demodulator 52 which provides a signal to an integrator 54 which generates the path length control monitor signal PLCMON 32. The output of the AC amplifier 50 is also AC coupled to a peak detector 66 which provides a single beam signal 36. The AC amplifier 50 also has as an input from the sweep signal 6122 which is synchronized to the switch signal 6124. The synchronous demodulator 52 also provides a method by which the closed loop path from the laser intensity monitor through to the path length control monitor may be used to adjust the path length.

The high level circuit diagram of FIG. 6 illustrates one example of an apparatus to control path length. The synchronous demodulator provides a way of controlling the path length mirrors in a fashion such that the path length control transducers are continuously seeking the peak of a laser mode.

Bias Drift Improvement

Figure 7:
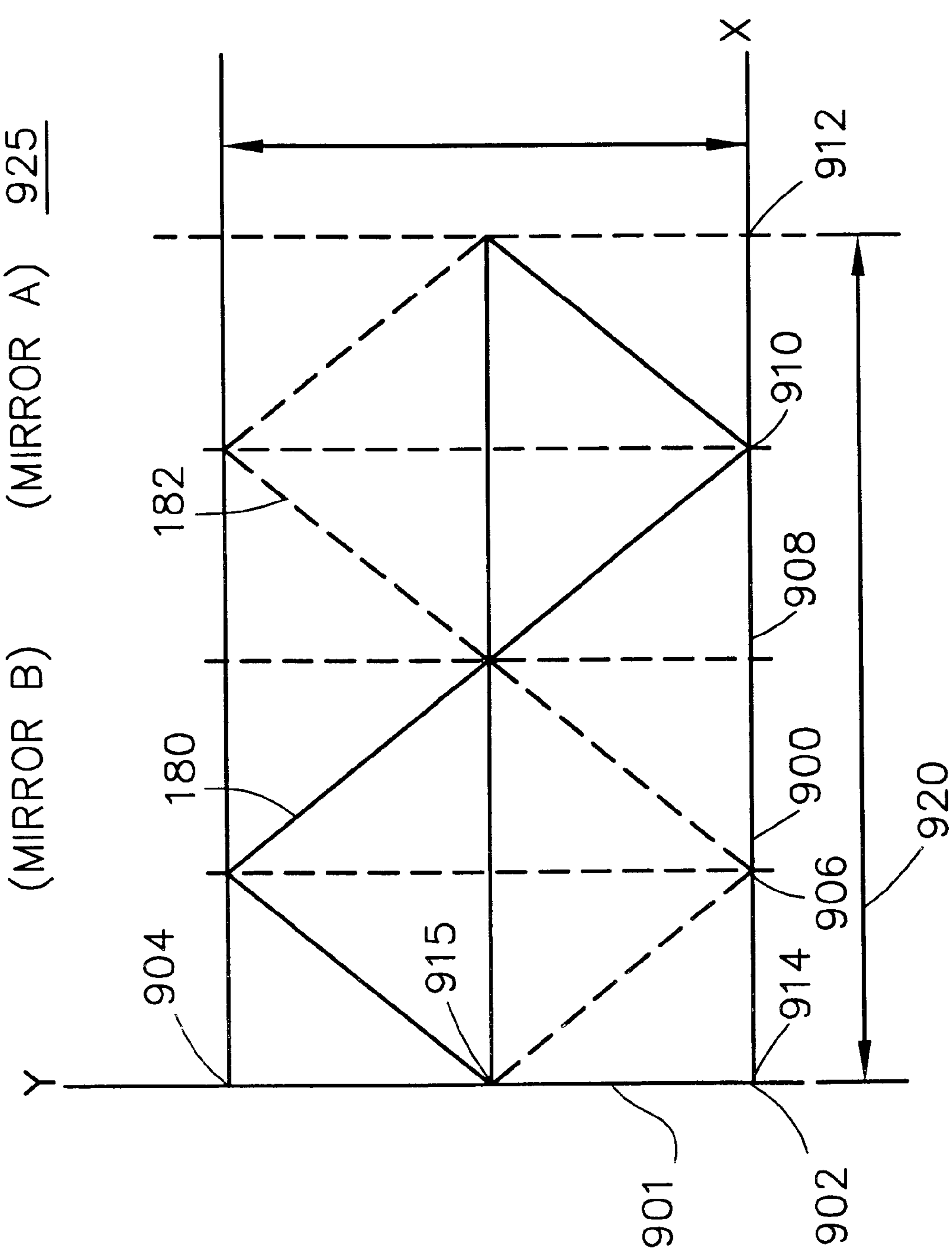
FIG. 7 shows a plot of a modular laser gyro bias improvement control voltage against time.

FIG. 7 shows the use of mirror A 13 which has been moved to cause the path length of the laser beam to move increasingly through two wavelengths of the laser. FIG. 7 also shows the use of mirror B 15 which has been moved to cause the path length of the laser beam to move decreasingly through two wavelengths of the laser. The X horizontal axis 900 shows time. The Y vertical axis 901 shows BDI control voltage. At all points in time the method of counter movement of the mirrors results in no net change in path length. Once the mirrors have traversed through their range of motion they reverse and move opposite their original direction. This motion is repeated continuously during the bias drift error compensation mode of the invention.

The entire BDI cycle 925 is run over a time period 920, typically 1–10 seconds in duration. In one preferred embodiment of the invention the time period 920 may be about 10 minutes. The BDI voltage 180 driving mirror B 15 is run from an average value 915 at time 914 to a high positive value 904 at time 906 back to the average value at time 908 to a high negative value 902 at time 910 back to the average value at time 912. The BDI voltage 182 driving mirror A is run from an average value 915 at time 914 to a high negative value 902 at time 906 back to the average value 915 at time 908 to a high positive value 904 at time 910 back to the average value at point 912. Driving the BDI control voltages 180 and 182 in this fashion moves the path length control mirrors through the BDI cycle without changing the path length and while also not effecting the ability of the modular laser gyro to provide an accurate gyro response.

Certain laser gyros exhibit excellent random drift rates. These laser gyros may be identified using a test bed. The test bed may be configured to run a test where the random drift rate is measured over the range of mirror positions attained over the bias drift cycle using the bias drift rate method and apparatus described above. The random drift rate is noted at predetermined sample points in the bias drift cycle. Gyros with excellent random drift rates may be operated with the mirrors at the positions that exhibit these excellent random drift rates. A choice may be made during the construction and test of the gyro whether to run the gyro using the bias drift improvement method or to run the gyro at the lowest random drift rate dependent on which improvement method yields the lowest drift rate. In one preferred embodiment ties in drift rate dictate the use of the bias drift rate method for operation of the gyro.

Built In Test

Figure 8:
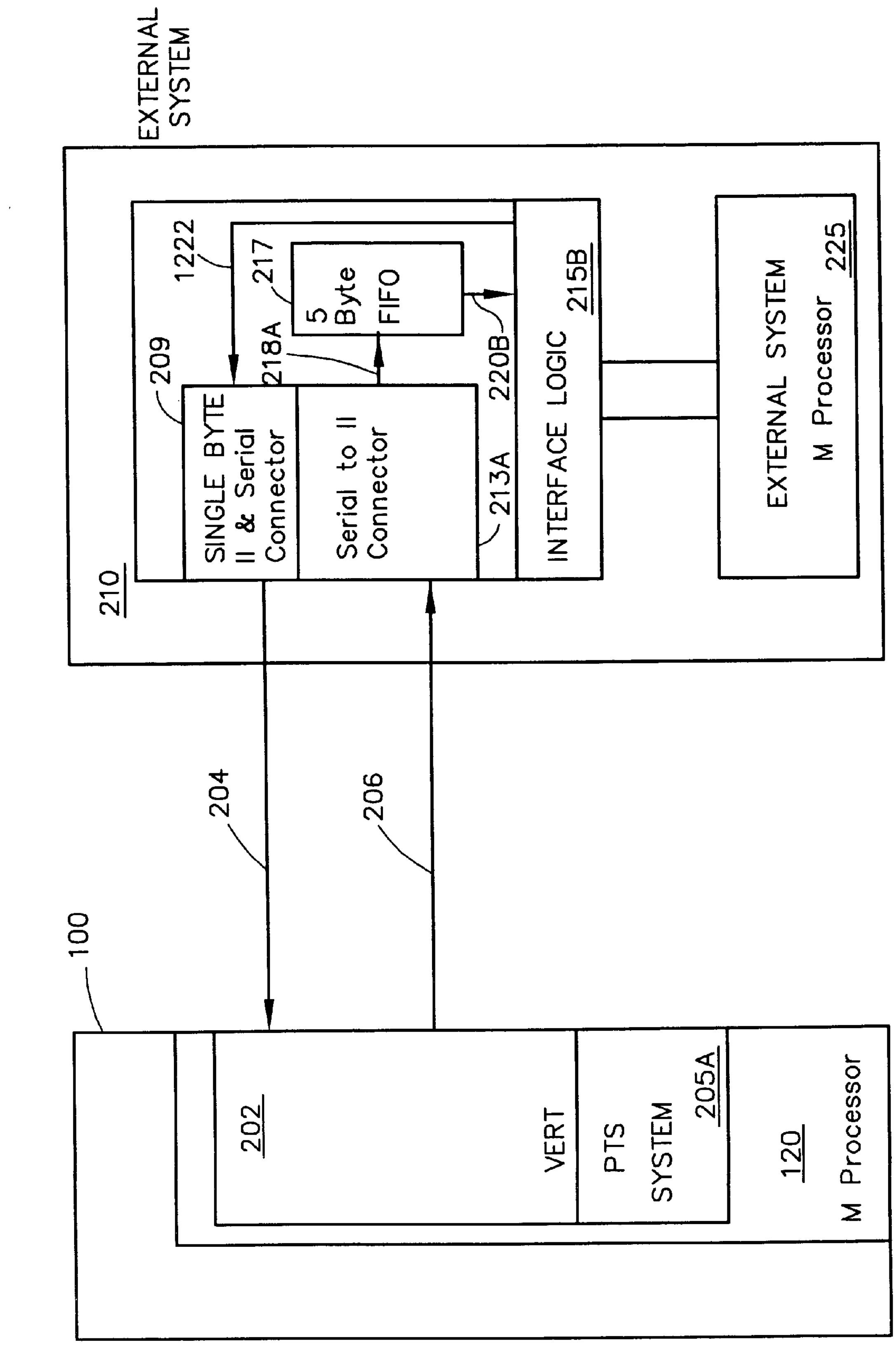
FIG. 8 shows one example of a hardware schematic diagram for the high speed communication system of the method of the invention.

FIG. 8 shows a hardware diagram for one example of the apparatus of the invention used to interface a modular laser gyro microcontroller 100 to an external processing system 210. The modular laser gyro microcontroller 100 includes a microprocessor 120. The microprocessor 120 includes a high speed UART 202 controlled by a peripheral transaction system 205A. The UART 202 communicates to the external processing system 210 on transmit line 206 and receive line 204. Line 206 is connected to the external processing system 210 through a serial to parallel converter 213A. The serial to parallel converter 213A provides information on line 218A to a five Byte first-in-first-out register (FIFO) 217. The five Byte FIFO 217 interfaces to processor interface logic 215B which provides information to an external system microprocessor 225 for further processing. The interface logic 215B provides commands from the external system microprocessor 225 through serial interface line 1222 to a single byte parallel to serial converter 209. The single byte parallel to serial converter 209 provides information to the modular laser gyro microprocessor 120 on receive line 204.

The apparatus of FIG. 8 provides a way of communicating high speed serial data into a queue in the serial to parallel converter 213A which provides a five Byte FIFO 217 with high speed interface data that may be accepted by the external system microprocessor 225. The apparatus of FIG. 8 provides a bi-directional means by which information may flow between the two processors 120 and 225 at a very high rate.

The microprocessor controlled configuration and control of the modular laser gyro 10 is accomplished through the communication of a command set. These commands are generally defined in four types. The four command types for the modular laser gyro are, first the parameter load commands, second the gyro control commands, third the gyro status commands, and fourth the gyro calibration and diagnostics commands.

Parameter load commands provide a way of loading constants into the microprocessor's EEPROM 102. Parameter load commands may be of two types. The first type is a one-word command, the second type is a two-word command. In one example embodiment of the invention a word is defined as a sixteen bit unsigned quantity.

Two-word parameter load commands fall into the types of commands requiring a two byte physical address in the EEPROM, for example, command 0 hexadecimal loads the K1 constant into the EEPROM at word addresses 0 and 1, command 1 loads the constant K2 into word addresses 2 and 3, etc. These commands occupy the 0-F hexadecimal address location. These constants occupy word addresses 0-1 FH in the EEPROM 102. The following table lists two-word parameter load commands for one example embodiment of the invention.

TABLE A

1. CMD 0H—Load compensation constant K1.
2. CMD 1H—Load compensation constant K2.
3. CMD 2H—Load compensation constant K3.
4. CMD 3H—Load compensation constant K4.
5. CMD 4H—Load compensation constant KI.
6. CMD 5H—Load compensation constant KI2.
7. CMD 6H—Load compensation constant K7.
8. CMD 7H—Load compensation constant K9.

9. CMD 8H—Load Serial Number.
10. CMD 9H—Load Build Date.
11. CMD AH—Load Alignment X.
12. CMD BH—Load Alignment Y.
13. CMD CH—Load Current (min,max) Limits; microamperes.
14. CMD DH—Load Power (min,max) Limits. Power is in milliwatts.
15. CMD EH—Load initial Dither stripper AGC gain constant.

In this example, one-word parameter load commands are loaded into EEPROM starting at address 40H. These command codes represent the physical address in the EEPROM where data is to be stored. These commands are listed below with explanations in Table B.

TABLE B

1. CMD 20H—Load Operating Hours. This command initializes the operating hours to a value specified in command parameter 1 into the EEPROM.
2. CMD 21H—Load Dither Frequency. This command loads the dither frequency in Hertz units into the EEPROM.
3. CMD 22H—Load Dither Command Angle. This command loads the dither command angle into the EEPROM. This value is used by the modular gyro system during power-on to set the initial command angle.
4. CMD 23H—Load PLC Mode Ref Voltage. This command loads the PLC mode reference voltage into the EEPROM.
5. CMD 24H—Set laser run current. This is a 4 bit value to set the initial laser run current.

Gyro control commands are those commands that either set the gyro operating parameters or alter gyro dither angle or write parameters check sum. The set gyro operating parameters commands change the operating modes of the gyro. Various bits are associated with various operating states of the gyro. The command code for the set gyro operating parameters command is 30H. Bit 0 of the command selects either constant current or constant power operation. Bit 1 is used to restart the system. Bit 2 is used to turn the compensation on or off for the gyro. Bit 3 is used to turn the noise for the gyro on or off.

The next command used in the gyro control command set is to alter gyro dither angle command. This command allows the dither angle to be altered to a value specified by the first parameter word in the command. The command code for this command is 31H.

The next command for the gyro control command set is the write parameter's check sum command. This command generates an overall check sum on the parameters currently in the EEPROM 102 and stores this value in the EEPROM 102. This check sum is used to determine whether or not the EEPROM 102 was loaded with the correct information or expected information.

The gyro read status commands allow gyro system functions to be monitored on the serial output data port 206. These commands begin at address 40H. The first read status command is command 40H which is read current control loop current command. This command returns the current control loop current from the gyro 10. The information returned is in microamperes. The read temperature command address 41H returns the current gyro temperature in degrees Kelvin. The readout intensity monitor (RIM) command address 42H turns the current RIM signal level. The read operating hour's command returns the number of hours to the nearest hour that the gyro 10 has been in active operation. This command's address is 43H. The read time to fail command address 44H returns the remaining number of hours the gyro has until a failure may occur. Command addresses 50H–5FH reads the calibration constants used for the gyro. The final commands are the enter calibration or diagnostic modes commands which are commands that enable the gyro to calibrate itself or diagnose any potential problems.

Figure 9:
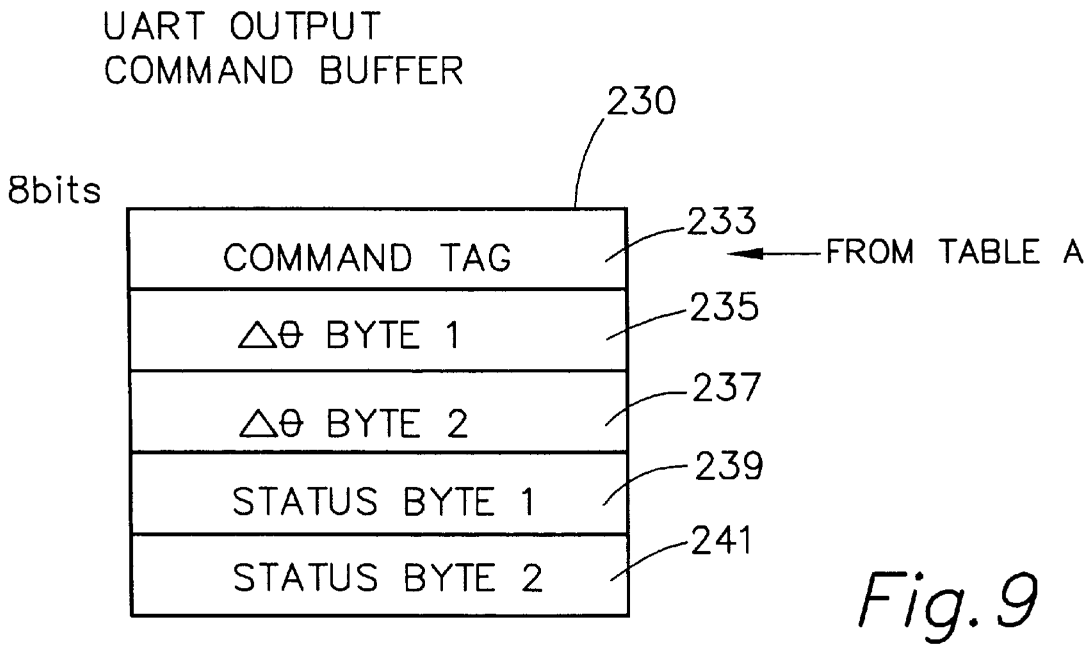
FIG. 9 shows an output frame for a command for a modular laser gyro.

Referring now to FIG. 9 which shows the structure of the UART output to command buffer for the microcontroller 100 UART in 202. When information is sent from the microcontroller 100 to the external system microprocessor 225 the information is transmitted in a five byte structure called a frame. The output frame 230 comprises a command tag 233, a delta theta byte 235, a delta theta byte 237, a first status byte 239, and a second status byte 241. The status tag 233 is a reference to the type of status data the modular laser gyro system status tag is sending. Status data includes such information as compensation coefficients, path length control voltage levels, modular laser gyro temperatures and the status of the last command sent to be executed. The delta theta byte 235 and delta theta byte 237 are the dither stripped compensated inertial navigation measurements of the modular laser gyro 10. Status byte 1 239 and status byte 2 241 are the information resulting from the command.

The serial output data character format is asynchronous and 10 bits in length in one embodiment of the invention. The data is in the format of one start bit, one stop bit, and 8 data bits. In one embodiment of the invention the maximum clock rate is 12 megahertz resulting in a 750 Kbaud communication Rate.

Figure 10:
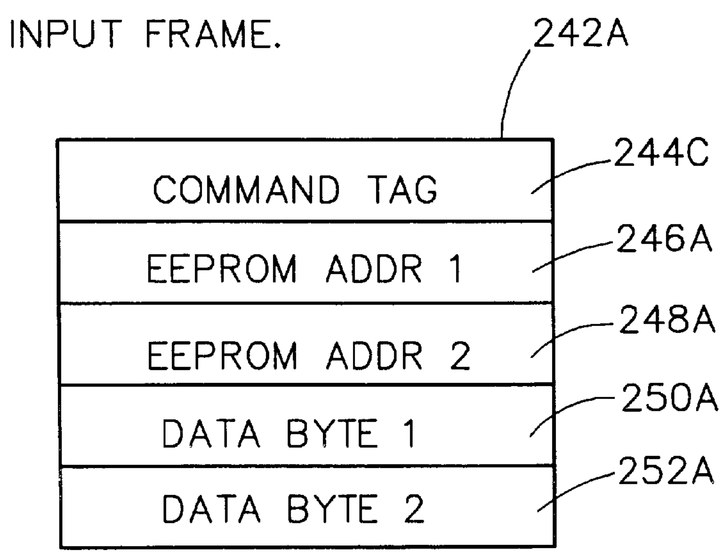
FIG. 10 shows an input frame for communications from an external host system to a modular laser gyro.

Now referring to FIG. 10 which shows the modular laser gyro of the invention's input frame format. The input frame 242A is composed of a number of elements. The first element is a command tag similar to the output frame 230. Command tag 244C provides a validity flag used to verify a write command to the microprocessor 120 of the modular laser gyro. The EEPROM address 246A and EEPROM address 248A contain the location in the EEPROM 102 of the data to be stored. The data byte 1 and data byte 2 250A and 252A provide the actual data to be stored into the EEPROM 102 at EEPROM address 246A and EEPROM address 248A.

Data is sent through the output channel from the gyro 10 to the external processing system 210 continuously at a predetermined update rate. This is to provide inertial navigation data to the external processing system 210 from the microprocessor 120 that is current and that may also include other information encoded in the status bytes.

Figure 14:
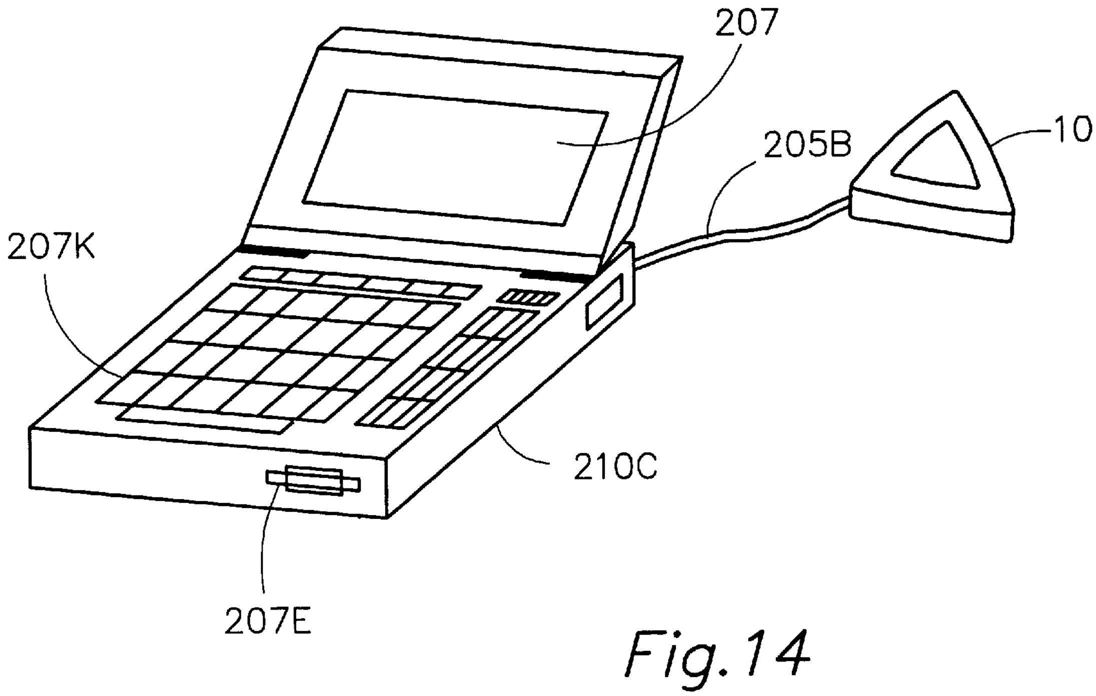
FIG. 14 shows a schematic diagram of a test apparatus of the invention.

Now referring to FIG. 14 which shows an alternate embodiment of the invention using an external system 210C which communicates with the modular laser gyro 10 of the invention as described herein. The system level control of the modular laser gyro 10 in this configuration is accomplished using interactive commands from the control system 210C. The control system 210C may advantageously comprise a microprocessor-based computer such as a personal computer, for example. The system 210C displays information to a human operator through visual screen 207. The operating parameters of the modular laser gyro system 10 are displayed on screen 207. The user uses the keyboard 207K of the control computer 210C. Those skilled in the art will recognize that gyro 10 operating parameters may be stored on removable media floppy disk 207E. The operation of the gyro 10 may be automated through a number of user interfaces including a window based system or other interactive systems. Those skilled in the art will also realize that batch-oriented testing commands may be loaded in the external system 210C and used to periodically monitor the performance of the modular laser gyro system 10 over long time periods.

Figure 11:
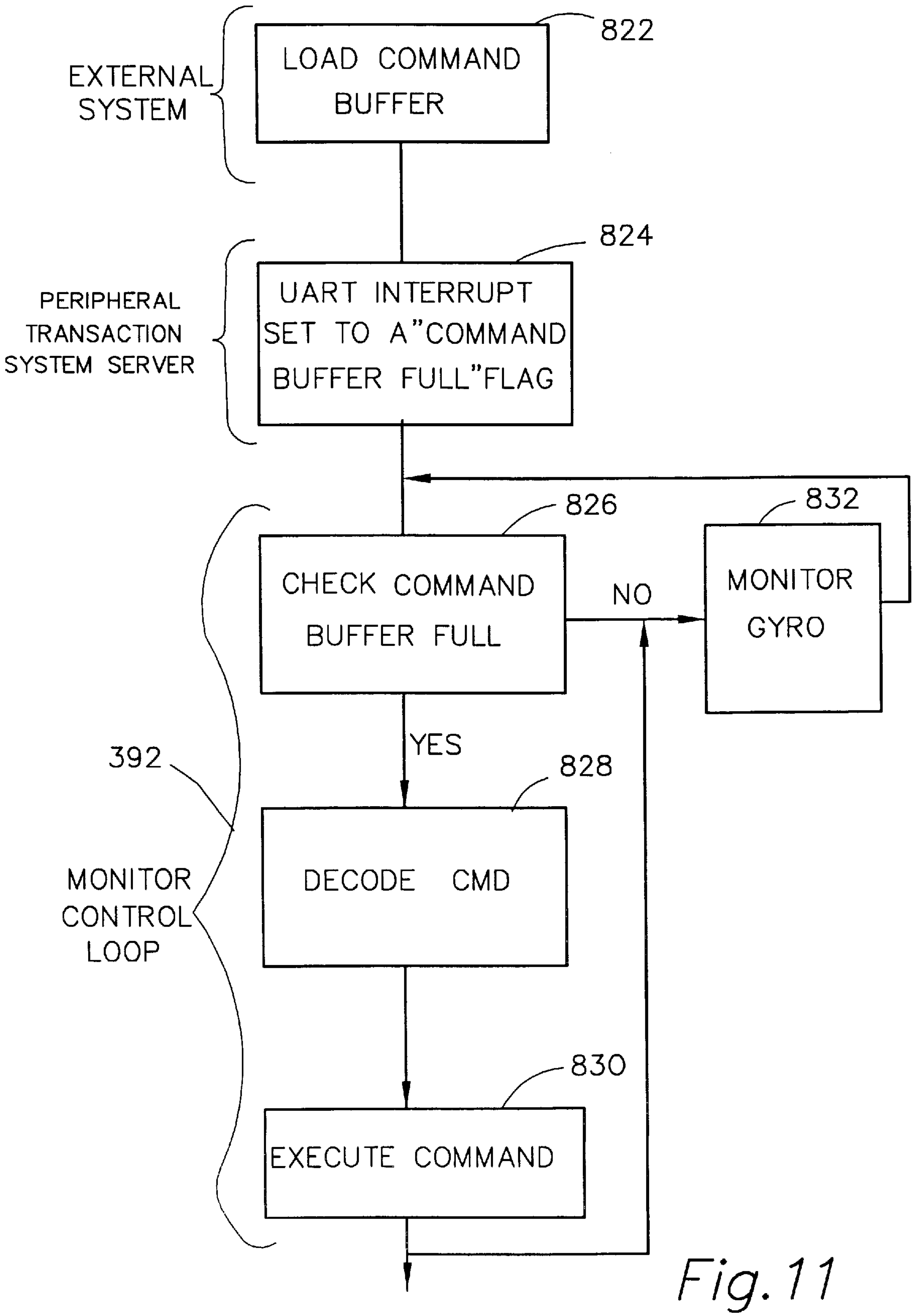
FIG. 11 shows a method of communicating between an external system and a modular laser gyro as employed by one embodiment of the invention.

Now referring to FIG. 11 which shows one method of the invention used to communicate between an external processing system 210 and the system microcontroller 100 for the modular laser gyro 10. The external processing system 210 could alternately include an inertial navigation system or a modular laser gyro test system. The external processing system 210 is responsible for loading a command into the output frame command buffer 230 at step 822. The command structure is shown more completely with reference to FIG. 9. The command is communicated over the receive line 204. The peripheral transaction system server 205A which is part of the microprocessor 120 sets a "command buffer full" flag. The UART 202 generates an interrupt which sets the command buffer full flag in step 824. The process of FIG. 11 then flows to enter a monitor control loop 392 and at step 826 checks whether or not the command buffer is full. If the command buffer is not full the process flows to step 832 to continue execution of the monitor control loop. If the command buffer 230 is full the process flows to decoding the command in step 828 and the process executes the command decoded in step 828 and step 830. The process then flows to step 832 to monitor the gyro. The process then flows to check the "command buffer full" flag in step 826 and repeats.

The modular laser gyro communicates with the external processing system 210 for many functions including reporting self test activities. The modular laser gyro includes a built in test equipment status register or BITE register 334, shown in FIG. 12, that reports the status of built in test functions, including self test functions, that are executed periodically. These periodic built in test functions are called cyclic BIT functions.

Figure 12:
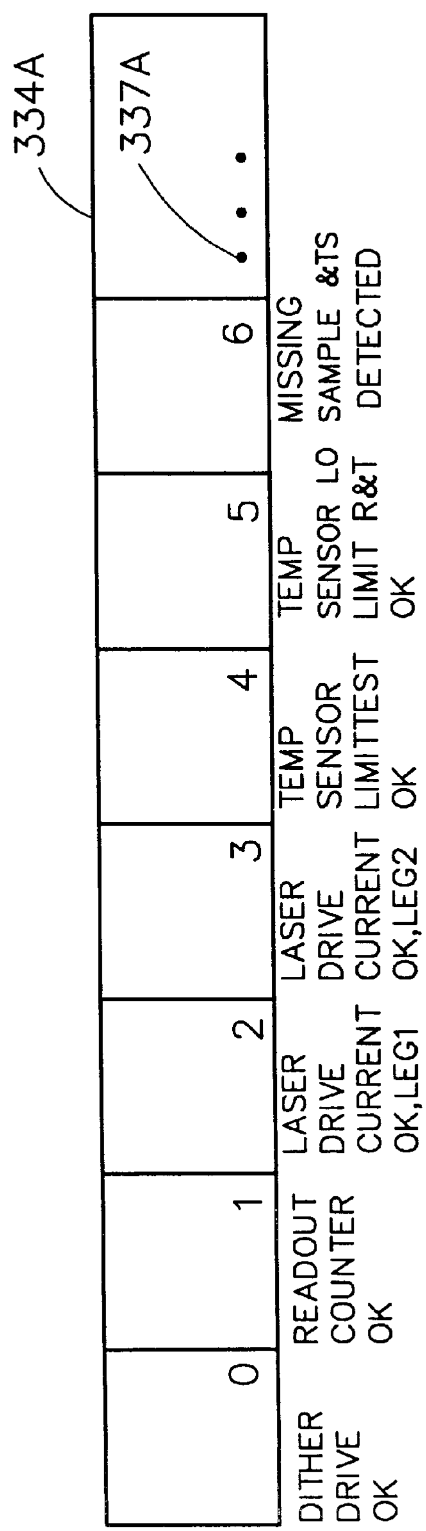
FIG. 12 shows schematically a built in test equipment status register.

Now referring to FIG. 12 which shows the built in test equipment status register 334. Each bit of BITE register 334 holds a particular meaning. Bit 0 of the BITE register 334 indicates the health of the dither drive. Bit 1 of the BITE register 334 indicates the health of the readout counter. Bit 2 of the BITE register 334 indicates the health of the laser drive current for the leg 1 of the modular laser gyro. Bit 3 of the BITE register 334 indicates the health of the laser drive current leg 2. Bit 4 of the BITE register 334 indicates the health of the temperature sensor while testing for a high temperature limit. Bit 5 of the BITE register 334 indicates the health of the temperature sensor while testing for a low temperature limit. Bit 6 of the BITE register 334 indicates the existence of a sample strobe to the modular laser gyro 10. Those skilled in the art will recognize that other features of the modular laser gyro 10 may be tested and their health reported in the BITE register 334 as indicated by ellipsis dots 337 in the BITE register 334.

Figure 13:
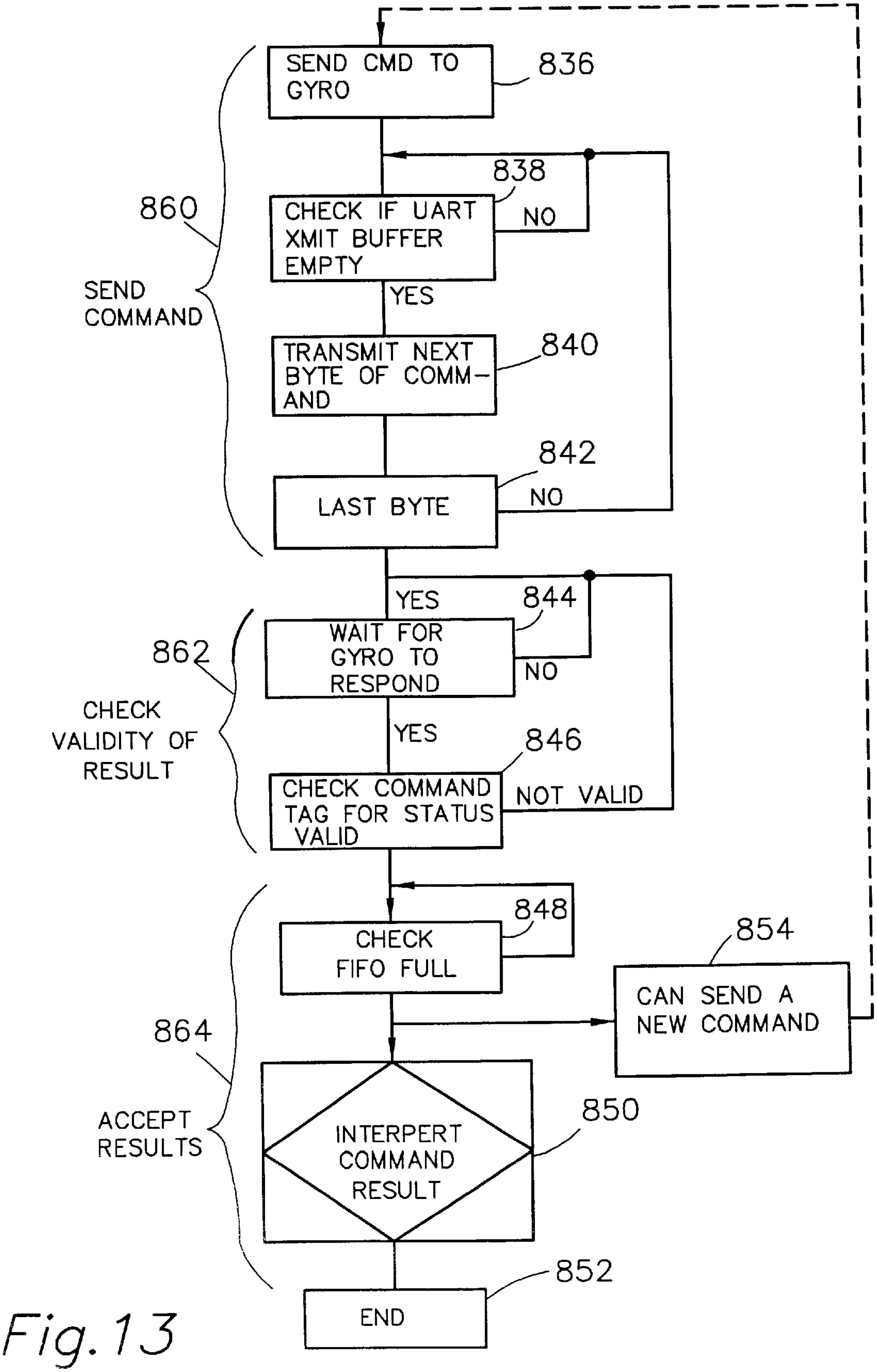
FIG. 13 shows one method of communicating high speed data in a modular laser gyro high speed test interface.

Now referring to FIG. 13 which shows the method of the invention used to interface the external system microprocessor 225 to the modular laser gyro 10 for high speed testing. The high speed test interface method of FIG. 13 starts by sending a command to the modular laser gyro in step 836. The process of FIG. 13 occurs in three phases. The first phase is the send gyro command phase 860. The second phase checks the validity of the result phase 862. The third phase is the accept results phase 864. The process flows from step 836 to step 838 where a check is made to see whether or not the UART serial converter transmit buffer 209 is empty. If the UART serial converter transmit buffer 209 is not empty the process repeats until the serial converter transmit buffer 209 is empty and flows to step 840. In step 840 the process sends the next BITE of the command. The process then flows to step 842 to check if this is the last BITE of the command. If it is not the last BITE of the command the process flows back to step 838 to send another BITE. If it is the last BITE of the command the process flows to step 844 to wait for the modular gyro to respond. This involves checking whether or not the FIFO 217 set up in FIG. 8 is full. If the FIFO 217 is not full the process returns to step 844 to wait for the modular gyro to fully respond. If the FIFO 217 is full the process checks the command tag for a valid status. If the status is not valid the process flows to 844 to wait for the modular gyro to respond again. If the command tag 244C status is valid the process flows to step 848 to check for the FIFO full. If the FIFO 217 is not full the process returns to 848 to wait for it to fill. The process then flows to 850 where the command is interpreted. At this point the modular laser gyro has the ability to again accept a new command as shown in block 854. The process in that case returns back to block 836 where the external system microprocessor 225 sends another command to the gyro. After the command is interpreted the process ends at step 852.

Calculation of Volts Per Mode

Figure 15:
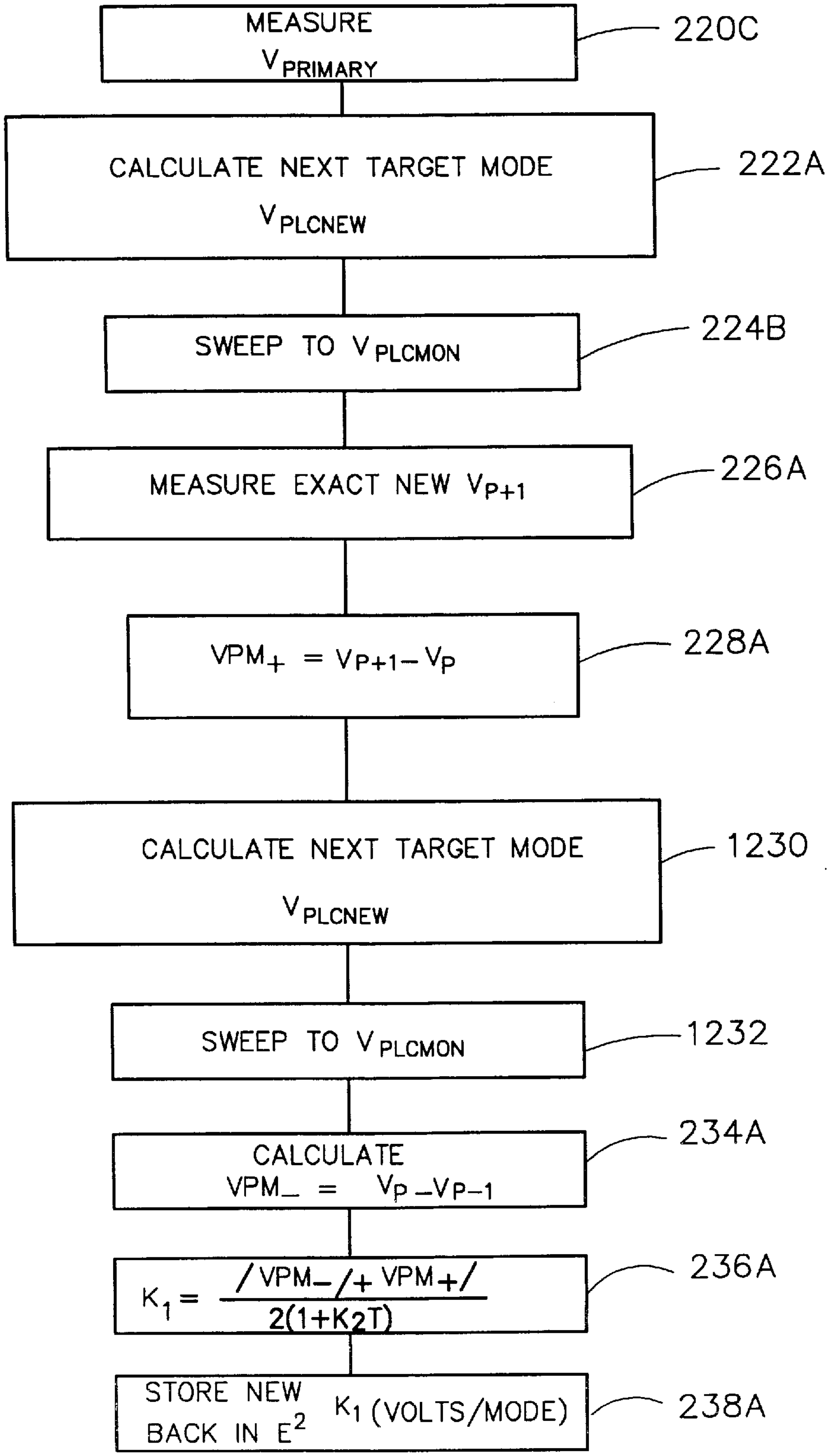
FIG. 15 shows a flow diagram of one method of the invention used to calculate volts per mode.

Now referring to FIG. 15 which shows a flow diagram of the method of the invention used to calculate the volts per mode of the modular laser gyro which is a derived lifetime estimation parameter. The methods of acquiring a mode and sweeping the modular laser gyro path length controllers, two important functions for calculating volts per mode are described hereinbelow.

Figure 16:
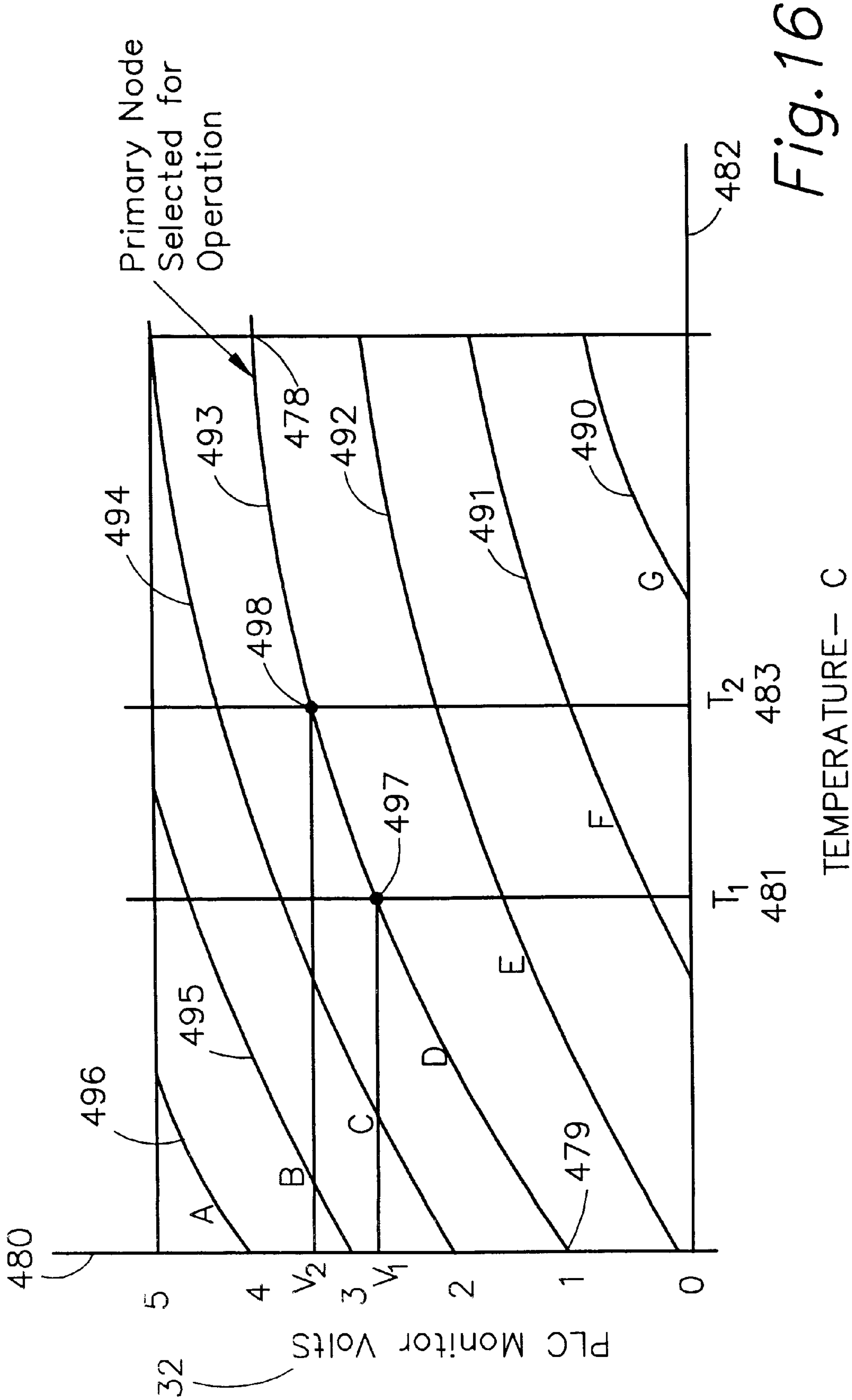
FIG. 16 shows the behavior of path length control monitor voltage as it depends on temperature.

Operating modes of the modular laser gyro 10 are dependent on temperature. Temperature fluctuations in gyro modes are illustrated in FIG. 16. FIG. 16 shows the behavior of path length control monitor voltage PLCMON 32 as it depends on temperature. A local peak, or maximum, in LIM is defined as a mode and is plotted as a parameter in terms of PLC monitor volts and as a function of temperature. Temperature is shown on the horizontal axis 482 which indicates increasing temperature to the right. PLC monitor voltage 32 is shown on the vertical axis 480 which indicates increasing PLC monitor output voltage toward the top of the graph.

FIG. 16 shows seven modes of one example embodiment of the modular laser gyro 10 of the invention as modes G through A numbered 490 through 496 respectively. FIG. 16 also shows two operating points of the modular laser gyro 497 and 498. It can be seen from FIG. 16 that as the temperature of the modular laser gyro changes so does the operating point of each mode. Lines 481 and 483 are provided to illustrate the effect of an increase in temperature from T1 to T2. Lines 481 and 483 intersect a number of mode curves providing several operating modes for the modular laser gyro at T1 and T2 respectively. Points 497 and 498 illustrate the effect a change in temperature has on the mode voltage. The modular laser gyro 10 is assumed to be operating on mode D, alternately known as the primary mode, at operating point 498.

While operating at T1 the path length control monitor voltage PLCMON 32 is shown in FIG. 16 to be V1 on axis 480. As the modular laser gyro changes temperature from T1 to T2 the PLCMON 32 voltage changes from V1 to V2 changing the operating point of the gyro to operating point 498 corresponding to PCLMON 32 voltage of V2. As the PLCMON 32 voltage swings through its minimum voltage 479 to its maximum voltage 478 the available modes at any given temperature change such that not all modes are available at every temperature. Therefore a need may arise, as the temperature changes, to hop a mode. Mode hopping is discussed in detail herein below with reference to FIG. 62, et seq.

Now referring again to FIG. 15, the process of calculating volts per mode starts by first measuring the path length control monitor voltage at step 220C $V_{Primary}$ (Also designated $V_P$)=$V_0+V_1T+V_2T^2$. The process then flows to 222A where the target mode is calculated as $V_{PLCNEW}=V_0-K_1(1+K_2T)+V_1T+V_2T^2$. The process then steps to step 224B where the modular laser gyro is swept to the $V_{PLCNEW}$ voltage. The process steps to 226A where the voltages referred to in this method are defined as follows. $V_P$ is the voltage of the path length controller at the primary mode. $V_{P+1}$ is the voltage of the path length control monitor at one mode higher than the primary mode. $V_{P-1}$ is the voltage of the path length control monitor at one mode lower than the primary mode. Process step 222A calculates the next higher target mode voltage as $V_{P+1}$. In step 226A the exact $V_{P+1}$ voltage is measured. In this volts per mode calculation a volts per mode for the modular laser gyro will be calculated for the positive direction and the negative direction. The positive volts per mode is called $VPM_+$ and the negative volts per mode is called $VPM_-$. The process then flows to step 228A where the voltage per mode in the positive direction is calculated as the voltage of the next higher mode to the primary mode $V_{P+1}$ minus the voltage of the primary mode $V_P$. The process then flows to 1230 where the $V_{PLCNEW}$ voltage for the new voltage in the negative direction is calculated as $V_0-K_1(1+K_2T)+V_1T+V_2T^2$. The process then flows to process step 1232 where the PLC transducers are swept to VpLcEW following the method discussed hereinbelow.

The process then flows to process step 234A where the new volts per mode in the negative direction is calculated as the difference between the primary volts of the path length control monitor minus the new negative $V_{P-1}$. In process step 236A the new $K_1$ constant is computed as the absolute value of the negative volts per mode plus the absolute value of the positive volts per mode divided by two times the quantity $(1+K_2T)$. The process then flows to step 238A where the new $K_1$ (volts/mode) is stored in the EEPROM 102.

In one alternate embodiment of the invention the modular laser gyro microprocessor controller further includes a personality storage module which may alternatively be in a second EEPROM or nonvolatile memory. The nonvolatile memory personality storage module stores certain operating characteristics of the gyro such as the path length control mirror positions and other operating characteristics of the gyro. The personality storage module also stores system specific information that may vary from system to system. This system specific information is determined at build time during the manufacturing process. These generating characteristics may be read or updated by the external system 210 using the communication apparatus of the invention.

Figure 17:
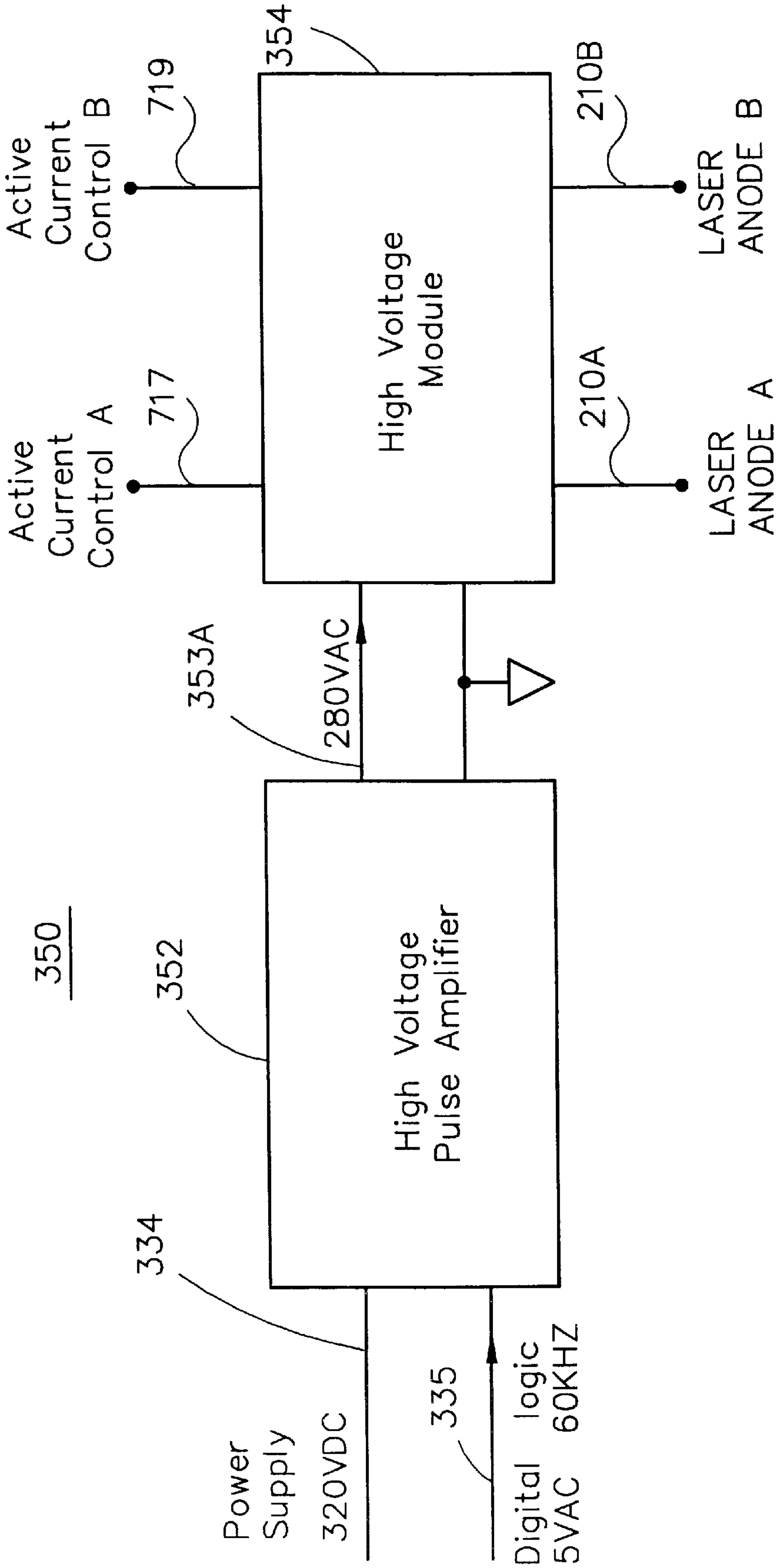
FIG. 17 schematically shows a block diagram of one embodiment of a high voltage start circuit as provided by one aspect of the invention.

Referring now to FIGS. 5 and 17, also included in the active current apparatus is high voltage start circuit 350 which is coupled through line 1337 and resistors 398, 383, and 397, to anode 5210A and 5210B of modular laser gyro 10. The circuit of FIG. 17 is employed during the start mode of the modular laser gyro 10. At line 335, in this example, controller 100 supplies a 0 to 5 volts square wave at a frequency of about 60 KHz with a 10% duty cycle on line 335 which is input to the high voltage start circuit 350. The high voltage start circuitry 350 comprises a 280 volt pulse generator 352 and a voltage multiplier circuit 354. The pulse generator 352 is used to step up the input voltage square wave, $V_{IN}$, on line 335 to a 280 volt signal represented by the waveform 335WF shown in FIG. 19A. The 280 volt peak-to-peak signal output line 353A is also a 60 KHz signal having a 50% duty cycle which is fed into the voltage multiplier circuit 354. Voltage multiplier circuit 354 then outputs a high DC voltage of about 2500 volts. The 280 VAC output waveform 353WF is shown in FIG. 19B.

The high voltage supply 1334 (nominally valued at +320 VDC), high voltage pulse generator 352, and voltage multiplier circuit 354 are all contained in the gyro housing 17. This eliminates the need for an external high voltage supply, and thus external high voltage supply cables and seals. The high voltage pulse generator 352 amplifies 5V pulses to 280 volt pulses. The 280 VAC pulses are then amplified and rectified by a parallel 10x multiplier. The voltage multiplier circuit 354 is shown in more detail in FIG. 20. Voltage multiplier circuit 354 provides at least 2,500 volts needed to start the gyro 10.

Figure 18:
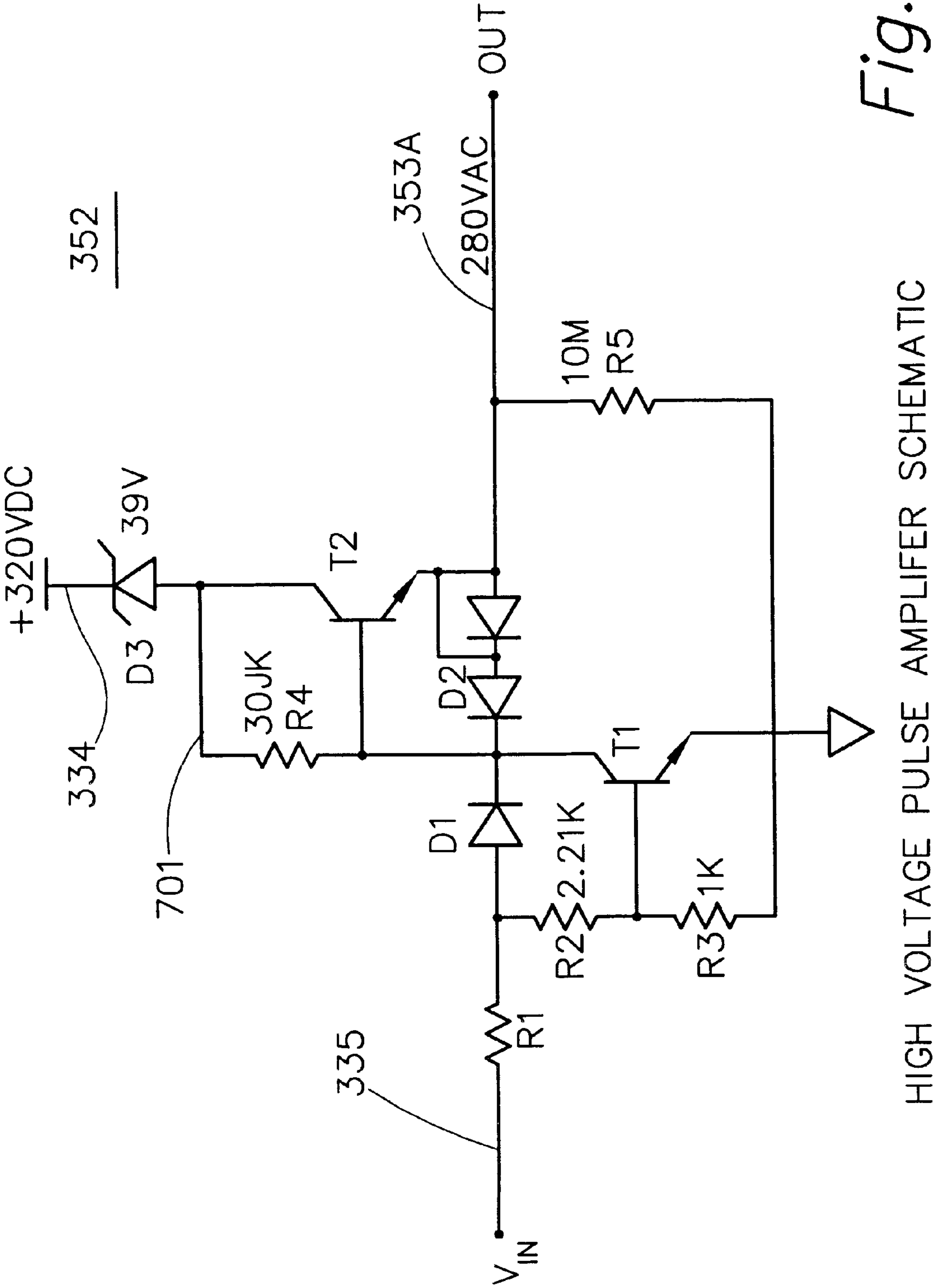
FIG. 18 shows a detailed circuit diagram of a high voltage pulse generator circuit as provided by one aspect of the invention.

Now referring to FIG. 18 which shows the high voltage pulse generator 352. The high voltage pulse amplifier 352 amplifies 5V pulses from the digital logic at a 60 KHz 10% duty cycle to an output of 280V pulses at approximately 50% duty cycle. The circuit of FIG. 18 in one embodiment of the invention uses surface mounted technology, with a low surface area, low cost, high reliability and efficiency. The transistors T1 and T2 used in the circuit of FIG. 18 may advantageously be bipolar NPN's which have a rated $V_{CEO}$ of 350V. The network R1, R2, R3, and D1 is used to drive transistor T1 and yet keep T1 out of saturation. D1 is a Schottky diode used to clamp T1 out of saturation for low voltage amplification. The circuit includes a conventional PN junction high voltage diode with a 600V reverse breakdown voltage and a higher forward voltage drop and a resistor divider R2 and R3 to keep T1 out of saturation. D2 is a low voltage diode used to create a dead band such that T1 and T2 may never be on at the same time.

In an alternate embodiment of the invention complimentary circuits using NPN and PNP or N-channel and P-channel transistors may be used to gain more efficiency at the risk of turning both devices on at the same time during power up. For high performance the capacitance at node 701 is advantageously kept at a minimum and diode D1 and D2 preferably have low capacitance characteristics. Resistor R4 and T2 perform as an active pull-up component when T1 is turned off.

R5 is used to keep T1's collector voltage below 280V. In the off mode, which is most of the time, $V_{IN}$=0 volts and the circuit only consumes 28AA.

Figure 19A:
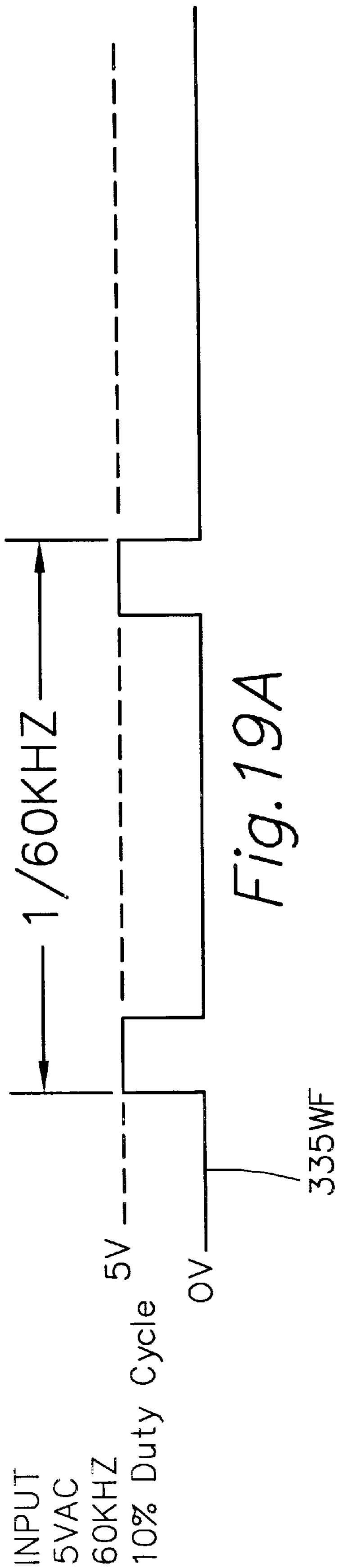
FIGS. 19A and 19B show high voltage pulse generator waveforms.
Figure 19B:
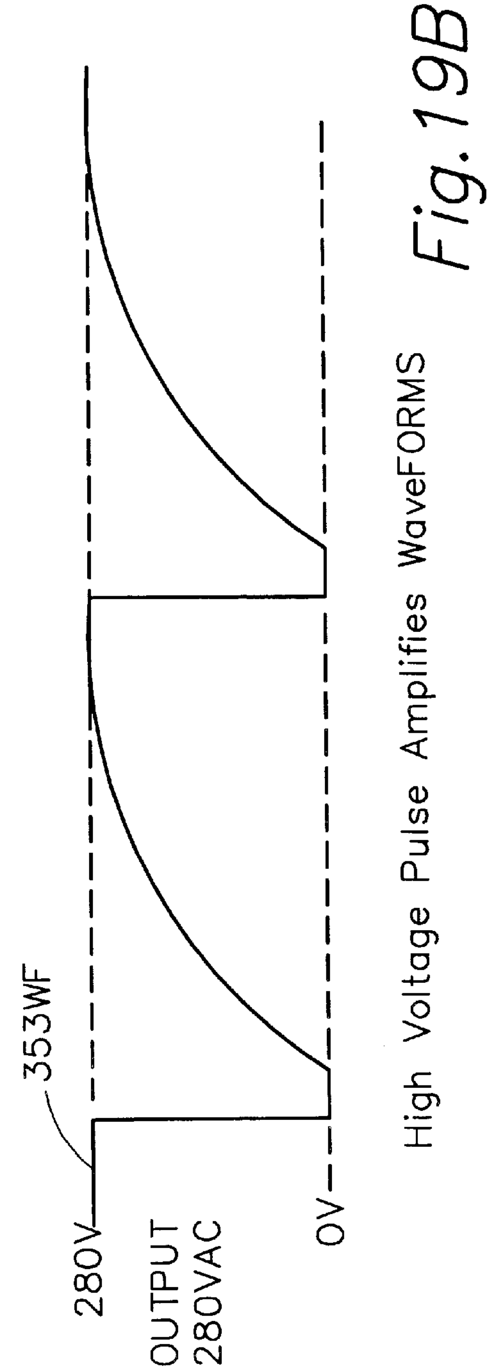

Now referring to FIGS. 19A and 19B which show examples of high voltage amplifier waveforms. The input waveform 335WF is 5 volts at 60 KHz 10% duty cycle. The 10% duty cycle significantly reduces the power consumption of the circuit of the invention. T1 turns on quickly and off slowly due to the capacitance on node 701. The output waveform 353WF has approximately a 50% duty cycle at the 140 volt level. The voltage multiplier circuit 354 requires 280 VAC at 60 KHz, and its duty cycle is not critical.

Figure 20:
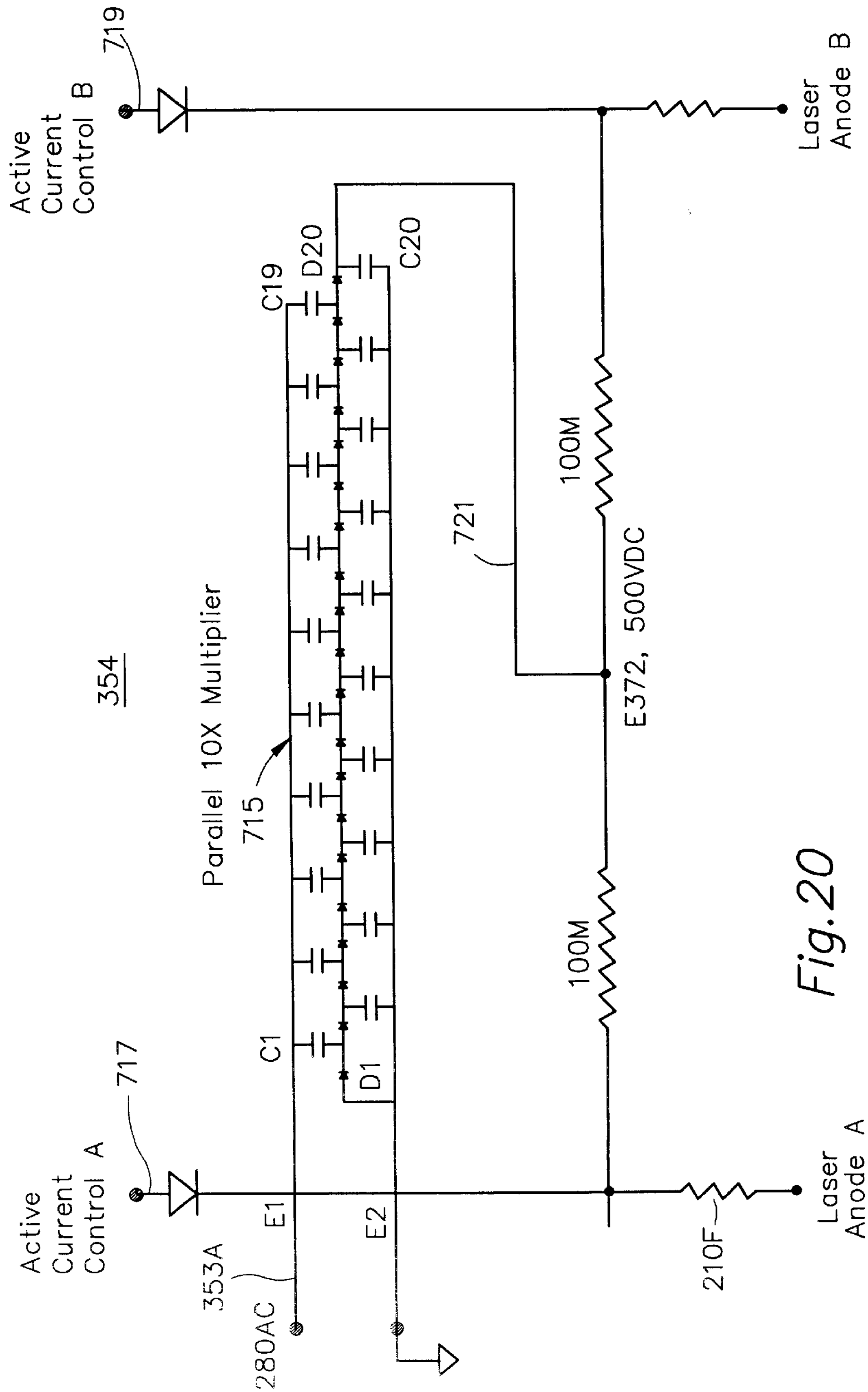
FIG. 20 shows a circuit schematic diagram of a high voltage module of the invention.

Now referring to FIG. 20 which shows a detailed schematic of the circuit for the voltage multiplier circuit 354 which includes two high voltage blocking diodes CR1and CR2 (4,000 PIV) used to protect the active current circuitry during start-up. Two small ballast resistors 5210F and 5210G have resistance values ranging from 10K to 30K. The prior art used large ballast resistors (1M ohm) which consumed a relatively large amount of power. A parallel ten times voltage multiplier 715 is used to give at least 2,500 VDC on line output 721. The start current for the gyro is 2,500 VDC/100 Meg=25$\mu$A per leg of the gyro. The parallel multiplier 715 has more current driving capability than a series multiplier. The parallel 10 multiplier 715 has 20 diodes and 20 capacitors. D1 through D20 require reverse breakdown characteristics of only 2 times the input peak to peak voltage. The voltage rating on capacitors C1 through C20 progressively increases from 280V to 2,800V. C1 through C20 equal 35 pF each. The capacitance on LASER ANODE A 5210A and LASER ANODE B 5210B is preferably less than 2 pF.

In one embodiment of the invention the circuit is fabricated in a substrate that contains thick film resistors and high voltage diodes and capacitors.

The substrate and components are housed in a high voltage dielectric Ryton (TM) and potted with high dielectric strength filler. Since node 721 (2,500V) is buried in the high voltage module, the resultant part is very reliable. The gyro and high voltage module are advantageously back filled with dry nitrogen. This provides a double barrier for high voltage corona breakdown and leakage.

Figure 21:
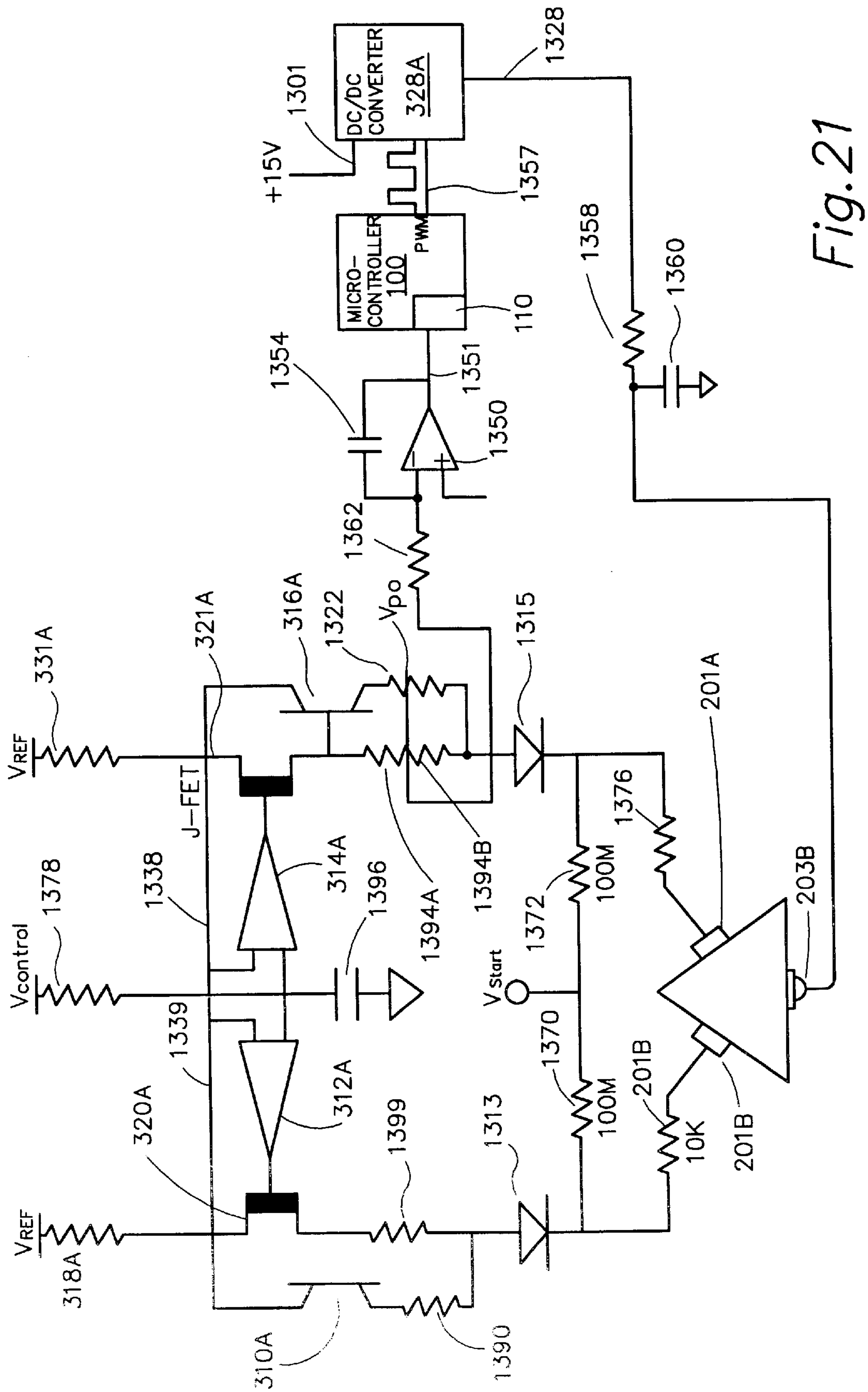
FIG. 21 shows an alternate embodiment of the invention to provide an active current control.

Referring now to FIG. 21, an alternate embodiment of an active current control apparatus as provided by the present invention is shown. The active current control apparatus is comprised of first and second amplifying means 2112, 2114, control JFETs 320A, 321A, first and second output transistors 2110, 316A, integrating amplifier means 1350, micro-controller 100 and pulse width modulated DC/DC converter means 328A. The active current control apparatus 300B operates first and second current supply legs including first and second amplifying means 2112, 2114 that may advantageously be constructed similarly to the two driving legs shown in FIG. 5 comprising first and second driving amplifiers 344, 332. The first and second control JFETs 320A, 321A are advantageously N channel JFETs. A predetermined external voltage $V_{control}$ is applied through resistor 1378 to the non-inverting inputs of the first and second drive amplifiers 2112 and 2114. A first terminal of capacitor 1396 is also connected to the non-inverting inputs of the first and second amplifying means for the purposes of filtering the $V_{control}$ voltage. As is the case in the circuit of FIG. 5, feedback lines 1339 and 1338 are connected from the sources of the JFETs, 320A and 321A respectively, to the inverting inputs of the first and second amplifying means 2112 and 2114. Reference voltage $V_{REF}$ is introduced into the feedback lines 1339, 1338 through precision resistors 318A and 331A, respectively. The reference voltage VRF may advantageously be approximately +10 volts DC. JFETs 320A, and 321A and output transistors 2110, 316A operate together with resistors 1390, 1399, 1394A, 1394B, 1322 and diodes 1313, 1315 in a manner similar to their similarly arranged counterparts that are described with respect to FIG. 5.

Here departing further from the configuration shown in FIG. 5, the output of the second output transistor 321A is connected to resistor 1394A which is in series with resistor 1394B. An integrating amplifying means 1350 having feedback capacitor 1354 includes a reference voltage $V_{REF2}$ which may advantageously be about 2.5 volts in one example embodiment. A sampled signal $V_{po}$ is tapped between resistors 1394A and 1394B. A small current is sent through resistor 1362 when $V_{po}$ has a value which does not equal $V_{REF2}$ to an inverting input of integrating amplifying means 1350. Since VP, is driven to equal $V_{REF2}$ by the DC/DC converter 328A, the current $I_{po}$ is approximately 0. Further, it is important to note that only one leg of the active current source circuit is in the servo loop. This accounts for differences which may exist in the modular laser gyro tube voltages for the two legs. Since the apparatus uses a servo mechanism to adjust only one leg, the currents in both legs are substantially unaltered. The apparatus further takes the modular laser gyro tube voltages into account by reverse biasing the collectors of transistors 2110 and 316A by at least 10 volts. Even with this added biasing, the apparatus allows the modular laser gyro to operate with voltages having much lower absolute values of voltage than those found in the prior art.

The integrating amplifying means 1350 provides a signal 1351 to an analog-to-digital input of analog-to-digital converter 110, which is part of micro-controller 100. Micro-controller 100 converts signal 1351 into a pulse width modulated signal (PWM) that is responsive to the signal 1351. The PWM signal is coupled to an input of proportional DC/DC converter 328A. DC/DC converter 328A in turn provides an output 1328, which is proportional to the PWM signal, through an RC filter comprising a resistor 1358 and a capacitor 1360 to the cathode 203 of the modular laser gyro 10. In the example embodiment shown, a positive 15 volts is supplied to a positive input 1301 of the DC/DC converter 328A. Those skilled in the art will appreciate that other equivalent devices may be substituted in the circuit discussed with reference to FIG. 21. For example a transistor coupled to a proportional DC/DC converter may be substituted for the pulse width modulation apparatus discussed above.

In operation, voltage signal $V_{po}$ provides an input to the integrator comprising the integrating amplifying means 1350 and capacitor 1354. The sample voltage is inverted through the integrator which may preferably have a 20 second time constant. The output of the integrating amplifier 1350 is sampled by the micro-controller A/D converter 110. The micro-controller then provides a pulse width modulated signal input to the DC/DC converter 328A. The DC/DC converter operates to bring the sampled point down to the reference voltage $V_{REF2}$ in this example. This configuration has the advantage that all of the power in the circuit is dissipated at the plasma in the modular laser gyro and there is no need for even small ballast resistors. Some nominal values of resistance are shown in order to provide a better understanding of this example of an embodiment of the invention.

Still referring to FIG. 21, in one prototype example embodiment of the invention constructed by Honeywell Inc., an active current control circuit apparatus was built using 2N3743 PNP transistor dies in hybrid packages for the output transistors. It was later found that a significant cost reduction could be achieved by substituting an MMBT6520 PNP transistor in a surface mounted SOT-23 package. The only high frequency component required in the circuitry is the 2N3743 transistor that has a $F_T$ of greater then 30 MHz and a collector-base capacitance of less than 15 pF. The cathode voltage servos to minimize the power dissipation in the electronics which is important to a modular electronics design since all the electronics are located in the gyro housing. One of the 2N3743 voltages, namely $V_{po}$, is monitored using a 20 M ohm resistor, which in turn supplies a small current to an integrator. The output of the integrator then controls the input to the DC/DC converter. The closed loop time constant is approximately 0.5 seconds. In one example, as the input to the A/D converter varies from about 0 to 5 volts, the corresponding pulse width modulated signal has a duty cycle ranging from about 45% to about 30%.

Modular laser gyros exhibit a negative resistance when operating. The negative resistance of the modular laser gyro results in approximately constant power dissipation. The cathode voltage automatically adjusts to a lower voltage as the current increases, thereby conserving power. The design of FIG. 21 delivers about 200–400 milliwatts of power to the gyro while dissipating a maximum of about 50 milliwatts.

Direct Digital Dither Drive

Now refer to FIG. 1B which shows the modular gyro of the invention using a direct digital dither drive. The direct digital dither drive of the invention is implemented in one example embodiment with a microcontroller serving as controller 100. The dither drive is a closed loop system comprising a dither pickoff 244A, dither pickoff amplifier circuit 400, A/D converter 110, controller 100, PWM1 115 output line 501B, direct dither drive 500 and dither motor 244B. The A/D converter 110 may be integral to the controller and may advantageously be a 10-bit A/D converter. The 10-bit A/D converter provides ten bits of accuracy for the dither stripper method and apparatus discussed in more detail below. The controller 100 may also advantageously include a microprocessor 120. The controller 100 has a processor 120 core with hardware peripheral support that provides highly reliable, cost effective and highly integrated control functions.

Briefly, in operation the RLG Block position represented by a pickoff voltage 245A is first amplified by dither pickoff amplifier 400. The amplified dither pickoff signal 501A is sent to the A/D converter 110 and also to a comparator (not shown) which in turn generates a square wave 501C which is sent to a one shot 810 to limit the maximum frequency of the interrupt. The one shot 810 is periodically reset at approximately the rate of 1000 Hz. The output of the one shot interrupts the controller at positive edge zero crossings. The method of dither pickoff and drive is shown in more detail in FIGS. 25A, 25B, 25C, and 25D. Based on the zero crossing of the laser block position the microprocessor calculates the dither period and predicts sample times. The dither drive wave form shown in more detail in FIG. 26 is then sampled by the A/D converter 110 at the negative and positive peaks of the dither signal sine wave. This sampling process also provides a 90 degree phase shift which is required to drive the dither motor 244B. After sampling, the A/D value is compared to the desired gain adjusted displacement reference, the quantity is multiplied by a gain factor, random noise is added and the signal is sent to the pulse width modulator 115. The random noise may advantageously be a gaussian distribution. The displacement reference is corrected by a gain adjustment of the dither stripper to correct for any pickoff scale factor variations. The reference displacement signal may be further adjusted at periodic intervals by the modular laser gyro direct dither drive system.

In one example, the microcontroller 100 includes three pulse width modulators which in this embodiment of the invention are used for various control functions. The pulse width modulator PWM1 115 is used for controlling the dither drive circuit. A number of software modules are involved in the initialization and control of the microcontroller 100. The software programs are run by the microprocessor 120 contained within the microcontroller 100. A PWM signal of 100% corresponds to an output of −150 volts, a PWM signal of 50% corresponds to an output of 0 volts, and a PWM signal of 0% corresponds to an output of +150 volts.

In one embodiment of the invention the pulse width modulation signal is initially set to a 50% duty cycle. Part of the dither drive circuit utilizes a random noise quantity that is injected into the drive circuit. The dither drive random number generator is initialized at the time the control system for the modular gyro 10 is started.

The dither drive circuit is further initialized by the initialization of system variables. System variables refer to the reference voltages which are used to calculate the actual displacement of the lasing system. In the dither drive circuit a pickoff signal 245A which is an approximation of a sinusoid signal is generated by the dither pickoff. The pickoff signal represents angular displacement. The reference peak angular value is compared against the peak of the sinusoidal pickoff signal and a difference value is obtained which defines the error in the dither drive. The actual reference voltages are then initialized during system powerup. These reference values are stored in EEPROM 102 and represent a conversion from voltage to displacement.

In one embodiment of the invention the dither drive requires 200 milliseconds to initialize. The dither drive is started either simultaneously with the laser or slightly ahead of the laser.

In the embodiment of FIG. 1B there are first and second timers in the microcontroller 100. The first timer is used for sampling functions. The second timer is used for dither drive and dither stripping functions. Both timers must be synchronized. On board high speed output logic in the microcontroller 100 synchronizes the timers to perform such functions as A/D conversion for the dither stripping operation. The on board high speed input logic captures external events that are occurring in real time and stores the first timer count values in a FIFO register 217. The microcontroller 100 is thereby able to independently and asynchronously capture external events.

The sample strobe $DS_1$ is provided by the host inertial navigation system. $DS_1$ represents the time at which all the gyros in the inertial navigation system should be sampled. The sample times need to be anticipated to eliminate modular gyro system latencies. The sample strobe $DS_1$ also synchronizes multiple gyros within the INS.

In this embodiment of the invention the microcontroller 100 has a number of analog inputs that are multiplexed into a single analog to digital converter. The multiple use of a single A to D converter to address more than one analog input signal requires that the sampling be timed properly. The microprocessor system includes a non-volatile memory which in this embodiment is an electrically erasable programmable read only memory ("EEPROM"). Certain system parameters such as dither frequency and dither reference angle are stored in the EEPROM so that system parameters may be restored after system power on. Those skilled in the art will recognize that other non-volatile memory means may be used.

In the start-up initialization sequence the dither drive is pulsed for 20 pulses at the dither frequency with a square wave. For example, in the case where the dither frequency is running at 500 Hz the duty cycle is changed from 0% to 100% for 20 pulses. This cycling supplies energy to the dither motor near its natural resonant frequency to get the dither motor started.

Figure 22:
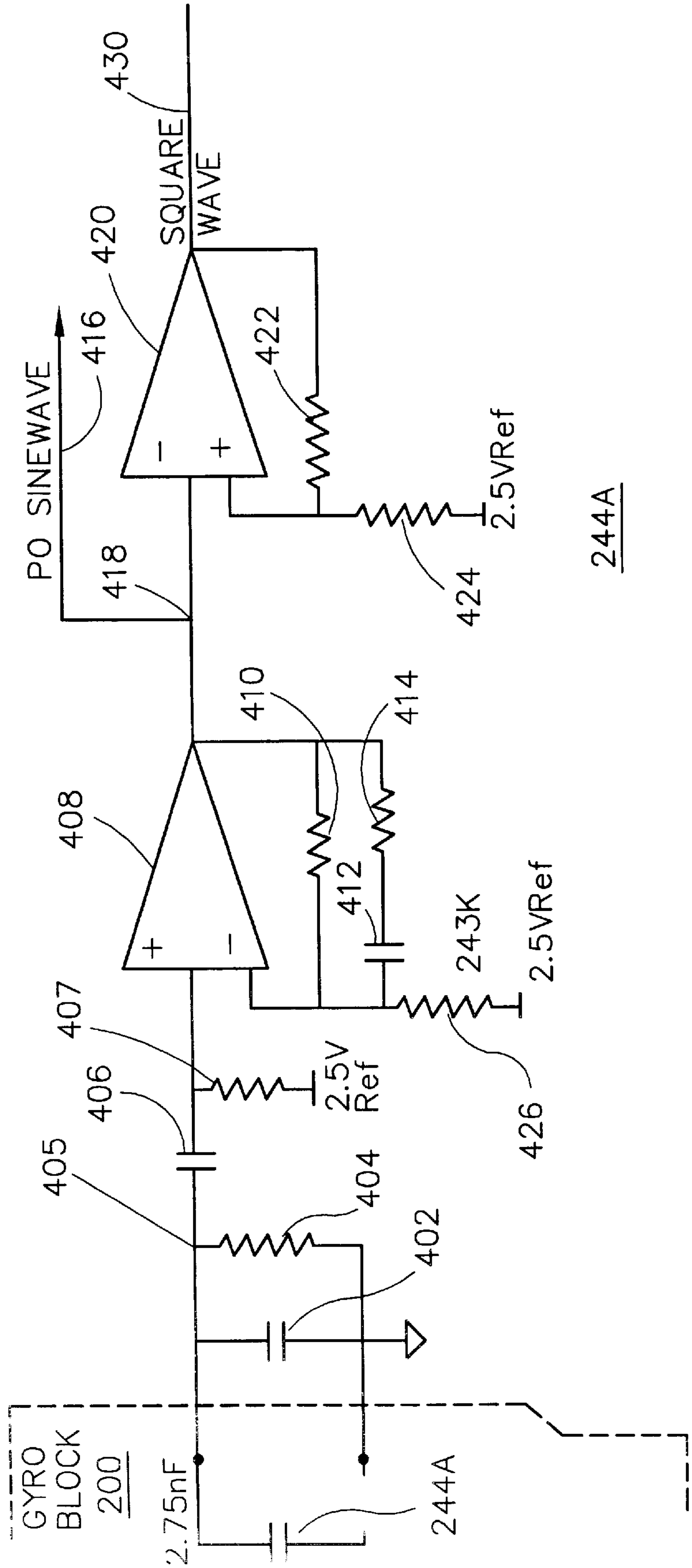
FIG. 22 schematically shows a circuit diagram of one example of a dither pickoff circuit made in accordance with the present invention.

Referring now to FIG. 22 which shows a circuit diagram of one example of a dither pickoff circuit made in accordance with the present invention. In one example, the dither pickoff apparatus comprises at least first, second and third capacitors 402, 406, 412, first through seventh resistors 404, 407, 410, 414, 422, 424, 426 and first and second amplifying means 408, 420. Also shown is dither pickoff 244A which is here symbolized by its inherent capacitance. The first capacitor 402 is connected in parallel with the first resistor 404 at node 405. The dither pickoff is also connected at node 405. The second capacitor 406 is coupled at a first terminal to node 405 and at its other terminal to a non-inverting input of the first amplifier 408. The first amplifier 408, resistors

410, 414 and 426 and capacitor 412 are connected in an arrangement suitable to provide a first gain factor and phase compensation to the dither pickoff circuit. The output 418 of the first amplifier provides a substantially sinusoidal signal 416 which is representative of the dither pickoff to an analog-to-digital input of the microcontroller 100. The second amplifier 420, and resistors 422 and 424 are connected and arranged in a well known manner to provide a substantially square wave signal 430 to the zero crossing input to a one shot 810 in the digital logic 800 and finally to the controller 100. The signal 430 is also representative of the dither pickoff and provides the basic zero crossing detection signal from which the dither period is calculated. The one shot 810 limits the maximum interrupt frequency to 1000 Hz and thereby eliminates false interrupts during start-up.

Figure 23:
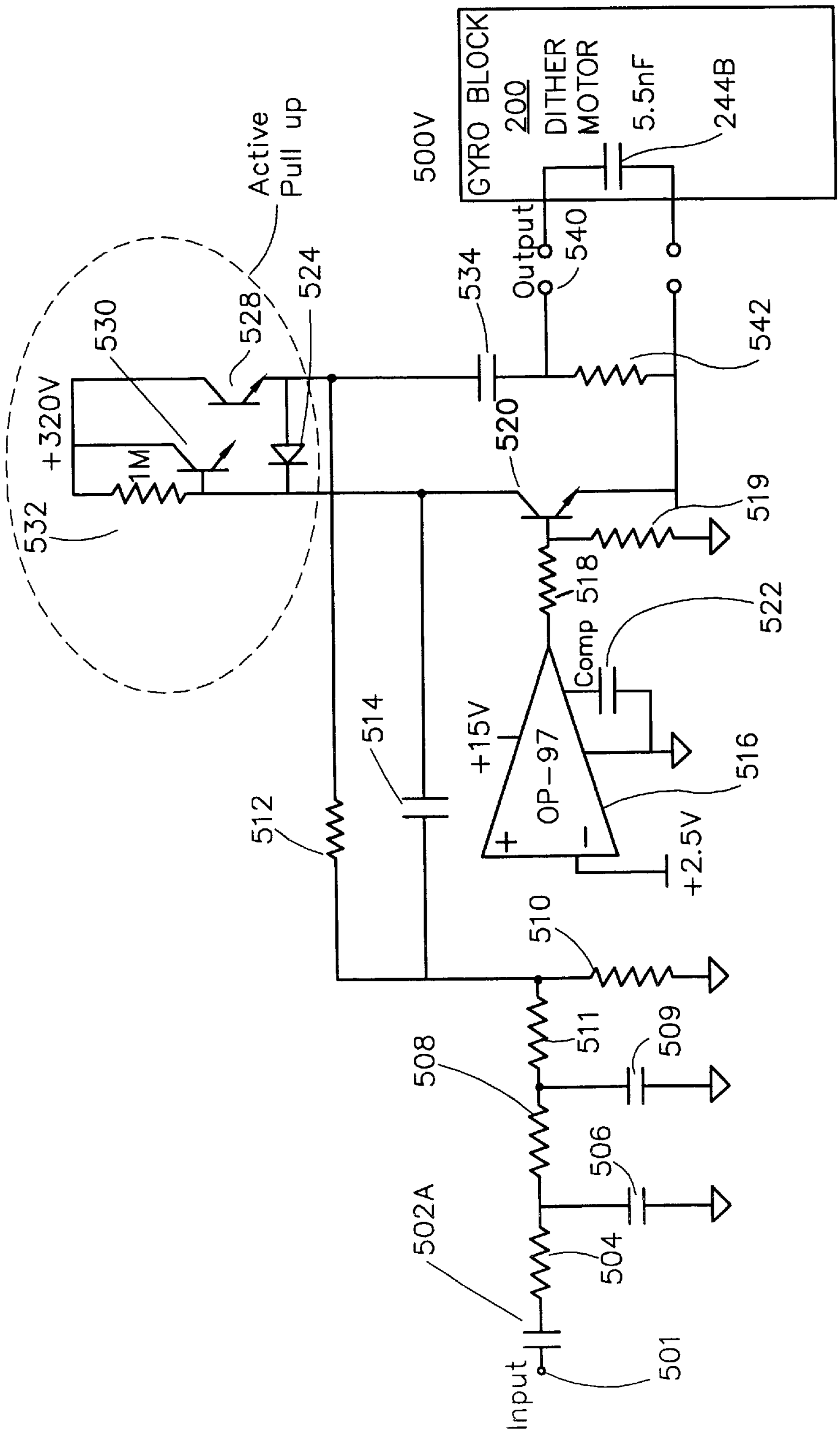
FIG. 23 schematically shows a circuit diagram of one embodiment of a direct digital dither drive circuit as provided by one aspect of the invention.

Now referring to FIG. 23 which shows a circuit diagram of one embodiment of a direct digital dither drive circuit 500 as provided by one aspect of the invention. The direct digital dither drive 500 includes first through sixth capacitors 2302, 506, 509, 514, 522 and 534, first through ninth resistors 504, 508, 510, 511, 512, 518, 519, 532 and 542, first through third transistors 520, 528 and 530, diode 524 and amplifier 516.

The first capacitor 2302 is connected at a first terminal to a pulse width modulated output 501 from the controller 100. The first capacitor 2302 is connected at a second terminal to a first terminal of the first resistor 504. A second terminal of resistor 504 is connected to a first terminal of the second capacitor 506 and to the second resistor 508. A second terminal of the resistor 508 is connected to a first terminal of the third resistor 511, and to the third capacitor 509. A second terminal of the third resistor 511 is connected to a first terminal of the fourth capacitor 514 and to the fourth resistor 512 as well as to the non-inverting input of amplifier 516 and fifth resistor 510. The output of amplifier 516 is connected to the base of the first transistor 520 through a resistor divider sixth resistor 518 and seventh resistor 519. The fifth capacitor 522 serves as compensation capacitance, increasing phase margins, for amplifier 516. A second terminal of capacitor 514 is connected to the collector of transistor 520 and to the base of the third transistor 530 as well as to a first terminal of the eighth resistor 532. The collector of the third transistor 530 is connected to a second terminal of the eighth resistor 532 and to a voltage source which may advantageously be about 300 volts in this embodiment of the invention.

The emitter of the third transistor 530 is connected to the base of the second transistor 528 which is also connected at its collector to the voltage source wherein transistors 530 and 528 form a Darlington pair. Diode 524 is a low voltage diode connected in parallel with the Darlington pair and provides a dead band. A second terminal of the fourth resistor 512 is connected to a first terminal of the sixth capacitor 534 and the emitter of the second transistor 528. The capacitor 534 is used to level shift the output of the transistor 528 by 150 volts. The drive signal is AC coupled across 534 to the ninth resistor 542 and to the dither motor 244B in the modular laser gyro block 200. The resistor 542 provides a DC average of zero volts to the dither motor.

In one embodiment of the invention the first through third transistors may advantageously be NPN transistors of model type MJD50 as available from the Motorola Company of the United States of America. The amplifier may advantageously be a bipolar operational amplifier such as model OP—97 available from Analog Devices of Massachusetts, USA. Some example component values are illustrated in FIG. 23.

In operation the direct digital dither drive of the invention in this illustrated embodiment is a circuit that directly converts a 5 volt pulse width modulated digital signal from the controller 100 to an analog 300 volt peak-to-peak signal without the use of a transformer. In the past, transformers have proven to be unreliable and require a large core size to avoid saturation when driving the dither motor capacitive load at low frequencies such as about 500 Hz. The pulse width modulated output 501 from the controller 100 may advantageously be a 5 volt pulse width modulated (PWM) signal from the controller with a fixed frequency of about 23.5 KHz which is derived from a 16 Mhz crystal 104 and has a resolution of 512 steps from 0% to 100% PWM. The PWM signal is used only as a means for digital-to-analog conversions and should not be confused with schemes to pulse width modulate at the dither frequency.

In the embodiment of the invention shown in FIG. 23, the direct digital dither drive circuit requires less than 300 mW compared to 750 mW required by transformer designs when driving a 5.5 nF load which is a typical dither motor load with a 500 arcsec peak to peak amplitude and 4–8 arcsecs RMS random noise. In a typical modular laser gyro system 4–8 arcsecs is equivalent to about 1 sigma standard deviation. The efficiency of the circuit apparatus of the present invention is achieved by placing three low pass poles of the transfer function at approximately $(550\ \text{Hz}\times 23.5\ \text{KHz})^{1/2}$= 3.6 KHz which filters the PWM 23.5 KHz signal and yet yields rise and fall times of less than 200 microseconds. Since the power required to drive the capacitive load is proportional to $(V^2\times f)$ where f is the drive frequency, it is important to filter the PWM signal from the load to conserve power.

The efficiency of the drive is further enhanced by the controller which allows the PWM value to change only twice per dither cycle. There is a first change at the positive peak and a second change at the negative peak of the dither pickoff. The theoretical power required to drive 5.5 nf at 550 Hz at 300 volts (full amplitude) is given by the formula:

$$P=2f(\tfrac{1}{2}CV^2)=272\ \text{mW}.$$

The AC power for one embodiment of the present invention approaches this theoretical limit. The DC bias power is about 81 mW.

Other aspects of the invention include a single power supply design with all NPN transistors and no PNP transistors. The NPN transistors are available in a surface mounted DPAK with the following parameters:

$$V_{CEO}=400\ \text{VDC and}\ V_{CB}=500\ \text{VDC}.$$

Diode 524 provides a dead band so as to prevent transistors 520 and 528 from being turned on simultaneously. The dead band eliminates current spikes on the power supply and further improves efficiency.

The fourth capacitor 514 is connected to the base of transistor 530 rather than the emitter of transistor 528 at the output to enhance stability during the rise and fall transitions. The fourth resistor 512 sets the DC operating point of the output at the emitter of transistor 528 at about +150 volts in one example embodiment of the invention. The output at the emitter of transistor 528 is then level shifted to the final output 540 by coupling capacitor 534. In this arrangement, a 50% duty cycle PWM signal input corresponds to 0 volts output at output 540. A 0% duty cycle PWM signal corresponds to an output at 540 of about +130 volts. A 100% duty cycle PWM signal corresponds to about −130 volts at the output. In the example illustrated, the time to charge the coupling capacitor 534 is about 0.7 seconds during power up of the modular laser gyro.

In a further aspect of the invention the input is AC coupled by the first capacitor 2302 to provide a symmetrical drive with no low frequency components. During start-up of the modular laser gyro the controller outputs a 50% duty cycle PWM signal for about 14 ms to charge capacitor 2302 to a predetermined DC level. As stated earlier the start-up initialization sequence begins by pulsing the dither drive for 20 pulses at the dither frequency with a square wave. For a dither frequency of 500 Hz the duty cycle is changed from 0% to 100% for 20 pulses. This cycling supplies energy to the dither motor near its natural resonant frequency to get the dither motor started.

Figure 24:
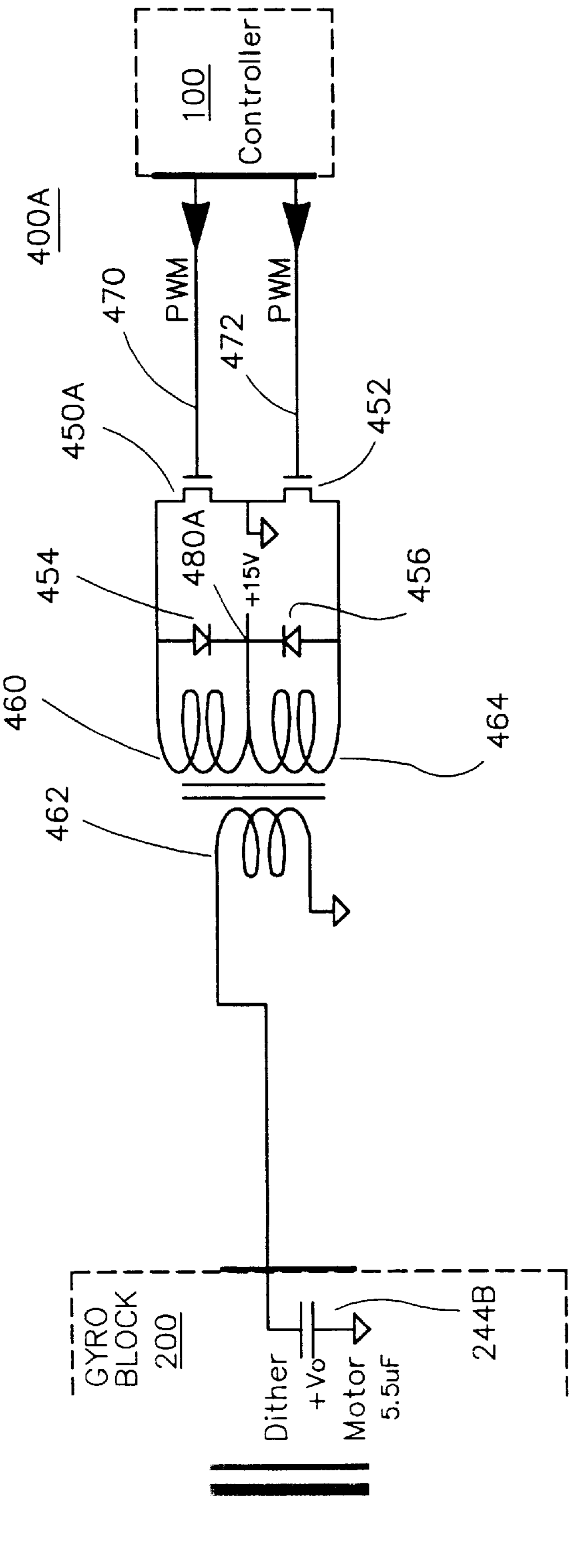
FIG. 24 shows a detailed circuit diagram of an alternate embodiment of a dither drive circuit as provided by one aspect of the invention.

Referring now to FIG. 24 which shows a detailed circuit diagram of an alternate embodiment of a dither drive circuit as provided by one aspect of the invention. The dither drive circuit of FIG. 24 comprises a transformer having primary windings 460, 464 and secondary windings 462. A first diode 454 is connected across winding 460 to a voltage source 2480 which may nominally be +15 volts. Similarly, a second diode 456 is connected across winding 464 to voltage source 2480. Secondary winding 462 is coupled at a first leg to dither drive 244B in the modular laser gyro block 200. A pair of transistors 450A, 452 are driven by first and second PWM signals 470, 472 in a push-pull fashion. The transistors 450A, 452 may advantageously be MOSFET type devices or equivalent devices.

Figure 25A:
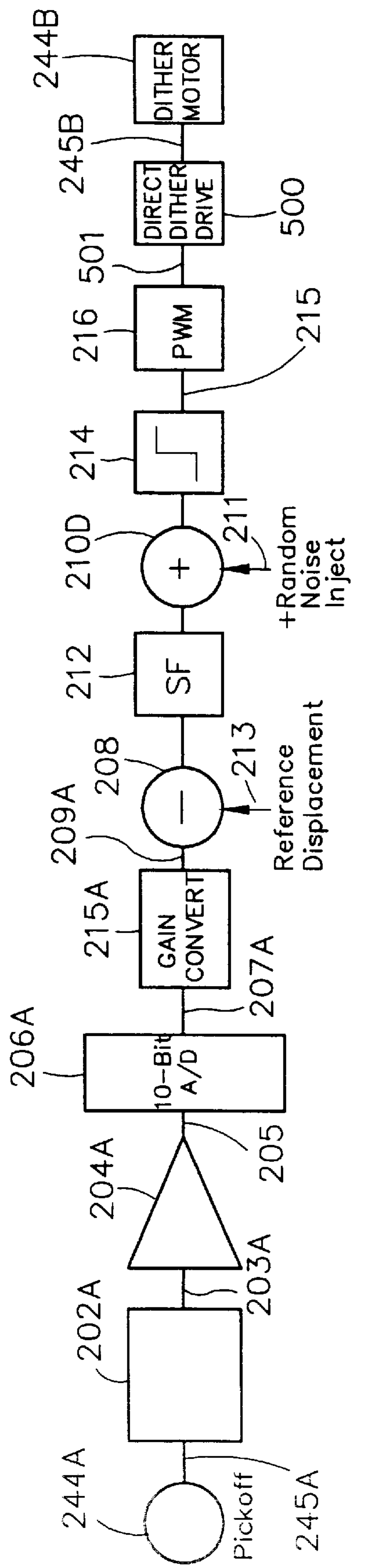
FIG. 25A shows a high level schematic block diagram of the direct dither drive used in a modular laser gyro including the closed loop system.
Figure 26:
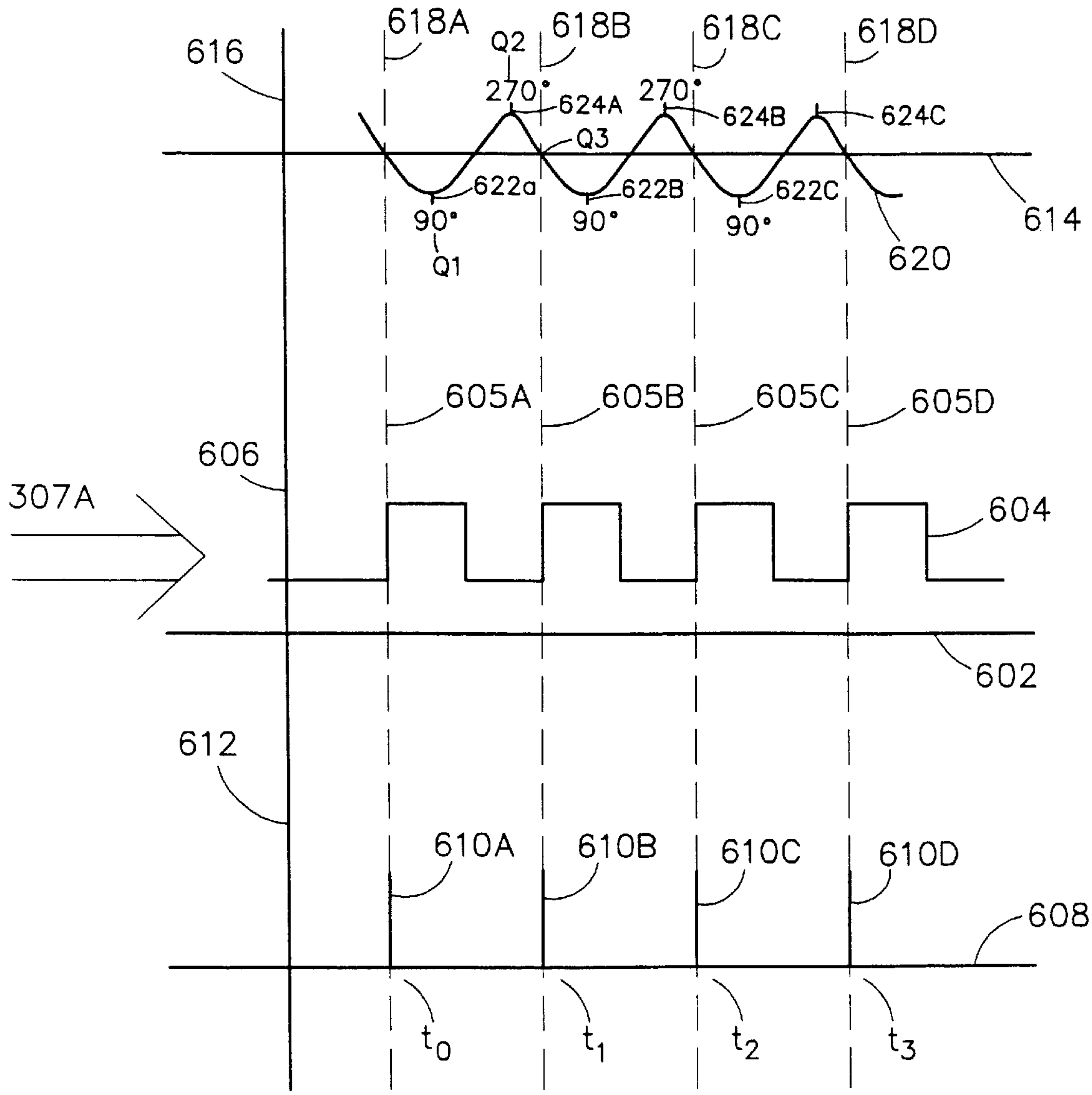
FIG. 26 shows an interrupt timing diagram as a function of the output of the zero crossing detector.

Now referring to FIG. 25A which shows a high level schematic of the direct digital dither drive method and apparatus of the invention showing the flow of the dither pickoff signal 245A from the dither pickoff 244A through to the dither motor 244B. FIG. 25A represents an embodiment of the dither drive that gain converts the voltage 2205 representing the dither displacement to modular laser gyro counts which represent the inertial rotation of the gyro 200. All subsequent processing is carried out using counts up to the generation of the PWM signal 501.

The dither pickoff 244A delivers a dither pickoff signal 245A to a filter 2502 which conditions the dither pickoff signal 245A and provides a conditioned pickoff signal 2503. The pickoff signal 2503 is amplified by amplifier 2504 and sent to a 10-Bit A/D converter 2506. A/D converter 2506 processes the conditioned and amplified dither pickoff signal 2205 into a digital signal 207A representative of the dither pickoff signal 245A voltage. The digital signal 207A is then gain converted by multiplier 215A to a count value 209A representing angular displacement of the gyro block 200.

In the embodiment of FIG. 25A the digital signal 207A is converted into counts by being multiplied by a predetermined constant K. One count is approximately equal to one arcsec of angular displacement. The constant K is in counts/volt units. K is the same constant used in the dither stripper to obtain an equivalent digital volts. The constant K is continuously updated by the dither stripper and gives a direct calibrated correlation between dither pickoff analog volts and equivalent digital readout counts.

A predetermined reference displacement dither angle 2213 expressed in digital counts is stored in the EEPROM 102.

The digital signal then flows to a digital gain amplifier 212 which feeds a random noise injector 2521 which injects random noise 211 in the signal. Random noise 211 is provided to prevent the lasers from experiencing dynamic lock effects. The signal then enters a pulse width modulation limiter 214 which, in turn, provides a signal 215 to the pulse width modulator, 216. The PWM signal depends on the difference between the reference value and measured displacement value of the block. The direct dither drive is shown in more detail in FIG. 23.

Figure 25B:
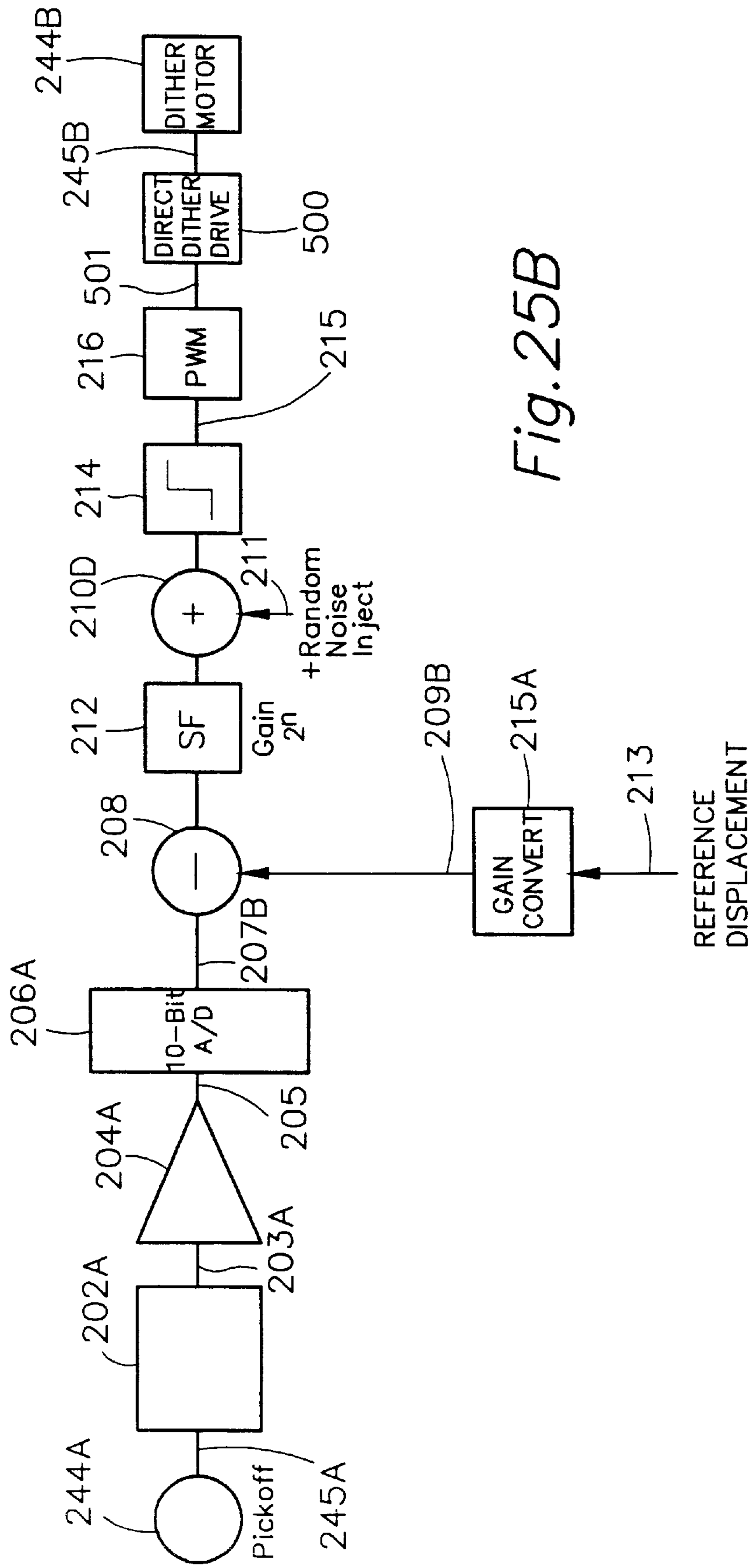
FIG. 25B shows a high level schematic block diagram of the direct dither drive used in a modular laser gyro including the closed loop system.

Referring now to FIG. 25B which shows an alternative high level schematic of the direct digital dither drive method and apparatus of the invention showing the flow of the dither pickoff signal 245A from the dither pickoff 244A through to the dither motor 244B. FIG. 25B represents an embodiment of the dither drive where all processing is carried out using volts up to the generation of the PWM signal 501.

In the alternate embodiment of the invention shown in FIG. 25B the output of the A/D converter 2506 is fed to the comparator 208 to generate a signal that represents a voltage instead of counts as in FIG. 25A. A predetermined reference displacement dither angle 213 expressed in digital counts is stored in EEPROM 102. In the embodiment of FIG. 25B the reference displacement 213 is converted into digital volts by being multiplied by the reciprocal of the predetermined constant K. The remainder of the processing in FIG. 25B proceeds as in FIG. 25A.

Figure 25C:
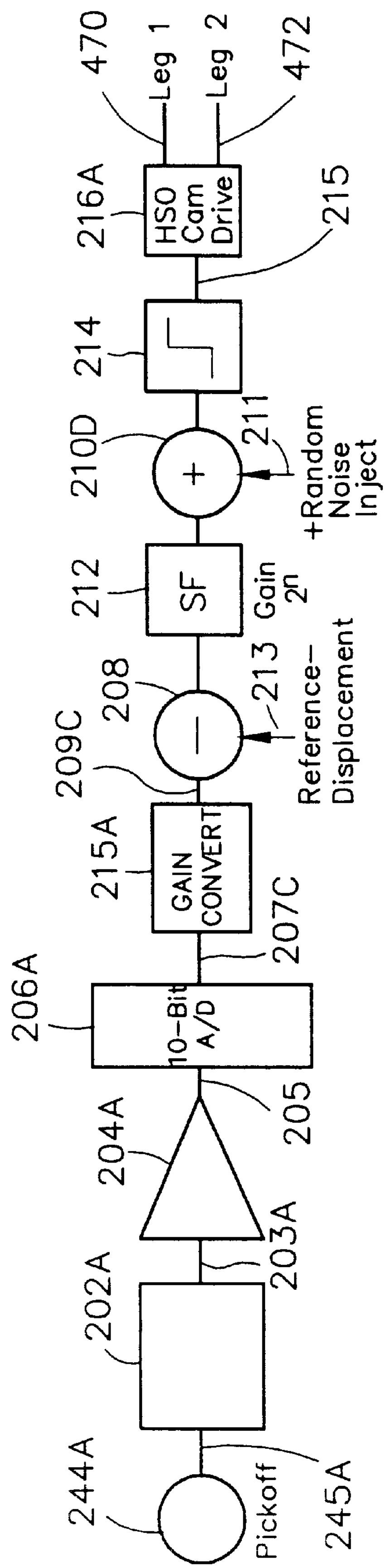
FIG. 25C shows a high level schematic block diagram of the direct dither drive used in a modular laser gyro including the closed loop system.

Referring now to FIG. 25C which shows an alternative high level schematic of the direct digital dither drive method and apparatus of the invention showing the flow of the dither pickoff signal 245A from the dither pickoff 244A through to Leg1 470 and Leg2 472 of the dither motor 244B. As in the method and apparatus of the invention according to FIG. 25A, FIG. 25C represents an embodiment of the dither drive that gain converts the voltage 205 representing the dither displacement to modular laser gyro counts which represent the inertial rotation of the gyro 200. All subsequent processing is carried out using counts up to the generation of the high speed output content addressable memory (HSO CAM) drive signals 470 and 472.

In FIG. 25C the digital signal also flows to a digital gain amplifier 212 which feeds a pulse width modulation limiter 214 which, in turn, now provides a pulse width modulation signal 215 to the HSO CAM Drive 216A of the digital dither drive. As with the foregoing embodiments the PWM signal depends on the difference between the reference value and measured displacement value of the block.

The high speed output logic in this embodiment of the invention is provided by a conventional HSO unit on the microcontroller 100. The high speed output logic triggers events at predetermined times. The events are orchestrated by writing commands to what is referred to as HSO command register and HSO time register. Different events are possible with the high speed output including A/D conversions, resetting timers, resetting software flags, and switching high speed output lines. More information is available on the high speed output logic referring to the INTEL™ model 80C196 KC User's Guide from INTEL CORPORATION on pages 5–49. Specifically reference FIG. 10-1 in the 80C196 KC User's Guide which describes the HSO command register. The input to the direct dither drive 500 is generated from the HSO CAM drive or the PWM output of the 80C196KC microcontroller. The structure of the direct dither drive 500 is shown in more detail with reference to FIG. 23. The high speed output CAM drive 216A then provides the dither signals to drive Leg 1 at 470 and drive Leg 2 at 472.

Figure 25D:
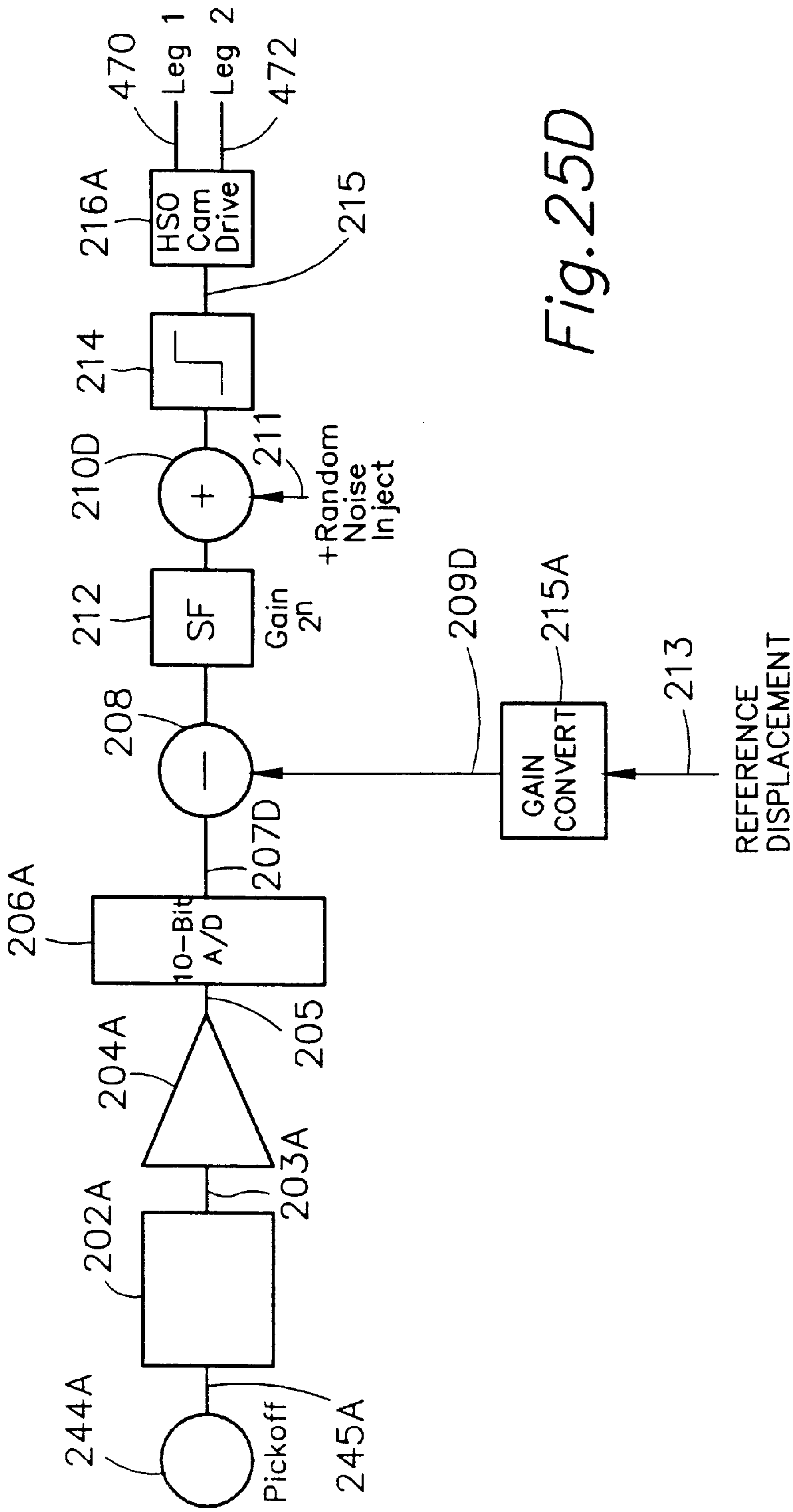
FIG. 25D shows a high level schematic block diagram of the direct dither drive used in a modular laser gyro including the closed loop system.

FIG. 25D represents an embodiment of the dither drive where all processing is carried out using volts up to the generation of the HSO CAM drive signals 470 and 472.

Now referring to FIG. 26 which shows a detailed interrupt timing diagram of the method of the invention. The direct drive dither system in one embodiment of the invention uses the output 430 of the zero crossing detector of FIG. 22 to trigger an interrupt. Signal 430 of FIG. 22 provides a wave train that resembles a timing clock. The detail of the wave train is shown in FIG. 26 as a group of square waves 604.

The wave train is shown as the output of signal line 430 as a function of time 602. The signal 604 indicates when the gyro block 200 has crossed the zero point in its cyclic dither motion as indicated by gyro block position signal 620. The zero crossing points are indicated by 618A, 618B, 618C and 618D. The generated interrupts are shown as interrupts 610A, 610B, 610C and 610D. The interrupts are generated on the zero crossing 618A, 618B, 618C and 618D of the block 200 corresponding to a low to high transition of the output signal 430 at points 605A, 605B, 605C and 605D.

The frequency of the dither pickoff 244A may be calculated by noting when in time the low to high transitions occur. In FIG. 26 $t_0$ denotes the occurrence of transition 605A generating interrupt 610A, $t_1$ denotes the occurrence of transition 605B generating interrupt 610B, $t_2$ denotes the occurrence of transition 605C generating interrupt 610C, and $t_3$ denotes the occurrence of transition 605D generating interrupt 610D. The frequency of dither may be calculated with this set of information from interrupt to interrupt by dividing the time difference $(t_1-t_0)$ into 1 cycle or $1/(t_1-t_0)$. The frequency of dither may be calculated with this set of information between more than one interrupt by dividing the time difference between interrupts, 610A and 610D, $(t_3-t_0)$ into 3 cycles or $3/(t_3-t_0)$.

In one embodiment of the method of direct dither of the invention the location of the 90° and 270° block cycle positions is required to be measured. The 90° positions are shown in FIG. 26 as points 622A, 622B and 622C. The 270° positions are shown in FIG. 26 as points 624A, 624B and 624C.

Figure 27:
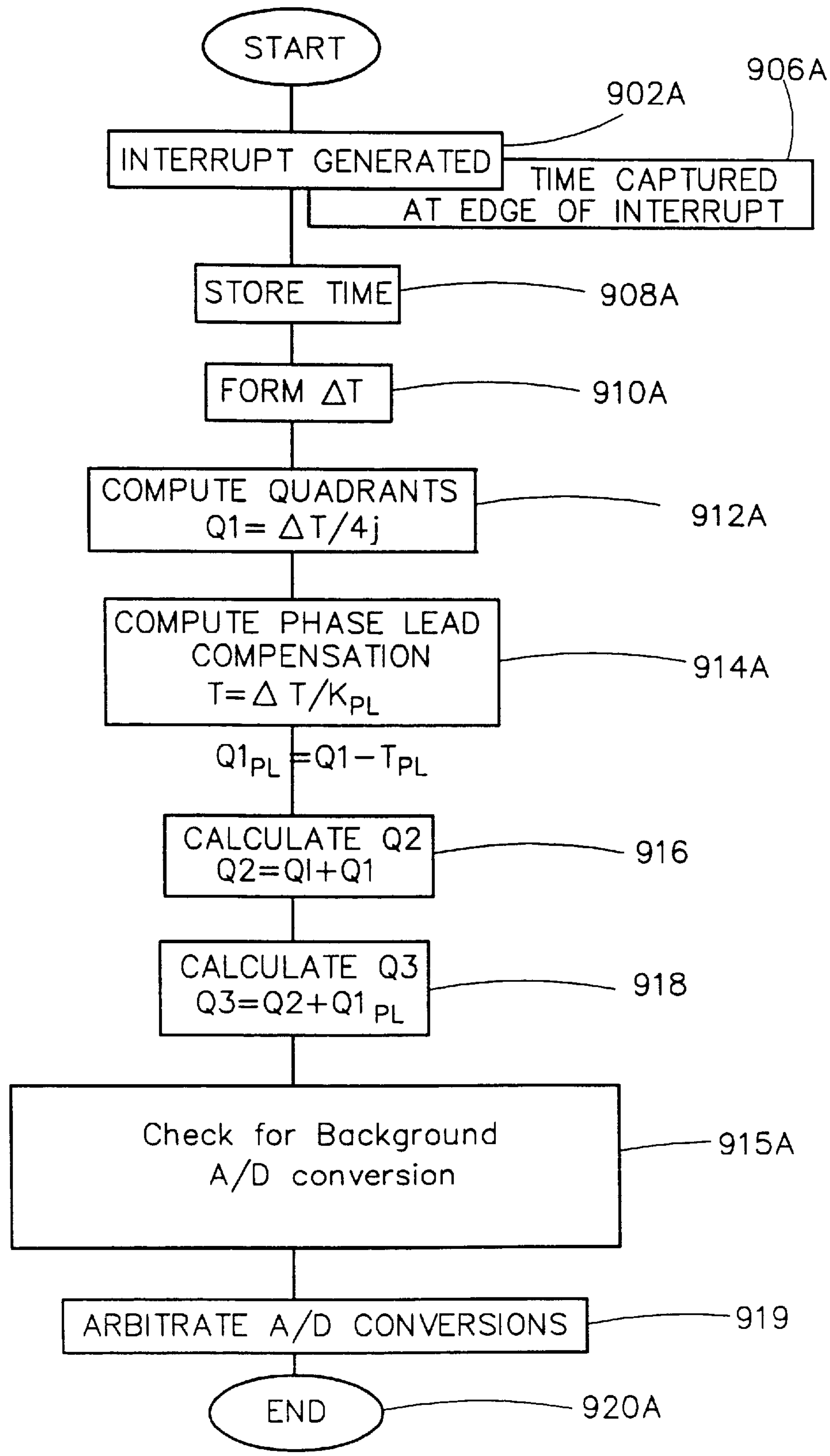
FIG. 27 shows a method of determining the 900 and 2700 crossing points of the dither cycle.

Now referring to FIG. 27 which shows the method of the direct digital dither drive apparatus of the invention to determine the 270° and 90° crossing points of the dither cycle. The method first starts with process block 7902 which shows the interrupt as generated by the zero crossing detector output 430. The zero crossing detector is shown in FIG. 22 and FIG. 26 as signal 430 and 604 respectively. The interrupt signal from the zero crossing detector is known in one embodiment of the method of the invention as the T2CAP interrupt. The process then flows to step 7904 where the T2CAP interrupt service routine is executed. The T2CAP interrupt service routine is described in the following process flow diagrams.

The time at which the T2CAP interrupt occurs is captured in process step 7906. The process then flows to step 7908 where the time of the interrupt, Tn, is stored in a temporary register. The process then flows to step 7910 where the change in time is computed from the last interrupt. The first time this process is executed the initial time is approximated. The new time, Delta T, is determined to be the difference between the current time minus the last interrupt time. The process then flows to step 7912 where the elapsed time or the difference in time between the two interrupts is divided by four. This procedure is done to determine the quadrature for the difference in time between interrupts. This number is as accurate as the resolution of the digital system and represents the amount of time between zero crossings of the dither cycle. This in turn represents the frequency of the actual dither of the modular laser gyro block.

The process then flows to process step 7914 where the phase lead compensation is calculated. The phase lead is defined as Delta T divided by a constant $K_{PL}$. Delta T corresponds to the amount of time required for the laser block to dither one cycle or Delta T equals 360°. The constant $K_{PL}$ is a predetermined value based on the dither cycle and the analog delay. For example if the predetermined constant $K_{PL}$ is equal to 32 the phase lead would be 360°/32 or 11.25°. The amount of phase lead time defined as TPL would be calculated by multiplying Delta T by the phase lead proportion of the cycle or $T_{PL}$=Delta T*(11.25°/360°). The objective of the phase lead is to provide a dither drive signal that coincides with the desired actual dither drive signal. This phase lead anticipates the associated delay in the processing circuitry of the dither drive and the associated delay in software processing. The first quadrature Q1 corresponds to the actual displacement of the laser block at the 90° position. The phase lead quadrature, $Q1_{PL}$, is defined as $Q1-T_{PL}$ which represents the actual sample time for the high speed output dither drive CAM 216A shown in FIGS. 25C and 25D. The process of FIG. 27 then flows to 7916 where the halfway point Q2 is determined to be twice the sum of the first quadrature (Q1+Q1). The process then flows to step 7918 where the third quadrature Q3 is determined to be $Q2+Q_{PL}$. The T2CAP interrupt of FIG. 27 then checks for the existence of a background A/D conversion if necessary. A need for a background A/D conversion schedules a software timer flag and interrupt which may be used by the arbitration method of the invention shown in FIG. 32 to resolve the use of the current A/D conversion 7915. The software timer flag and interrupt are scheduled using the high speed output logic. The process then flows to step 7919 where the A/D Conversion for the dither drive and dither stripper are arbitrated with background A/D conversions. Process 7919 is described in detail with reference to FIG. 28. The process ends at 7920 and returns to the running modular gyro monitor control loop shown in FIG. 29.

Figure 29:
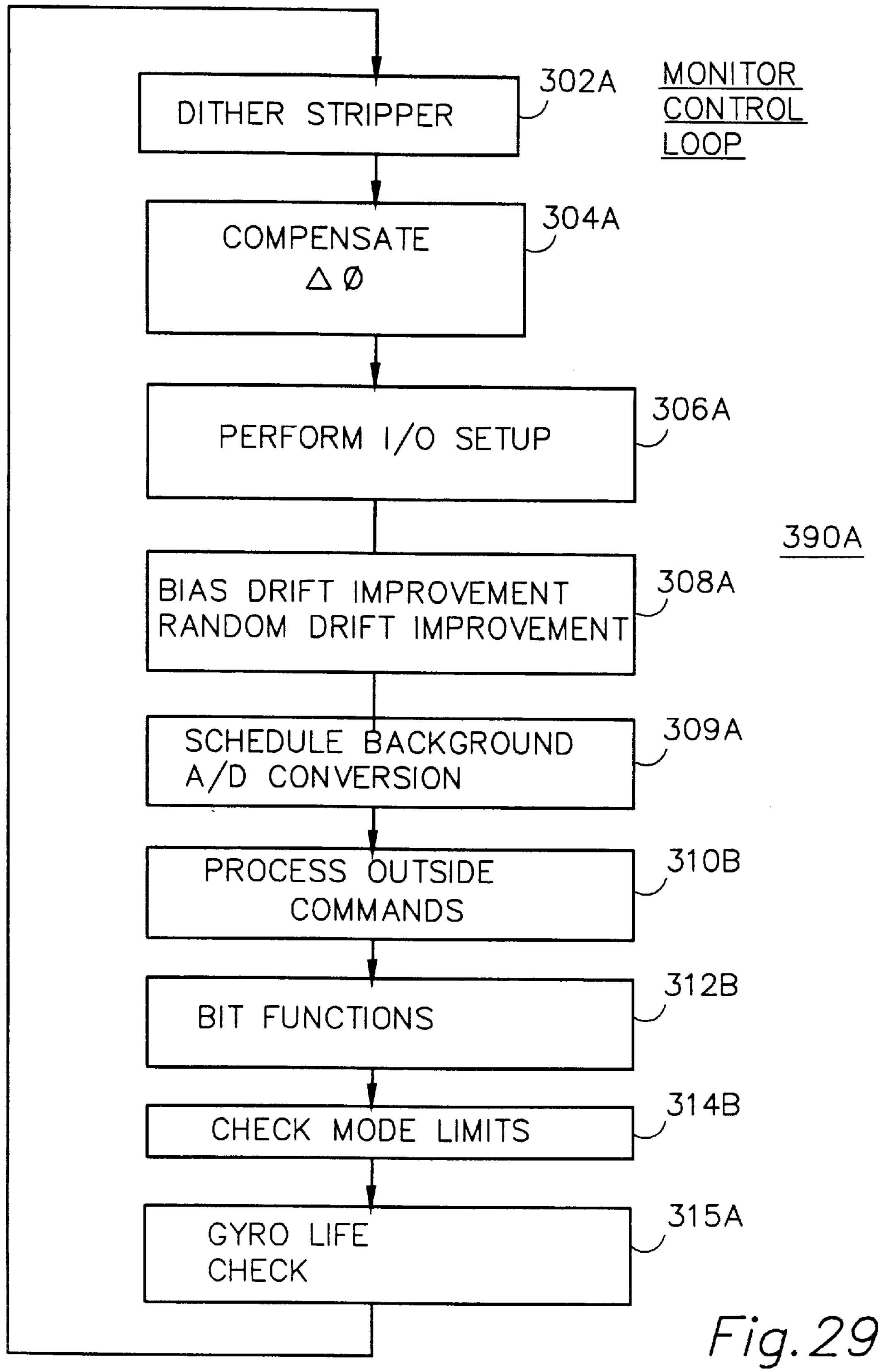
FIG. 29 shows the method of monitoring the modular gyro with the monitor control loop.

The monitor control loop 9390 shown in FIG. 29 is the main process execution loop for the digital modular gyro 10. The monitor control loop waits for the dither stripper A/D conversion to complete at step 9302 before executing the process of the monitor control loop. A conversion complete flag is included in the apparatus of the invention which if set indicates that the A/D conversion completed. The monitor control loop 9390 shows first the execution of the dither stripper algorithm 9302. The compensation of the rotational inertial navigation data for temperature bias drift and age occurs next in step 9304. The monitor control loop 9390 performs I/O set up for the system in 9306. The process then flows to the bias drift improvement and random drift improvement step in 9308. The process then flows to 9310 where any commands, given by an outside system, for the modular gyro are processed. The process executes a built-in test function at 9312 and checks laser mode limits in process 9314. The monitor control loop 9390 then repeats this set of processes until the modular gyro 10 is shut down.

Figure 35:
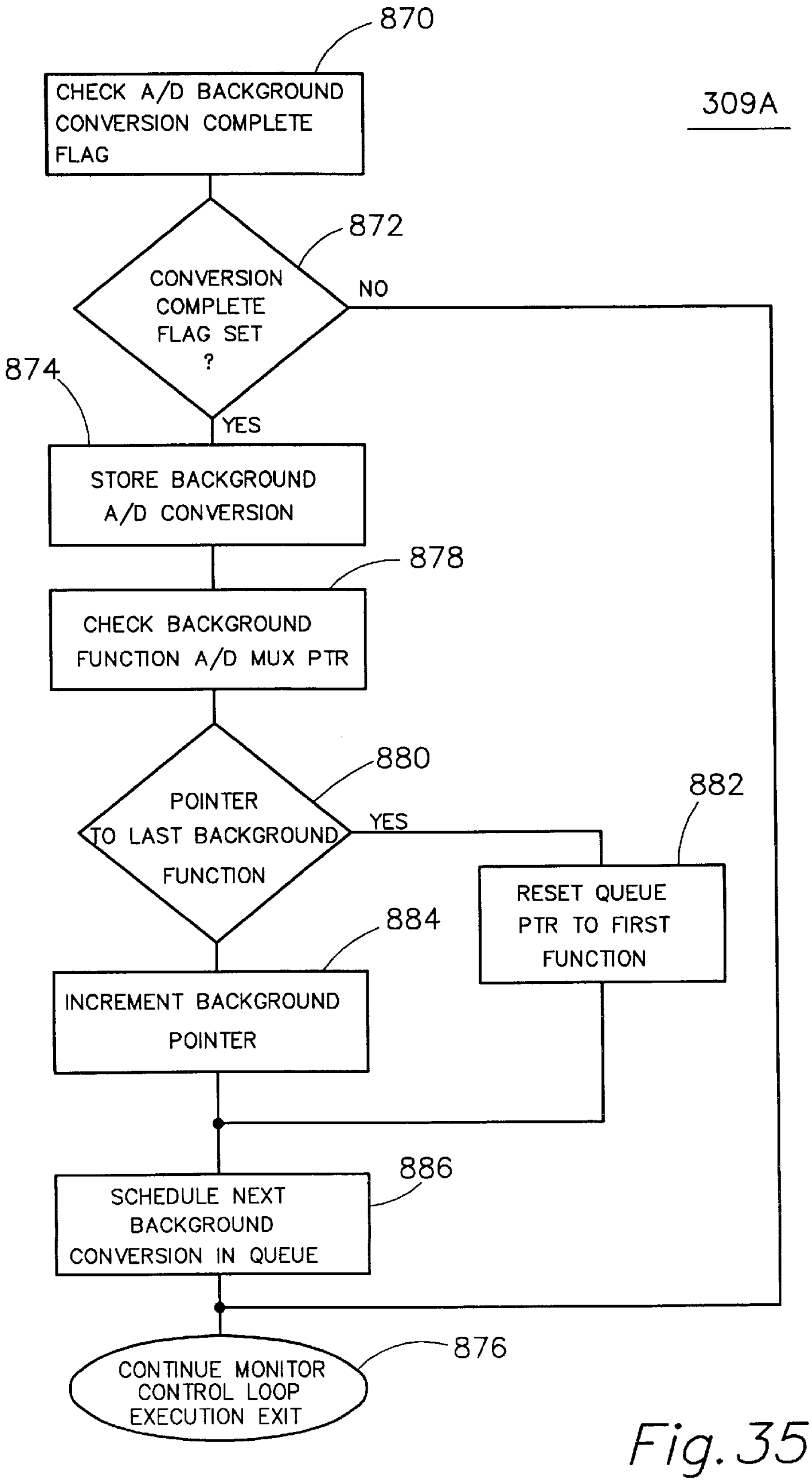
FIG. 35 shows the method of the invention to queue a background analog to digital conversion.

Now referring to FIG. 35 which shows the method of scheduling an A/D background conversion. The scheduling of the A/D background conversion occurs in a hardware system that has a predetermined set of A/D conversion events that may be scheduled in a queue. The number of A/D conversions are predetermined. In one example embodiment of the invention there are seven A/D conversions in the queue. The process of arbitrating them with the monitor control loop shown in FIG. 29 first starts in step 870 where the A/D background conversion complete flag is checked. The process then flows to 872 where the conversion complete flag is checked to see if it is set. If it is not set the process flows to exit the routine to return to the monitor control loop in step 876. In this case the A/D conversion cannot be accomplished because the A/D conversion for the last scheduled A/D conversion is not done yet. If the conversion complete flag is set the process flows to step 874 where the current background A/D conversion is stored in a background conversion A/D register. This relates the current background A/D conversion to a function that is set up by another routine such as measurement of temperature, PLC monitoring, etc. The process then flows to step 878 where the background A/D conversion multiplexer pointer is checked. The process then flows to 880 which determines what to do after the pointer is checked. If it points to the last background function then the queue pointer is reset in step 882 to point to the first function. If the pointer is not the last background function then the process increments to the next background function pointer in 884. The process in either case flows to step 886 to schedule another background conversion in the queue. The process then exits to the monitor control loop in 876.

Figure 28:
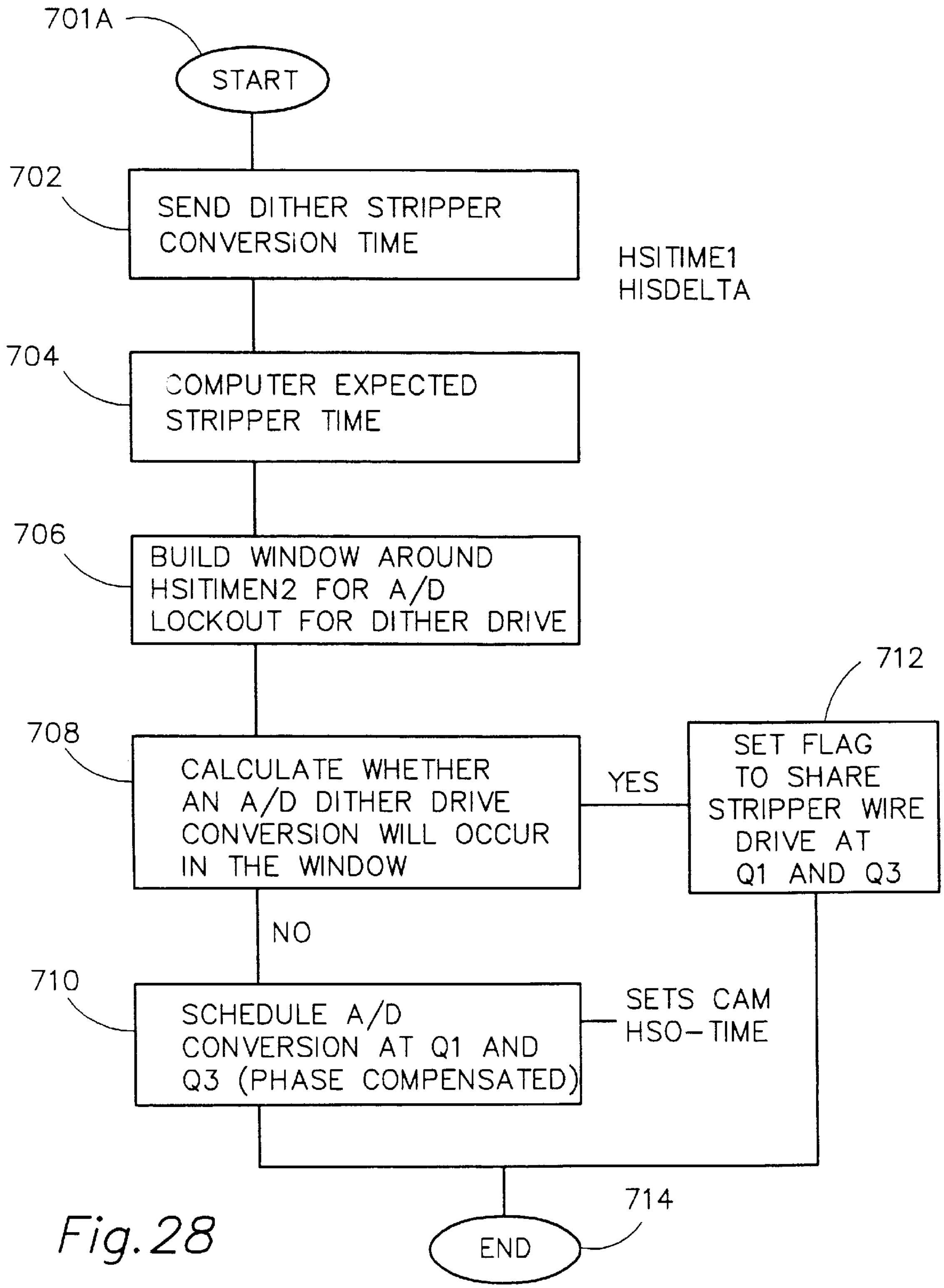
FIG. 28 shows a schematic representation of the method and apparatus of the invention used to arbitrate a single analog to digital converter between a multiple number of other modular gyro functions.

Now referring to FIG. 28 which shows the method of arbitrating a single analog to digital converter between multiple analog signal inputs in the digital dither drive application of the method of the invention. FIG. 28 shows a process flow diagram in which the digital modular gyro 10 transfers a dither stripper conversion time to step 702. The conversion time HsiTime1 is calculated from the dither stripper process as discussed in more detail below with reference to FIG. 33 by using $T_{NEW}$ as HsiTime1 and "deta t" as HsiDelta.

The process then flows to compute the expected stripper time which is calculated from two values which are sent in process 702. The first value is the HsiTime1 which is the beginning of the dither stripper conversion time and the HsiDelta which is also sent from the external system through process 702. The expected dither stripper sample time is the sum of the HsiTime1 and HsiDelta 704. This time is called HsiTime2. The process then flows to 706 where a window is built around the HsiTime2 to lock out the A/D converter for the dither drive. This prevents dither drive A/D conversion from interfering with the dither stripper A/D conversion if they occur simultaneously. The A/D converter in this embodiment of the invention is an asynchronous converter. The A/D conversion may occur asynchronously with the processes that set up the A/D conversion. Process step 708 calculates whether or not the A/D conversion for the dither drive will occur in the dither stripper window. The process then forks to either process step 712 or process step 710. Process step 710 sets up the high speed output content addressable memory (HSO CAM) to schedule a phase compensated A/D conversion and software timer flag and interrupt specifically for the dither drive. Process step 712 sets up the HSO CAM to schedule a software timer flag and interrupt specifically for the dither drive to share the already scheduled dither stripper A/D conversion. The method of the invention checks the software time flag's condition to determine what type of action to take at the scheduled time, whether a dither stripper conversion, dither drive conversion, a shared dither stripper and dither drive conversion or a background conversion. Process step 708 provides a method of either scheduling a new A/D conversion or sharing the one that is scheduled to happen. Implicit in the method of the invention is the assumption that a single A/D conversion within the window is adequate for dither drive applications because the dither stripper A/D conversion is always of highest priority. In process 712 a flag is set which will indicate to another routine, namely the dither drive routine and the dither stripper routine that the A/D conversion may be shared. In process step 710 the A/D conversion is scheduled and the result of the conversion is sent to the content addressable memory within the microcontroller 100 for the high speed output logic described below. The A/D conversion is scheduled at time Q1 and Q3 which have been phase compensated as described above. The process then flows to 714 where the arbitration of the A/D converter has been completed.

Figure 30:
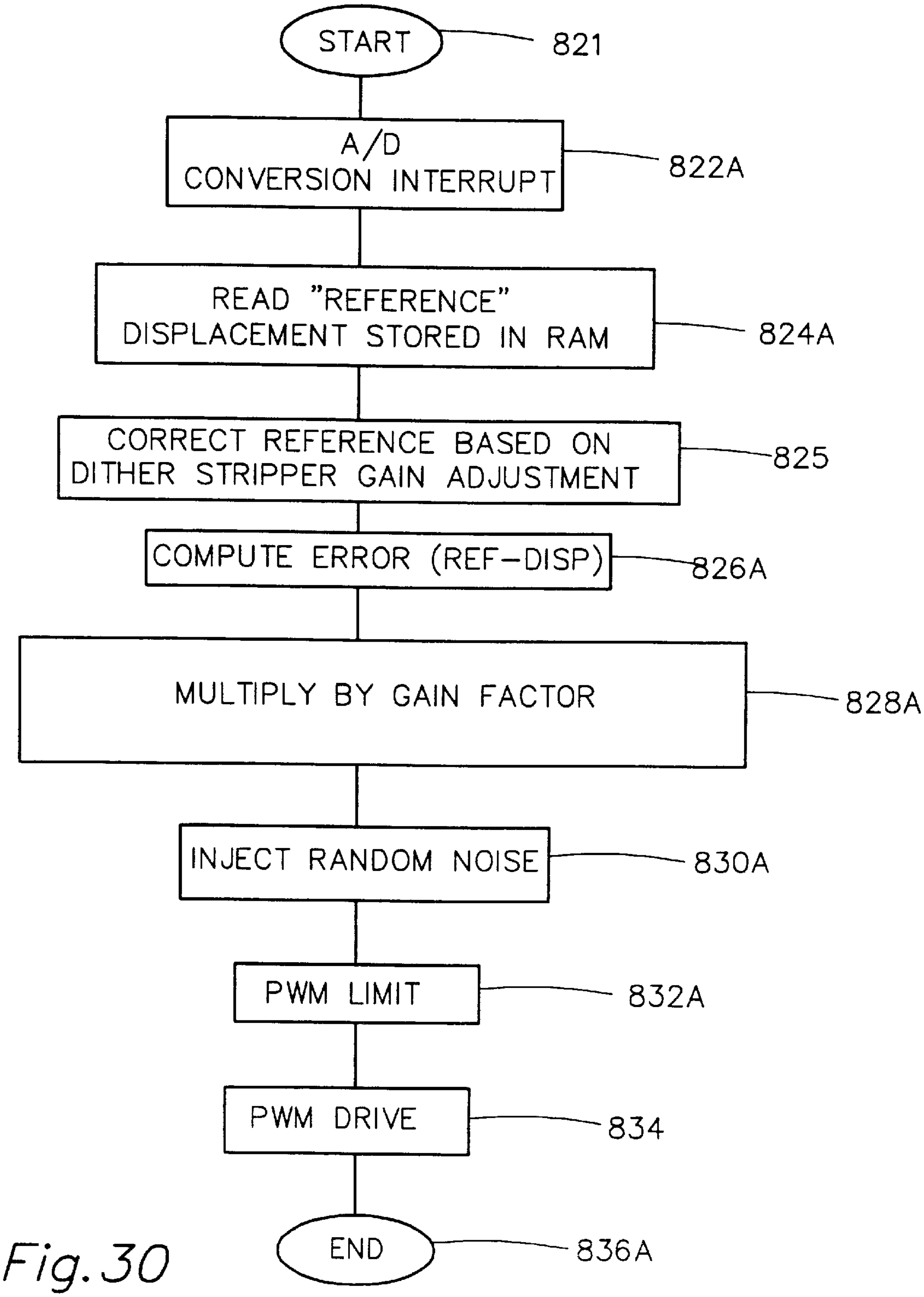
FIG. 30 shows a method of processing a dither pickoff signal that has been digitized and converted from a dither pickoff.

Now referring to FIG. 30 which shows the method of computing the pulse width modulated drive signal from the analog to digital conversion of the dither pickoff. The method of the invention which is embodied in the microcontroller 100 starts in process block 3021 with an A/D conversion interrupt from the dither drive routine at step 3022. The reference displacement, which is the amount of angular displacement of the dither motor expressed in readout counts that should have occurred, is read from memory in step 3024. The dither angle reference counts are converted to equivalent analog pickoff signals in digital volts based on the dither stripper gain adjustment at step 3025.

The process then flows to 3026 where the error in the dither motor displacement is calculated as the reference displacement minus the actual displacement. The process then flows to 3028 where the computed error is multiplied by a predetermined gain factor which is 50 in one embodiment of the invention. The process then flows to 3030 where random noise is injected into the system. By way of example and not limitation in one embodiment of the invention the distribution of the random noise is Gaussian. The process then flows to step 3032 where the pulse width modulated signal output is limited to a maximum value of 100% PWM and a minimum of 0% PWM to avoid rollover of the register. In this embodiment of the invention the limiting value may be 0 or 255 representing a PWM of 0% or 100%, respectively. The process then flows to step 3034 where the dither drive is provided with the calculated drive level to bring the dither motor within the reference value adjusted by the injected random noise. The process then ends at step 3036.

Figure 31:
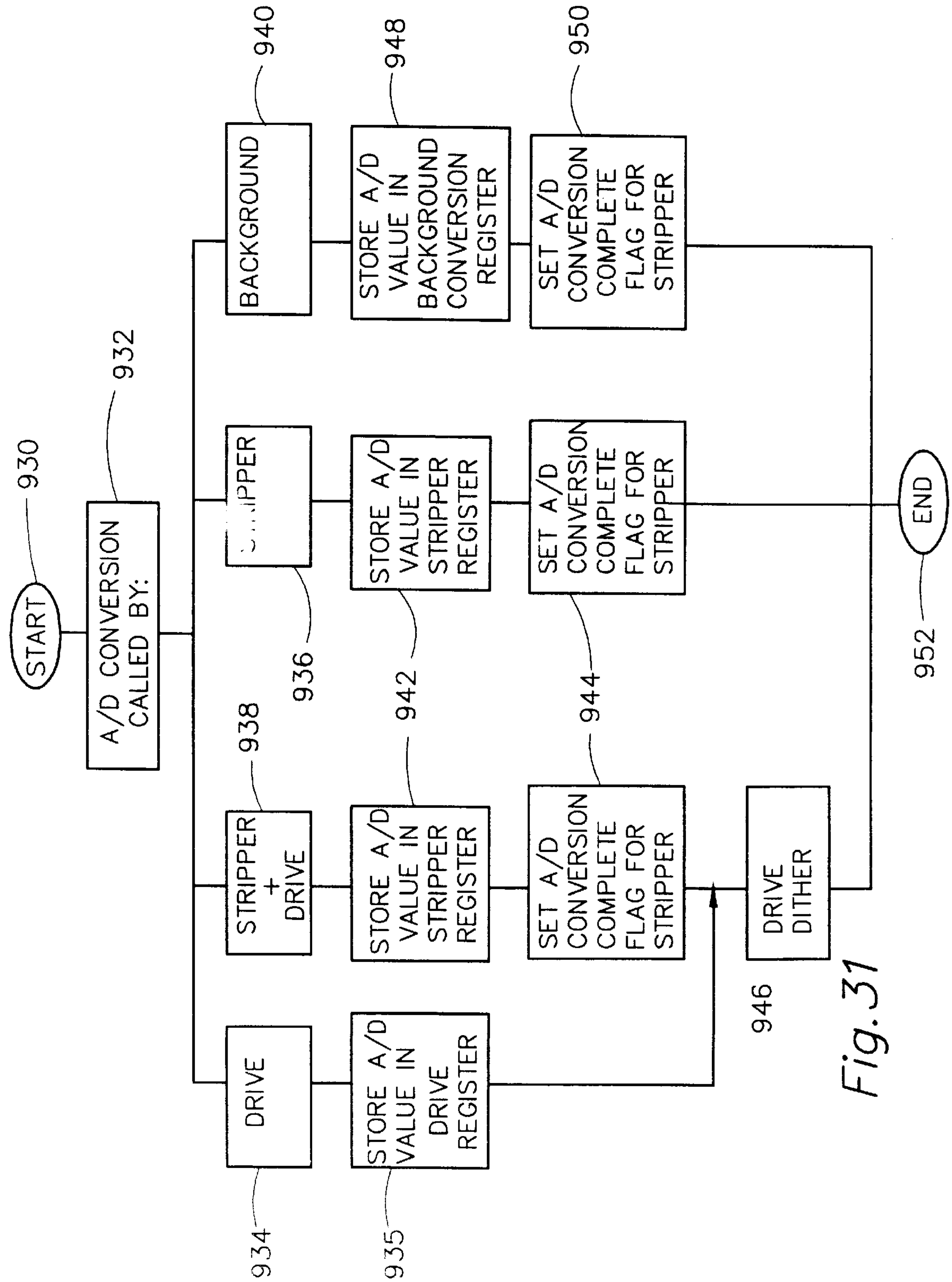
FIG. 31 shows a schematic diagram of the method of handling an A/D conversion when called by either the drive and the stripper and the background processes.

Now referring to FIG. 31 which shows a schematic representation of the direct digital dither drive A/D conversion handler. A/D conversions are required in the modular gyro for dither drive, dither stripper and background conversions, such as those required to compute the quadratures of the dither. The process shown in FIG. 31 is the method by which the A/D conversions are handled depending on which process called the A/D conversion. The method starts at 930 with an A/D conversion interrupt. The source of the A/D conversion is determined to originate from, in process block 932, either the dither drive at 934, the dither stripper at 936, the dither stripper and dither drive 938 or background processes 940. The stripper and drive step 938, indicates that the dither drive A/D conversion happened within the dither stripper A/D conversion window. The process flows to step 942, just as a simple dither stripping operation, because the window for the dither stripper is adequate for the dither drive also. The digital drive 934 calling the A/D conversion flows directly to the dither drive at 946. The dither drive routine is described in more detail in FIG. 30.

By the time the A/D conversion is carried out it is already known which processes called for the A/D conversion. This is predetermined by the T2CAP interrupt shown in FIG. 28 and software timer interrupts.

The process flows to step 942 if the dither stripper or the dither drive and dither stripper call for an A/D conversion wherein the A/D value in the stripper register is read. The A/D conversion complete flag is then set at 944 to indicate that the recent A/D conversion value for the stripper or stripper and drive is in the stripper register and was called by the stripper and drive. The process then flows in either case of the drive or stripper and drive to drive the dither at 946. In the instance of a background A/D conversion the process flows to 940 where the A/D value is fetched out of the background register at 948 and the conversion complete flag is set for a background conversion 950. In all cases the process ends at 952.

Figure 32:
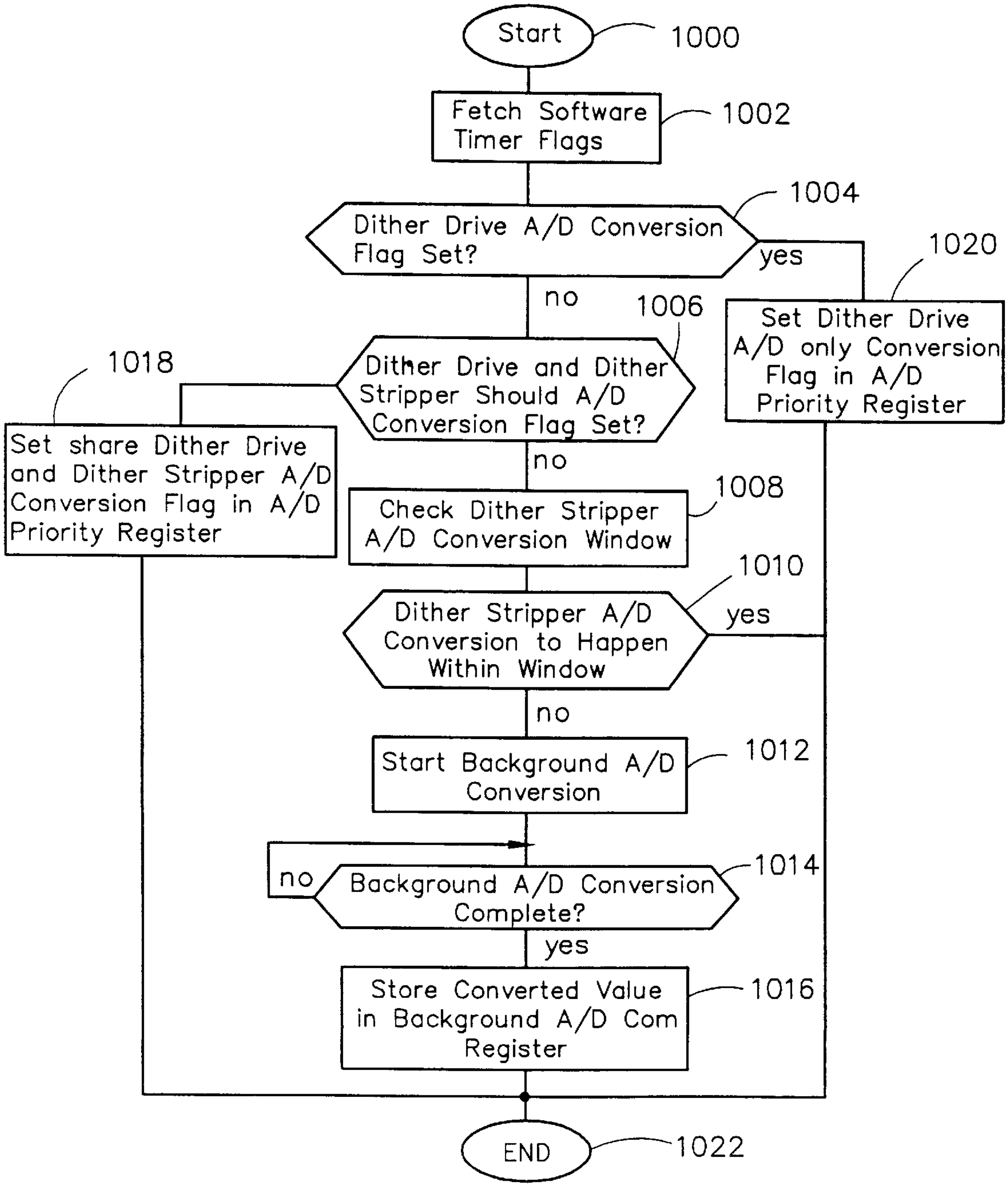
FIG. 32 shows a schematic diagram of the interrupt service routine for the software timer interrupt.

Now referring to FIG. 32 which shows an interrupt service routine for the software timer interrupt to schedule either a dither only conversion, shared conversion or background conversion. The process starts 1000 by fetching a software timer flag in step 1002 from a special function register. The process then checks to see whether or not the software timer flag is set for a dither drive A/D conversion 1004. If so the process proceeds to step 1020 to set the dither drive A/D conversion only flag in the A/D priority register in the microcontroller 100 scratch pad RAM and ends at step 1022. If a dither drive conversion is not indicated then the process flows to step 1006 where the process checks to see whether or not the software timer flag is set for a drive and stripper conversion. If so the process proceeds to step 1018 to set the share dither stripper with the dither drive A/D conversion flag in the A/D priority register in the microcontroller 100 scratch pad RAM and ends at step 1022. If a shared conversion is not indicated then the process flows to step 1008 where the method of the invention checks whether or not a dither stripper A/D conversion is in process. Implicit in the method of FIG. 32 is the condition that if there is not a shared conversion or a dither drive conversion there must be a background conversion. The process then flows to step 1010 to check whether or not the dither stripper A/D conversion will happen within a window defined as HsiTime1+HsiDelta as explained in step 702 of FIG. 28. If the conversion occurs in the window the process ends at step 1022. If the conversion does not occur in the window the process flows to step 1014 to wait for the background conversion to complete. The background conversion will occur within a specified period. In one embodiment of the invention the background conversion occurs within 20 microseconds. The process then flows to step 1016 to store the converted value to the background A/D register. The process then ends at step 1022. Those skilled in the art will recognize that waiting for the background A/D conversion process to complete may be interrupt driven as described in FIG. 31 or polled as described in FIG. 32.

Figure 33:
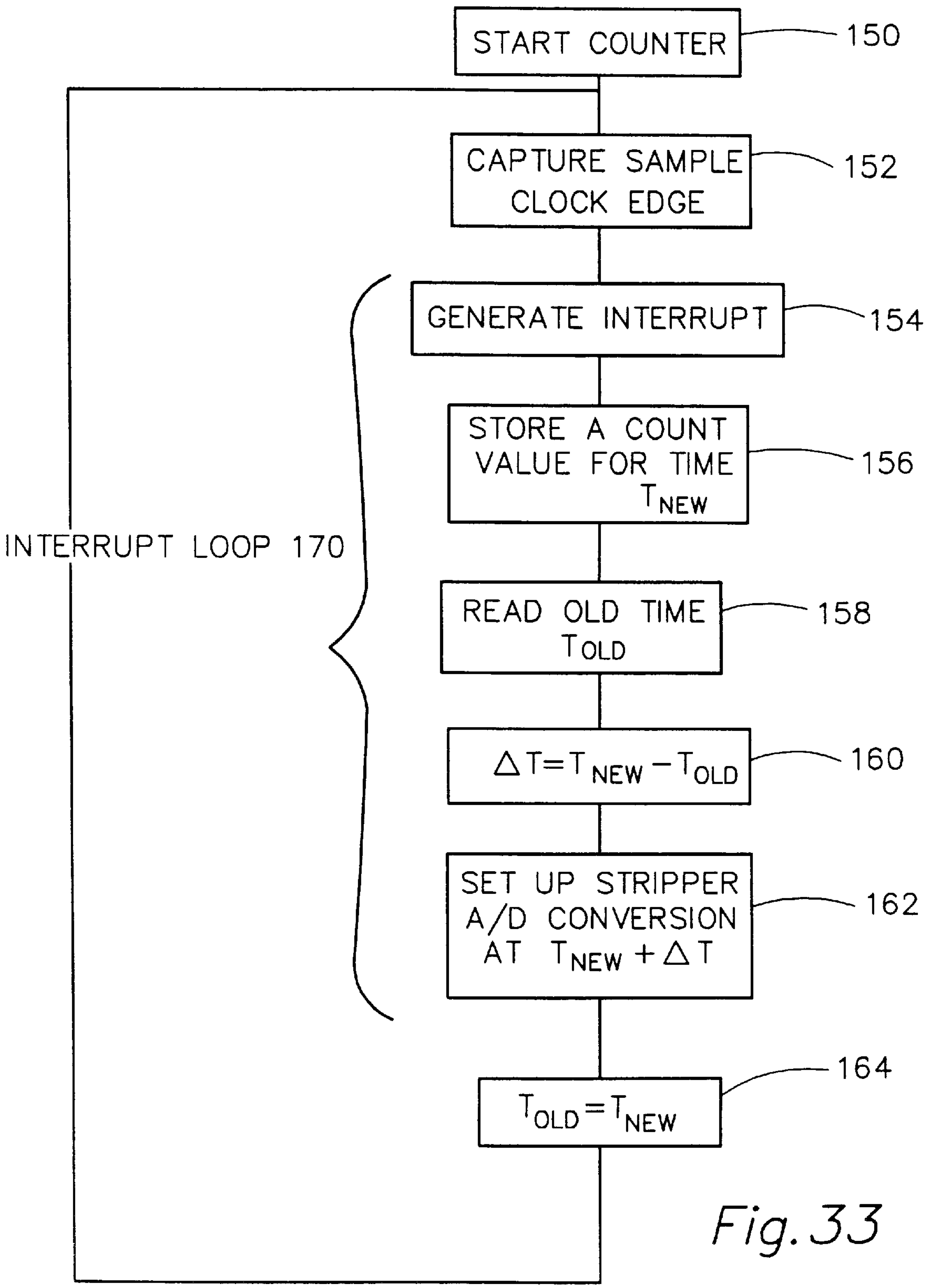
FIG. 33 shows the method of the invention used to predict the sample strobe.

Now referring to FIG. 33 which shows the method of the invention used to compute and anticipate the occurrence of the next system sample clock. The importance of anticipating the sample clock is illustrated by the need for the external inertial navigation system to obtain inertial navigation data which is synchronized to a external clock uniform throughout the inertial navigation system. Without this capability inertial navigation data would be provided asynchronously thus resulting in inaccurate evaluation of inertial position. The process of FIG. 33 starts by starting a counter in process block 150 when the process is first initialized. The process then flows to process block 152 where a sample edge of a sample clock from the system is captured. This in turn, generates an interrupt in process block 154. The interrupt then starts a process called the interrupt loop 170. The interrupt loop schedules an A/D conversion. A count value from the counter of step 150 is stored at the interrupt time when the interrupt is generated in process step 154. The process then flows to step 158 where the last time an interrupt occurs is read from memory. The process then flows to step 160 where the difference in time between the old interrupt and the new interrupt is computed as "delta t". The process then flows to 162 where the A/D conversion is set up in the high speed output of the microprocessor. The new time for the high speed output to occur is at the "new t" plus "delta t". The process then flows to step 164, the "old t" is set up to be equal to the "new t" and the process returns to process step 152 where the next sample clock is captured. The method of FIG. 33 dynamically compensates for changes in system sample clock period and dynamically tracks the behavior of the system sample clock. The A/D conversion for the dither stripper is set up in 162 in the HSO logic. The A/D conversion 162 is also used by the dither drive.

Figure 34:
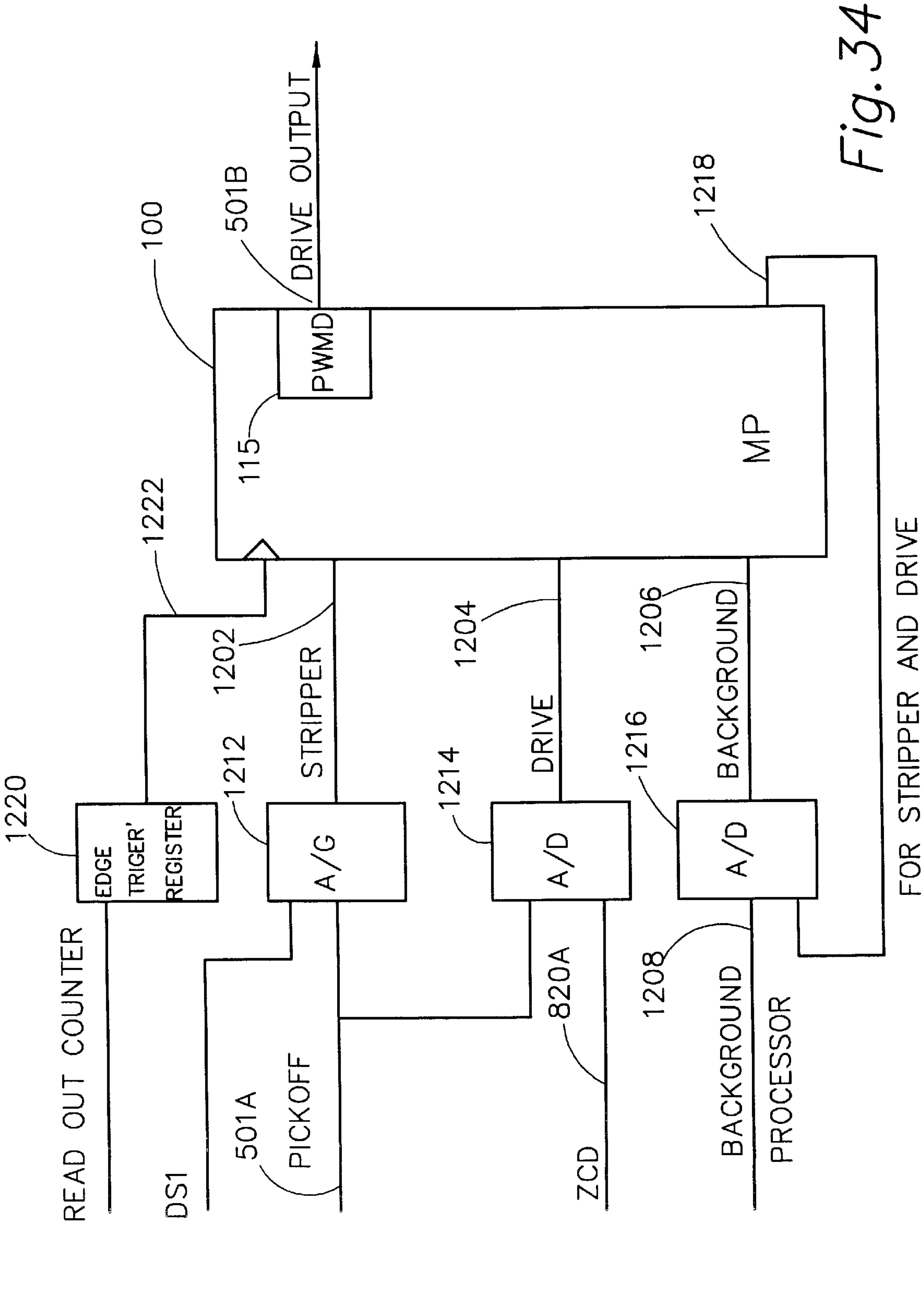
FIG. 34 shows a method and apparatus of the invention to drive one embodiment of a modular laser gyro dither mechanism utilizing two analog to digital converters.

Now referring to FIG. 34 which shows a method and apparatus of the invention to drive one embodiment of a modular laser gyro dither mechanism utilizing two analog to digital converters. Those skilled in the art will appreciate that the methods of the invention may be applied to the apparatus described in FIG. 34.

In this embodiment a first A/D converter 1212 provides a digital representation of the dither pickoff voltage that is timed appropriately for the dither stripper operations described above. The A/D conversion for the dither stripper must occur when DS1 is active. The microcontroller 100 uses the results of the A/D conversion and the output 1222 of the edge triggered readout counter register 1220 to perform dither stripping operations.

The second A/D converter 1214 provides a digital representation of the dither pickoff voltage that is timed appropriately for the dither drive operations described above. The A/D conversion for the dither drive must occur when the zero crossing detector 820A is active. The microcontroller 100 uses the results of the A/D conversion 1204 to perform dither drive operations.

The third A/D converter 1216 provides a digital representation of background processes such as temperature measurement, RIM and LIM measurement, PLC monitoring, etc. Background A/D conversions are enabled by the microcontroller through enable line 1218.

The modular laser gyro dither stripper performs the phase-locked dither stripping of the dither signal from the inertial navigation signal. The dither stripper uses a microcontroller to control a gain factor in the dither stripper feed back loop.

Dither Stripper

Referring again to FIG. 1B, the dither stripper of the invention is implemented in one example embodiment with a micro-controller serving as controller 100. It is a closed loop system comprising a dither pickoff 244A, dither pickoff amplifier circuit 400, A/D converter 110, controller 100, PWM output 115, direct dither drive 500 and dither motor 244B. The A/D converter 110 may be integral to the controller and may advantageously be a 10-bit AID converter. The controller may also advantageously include a microprocessor 120.

Briefly, in operation the RLG Block position represented by a pickoff voltage 245A is first amplified by dither pickoff amplifier 400. The amplified dither pickoff signal 501A is sent to the A/D converter 110 and also to a comparator 401 which in turn generates a square wave 501C which is sent to a one shot 810 to limit the maximum frequency of the interrupt. The one shot 810 is periodically reset at approximately the rate of 1000 Hz. The output of the one shot interrupts the controller at positive edge zero crossings.

In one preferred embodiment of the invention the microcontroller contains three pulse width modulators which are used for various control functions. The first pulse width modulator PWM 1, 115, is used for controlling the dither drive circuit. A number of software modules are involved in the initialization and control of the micro-controller 100. The software programs are run by the microprocessor 120 contained within the micro-controller 100.

Figure 36:
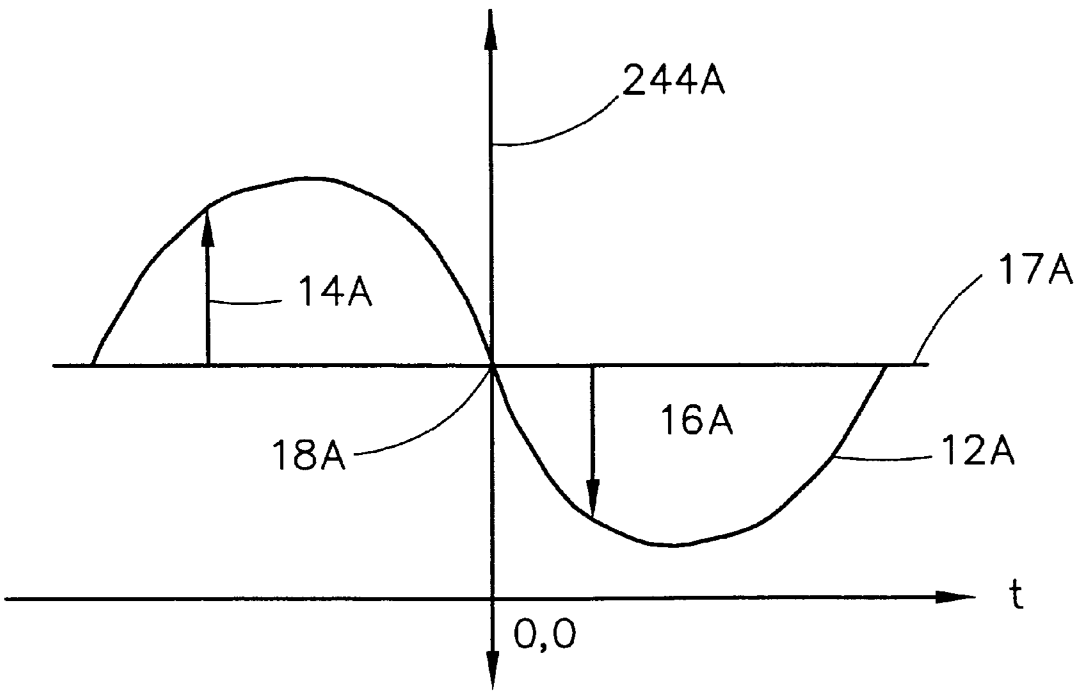
FIG. 36 shows a plot of the dither signal with examples of the system sample strobe.

Now referring to FIG. 36 which shows a dither pickoff signal verses time plot of the modular laser gyro of FIG. 1A. The dither pickoff signal 12A is shown going through a zero crossing point 18A. The zero crossing point 18A represents the position of the laser block half way between the minimum and maximum dither. FIG. 36 also shows the sample times 14A and 16A. The sample times 14A and 16A are determined by an external system. The sample clock used by the external system synchronizes other inertial navigation measurements such as other gyros and other accelerometers to insure that all readings from all inertial navigation systems will occur at the same time. Because of this requirement the sample times 14A and 16A must be predicted to provide adequate time to process the dither signal 12A.

Figure 37:
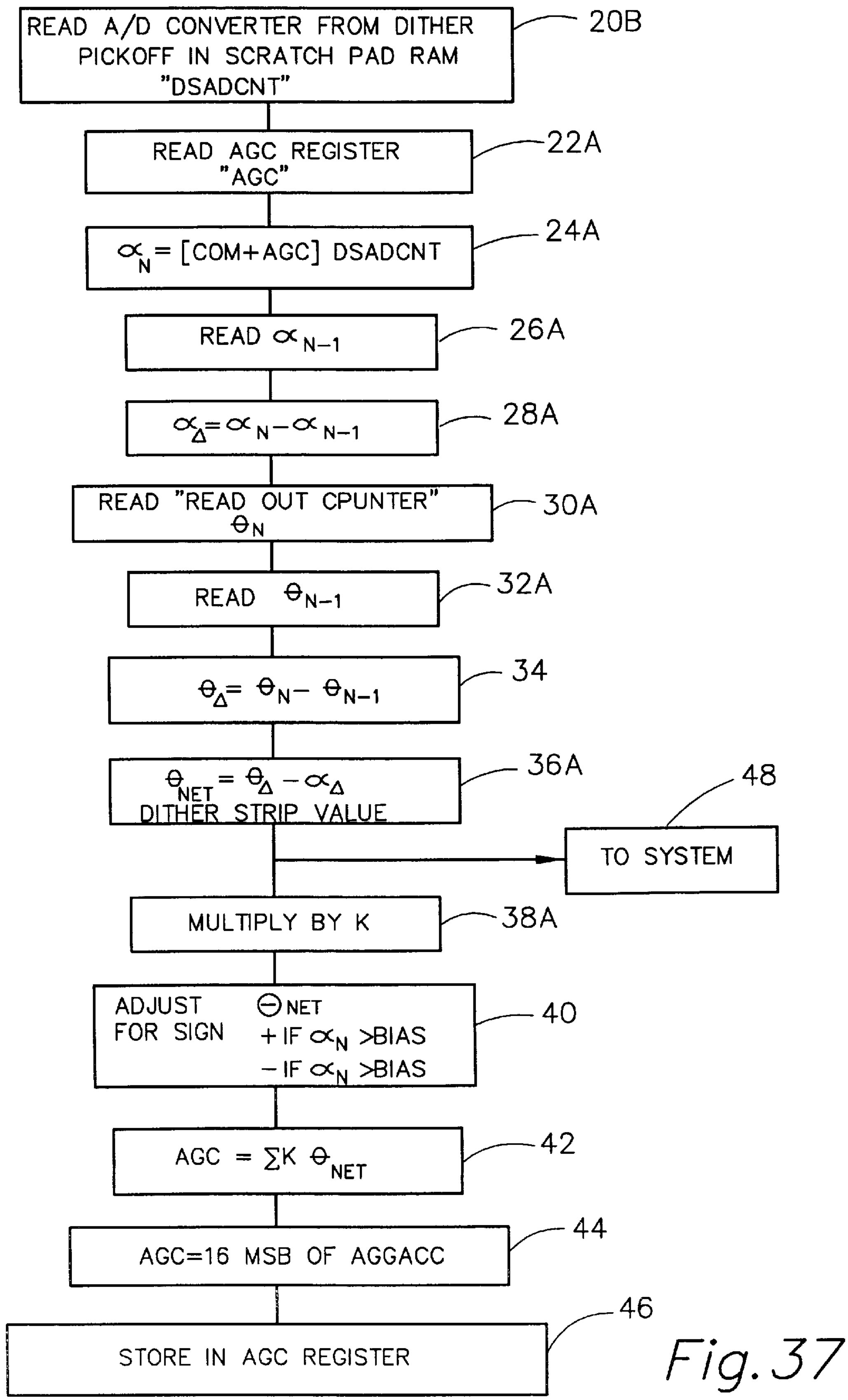
FIG. 37 schematically shows the method of dither stripping of the invention.

Referring now to FIG. 37 which shows a schematic block diagram of the method of the invention to remove the dither component from the readout signal. The readout signal contains both the inertial navigation signal and the dither frequency signal. The accurate and repeatable measurement of inertial position requires that the dither signal be removed or stripped from the readout signal.

FIG. 37 shows the method of stripping the dither signal from the readout signal. Process block 3720 shows the A/D conversion from the dither pickoff 244A to a scratch pad random access memory location entitled "DSADCNT". The method of analog to digital conversion is described in more detail herein. DSADCNT represents the dither pickoff voltage. To strip the dither requires the conversion of the dither pickoff voltage to an angular displacement at process block 3724, representing the movement of the gyro block.

The conversion of pickoff voltage 501A (DSADCNT) to angular displacement $\alpha_N$ follows the equation: $\alpha_N$=[$K_{COMP}$+AGC]*DSADCNT. Where $K_{COMP}$ is a compensation factor used to adjust the magnitude of the conversion in relation to the AGC factor, AGC is an automatic gain control factor which helps compensate for changes in dither pickoff characteristics due to temperature, aging, etc. and DSADCNT is the converted dither pickoff voltage 501A.

In the preferred embodiment of FIG. 37 the AGC factor is accessed from an AGC register in step 3722. The process then flows to step 3724 where the dither angular displacement $\alpha_N$ is computed as the sum of $K_{COMP}$ plus AGC, times DSADCNT. In one preferred embodiment of the invention the compensation factor is 10,000. The $\alpha_N$ is in readout count units (1.11 readout counts≈1 arc second) and represents the conversion from voltage which is represented in the DSADCNT register.

The dither stripper must then compute the change in angular displacement of the dither motor since the last time the process was sampled. The process flows to process block 3726 where the last computation of dither angular displacement $\alpha_{N-1}$ is read from memory. The process then flows to process block 3728 where the difference between the current angular displacement $\alpha_N$ and the last measured angular displacement $\alpha_{N-1}$ is computed and stored in a variable called $\alpha_{DELTA}$. $\alpha_{DELTA}$ represents the dither component of gyro block movement.

The dither stripper then must compute the modular laser gyro measured change in displacement to compute the net inertial displacement of the gyro block 200. The process flows to process block 3730 where the readout counter 700A value $\theta_N$ from the modular laser gyro is read. The process next flows to process block 3732 where the last read readout counter value $\theta_{N-1}$ is read from memory. In step 34 the difference in readout counter values $\theta_{DELTA}$ is computed as $\theta_N-\theta_{N-1}$. The process then flows to process block 3736 where the actual inertial navigation rotational change called $\theta_{NET}$ is computed as $\theta_{DELTA}-\alpha_{DELTA}$.

Once the dither signal has been stripped the process then provides $\theta_{NET}$ to the inertial navigation system using the laser angular rate sensor of the invention. Concurrently at step 3738 the process enters a phase in which an adjustment is made to the AGC coefficient. The process flows to process block 3738 where the net output is multiplied by a gain adjustment factor K which is predetermined before the operation of the method of the invention to allow the system to convert faster. During initial turn on K is set to a high value and lowered as the gyro approaches steady state. The process then flows to process block 40 where the automatic gain control constant AGC is adjusted depending on the magnitude of $\theta_{NET}$ and $\alpha_N$. If $\alpha_N$ and $\theta_{NET}$ are the same sign then AGC is compensated in the positive direction. If $\alpha_N$ and $\theta_{NET}$ are of different sign then AGC is compensated in the negative direction. The process then flows to process block 42 where an automatic gain control accumulator "AGCACC" is updated with the new $\theta_{net}$ multiplied by the constant K. The AGC accumulator "AGCACC" is the sum of all $\theta_{nets}$ multiplied by the constant K where $\theta_{net}$ and K may be of either sign. The AGC coefficient is then gain limited in process block 44. The process then flows to process 46 where the new AGC coefficient is stored for reuse in the method of the invention in process step 3722. The dither stripping method is repeated for each new measurement of angular displacement of the dither drive motor.

In one embodiment of the invention the micro-controller 100 is used to execute the dither stripper method of the invention. The following software description outlines one method of implementing the dither stripper.

Procedure Name:

DITHER STRIP

Procedure Description:

This procedure performs the phase-locked dither stripping algorithm. Special considerations are that the real-time clock handler changes the dither gain based upon the clock time.

Gain will be high during initialization time.

Procedure Inputs:

Dither Stripper A/D conversion value, DSADCNT, Other previous data stored are previous A/D conversion, previous readout count and present agc gain.

Data Structures Used:

| | | | |
|---|---|---|---|
| EXTRN | FUNCTLW:WORD | ; | Function control word |
| EXTRN | LAX:LONG | ; | General Purpose Register |
| EXTRN | LBX:LONG | ; | General Purpose Register |
| EXTRN | AX:WORD | ; | General Purpose Register |
| EXTRN | BX:WORD | ; | General Purpose Register |
| EXTRN | DX:WORD | ; | General Purpose Register |
| EXTRN | AGCGAIN:LONG | ; | AGC gain register gyro #1 |
| EXTRN | AGCACC:LONG | ; | AGC accumulator register gyro #1 |
| EXTRN | AGCAN1 | ; | A/D conversion value from last sample period #1 |
| EXTRN | UPDNCNT1:WORD | ; | Readout cntr value from last sample period #1 |
| EXTRN | NETTHETA:WORD | ; | Net uncompensated theta output gyro #1 |
| EXTRN | DSADCNT:WORD | ; | Dither stripper A/D conversion value |
| EXTRN | DSGAIN:WORD | ; | Dither Stripper accumulator gain factor |
| | | ; | Common to all three dither strippers |
| EXTRN | GAIOMAP:NULL | ; | Address of gyro readout counter |

CSEG

PUBLIC DITHER STRIP

DITHER STRIP

Load new dither stripper gain value based upon whether dither stripper accumulator flag is set.

```
JBC FUNCTLW,3,NSDTIME        ;  CHANGE GAIN ONLY WHEN
                                INTERVAL FLAG IS SET
ANDB FUNCTLW,#11110111B      ;  CLEAR DITHER STRIPPER
                                ACCUMULATOR FLAG
```

Recalculate dither stripper agc gain for this accum interval, all gyros.

```
LD AGCGAIN,AGCACC+2      ;  MS 16 BITS OF AGCACC TO
                            GAIN LS 16 BITS
EXT AGCGAIN              ;  OF GAIN REGISTER, SIGN
                            EXTEND AGCGAIN TO 32b
```

NSDTIME:

Multiply A/D conversion by gain factor

```
    ADD LAX,AGCGAIN,#1000D      ;  1000 + AGCGAIN
    ADDC LAX+2,AGCGAIN+2        ;  LAX IS LONG INTEGER
    MUL LAX,DSADCNT             ;  A/D conversion value *
    (1000+AGCGAIN)
```

Subtract An from An-1, Make dither stripped theta (nettheta)

```
    LD LBX,LAX              ;  AN TO LBX
    LD LBX+2,LAX+2          ;
    DIV LBX,#1000D          ;  DIVIDE BY 1,000
    DIV AGCAN1,#1000D       ;  DIVIDE AN-1 BY 10,000
    SUB LBX,AGCCAN1         ;  MAKE DELTA ALPHA
    LD AGCAN1, LAX          ;  AN <-- AN-1
    LD AGCAN1+2, LAX+2
```

Read and assemble readout counter data from gate array

```
LD DX,#GAIOMAP     ;  LOAD GATE ARRAY MEMORY I/O MAP
                      ADDR PTR
LDB AX, [DX]+      ;  GET LS NIBBLE FROM GATE
ARRAY
ANDB AX,#OFH       ;  BIT MASK
STB AX,BX          ;
LDB AX, [DX]+      ;  GET NEXT NIBBLE
SHLB AX,#4         ;  MOVE INTO UPPER NIBBLE
                      POSITION
ADDB BX,AX         ;  MOVE INTO UPPER NIBBLE OF
                      LOWER BYTE
LDB AX, [DX]+      ;  GET NEXT NIBBLE
ANDB AX,#OFH       ;  BIT MASK
STB AX,BX+1        ;  LOWER NIBBLE OF UPPER
                      BYTE
LDB AX, [DX]       ;  LAST [MS] NIBBLE
SHLB AX,#4         ;  MOVE INTO UPPER NIBBLE
                      POSITION
ADDB BX+1,AX       ;  MOVE INTO UPPER NIBBLE OF
                      UPPER BYTE
```

Make an unstripped delta theta from present and previous up/down counts

```
SUB NETTHETA,BX,UPDNCNTN1     ;  DITHER STRIPPED
                                 DELTA THETA NET
                                 OUTPUT
LD UPDNCNTN1,BX               ;  ACCUMULATOR
```

Accumulate last delta theta net in agc accumulator.

```
MUL LAX,NETTHETA,DSGAIN     ;  INCREASE GAIN
                               CONSIDERABLY
CMP DSADCNT,#508D           ;  IF ADCONVERSION <
                               2.5 V WE ARE ON POS
                               HALF CYC
JLE NEGACCUM1               ;  PERFORM SUBTRACTION
ADD AGCACC,AGCACC,LAX       ;  PERFORM 32 BIT
                               ADDITION
ADDC AGCACC+2,LAX+2
RET
```

NEGACCUM1:

```
    SUB AGCACC,AGCACC,LAX       ;  PERFORM 32 BIT
                                   SUBTRACTION
    SUB AGCACC+2,LAX+2
    RET
    END
```

Figure 38:
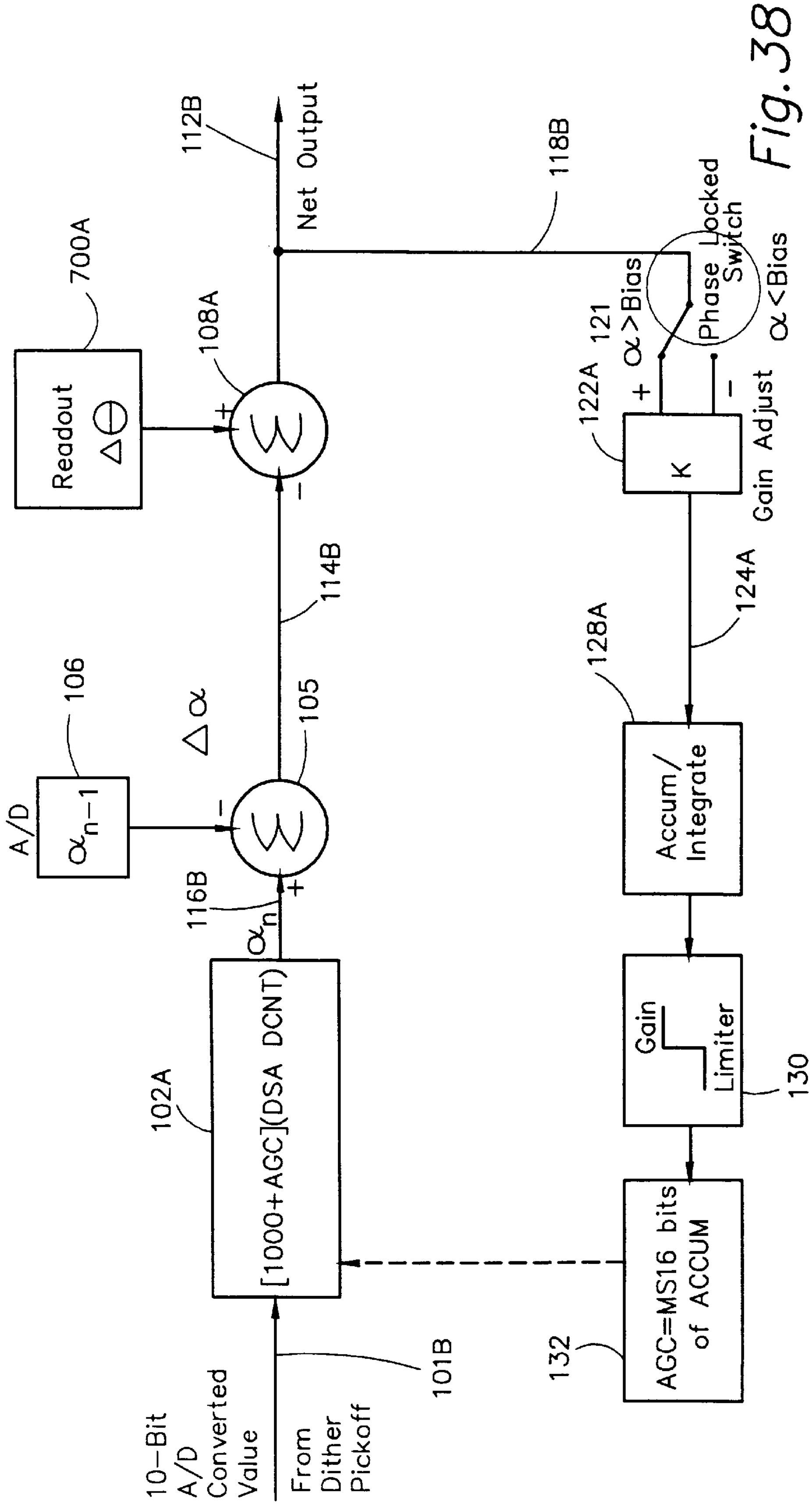
FIG. 38 shows a detailed diagram of an embodiment of the dither stripping circuit as provided by one aspect of the invention.

Now referring to FIG. 38 which shows a method of the dither stripping algorithm of the invention used to strip the modular laser gyro of the dither signal. In FIG. 38 the 10 bit A/D converted value from the dither pickoff 244A is input at signal line 101B. Signal line 101B is input to a sum and multiply unit 3802 which sums a predetermined constant, in this embodiment of the invention determined to be 1000, to the automatic gain control constant AGC. The sum of the predetermined constant plus the AGC coefficient is multiplied by the DSADCNT register. The result of this computation $K_{CV}$ is output on signal line 116B as $\alpha_n$. $K_{CV}$ is used in the modular laser gyro DIRECT DITHER DRIVE method and apparatus. $\alpha_n$ is then compared in comparator 105 with the last sampled $\alpha_{n-1}$ 106 from the A/D converter. The output of the comparator 105 is provided on a 32 bit bus as $\alpha_{DELTA}$ which is equal to $\alpha_N/1000-\alpha_{N-1}/1000$. The number 1000 may advantageously be chosen to adjust the measured gain and measured dither pickoff signals and stored angular displacements of the dither such that they will fit into the word width of the system.

The output signal from comparator 105 is provided on signal line 114B as $\alpha_{DELTA}$ to an additional comparator 108A which compares the current change in the angular displacement of the gyro block with the change in measured angular displacement of the modular laser gyro readout $\theta_{DELTA}$, provided in block 700A. The comparator 108A then provides a $\theta_{NET}$ which is a 32 bit representation of the actual inertial navigation output $\theta_{NET}=\Delta\theta-\Delta\alpha$. The net output is provided on the 32 bit bus shown as signal line 112B. The $\theta_{NET}$ output is also fed to a phase lock switch 3821 which is switched based on the comparison between the angular displacement of $\alpha_N$ and the gyro dither pickoff bias. If the bias is less than UN the gain adjust is positive to the $\theta_{NET}$. If the bias is greater than the angular displacement output, the gain adjust is negative to $\theta_{NET}$. The net output is provided after gain adjustment by gain adjustment block 3822 on signal line 3824 as $\theta_{NET\_A}$ which is also a 32 bit quantity. The $\theta_{NET\_A}$ signal is provided to an accumulate/ integrate stage 3828 where the 32 bit representation of the $\theta_{NET\_A}$ is integrated with prior $\theta_{NET\_A}$ values from other stripping cycles.

Figure 39:
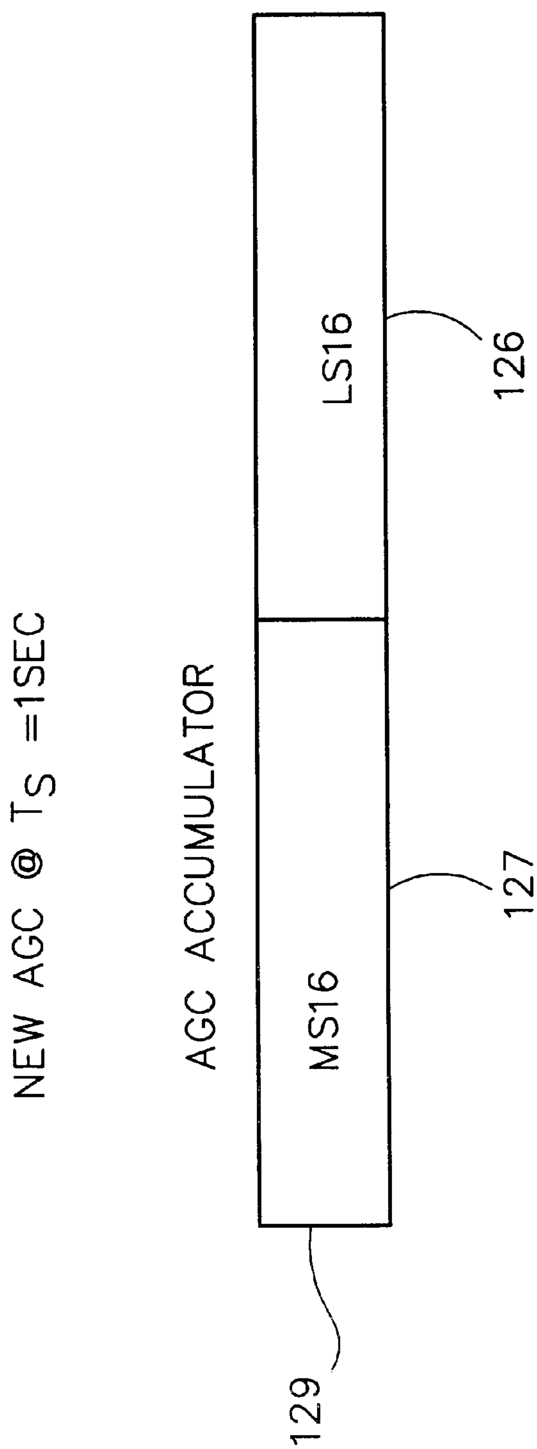
FIG. 39 shows a register block diagram of the automatic gain control register used in the dither stripping apparatus of the invention.

The internal representation of the 32 bit value found in the AGC accumulator is shown in FIG. 39. FIG. 39 shows the most significant bits 127 of the AGC accumulator register 129 and the least significant 16 bits 126 of the 32 bit AGC accumulator register 129. The process then gain limits the output of the accumulator at process block 130 which provides only the 16 most significant bits of the AGC accumulator 129 as the new AGC signal. This method prevents oscillations and small deviations in automatic gain control from being introduced into the automatic gain control loop 3880.

Life Prediction

Refer again to FIG. 1B which shows a block diagram of one embodiment of a modular laser gyro employing the life prediction features of the present invention. The path length control system 600 of the instant invention forms a closed loop system comprising a laser intensity monitor LIM signal 20 and readout intensity monitor RIM signal 38 serving as the laser performance signals. The PLC apparatus 600 provides a path length control monitor PLCMON signal 32, a LIM signal 20, and a single beam signal SBS 36 which are connected to the controller 100 through analog to digital converter 110. The PLC apparatus 600 is further described below with reference to FIGS. 1B, 44 and 45. Digital logic apparatus 800 provides a sweep signal 112, switch signal 116, not switch signal 114, dither signal 118 and not dither signal 128 to the path length control apparatus 600. The controller 100 provides control of the path length transducers through the digital logic apparatus 800. The A/D converter 110 may be integral to the controller 100 and may advantageously be a 10 bit A/D converter. The controller may also advantageously include a microprocessor 120. The operation of the invention is discussed in more detail below.

The controller 100 contains three pulse width modulators which in this embodiment of the invention are used for various control functions. The first pulse width modulator PWMO 37 is used for controlling the path length control apparatus 600 by PWMO signal 30. A number of software modules are involved in the initialization and control of the controller 100. The software modules are run by the microprocessor 120 contained within the controller 100.

Figure 44:
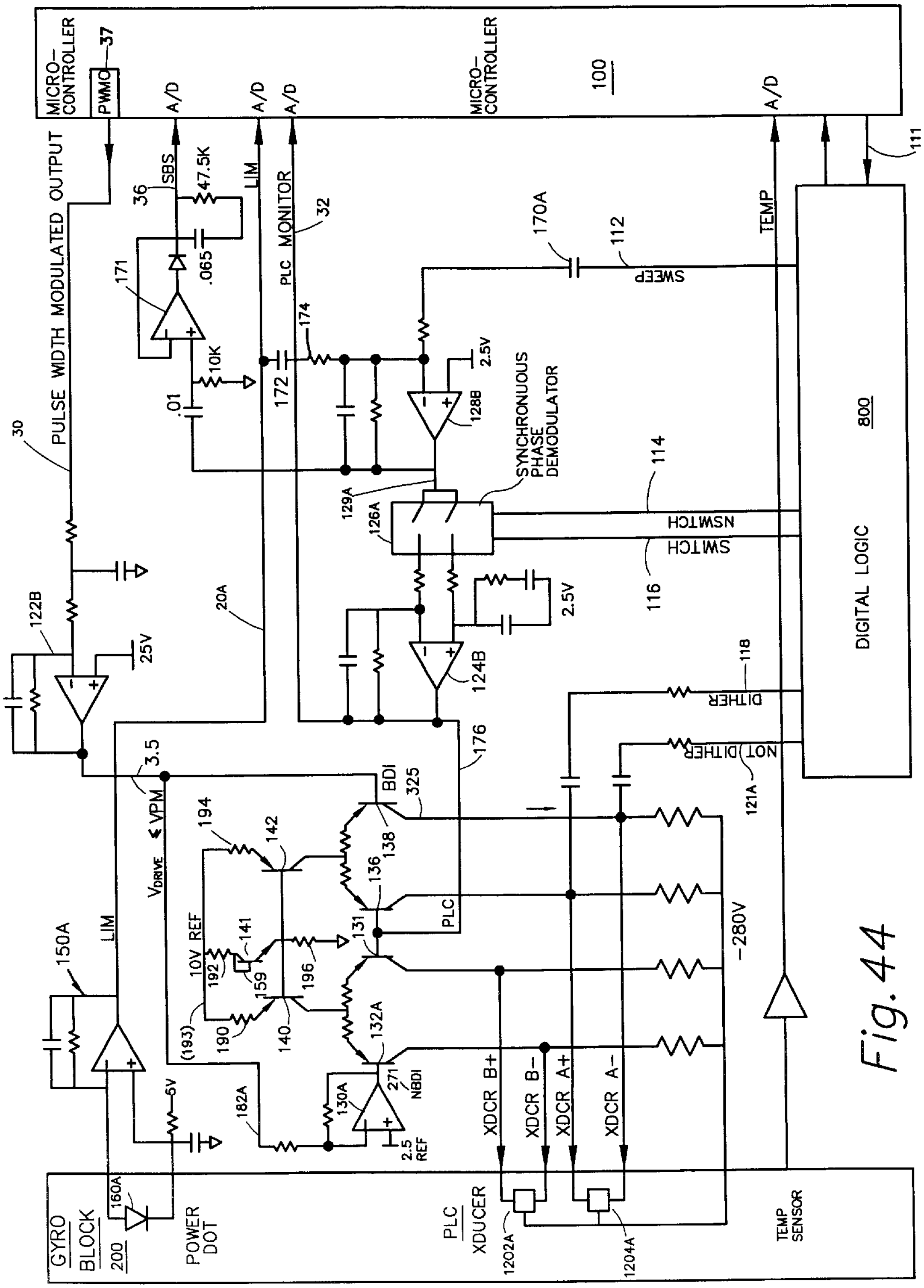
FIGS. 44 and 45 are intended to be pieced together as a single figure showing one embodiment of a path length controller as employed in one example of the invention used to step through a number of modes of the laser.
Figure 45:
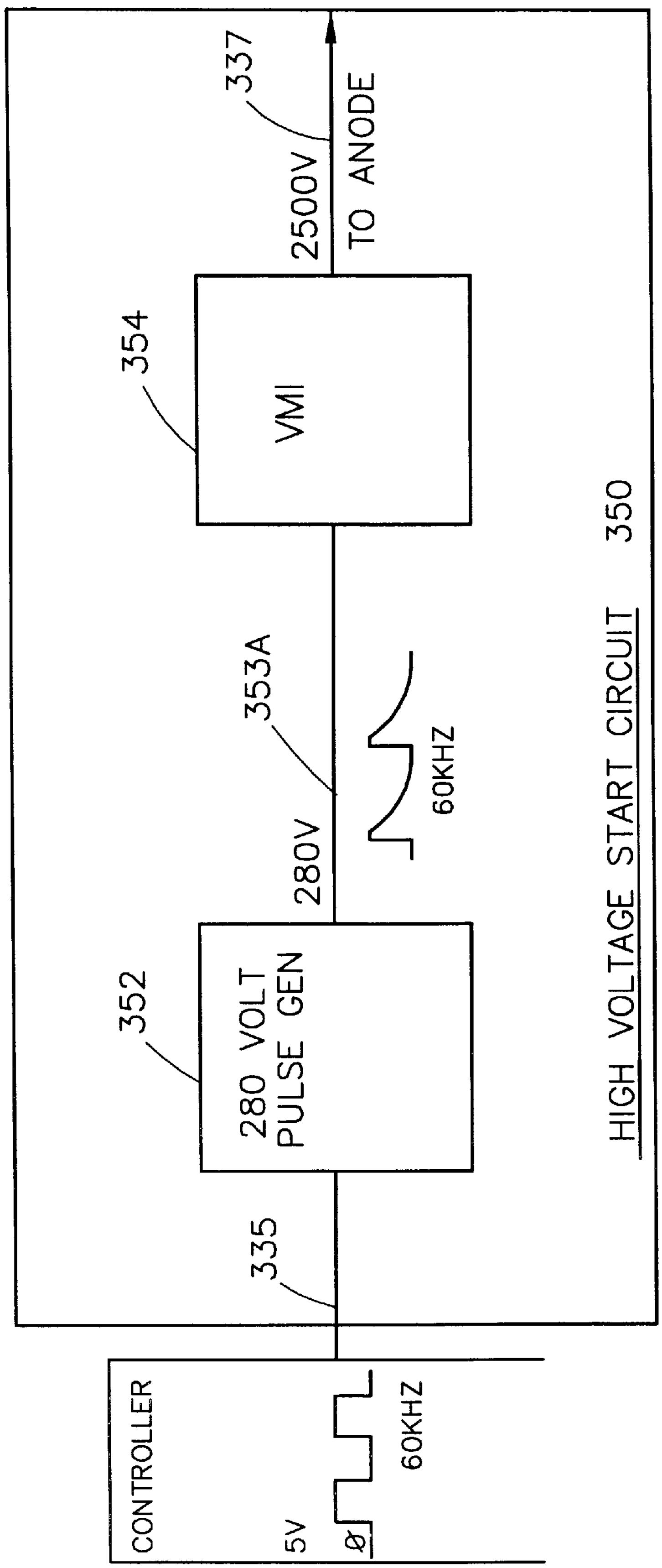

Shown in FIGS. 44 and 45 is one embodiment of a path length controller as employed in one example of the invention used to step through a number of modes of the laser. The path length controller of FIGS. 44 and 45 comprises digital logic 800, the sweep signal 112, the not switch signal 114, the switch signal 116, the first dither signal 118, a second dither line 121, a first integrator 4422, a second integrator 4424, a synchronous phase demodulator switch 4426, an amplifier 4428 and an invertor 4430. Also included are a first set of driving transistors 136, 138 and a second set of driving transistors 131, 132.

The sweep line 112 supplies a 3 Khz signal during start-up of the modular laser gyro 200. The sweep line 112 carries a signal designated SWEEP. The two switching lines 114, 116 also supply 3 Khz signals to the switch 4426 wherein the first switching line 114 is 180° out of phase with the second switching line 116. The switching lines in one example are designated SWITCH (SW) and NOTSWITCH (NSW) respectively. Similarly, the dither lines 118, 121 are designated DITHER (D) signal and NOTDITHER (ND) signal respectively. They also supply a 3 Khz signal from the digital logic 800 wherein the 3 Khz signals are 180° out of phase with each other. The dither lines and the switching lines are offset by 90 degrees in phase.

In operation the digital logic turns on the sweep line 112 in response to a start-up command from the controller 100 on control line 111. At the same time the digital logic turns off the DITHER 118 and NOTDITHER 121 lines during the time the SWEEP signal is applied. When the gyro has swept to the desired laser mode, the SWEEP signal is removed and the DITHER and NOTDITHER lines 118, 121 are enabled.

The sweep line 3 Khz signal is also related to the SWITCH and NOTSWITCH signals 116, 114. The sweep line 3 Khz signal may be in phase with one of the switch signals depending upon the mode to be swept, up or down. The 3 Khz SWEEP signal is connected through an AC coupling capacitor 170 to the inverting input of the first amplifier 4428. The signal is then routed through switch 4426 to the inverting or non-inverting input of the second integrator 124. In operation, if the SWEEP signal is in phase with the switch signal 116, the output of the invertor 4428 may be routed through the non-inverting input of integrator 4424. If the SWEEP signal is in phase with the NSW or NOTSWITCH signal line 114 the SWEEP signal may be routed through the inverting input of the second integrator 4424. Those skilled in the art, having the benefit of this disclosure, will recognize that these relationships may be manipulated in various combinations to produce substantially similar results.

The SWEEP signal is left on for a long enough period of time such that the output of the integrator at node 176 may achieve a high enough voltage for the modular gyro to sweep to a predetermined mode. Node 176, designated as a PLC Monitor signal, is monitored by the microprocessor controller 100 at A/D input line 32.

Control line 111 provides control signals to the digital logic device 800 to substantially switch the operational mode of the path length controller from sweep to running mode. The computer algorithm used for acquiring a desired mode is explained further in detail below.

Also supplied to the controller 100 is the laser intensity monitor signal ("LIM") at A/D input 20. The laser intensity monitor signal is picked up from photodetector 160 in the gyro block 200. The signal is amplified by transimpedance amplifier 150 and sent to the controller. The LIM signal 20 is AC coupled by capacitor 172 and fed back to the first amplifier 4428 through the inverting input. Note that the RC circuit comprising capacitor 172 and resistor 174 are constructed as a high pass filter to allow the 3 Khz dithering signal to pass to the non-inverting input of amplifier 4428. Therefore, in the sweep mode, that is usually on during start-up of the modular laser gyro, when the DITHER and NOTDITHER lines 118 and 121 are turned off, any LIM signal components are blocked by capacitor 172 from appearing on the non-inverting input of amplifier 4428.

The controller 100 continuously outputs a pulse width modulation signal PWMO 30 into the first integrator 122. This PWMO signal is converted by integrator 4422 into a path length control signal which is applied to the transistor drivers 132 and 138 in opposite polarities. The first component of the drive signal is applied to transistor 138. The second component 182 of the drive signal is applied through invertor 4430 to transistor 132 to drive a second transducer in the gyro block. The PLC signal from the second integration amplifier 4424 drives transistors 138 and 136. The PLC signals, together with the path length control signals, operate in pairs to differentially drive two sets of transducers in the gyro, A and B, which are connected to two mirrors 13 and 15 in the gyro block shown in FIG. 1A. In FIGS. 44 and 45, the transducer drivers are shown as elements 1202 and 1204. In practice, as is well known, these are typically piezoelectric elements. Piezoelectric transducers elements 1202 and 1204 have center taps that are connected to the most negative voltage −280 volts in one example. In this way the piezoelectric elements never experience a reverse voltage polarity which reduces hysteresis effects.

In one embodiment of the invention a constant current source comprising transistors 140 and 142 together with resistive components 190, 192, 194 and 196 are arranged to provide a current of about 0.3 ma into each leg of the transducer differential driving transistor pairs (131, 132) are (136, 138).

The differential transistor pairs slowly drive the DC position of the transducers to the desired position based on the SWEEP signal or the AC induced dither signal for seeking the peak LIM signal. The PWMO pulse width modulated signal is used only to move the mirrors differentially for BDI and RDI. The synchronous phase demodulator continues to seek the peak LIM signal based on the phase of the amplified LIM signal 20.

Figure 40:
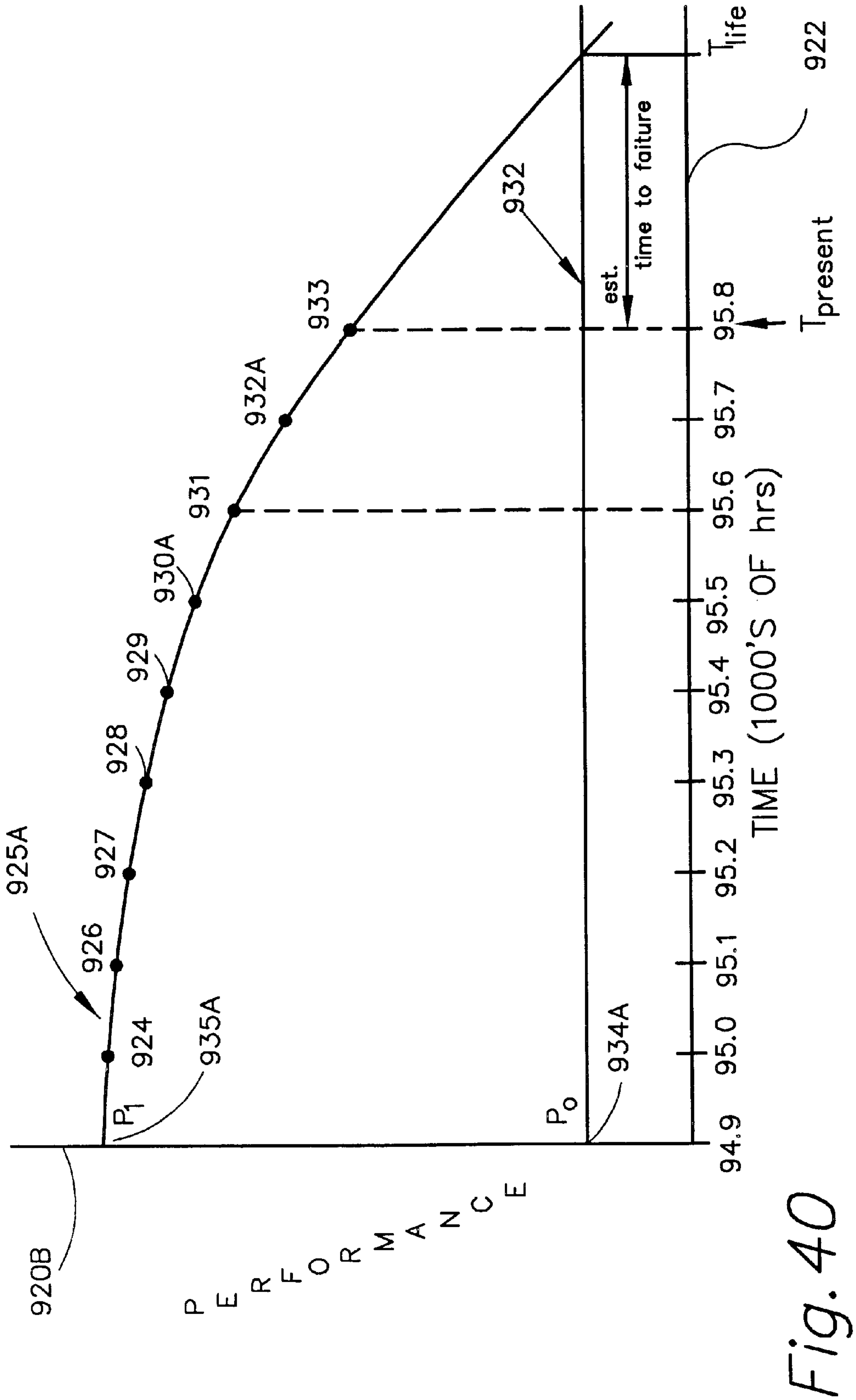
FIG. 40 shows the method of the invention's use of performance data over time as a graph of performance that is fit to a quadratic curve.

Referring now to FIG. 40, one example of modular laser gyro performance on axis 4020 versus time on axis 922 is shown. The modular laser gyro of this example has certain sampled data at various data points. Data point 924 corresponds to 95,000 hours. Data point 926 corresponds to 95,100 hours. Data point 927 corresponds to modular laser gyro lifetime of 95,200 hours. Data point 928 corresponds to modular laser gyro lifetime of 95,300 hours. Data point 929 corresponds to a modular laser gyro lifetime of 95,400 hours. Data point 4030 corresponds to a modular laser gyro lifetime of 95,500 hours. And finally data point 931 corresponds to modular laser gyro lifetime of 95,600 hours. FIG. 40 also shows the minimal acceptable performance level as line 4034 which is a constant performance parameter corresponding to data point $P_0$ on axis 4020. FIG. 40 shows a hypothetical aging profile from the last 1,000 hours of operation and shows an estimated time to failure of about 1500 hours. It may be seen that the performance parameter P drops in magnitude from $P_1$ to $P_0$, $P_1$ shown at point 4035, $P_0$ shown at 4034. The point set 924–931 may be fitted with any form of curve fitting method well known in the art. In the example of FIG. 40 it is shown as a quadratic equation 999. The performance parameter equals $K_1+K_2T+K_3T^2$ where $K_1$, $K_2$ and $K_3$ are coefficients computed from the performance data set and T is time which is shown on axis 922. The graph in FIG. 40 is taken at temperature $T=T_{characteristic}$ 936A. The lifetime $T_{LIFE}$ is defined at the intersection of the performance limit 4034 and the fitted curve 4025.

Figure 41:
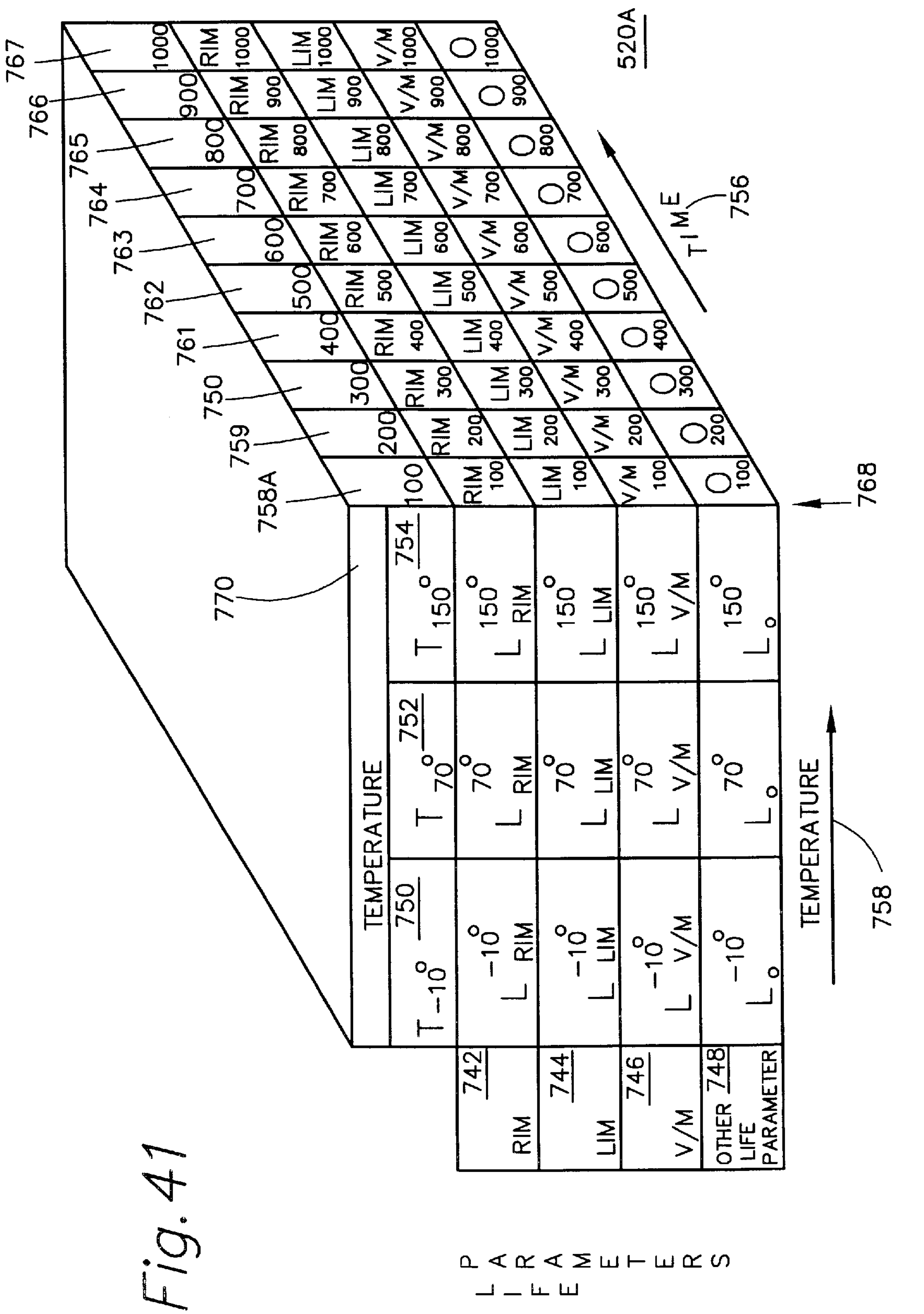
FIG. 41 shows the storage method of the invention showing life parameters versus temperature versus time.

Referring now to FIG. 41 one method of the invention used to store lifetime performance data and estimated life data is illustrated graphically. Those skilled in the art will recognize that for each temperature value there will be a particular lifetime performance chart likened to FIG. 40. In one example embodiment of the invention the three performance characteristics of the modular laser gyro are known as the readout intensity monitor or RIM the laser intensity monitor or LIM and volts per mode, which is a derived quantity shown with reference to FIG. 15. The modular laser gyro life parameters may be augmented with another life parameter shown in FIG. 41. The data shown in FIG. 41 is structured in such a way that it may be stored in a non-volatile memory in the modular gyro of FIG. 1B.

The structure of the storage of the method of the invention allows the storing of modular laser gyro lifetime based on a unique algorithm that minimizes the amount of memory required to store the lifetime information and prediction information. FIG. 41 shows a three-dimensional storage method that in one dimension of the three-dimensional storage method has the critical temperatures shown as $T_{-10°}$, $T_{70°}$ and $T_{150°}$ shown along Temperature axis 178. The temperatures may advantageously be chosen by the system designer to represent the critical temperatures at which the modular laser gyro may operate. Those skilled in the art will recognize that these temperatures are by way of example and other temperatures could be used depending on particular modular laser gyro characteristics. The life parameters are shown as the RIM signal 742, LIM signal 744 and volts per mode 746 and other life parameters 748. These life parameters are used because they have been determined experimentally to be the signals that best represent the performance of the modular laser gyro over time. FIG. 41 also shows on a third axis time ranges that are used to store particular modular laser gyro performance information—time bins. FIG. 41 shows the effect of storing at least ten performance figures over 1000 hour lifetime periods. In this embodiment of the invention the lifetimes are shown as the 100 hours bin, the 200 hours bin, the 300 hours bin, the 400 hours bin, the 500 hours bin, the 600 hours bin, the 700 hours bin, the 800 hours bin, the 900 hours bin and the 1000 hours bin. FIG. 41 shows life parameters including $RIM_{100}$, $LIM_{100}$, volts per $mode_{100}$ and $other_{100}$ in a column associated with the 100 hours bin. The entire three-dimensional array contains life parameter measurements for various combinations of parameter, critical temperature and lifetime.

Figure 42A:
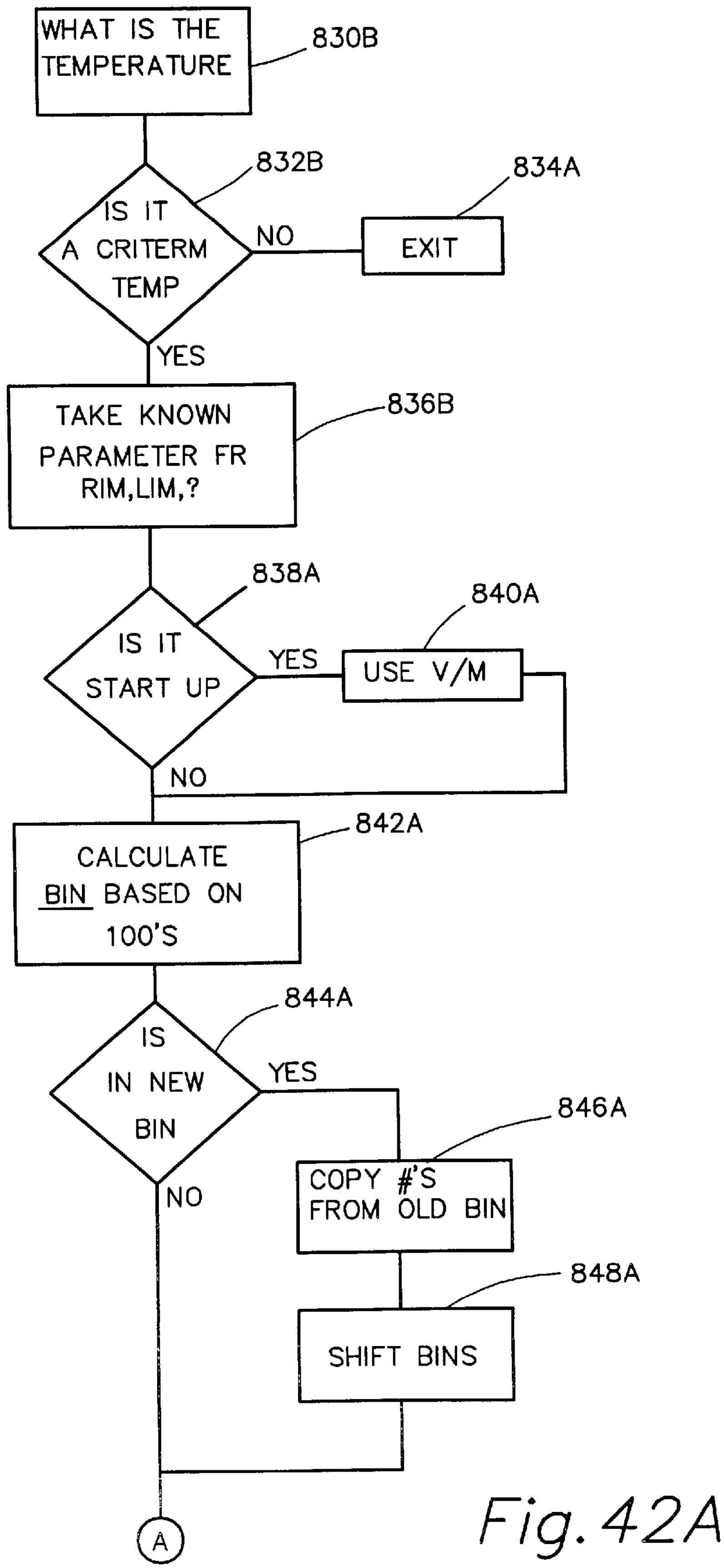
FIGS. 42A and 42B are intended to be pieced together as a single drawing which shows the method of the invention to determine the modular laser gyro lifetime.
Figure 42B:
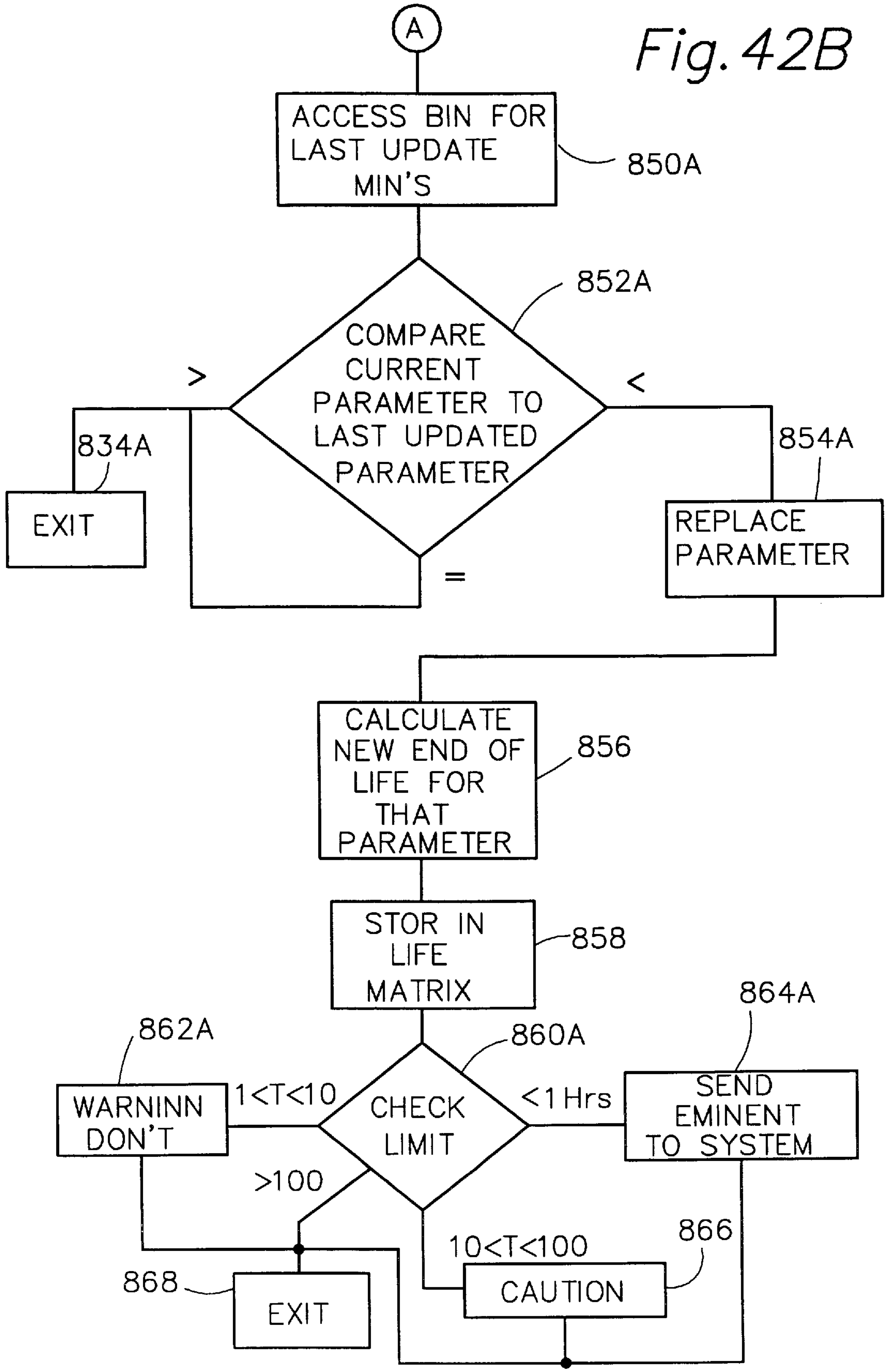

Now referring to FIGS. 42A and 42B which are intended to be pieced together to be read as a single figure, the method of the invention used to determine life and store information into the memory model of FIG. 41 is shown. The process of FIGS. 42A and 42B is run in one preferred embodiment of the invention at a 1 hz rate for example. Still referring to FIGS. 42A and 42B, the process starts by determining the modular laser gyro temperature in process step 4230. The process determines the temperature using the temperature measurement apparatus 33 shown in FIG. 1B. The process flows to 4232 to determine whether the temperature is a critical temperature.

A critical temperature is determined in one preferred embodiment shown in FIG. 41 as either −10° C., 70° C. or 150° C. Those skilled in the art will recognize that a temperature range may be used advantageously instead of an actual temperature because it is possible that the modular laser gyro temperature may fluctuate beyond a selected temperature value either before or after the temperature is checked. An example of a range for the −10° temperature would be −8° to −12°, for the 70° temperature range 68° to 72°, and for the 150° temperature range 148° to 152°. This approach allows the determination of a life profile with a larger sample population and presents more life profile data for processing. The process flows to step 4234 if the temperature is not in a critical temperature region at which point it returns to the monitor control loop or any lifetime calculation calling process. If the temperature measured is a critical temperature the process flows to step 4236 where the RIM, LIM, volts per mode parameters are read from the current system parameter table stored in the memory of the processor 100 shown in FIG. 1B.

The process then flows to decision block 4238 where the determination is made as to whether or not the modular laser gyro is being started up. If it is being started up then the volts per mode parameter is also utilized in the method of the invention which is shown in step 4240. The volts per mode is only measured on start-up in one example of the method of the invention but those skilled in the art will recognize that there are other times that volts per mode could also be used as a lifetime prediction parameter.

In either case the process flows to step 4242 to determine which of the lifetime bins may be used as shown in FIG. 41. In the method of FIG. 41 the bins are corresponding to the 100 hour bins shown along the time axis 756. The time of the parameter sample either falls on a bin or it does not. The process then flows to process step 4244 to determine whether or not the bin is a new bin. If the determination at step 4244 is that a new bin has been calculated, the process flows to step 4246 where the numbers are copied from the old bin. Then at step 4248 the bins are shifted.

In the example of FIG. 41 it is shown that any hours over 1000 would no longer be in any known bin and that this sample constitutes a candidate for a new bin. Therefore, the new time period must be accommodated, and the method of the invention allows the accommodation of the new bin by shifting bins. In the shifting bins method of the invention with reference to FIG. 41 the elements of the array for all life parameters that exist in the 200 hour lifetime region is copied to the 100 hour lifetime region 758A. Correspondingly, the 300 hour lifetime region 760 is copied to the 200 hour lifetime region 759 and so on until the 1000 hour lifetime region 767 is copied into the 900 lifetime region 766. The regions are relabeled corresponding to region 758A being 200 hours, now 766 being 1000 hours, and 767 being 1100 hours etc. Those skilled in the art will recognize that a pointer to each bin may be defined. Each bin pointer may then be rotated to conserve EEPROM lifetime.

The process flows from the shifting bin step 4248 to step 4250 where the last bin is accessed for the last life parameter stored in the bin. In decision step 4244 a non new bin causes the process to flow to step 4250. The last updated minimum is the life parameter that is stored in the bin. This means that a life parameter may only be stored in a bin if it does not exceed a currently stored performance parameter. For example if in the 100 hour lifetime region 758A the volts per mode was 1 volts per mode and now it is 0.9 volts per mode, the bin would be updated with 0.9 volts per mode. For example, in the process of FIGS. 42A and 42B the process goes to step 4252 where the current parameter is compared to the last updated parameter in the memory model in FIG. 41. If the current parameter is greater than the last updated parameter the process flows to 4234 to exit to the monitor control loop. If the current parameter is equal to the last updated parameter then the process similarly exits to the monitor control loop at step 4234. If the current parameter is less than the last updated parameter then the process flows to step 4254 where the bin parameter is replaced in the new bin. The process then flows to step 856 where the new life expectancy is calculated for the set of parameters that are now updated. The set of parameters may correspond to a new lifetime which may then be updated in the lifetime matrix 770 shown as the face of the cube. The new parameter may be calculated according to a linear fit, quadratic fit, or other curve fit that is well known in the art and is stored in the lifetime matrix 770. The process flows from step 858 to 4260 where the lifetime limits are checked. This is a part of the lifetime update and prediction algorithm that provides the warning or caution signals to the inertial navigation system using the invention.

The time limits are predetermined considering the mission of the modular laser gyro. In one example embodiment the critical temperatures used are at the one hour mark, ten hour mark and 100 hour mark. If the lifetime predicted by the new parameter is less than one hour then the process flows to step 4264 where the method of the invention sends an imminent failure warning to the inertial navigation system in an aircraft, for example. If the lifetime predicted by fitting the new parameter is between one hour and ten hours a warning is sent to the inertial navigation system in step 4262 to warn the inertial navigation system operator that the gyro is predicted to be failing and corrective action should be taken, as for example, delaying take off or scheduling a replacement of the gyro upon landing in the case of an airborne unit. The process flows to step 4268 if the time left is between ten hours and 100 hours. The process may flash a caution to the inertial navigation system warning that the gyro is close to imminent failure. Otherwise if the lifetime is greater than 100 hours the process flows to 4268 and exits back to the monitor control loop.

Figure 43:
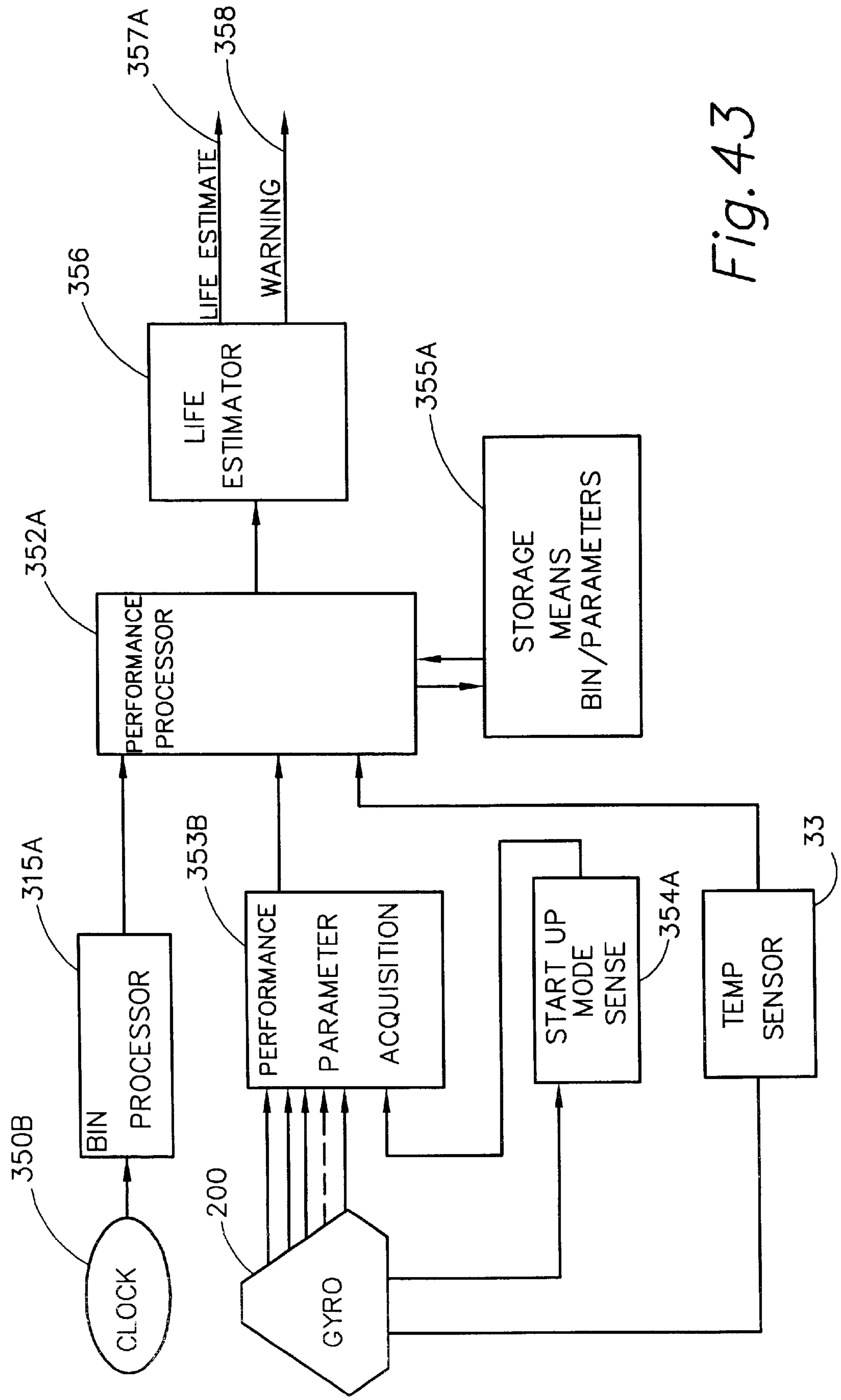
FIG. 43 is a block diagram which shows the modular laser gyro life prediction apparatus of the invention using a performance processor.

Now referring to FIG. 43 which shows the modular laser gyro life prediction apparatus of the invention using a performance processor 4352. A real time clock 4350 feeds the time of day to a bin processor 4351. The bin processor selects the proper bin based on the time and the predetermined bin designation. The laser gyro 200 feeds a set of performance parameters such as the RIM, LIM and volts per mode signal to a performance parameter acquisition system 4353. The performance parameter acquisition system provides a performance processor with required performance parameters. Start-up mode sensor 4354 determines whether the modular laser gyro is in start-up mode and provides other performance parameters to the parameter performance acquisition system 4353. Temperature sensor 33 monitors the gyro 200 temperature and provides the performance processor 4352 with the current temperature. The performance processor 4352 executes the methods described above in computing the correct bin performance parameter and temperature range for storage in the data structure stored in storage means 355. Performance processor 4352 then provides the life estimator 356 with the current parameters for each bin in question. The life estimator 356 then provides a life estimate 357 and a warning 358 to an external system.

Single Transformer Design

Modular laser gyro 10 includes a controller 100, a modular laser gyro block 200, an active current control 300, a dither pickoff amplifier 400, a direct digital dither drive 500, a path length control (PLC) device 600, a readout 700, and digital logic 800. The modular laser gyro 10 further comprises a high voltage start module 350 providing power to the laser block 200 and active current control 300.

Figure 47:
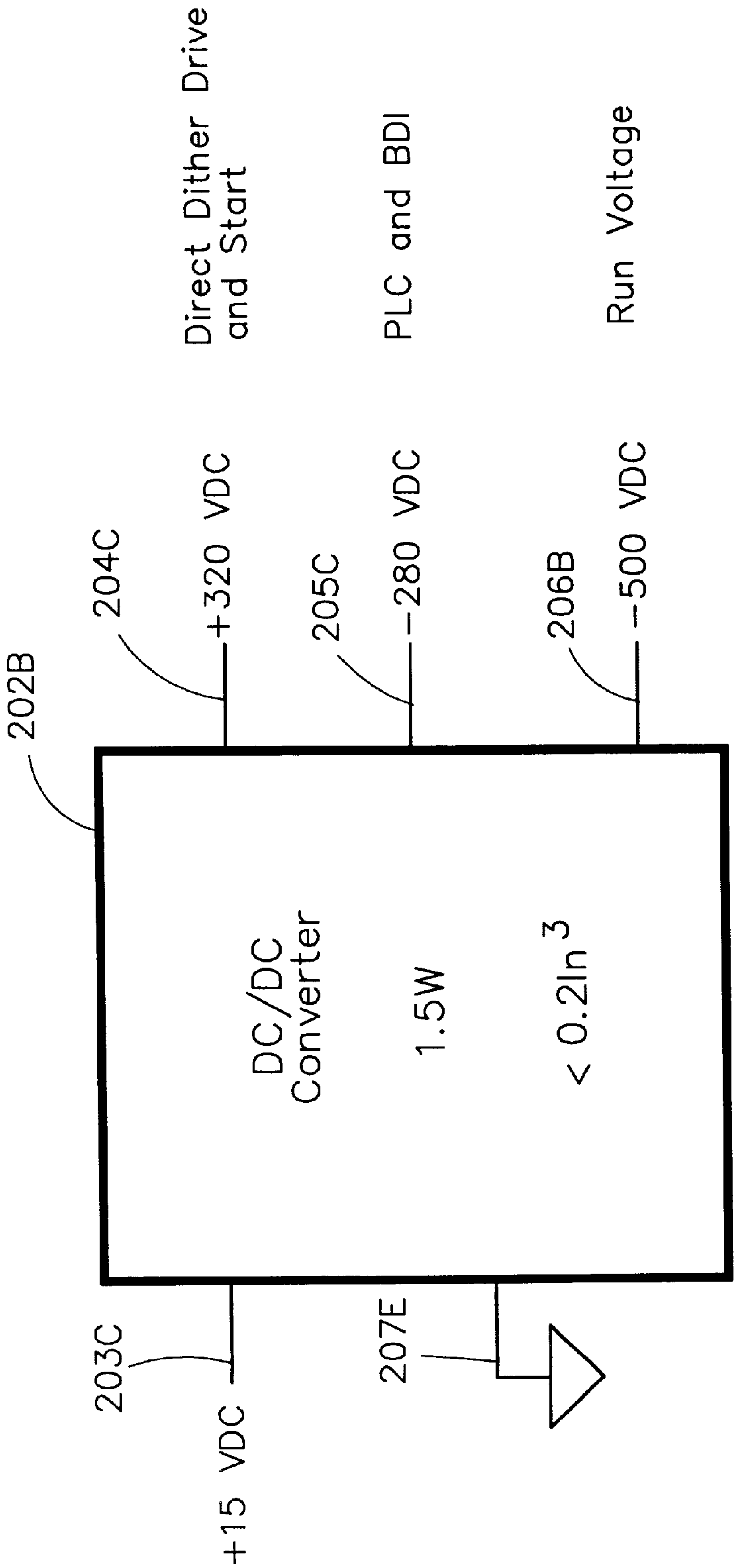
FIG. 47 schematically shows a block diagram of one example of the single transformer apparatus of the invention.

Now referring to FIG. 47 which shows a high level block diagram of the modular gyro power supply. The modular gyro power supply 328 receives power from a 15 volt DC supply 4703. The modular gyro power supply comprises a DC/DC converter that has a power reading of 1.5 watts. The DC/DC converter occupies a volume of less than 0.2 $in^3$. The DC/DC converter is grounded through ground line 4707. The output of the DC/DC converter 4702 is three different DC voltages. A first dither drive and start voltage of 320 volts DC is provided on voltage power supply line 4704. A second path length control and bias drift improvement power supply line is provided of −280 volts DC on voltage supply line 4705. A third run voltage of −500 volts DC is provided on voltage supply line 4706. The modular gyro power supply provides a compact and efficient DC/DC converter power supply.

In summary, a single input voltage of +15VDC nominally produces three high output voltages:

1) +320 VDC for Direct Dither Drive and Start circuitry;
2) −280V for Path Length Control and BDI or RDI;
3) −500V for an active current control. The total volume for the supply is less than 0.2 $in^3$. Total power consumption is 1.5 W.

Figure 48:
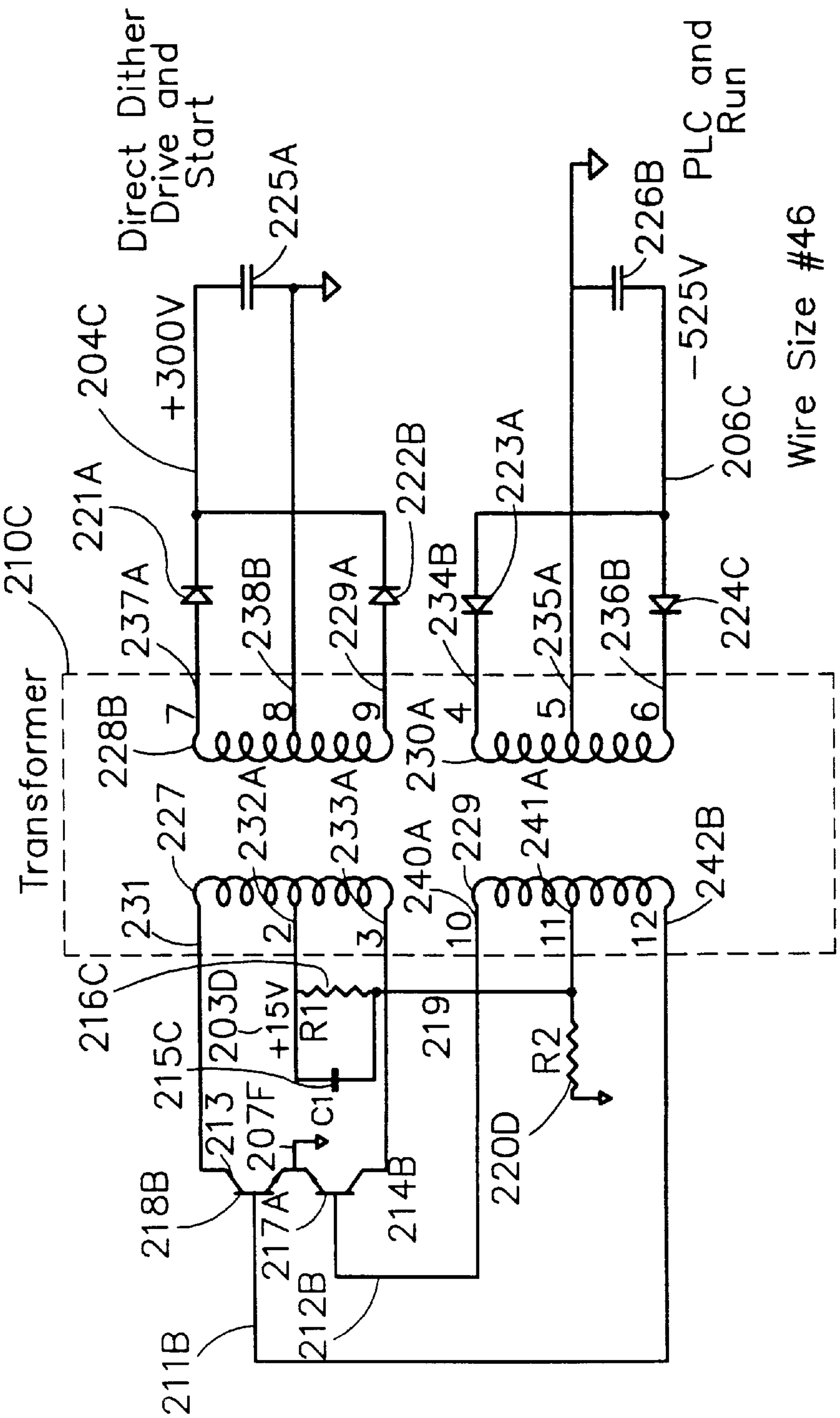
FIG. 48 schematically shows a detailed circuit diagram of one embodiment of a single transformer power supply as provided by one aspect of the invention.

Now referring to FIG. 48 which shows the power supply apparatus of the invention as a detailed circuit schematic. The modular laser gyro 10 of the invention uses one inexpensive small internal transformer 4710. The single transformer 4710 is used in a Royer Oscillator to obtain an efficient (80%) DC/DC converter.

Transformer 4710 comprises four center-tapped windings. Winding 4727 has a first terminal 4731 attached to the collector of transistor 4718. Transistor 4718 has a base terminal 4711 connected to the third terminal of center-tapped winding 4740, terminal 4742. The first winding 4727 has a second center tap 4732 connected to the 15 volt power supply 4703. Capacitor C1 4715 is connected across a resistor R1 4716 which is also connected at one terminal to the 15 volt power supply 4703. The third connection 4733 of the winding 4727 is connected to the collector of a second transistor 4817 terminal 4714 which has a common emitter configuration connected to ground 4707 with transistor 4718. The base 4712 of transistor 4817, is connected to the first terminal of winding 4729 at connection 4740. The center tap of the second winding 4740 is connected to ground through resistor R2 4720. The terminal winding connection 4741 is also connected to the other side of resistor R1 4716 which in one preferred embodiment of the invention is 5K ohms along with R2 4720 which is 5K ohms. The third winding 4728 is connected to transformer diode 4721 to provide a 300 volt power supply 4704 to the direct dither drive and dither start 4725. The center tap transformer 4738 is connected to the other side of the direct dither drive 4725. The output of the third winding 4728 is terminal 4739 which is also connected to the 320 volt supply 4704. The fourth winding 4730 provides a first winding connection 4734 through diode 4723 to provide a −500 volt supply to the path length controllers 4726. A center tap of winding 4750, center tap 4735, is connected to the other side of the path length controller 4726. The fourth winding 4750 also has a third connection 4736 connected through diode 4724 to the −500 volt supply through line 4706.

In one preferred embodiment of the invention the wire size is 46 gauge. The footprint of the DC/DC converter transformer fits into a package. 0.63 inches by 0.36 inches where each external terminal is 30° from each other circularly around the canister.

Figure 49:
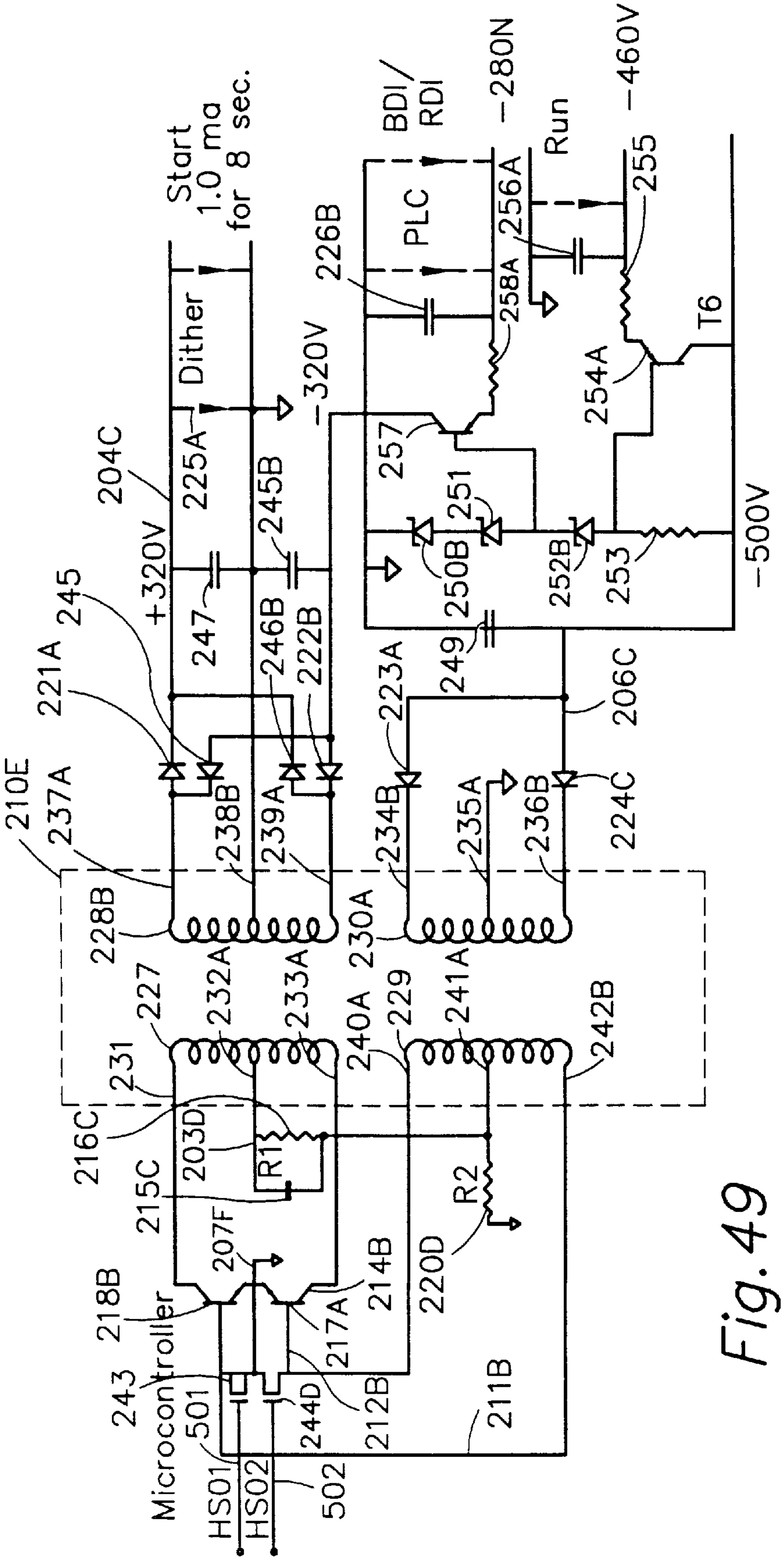
FIG. 49 schematically shows a detailed circuit diagram of one embodiment of a single transformer power supply as provided by an alternate aspect of the invention.

Now referring to FIG. 49 which shows an alternate embodiment of the invention. The primary winding 1, 2, 3, feedback winding 11, 12, 13, and transistors 4718 and 4817 form a basic Royer Oscillator Circuit. Bipolar Transistors 4718 and 4817 are controlled by the microprocessor to guarantee a reliable start-up.

After start-up, transistors 4718 and 4817 are turned off and are effectively out of the circuit. After start-up the circuit takes on all the advantages of the Royer Circuit. The self-oscillating frequency is automatically adjusted to optimize efficiency, avoiding deep saturation of the magnetic core, and reducing EMI radiation.

In this example, there are two secondary transformer windings. One for ±320V and the other for −500V. To reduce the number of Zener diodes, a zener diode stack of 3 zeners may be shared between the 2 secondary windings. Zener diodes 4950 and 4951 operate together to produce −280 VDC while all three including Zener diode 4952 rated at 180 VDC, produce −460 VDC.

Transistors 4957 and 4954 are series regulators. At start-up transistors 4743 and 4744 are turned on which turns off transistors 4718 and 4817.

After a short time, 1 ms., transistor 4743 turns off before transistor 4744 turns off. This assures that transistor 4718 turns on before transistor 4817 and avoids the meta-stability problems typically associated with a Royer Oscillator. Transformer 4710 comprises four center-tapped windings. Winding 4727 has a first terminal 4731 attached to the collector 4713 of transistor 4718. Transistor 4718 has a base terminal 4711 connected to the third terminal of center-tapped winding 4729, terminal 4742. The first winding 4727 has a second center tap 4732 connected to the 15 volt power supply 4703. Capacitor C1 4715 is connected across a resistor R1 4716 which is also connected at one terminal to the 15 volt power supply 4703. The third connection 4733 of the winding 4727 is connected to the collector of a second transistor 4817 terminal 4714 which has a common emitter configuration connected to ground 4707 with transistor 4718. The base of transistor 4817, 4712, is connected to the first terminal of winding 4729, connection 4740. The center tap of the second winding 4729 is connected to ground through resistor R2 4720. The terminal winding connection 4741 is also connected to the other side of resistor 1 4716 which in one preferred embodiment of the invention is 5K ohms along with R2 which is 5K ohms. The third winding 4728 is connected to diode 4721 to provide a ±320 volt power supply 4704 to the direct dither drive 4725. The center tap 4738 of winding 4728 is connected to the other side of the direct dither drive 4725. The output of the third winding 4728, terminal 4739, is also connected to the ±320 volt supply 4704. The fourth winding 4730 provides a first winding connection 4734 through diode 4723 to provide a −500 volt supply to the path length controllers 4726. A center tap of winding 4730, center tap 4735, is connected to the other side of the path length controller 4726. The fourth winding 4730 also has a third connection 4736 connected through diode 4724 to the −500 volt supply through line 4806.

In one example, the base of transistor 4718 is controlled by HSO1 through FET switch 4743 which is controlled from the microprocessor. The transistor 4817 is controlled by the second FET switch 4744 through high speed output 2. The output of the third winding 4728 is sent through a diode network to provide the dither motor and dither start circuit with power. The output of the −500 volt supply 4806 is provided to a zener diode network. A current of 0.05 milliamps is provided through resistor 1M 4953. A transistor T5 4957 provides power to the BDI circuit of −280 volts through resistor 4958. A path length controller current 0.3 milliamps is provided across the path length controller 4726 of 0.056 μf. Transistor T6 4954 provides a run current of 1.2 milliamps across capacitor 4756 of 0.022 μf through a resistor of 10K ohms 4955 connected to the emitter of transistor 4954.

Figure 50:
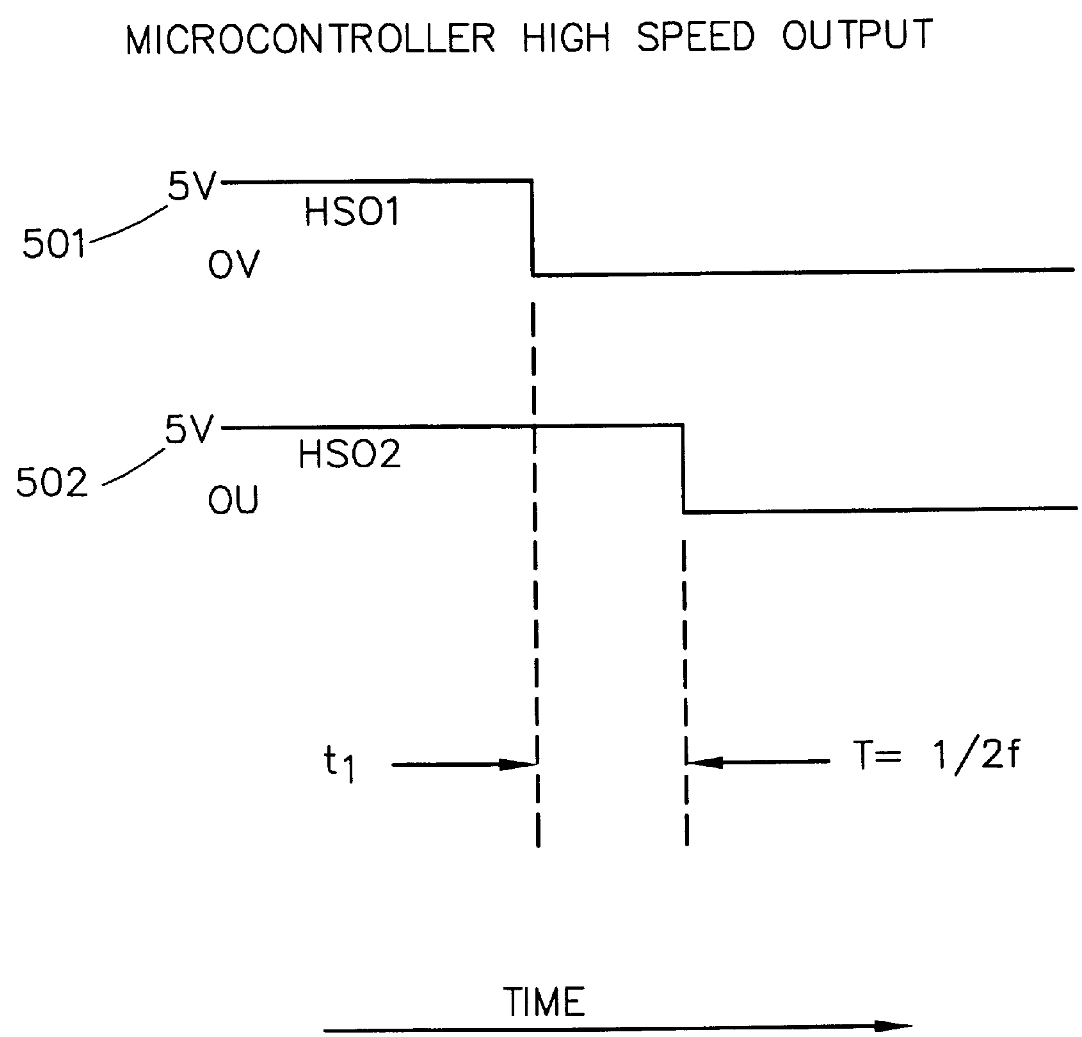
FIG. 50 shows a detailed timing diagram of the single transformer apparatus start sequence showing the microcontroller high speed output timing.

Now referring to FIG. 50 which shows the high speed output 1 and the high speed output 2 control lines. The timing diagram for the microcontroller high speed output provides a reliable start-up of the DC/DC converter power supply. This prevents either of the control transistors from going into an undesirable state. HSO1 is provided high at about 5 volts for a certain period at which time the HSO1 voltage is dropped to zero volts and HSO2 signal 502 is provided at a value of 5 continuous volts until such time T1+T exceeds T1+(½f), f being the frequency of the power supply.

Built In Test

Refer now again to FIG. 1B. Modular laser gyro 10 includes a controller 100 including a built in test equipment (BITE) register 334. The microcontroller 100 further includes a universal asynchronous receiver-transmitter (UART) 202 which communicates to an external system 210 through transmit line 206 and receive line 204.

Data is sent through the output channel from the gyro 10 to the external system 210 continuously at a predetermined update rate. This is to provide inertial navigation data to the external system 210 from the microprocessor 120 that is current and that may also include other information encoded in the status bytes.

Now referring to FIG. 14 which shows an alternate embodiment of the invention using an external system 210C which communicates with the modular laser gyro 10 of the invention as described herein. Those skilled in the art will also realize that batch-oriented testing commands may be loaded in the external system 210C and used to periodically monitor the performance of the modular laser gyro system 10 over long time periods.

Figure 51:
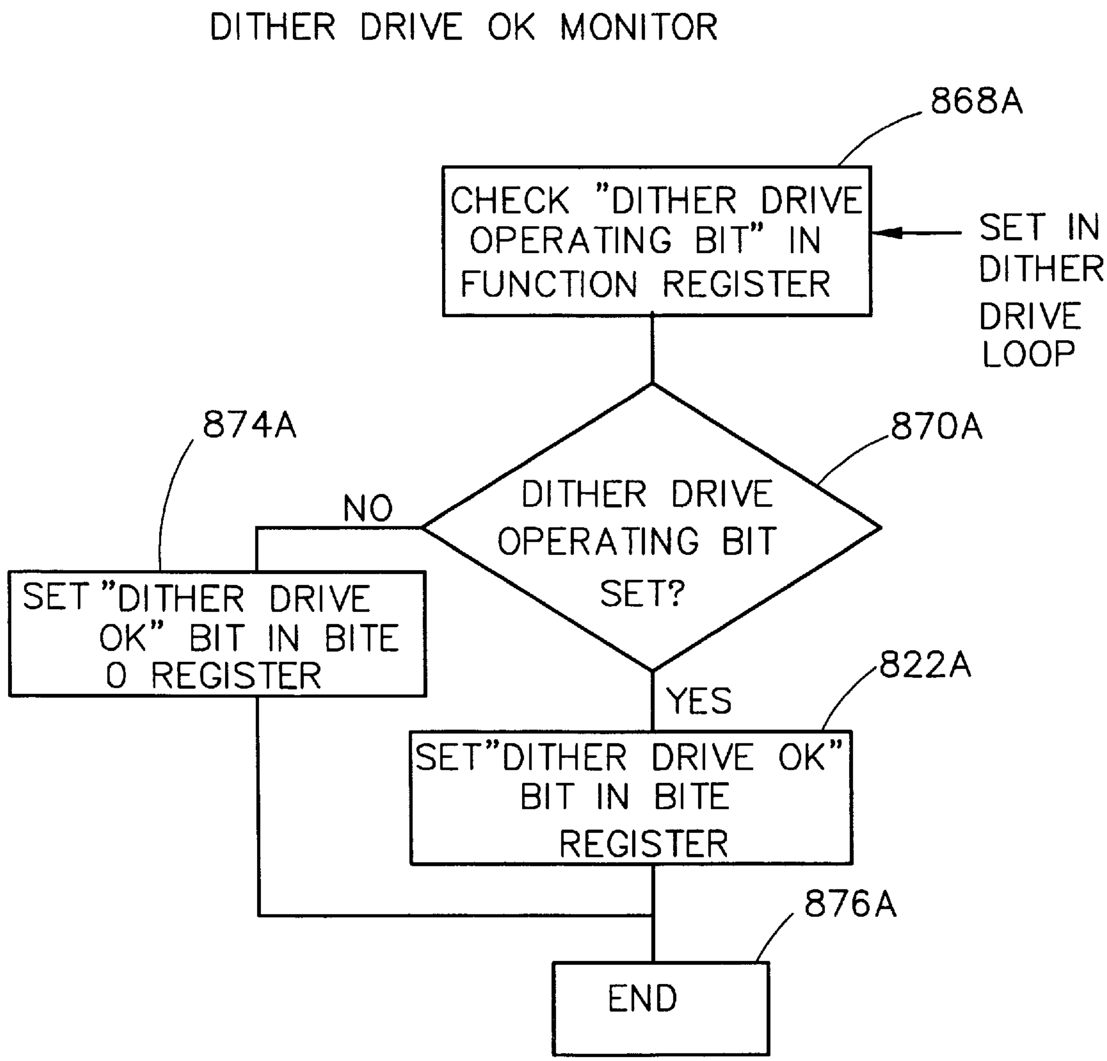
FIG. 51 shows a dither drive monitor.

Now referring to FIG. 51 which shows the method of the invention used to monitor the direct dither drive 500. The direct dither drive sets a dither drive health bit. If the dither drive is healthy the bit is set high, if it is not healthy it is set low. Step 5068 checks whether the dither drive operating bit is set in the function register. In step 5070, if the dither drive operating bit is set, bit 0 is set at step 5072 to indicate that the dither drive is operating. If the dither drive operating bit is not set then the process flows to 5074 to clear bit 0 of the BITE register 334. This indicates that the dither drive is not healthy. When the external system reads the BITE status register 334 bit 0 may indicate a nonfunctional dither drive. In either case the process ends at 5076.

Figure 52:
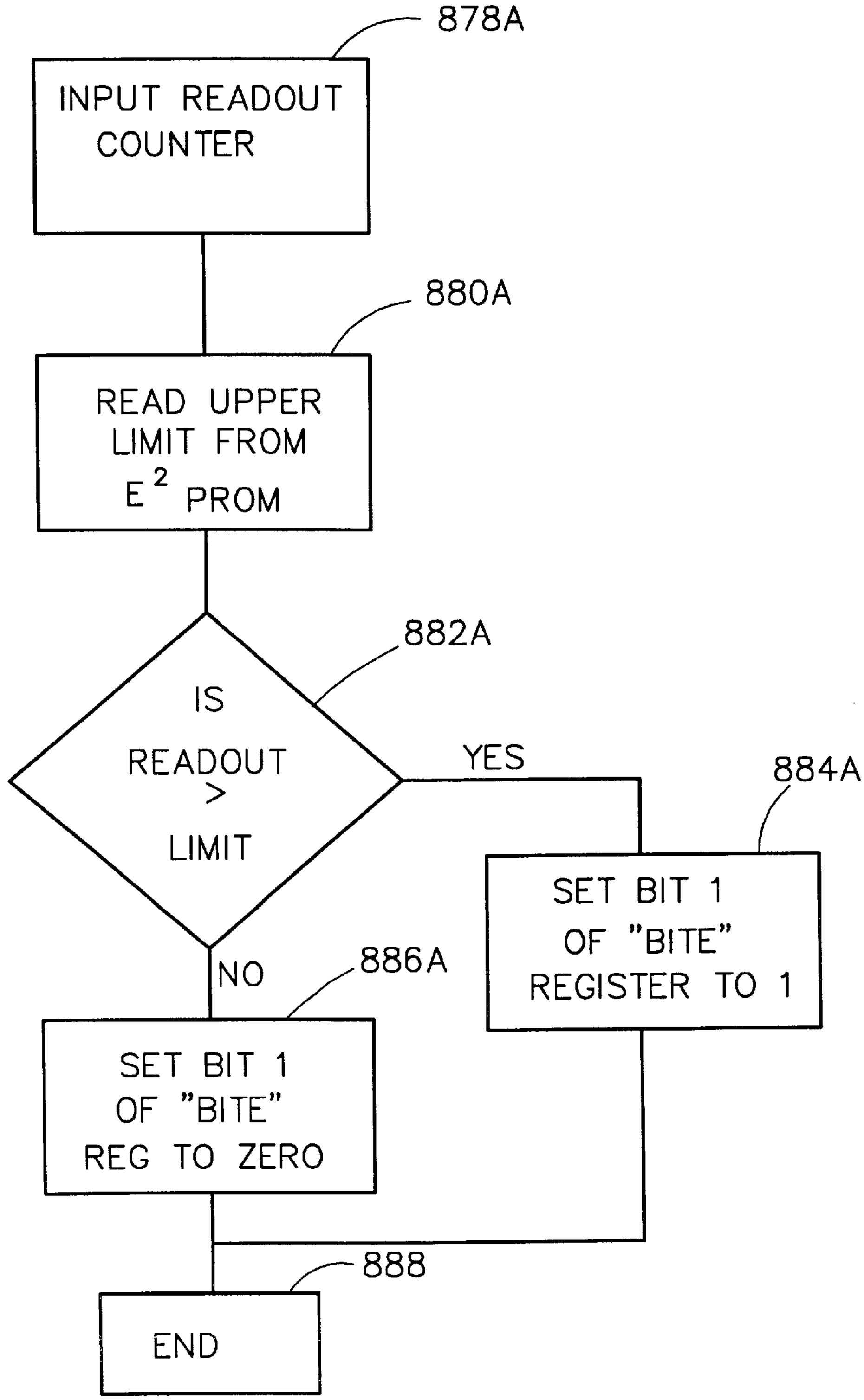
FIG. 52 shows a readout counter monitor.

Now referring to FIG. 52 which shows schematically the method of the invention to monitor the readout counter. The readout counter has an upper limit which is predetermined and is stored in the EEPROM 102. The readout counter monitoring method starts by inputting a readout counter value in step 5078 from the gyro 10. The process then accesses the readout counter upper limit from the EEPROM 102 in step 5080. In step 5082 the process determines whether the readout counter is greater than the predetermined limit. If it is greater than the limit the process flows to step 5084 to set bit 1 of the BITE register to 1. This indicates that the readout counter is not healthy. If the readout counter is less than the limit the process flows to process step 5086 to set bit 1 of the BITE register to 0. This indicates that the readout counter is healthy. In either case the process ends at step 5088.

Figure 53:
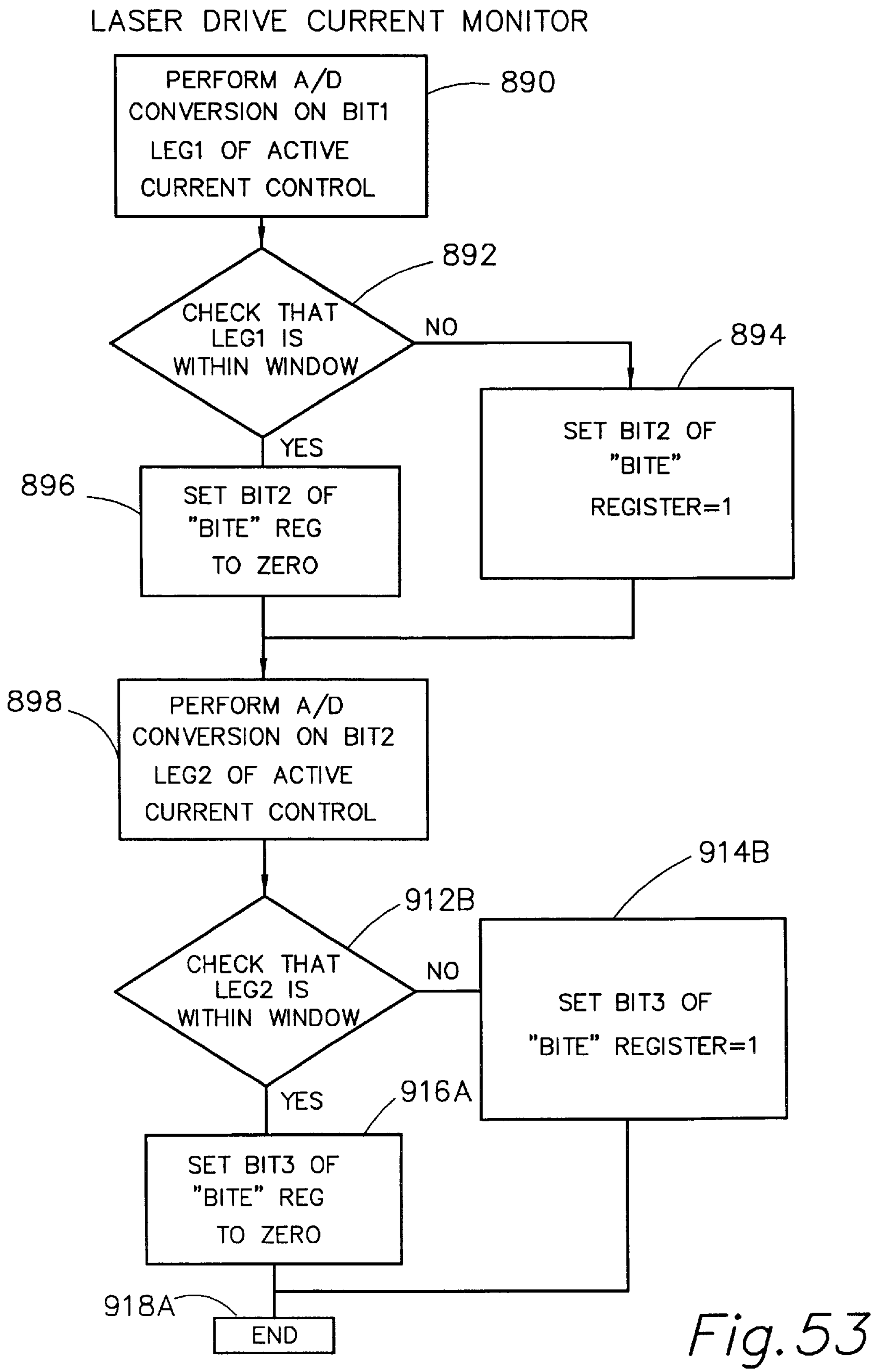
FIG. 53 shows a laser drive current monitor.

Now referring to FIG. 53 which shows the method of the modular laser gyro 10 to test the laser drive current. The laser drive current is shown with reference to FIG. 5 BITE 1 and BITE 2 which are A/D converted in controller 100. The laser drive current monitor process starts in step 890 where an A/D conversion is done on bit 1 leg 1 of the active current control as shown in FIG. 5. The process flows to step 892 to check whether or not leg 1 is within a window predetermined at the start-up of the gyro. The current limits are stored in the EEPROM 102. If the leg 1 current is not within the window then the process flows to 894 to set bit 2 of the BITE register 334 to indicate that the leg 1 current is not within limits. The process flows to step 896 if the leg is within the predetermined window. Bit 2 of the BITE register is set to 0 if the leg 1 current is within the window. The process flows to step 898 where an A/D conversion is performed on bit 2 leg 2 of the active current control loop. The process then flows to 5312 to check whether leg 2 is within the leg 2 window. If it is not the process flows to 5314 to set Bit 3 of the BITE register 334 to indicate that the leg 2 is not within the window. The process flows to 5316 to set Bit 3 of the BITE register 334 to 0 if leg 2 current is within the window. In either case the process ends at 5318.

Figure 54:
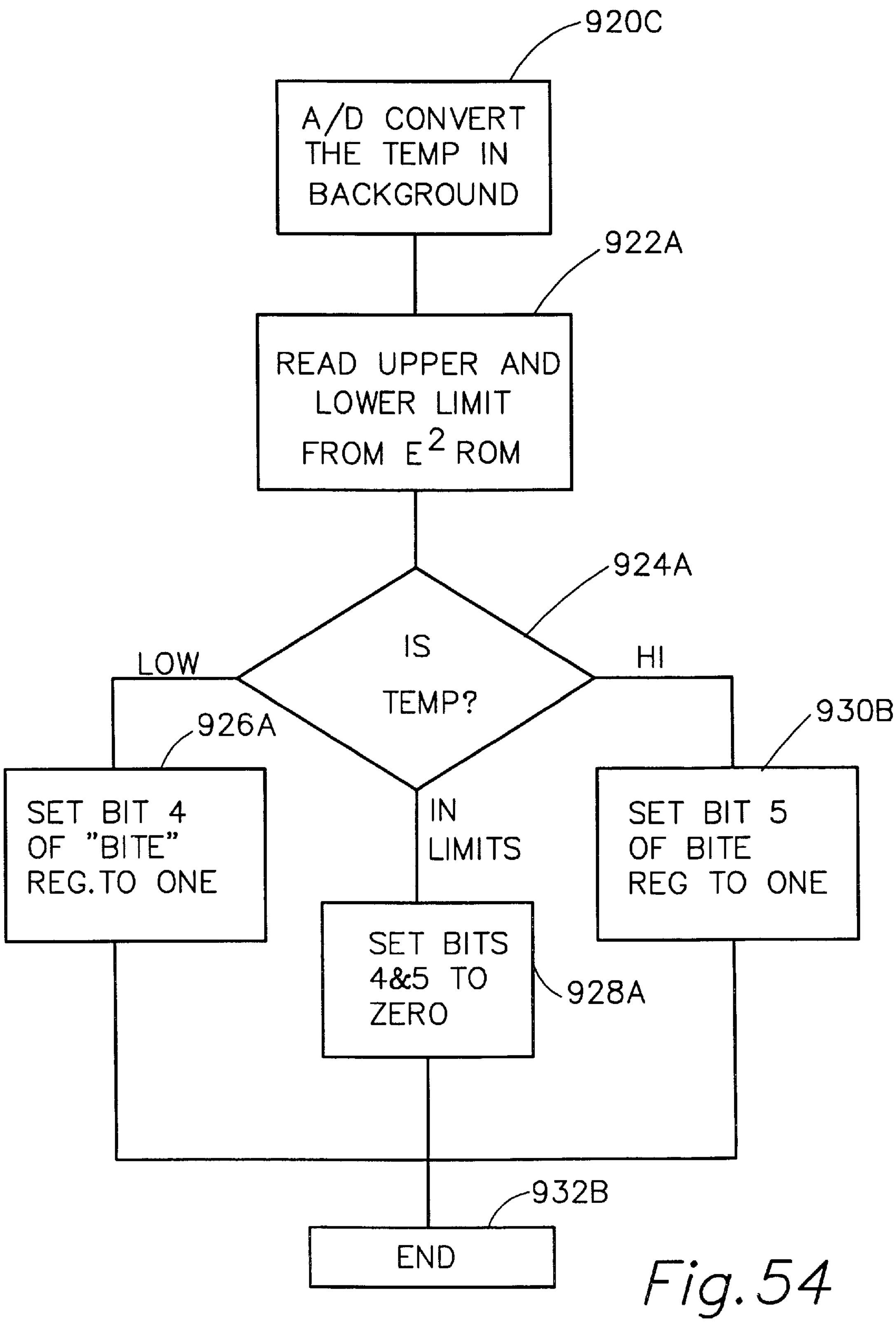
FIG. 54 shows a temperature sensor limit test.

Now referring to FIG. 54 which shows the method of the invention used to sense temperature. The temperature sensor limit test starts by doing an A/D conversion during a background interrupt 5420. The process flows to 5422 to read the upper and lower limits from the EEPROM 102. In process step 5424 the temperature is checked for being high, low or within limits. If the temperature is low then the process flows to 5426 to set bit 4 of the BITE register 334 to 1. This indicates that the gyro is out of temperature on the low side. If the temperature is too high, the process flows from step 5424 to step 5430 to set bit 5 of the BITE register 334 to indicate that the gyro is over temperature. If the temperature is within the limits the process flows to step 5428 to set bit 4 and 5 to 0 in the BITE register 334. In all cases the process flows to step 5432 to end.

Figure 55:
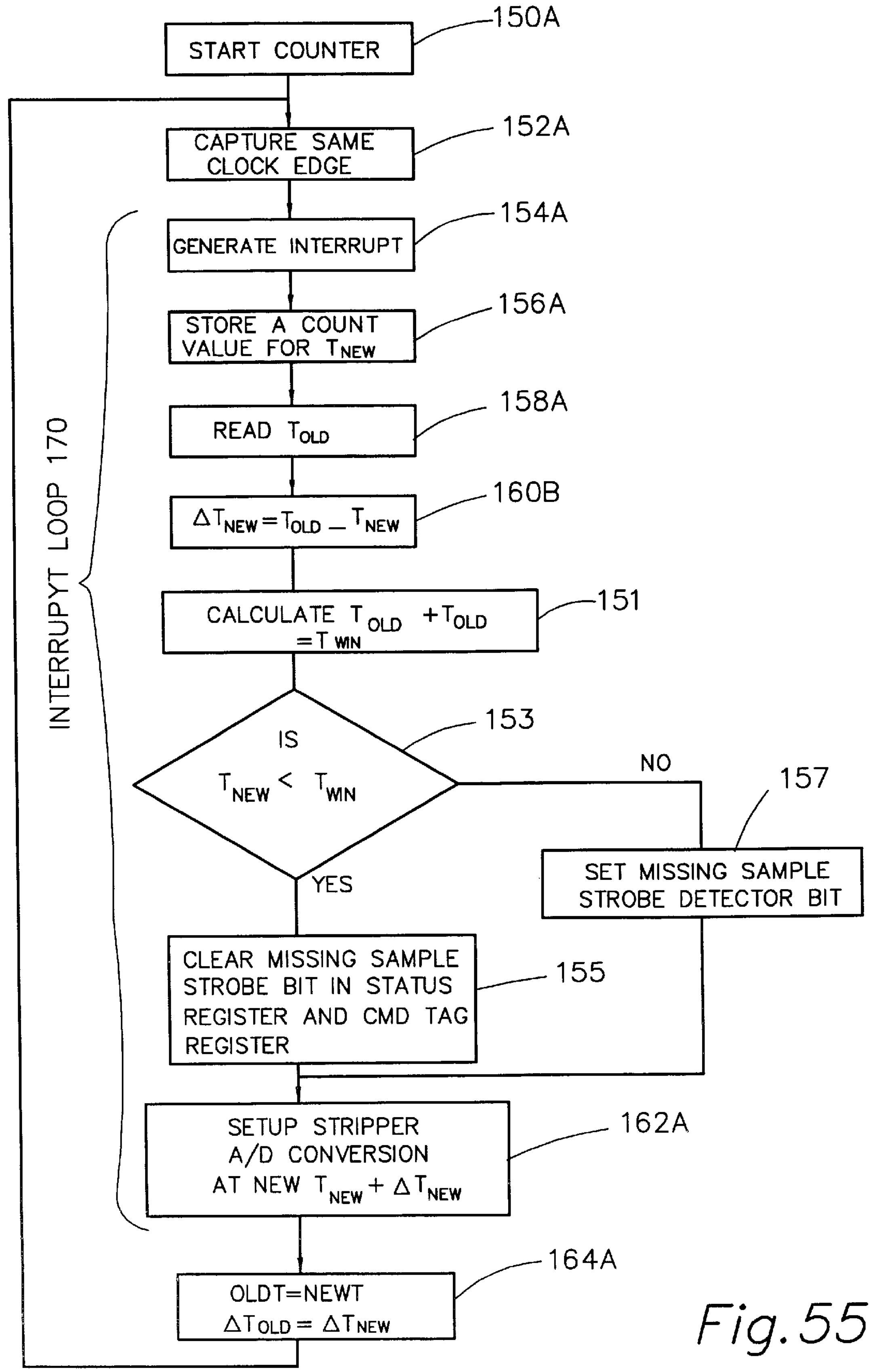
FIG. 55 shows a method of detecting a missing sample strobe.
Figure 56:
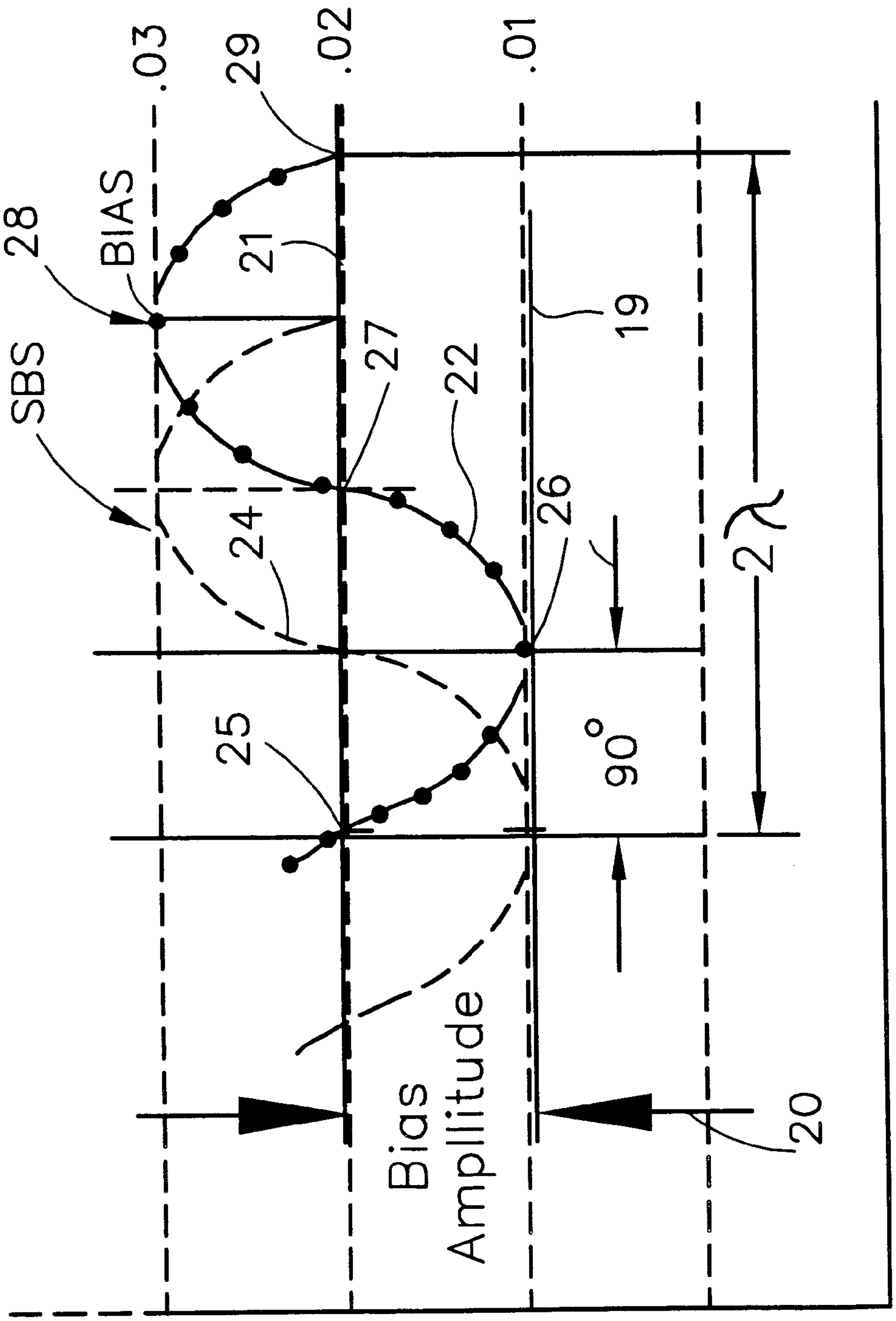
FIG. 56 shows a plot of BIAS and SBS to illustrate phase shift and BIAS amplitude.

Now referring to FIG. 55 which shows the method of the invention used to detect whether a sample strobe is missing by computing and anticipating the occurrence of the next system sample clock. The importance of the sample clock is illustrated by the need for the external system to obtain inertial navigation data which is synchronized to a external clock uniform throughout the inertial navigation system. Without this capability inertial navigation data would be provided asynchronously thus resulting in inaccurate evaluation of inertial position.

The process of FIG. 55 starts a counter in process block 5150 when the process is first initialized. The process then flows to process block 5152 where a sample edge of a sample clock from the system is captured which generates an interrupt in process block 5154. The interrupt then starts a process called the interrupt loop 5170. The interrupt loop schedules an A/D conversion. A count value from the counter of step 5150 is stored as $T_{NEW}$ at the interrupt time when the interrupt is generated in process step 5156. The process then flows to 5158 where the last time an interrupt occurred is read from memory as $T_{OLD}$. The process then flows to 5160 where the difference in time between the old interrupt and the new interrupt is computed as delta $T_{NEW}$. The process then flows to calculate the expected window TWIN for the sample strobe which is $T_{OLD}$ plus delta $T_{OLD}$ in step 5151. The process flows to decision block 5153 to check whether or not the new time is within the expected window. If the new time is within the predicted sample frequency then the missing sample strobe bit in the BITE register 334 is cleared in step 5155. If the new time is outside of the predicted sampling frequency window then the process steps to step 5157 to set the missing sample strobe detector bit in the BITE register 334. In either case the process returns to step 5162.

At step 5162 the A/D conversion is set up in the high speed output of the microprocessor. The new time for the high speed output to occur is at the $T_{NEW}$ plus delta $T_{NEW}$. The process then flows to 5164, the $T_{OLD}$ is set up to be equal to the $T_{NEW}$ and the process returns to process 5152 where the next sample clock is captured. The method of FIG. 55 dynamically compensates for changes in system sample clock period and dynamically tracks the behavior of the system sample clock. The A/D conversion step 5162 is also used by the direct digital dither drive.

Dither Stripper Gain Correction

Figure 57:
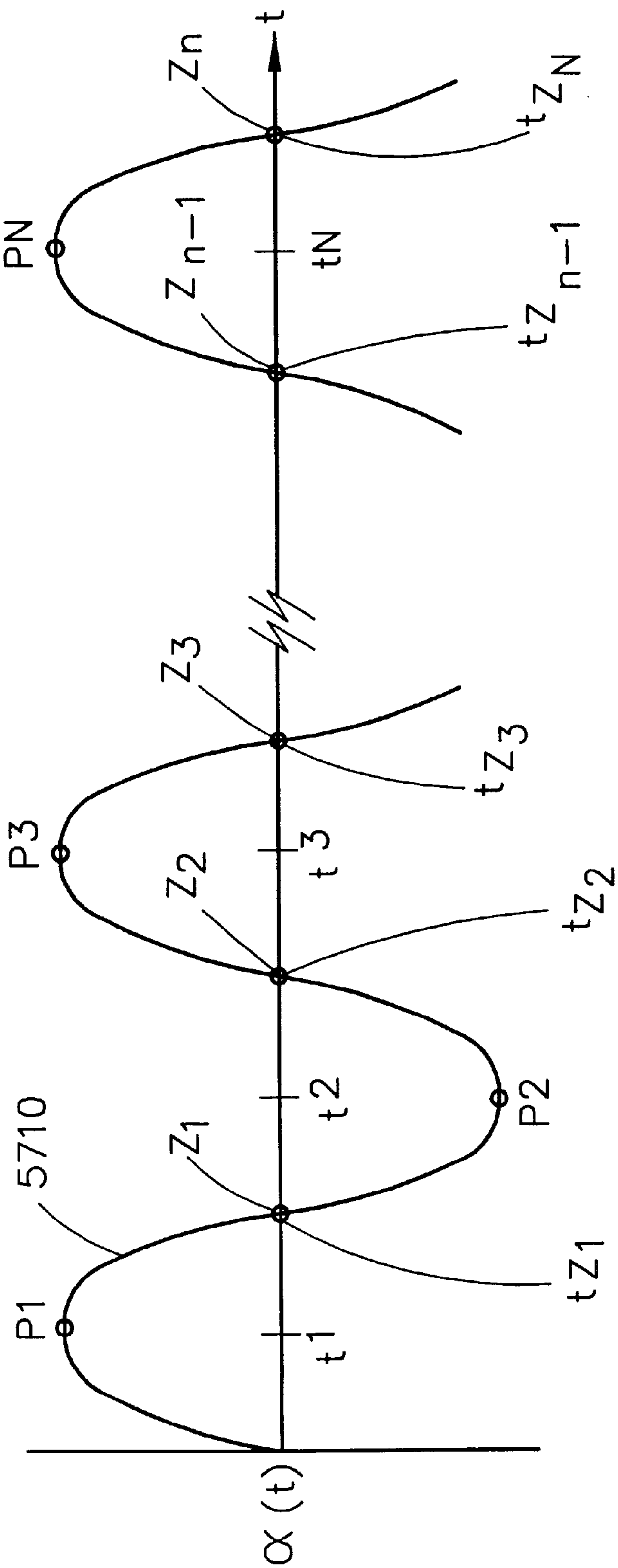
FIG. 57 shows a graphical representation of a sampling method for sampling a dither signal as used in one embodiment of the present invention.

Referring now to FIG. 57, a graphical representation of a sampling method for sampling a dither signal as used in one embodiment of the present invention is shown. Plot 5710 represents a dither drive signal which is proportional to a dither angle α. The dither drive signal as represented by plot 5710 may be typically generated by a piezo-electric element mounted to a dither motor attached to a ring laser gyro. Such mechanisms are well known in the art as discussed hereinabove . In accordance with the present invention, peak amplitudes $P_1, P_2, P_3 \ldots P_n$ may be sensed at corresponding times $t_1, t_2, t_3 \ldots t_n$. In addition to reading the peak amplitudes, the ring laser gyro output angle may be simultaneously sensed at each of the same corresponding times $t_1, t_2, t_3 \ldots t_n$.

In addition to peak detection, the method of the invention provides a means for sensing zero crossings at $Z_1, Z_2, Z_3 \ldots Z_n$. These measurements are made at times $t_{Z1}, t_{Z2}, t_{Z3} \ldots t_{Zn}$. The dither angle signal zero crossings are used in the method of the invention to determine phase angle errors as discussed further below.

Using the method and apparatus of the invention, as explained in more detail hereinbelow, the value of the change in stripped gyro angle, which may also be called the gyro net output, Δϕ, is calculated as $\Delta\phi=(\phi_n-\phi_{n-1})-(\alpha_n-\alpha_{n-1})$ K, where K is a gain correction factor which operates on the dither signal in stripping the dither signal component from the unstripped gyro angle to yield a stripped gyro angle output. As used in the aforesaid expression, $\phi_n$ represents an unstripped gyro angle sampled at time $t_n$. K is herein also referred to as DSGAIN in one example embodiment of the invention. These values of Δϕ with the sign of $\alpha_n$ are then summed into an integrator to correct the value of K. Using the method of the invention, the value of Δϕ is substantially a maximum sensitivity because $\alpha_n$ and $\alpha_{n-1}$ are typically widely spaced apart due to their correspondence in time to the selected peak amplitudes.

Referring now to FIG. 34A, there shown is a block diagram of a microcontroller apparatus for implementing the dither stripper method of the present invention. The apparatus comprises a microcontroller 100, digital logic 3410, a first analog-to-digital (A/D) converter 3428, a read out amplifier 3414, a temperature sensing apparatus 33, a dither pickoff apparatus 2024, and a dither drive 3402. The microcontroller may comprise any of a number of conventional microcontrollers. The microcontroller 100 advantageously has an on board analog-to-digital converter 110.

The dither drive 3402 receives a dither drive signal 3404 to drive a dither motor on the ring laser gyro in a conventional manner through drive line 3423. A dither pickoff signal 3422 is received from the drive elements in this example received from piezo-electrical elements (PZTs). The dither pickoff signal 3422 is amplified through an amplifier 3424 in the dither pickoff apparatus 2024 and the dither pickoff signal is then provided by the dither pickoff apparatus on lines 2306 and lines 3426. Line 2306 is connected to a first input of the second A/D converter 2304. Line 3426 is connected to an input of the first A/D converter 3428. The temperature sensor 33 outputs a temperature signal on line 31 which is also received at a second input of the second A/D converter 110.

Read out counts from the ring laser gyro are received from detector A on line 1720 and detector B on line 1722. The read out amplifier provides A and B channels 3416, 3418 respectively with an amplified count signal on each line to the digital logic 3410. Digital logic 3410 is also coupled at an interface bus 3429 to the first A/D converter 3428 in order to receive digitized dither pickoff signals. The digital logic is also coupled by means of bus 3412 to the microcontroller for purposes of transmitting data and addresses in a conventional manner. A sample request line 2390 handles external system sample requests for gyro output data. The sample request line 2390 operates as an interrupt to provide the requested data.

Figure 58:
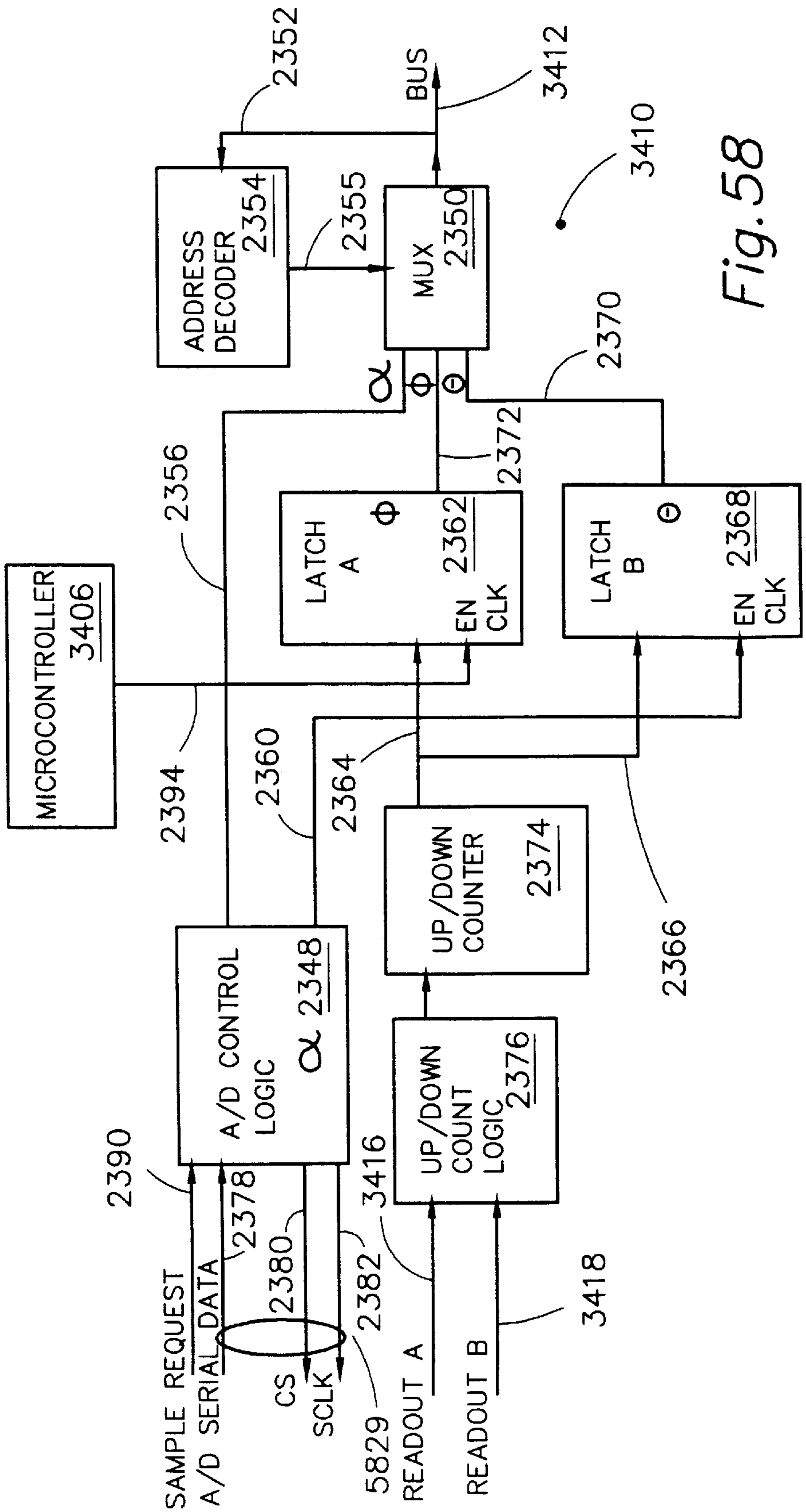
FIG. 58 shows a schematic block diagram of a microcontroller based apparatus for dither stripping an RLG digital logic apparatus.

In one example embodiment the digital logic 3410 comprises an integrated circuit manufactured by "ACTEL" model number A1225. A more detailed description of the digital logic 3410 is shown in FIG. 58. Those skilled in the art will recognize that other components may be added to the microcontroller shown herein for the purposes of adding more features to a modular ring laser gyro system.

Now referring to FIG. 58, a more detailed block diagram of the digital logic 3410 is shown. The digital logic 3410 comprises A/D control logic 2348, a first latch 2362, a second latch 2368, a multiplexer 2350 and address decoder 2354, an up/down count logic 2376 and up/down counter 2374. Line 5829 from the first A/D converter 3428 further comprises an A/D serial data line 2378, a chip select line 2380 and a system clock line 2382. The A/D control logic 2348 also receives the sample request line 2390 as generated by an external request for data. A/D control logic 2348 receives dither pick-off information on A/D serial data line 2378. The A/D control logic 2348 then processes the A/D serial data 2378 to provide a value for the dither angle a on line 2356 to the multiplexer 2350.

Up/down count logic 2376 receives readout A from the ring laser gyro on channel 3416 and readout B from the ring laser gyro on channel 3418. Up/down count logic 2376 processes the read out information in a well known manner and passes it to the up/down counter 2374. Data from up/down counter 2374 is provided to latch 2362 and latch 2368. The first latch 2362 is enabled via control line 2394 from the microcontroller 3406 at each peak and zero crossing of the dither signal as shown in FIG. 57. The second latch 2368 is enabled by an enable signal on control line 2360 in response to an external request impressed on sample request line 2390. When the second latch 2368 is enabled it latches the counter output 2366 as ring laser gyro count angle θ which is transmitted on line 2370 to the multiplexer 2350. Depending upon the address provided by the microcontroller to address decoder 2354 on line 2352, the address decoder switches multiplexer 2350 by means of a control signal on line 2355 to switch either the dither angle α, gyro angle ϕ or gyro angle θ through the multiplexer 2350 onto the bus 3412.

It is helpful to note that, for the purposes of understanding FIG. 58, the ring laser gyro count angles ϕ and θ may comprise the same value. That is, they both comprise unstripped gyro angle counts. However, the angle ϕ is latched only at times substantially simultaneous with peaks and zero crossings of the dither pickoff signal as discussed above with reference to FIG. 57. In contrast, the angle θ is equivalent to gyro count data taken at the time an external system request is processed. An external system request may occur at any time. Further, the angle θ may be provided to the external system as a corrected angle by applying the previous correction factors in a manner similar to that discussed herein for internal use for deriving a stripped gyro angle output.

Figure 59:
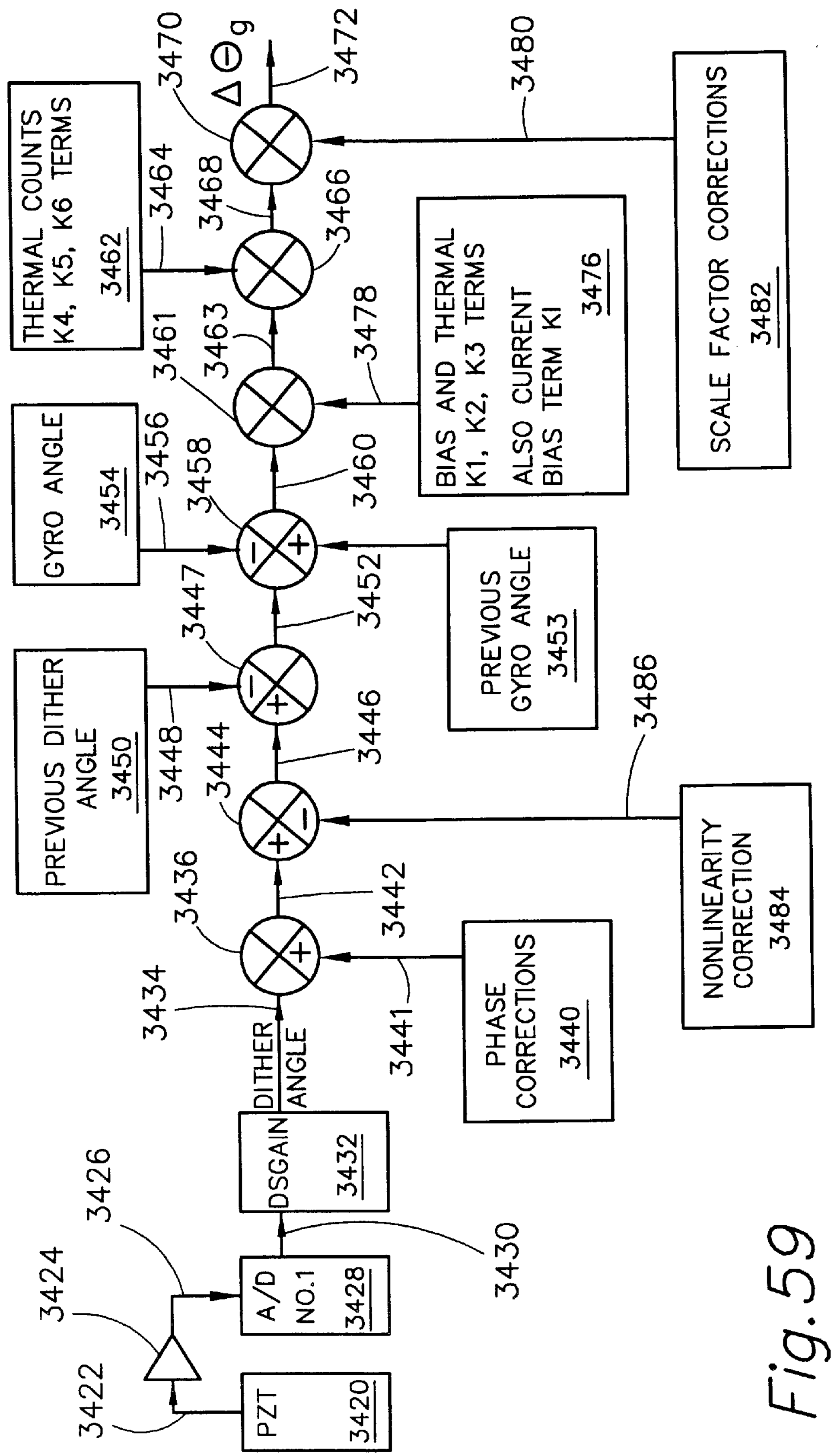
FIG. 59 shows a functional diagram of a method and apparatus for calculation of a change in stripped gyro angle $\Delta\theta_g$ as employed in one example of the present invention.

Now referring to FIG. 59, a schematic block diagram of a method and apparatus for calculation of a change in stripped gyro output angle $\Delta\theta_g$ as implemented in one example of the present invention is shown. The piezo-electric (PZT) or other dither drive element 3420 provides a dither signal 3422 to an amplifier 3424 which outputs an amplified dither signal 3426 into first A/D converter 3428. The first A/D converter 3428 converts the analog signal received on line 3426 into a digital data signal on line 3430 which is provided to a gain element 3432 labeled DSGAIN. The output of DSGAIN 3432 on line 3434 is a dither angle $\alpha$. The dither angle a on line 3434 is summed at a first summing junction 3436 with phase corrections from phase correction apparatus 3440 which are provided on line 3441. The output of the first summing junction 3436 on line 3442 is provided to a second summing junction 3444 where it is subtracted from a nonlinearity correction factor as provided by nonlinearity correction apparatus 3484 on line 3486. The second summing junction 3444 then provides a corrected signal on line 3446 to a third summing junction 3447 where it is subtracted from the previous dither angle provided in a conventional way by storage device 3450. The difference is then output on line 3452 to a fourth summing junction 3458 where it is summed to the previous gyro angle stored in memory element 3453 and subtracted from the current gyro angle which may be stored in memory device 3454. The output of the fourth summing junction is transmitted on line 3460 to a fifth summing junction 3461 where it is added to bias and thermal bias terms $K_1$, $K_2$, and $K_3$ along with a current bias term $K_I$ from block 3476. Use of the current bias term $K_I$ is optional. $K_I$ may be determined from factory calibration measurements. The output is provided on line 3463 to a sixth summing junction 3466 where it is added to thermal count $K_4$, $K_5$, and $K_6$. The output of the sixth summing junction 3466 is added at a seventh summing junction 3470 with a scale factor correction provided by block 3482 on line 3480 to provide the final stripped gyro angle $\Delta\theta_g$ in this example.

In one example of the method of the invention, PZT 3420 is read at each system request in less than one microsecond and is within 0.16 microseconds of the gyro count reading. The PZT voltage value is corrected for the gain of the amplifier and the PZT; corrected for the pick-off amplitude nonlinearity; corrected for the phase difference between the pick-off and the gyro; and subtracted from the previous corrected pick-off angle. This value is then subtracted from the difference in the previous unstripped gyro angle and the present unstripped gyro angle. This produces the change in stripped gyro angle. This value is then further corrected by the gyro bias and count calibrations as a function of temperature. At this time the gyro scale factor is also corrected. These corrections take place at various times to preserve an accuracy in a modular ring laser gyro system of about <0.001 deg/hour and less than 1 count.

In an alternate embodiment of the invention, the dither stripping and related calculations described throughout this specification may be accomplished with reference to the stripped or unstripped gyro angle itself without using the change in stripped gyro angle. This alternate approach eliminates the need for subtracting previous dither angle and previous gyro angle values since all angles are accumulated to provide a count representing the gyro angle output. The stripped gyro angle may also be expressed as the sum of all of the changes in stripped gyro angles.

The corrections and adjustments to the gyro and dither counts may be done at a resolution of at least 1.0 counts, but may be much smaller, that is, resolutions as low as 0.1 counts may be used. Those skilled in the art will also recognize that the terms may be summed in any order.

The output 3422 of PZT 3420 is read by AID converters. The second A/D converter is under microcontroller control and is read to control the dither amplitude; to measure the dither stripper gain; to measure the mean value of the PZT amplifier output; and to find the phase angle error. The PZT amplifier voltage is also read by the first AID 3428 upon command from an external system request. Compensation of the PZT measurement is made by multiplying the PZT voltage by the DSGAIN value measured in the DSGAIN loop and corrected for phase and nonlinearity.

The nonlinearity correction is a constant. It is stored in a memory device, as, for example an EEPROM 1007 as shown in FIG. 34A. The value used in one example embodiment of the invention is approximately $$CORR=((ALPHA-ZERO)+8)^2+5000$$

Where:

CORR is the correction,

ALPHA is the present measured dither pickoff angle, and

ZERO is the calculated (i.e. the assumed mid-value) of the dither angle or the zero point.

The value of 5000 is only an example and may vary as, for example, with temperature. The correction is for positive nonlinearity, i.e. if the measured angle is too large requiring this correction to be subtracted from the measured value thus reducing the measured value. Those skilled in the art will recognize that other nonlinearity equations may be used such as substituting a cubic equation for the quadratic.

The phase error correction apparatus 3440 between the pickoff voltage and the gyro angle may be derived by a measurement of a phase error angle at the gyro dither angle position. The phase error at other angles corresponding to external system request times may advantageously be found through a look up table which comprises values for a predetermined error correction function, as, for example, a cosine or sine function, expressed as a percentage of the peak dither angle.

Figure 61:
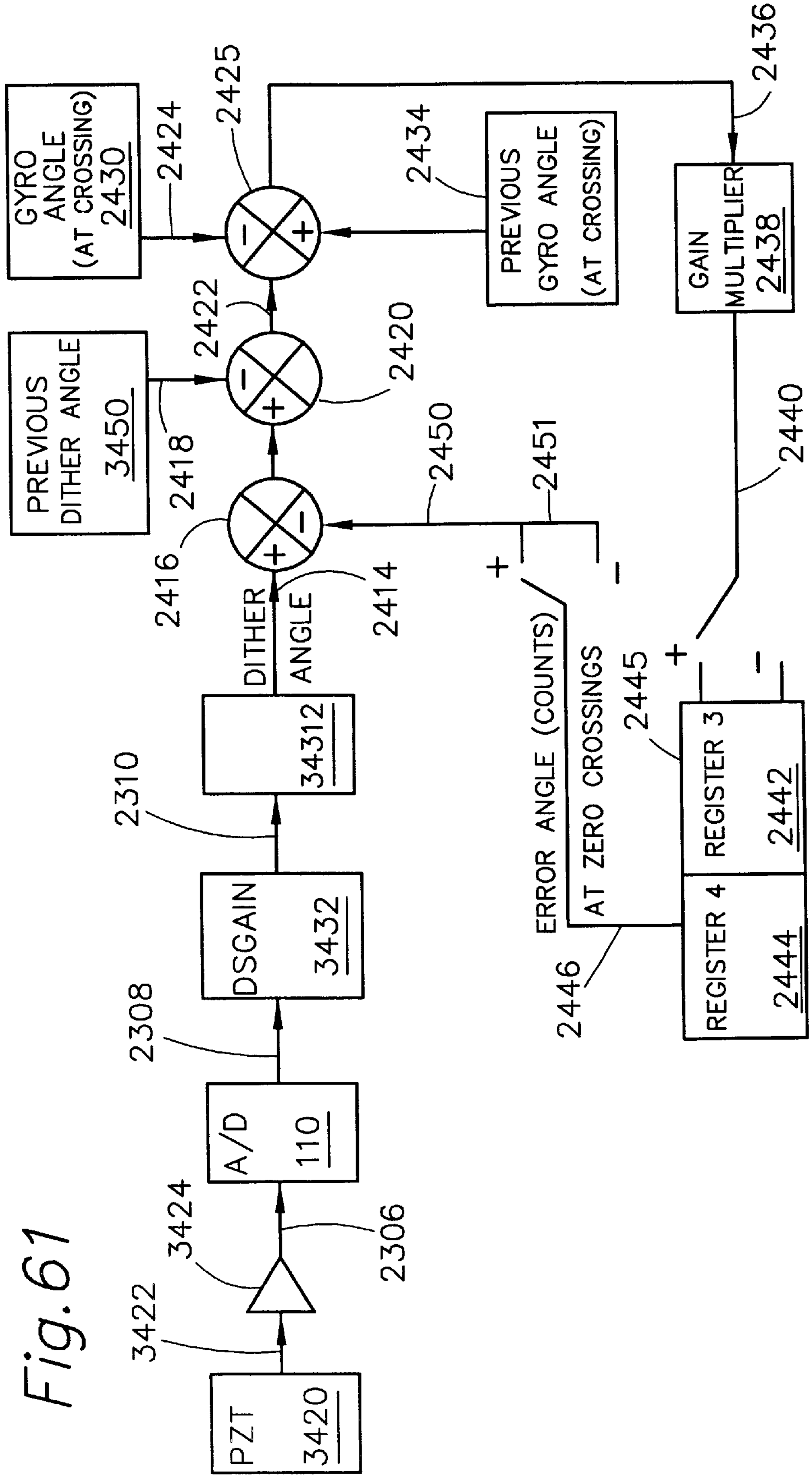
FIG. 61 shows a functional diagram of one example of a method and apparatus for measuring a phase error angle as employed in the present invention.

In one example, the phase loop as shown in FIG. 61 determines the phase error counts at both positive going and negative going zero crossings. The resultant value is called MAXPHASE and it is a signed value. When a system sample request is made, it may typically occur at an arbitrary phase angle on the dither cycle. By measuring the dither angle at the phase angle which coincides with the request and comparing the measured dither angle to the maximum command dither angle, ALPHAMAX, the sine of the phase angle on the dither cycle may be determined. The phase correction may then be determined as the cosine of the dither cycle phase angle multiplied by MAXPHASE. A simple look up table which references a cosine value for corresponding sine values may be employed to look up the phase correction.

At summing junction 3447, the previous dither angle is subtracted from the present value, thus yielding the angle change. It should be noted in considering this process that an RLG is an integrating rate gyro with the output representing the integral of the dot product of the input rate and the gyro input axis. This subtraction also serves to assure that this process cannot introduce an error into the gyro output. This change in input angle $\Delta\theta$ is the basic measurement of the RLG done at summing junction 3458.

Bias constants are determined as discussed below. Once per second, the bias correction is made by reading the stored coefficients of $K_1$, $K_2$, $K_3$ and calculating the count error DELTA as:

$$DELTA=K_1+K_2xTMP+K_3xTTP^2+DELTAR$$

Where:

TMP is the filtered value of temperature

DELTA is the count correction

DELTAR is the residual value of DELTA (over 1 count to an accuracy of 0.001 counts).

In one example, the value of this correction may be added to the output angle in increments of 0.1 counts and any residual angle of 0.001 counts retained as DELTAR. This preserves the accuracy of about <0.001 deg/hour to the gyro.

Once per second the value of the present filtered temperature, TMP, is compared to the previous temperature called TMPP. In one example, if the difference has an absolute value greater than 0.2° F., corresponding to a correction greater than 0.1 arc second, then the following correction is calculated and used to correct the gyro output:

$$\text{DELTA}=(TMP-TMPP)\times(K_4+(TMP+TMPP)/2\times K_5)+\text{DELTART}$$
$$\text{TMPP}=\text{TMP}$$

The value of this correction may be added to the output angle in increments of 0.1 counts and any residual angle of 0.001 counts retrained as DELTART. This preserves the accuracy of 0.001 deg/hour. Note that each count is 1.1123 arc seconds and that 1 count/second is 1.112 deg/hour. The maximum value of these terms, for one embodiment of a modular laser gyro is about 2 arc seconds per 2° F. Therefore, at thermal rates of even 300° F. per hour, this term is not greater that 0.12 counts per second.

The correction of scale factor 3482 may be corrected to an accuracy of one part per million. The total output angle may be monitored and a correction of counts be performed whenever the total equals or exceeds a pre-stored signed value. This correction may be accomplished at each output request when the output DELTAR is greater than 1,000 counts. Residuals must be retained to preserve the scale factor accuracy of lppm. This value may change about 4ppm as the mode changes.

Figure 60:
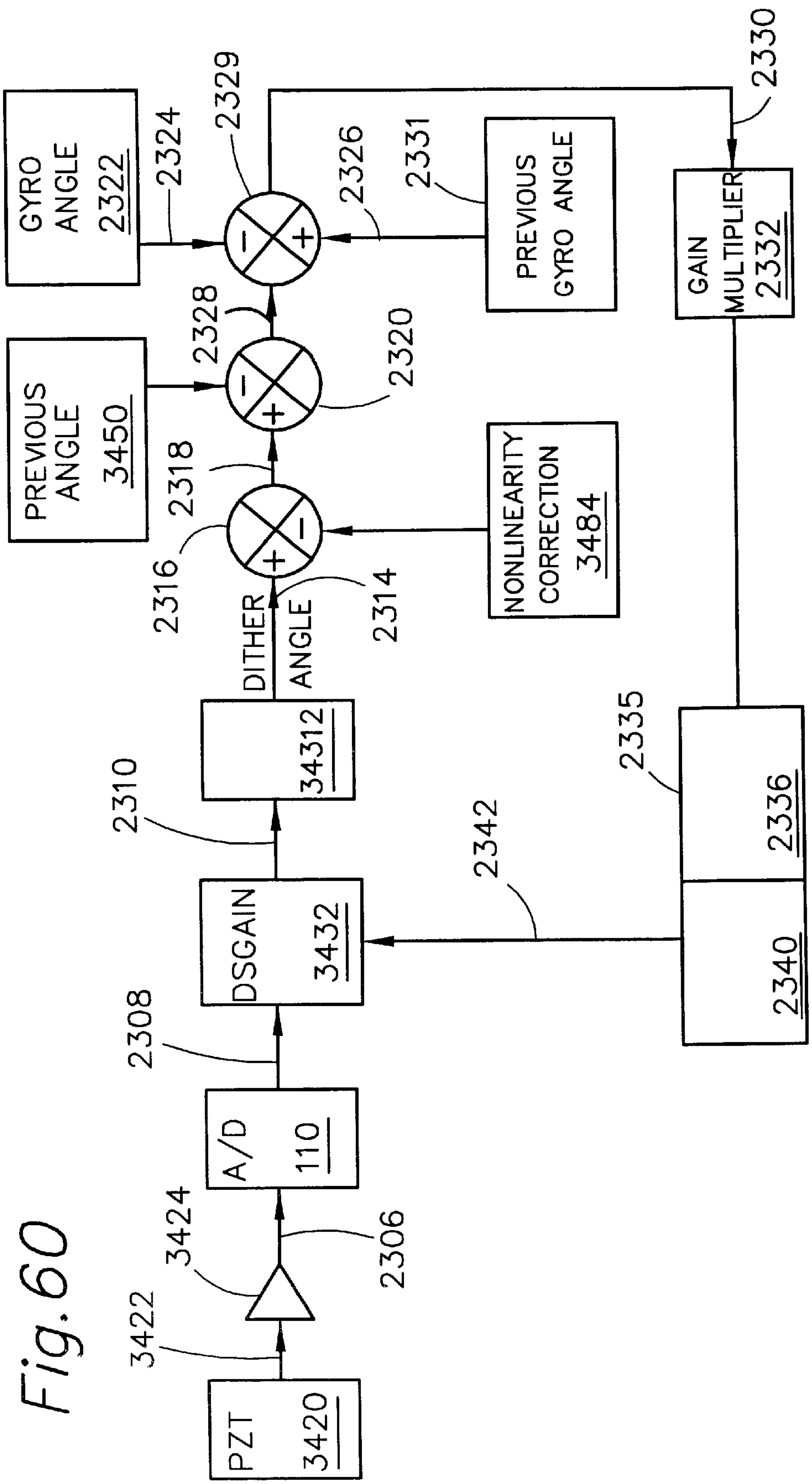
FIG. 60 shows a functional diagram of a method and apparatus for calculation of dither stripper gain as employed in one example of the present invention.

Referring now to FIG. 60, a functional diagram of a method and apparatus for calculation of dither stripper gain as employed in one example of the present invention is shown. The dither stripper gain, DSGAIN, is calculated by a function based upon the dither drive values at each peak. The DSGAIN may be used to correct the PZT measured voltage to be a substantially exact measure of the dither angle as expressed in counts. The DSGAIN has the dimensions of gyro counts/volt. The gain has a time constant of 0.2 seconds for the first 3 seconds after starting the RLG system and 12 seconds thereafter.

The calculation for dither stripper gain may be processed as follows. At each dither peak, such as when the dither output is measured for the dither drive loop, PZT 3420 outputs a signal on line 3422 which is amplified by amplifier 3424. The amplified PZT signal is output onto line 2306 and received by A/D converter 110 which supplies a digital signal representative of the PZT output on line 2308. The unstripped gyro angle is then used, together with the previous value of the unstripped gyro angle and a correction for nonlinearity 3484 from stored parameters, to find a value for the gain correction factor DSGAIN. The value of the PZT output on line 2308 is multiplied by the gain element 3432 labeled DSGAIN. The resultant output from the gain element 3432 is output as a gain corrected dither angle on line 2310 and received by a scaling element 2312. The scaling element 2312 operates to scale the dither angle. In one example of the invention, the scaling element 2312 operates to divide the gain corrected dither angle on line 2310 by a factor of 10000. After scaling, a nonlinearity correction 3484 is then added to the scaled dither angle at summing junction 2316. Summing junction 2316 outputs the nonlinearity corrected dither signal on line 2318 which is received by a second summing junction 2320. Note that the nonlinearity correction does not have to be recalculated each time because the nonlinearity correction is always the same at the peak dither angle which is equal to the command angle. This value for the nonlinearity correction may be read from stored parameters.

The output of the second summing junction is a difference value which is sent on line 2328 to a third summing junction 2329. A block 2331 stores the previous unstripped gyro angle and a block 2322 stores the current unstripped gyro angle. The current unstripped gyro angle is impressed on line 2324and subtracted from the difference value on line 2328 while the previous gyro angle is impressed on line 2326 and summed at the third summing junction to the difference value on line 2328. The resulting value is impressed on line 2330 and gain multiplier 2332 operates on the result. In one example, gain multiplier 2332 multiplies the result from line 2330 by a gain of 600 for the first second after start of the RLG and by 10 thereafter to produce a gain correction value. In this way, the multiplier 2332 operates to adjust the time constant in the gain correction loop. The gain correction value is then accumulated in a 32 bit register 2335. Register 2335 is comprised of low 16 bit register 2336 and high 16 bit register 2340. The most significant bits, register 2340, are used to correct the DSGAIN factor. In this way the gain factor, DSGAIN, applied to the dither angle is continuously updated.

Referring now to FIG. 61 a functional diagram of one example of a method and apparatus for measuring a phase error angle as employed in the present invention is shown. As may be seen the apparatus of FIG. 61 includes PZT 3420, amplifier 3424, A/D 110, gain element 3432 and scaling element 34312. The aforesaid elements operate in a substantially similar manner as discussed with reference to FIG. 60. A scaled dither angle is transmitted on line 2414 to a first summing point which outputs a difference value to a second summing junction 2420 which also receives a value representing the previous dither angle from storage device 3450. The second summing junction provides a second difference on line 2422 to a third summing junction 2425. The third summing junction 2425 also receives a value representing the unstripped gyro phase angle at the zero crossing from block 2430 and the previous unstripped gyro phase angle at the zero crossing from block 2434. The unstripped gyro phase angle at the zero crossing is subtracted and the previous unstripped gyro phase angle at the zero crossing is added to the second difference value to yield a corrected angle on line 2436. The corrected angle is then multiplied by a factor from a phase angle gain multiplier element 2438 to produce an error angle count at zero crossings on line 2440. Depending upon the sign of the error angle count at zero crossings on line 2440, the output is switched as a positive or negative value into a register 2445. Register 442 holds the low 16 bits and register 444 holds the high 16 bits of 32 bit register 445. The sign of the switch 451 follows the sign of the zero crossing dither angle as explained hereinbelow.

The phase correction is made from the phase error measured by the phase error loop of FIG. 61. At the zero crossings of the dither pickoff angle, at both zero and 180 degrees, the output stripped angle is measured and is added to a 32 bit accumulator with a sign set at plus for the zero crossing and negative for the 180° crossing. The output of this accumulator is added to the PZT count output also with the sign of the crossing. This loop finds the value of counts which satisfy the loop, and is the measure of the phase error angle. This value is used in the dither stripper to correct a gyro angle output in response to a system request.

The compensation of the laser gyro output is accomplished by compensation for three sets of nominal constants. The constants include:

1) The set of coefficients describing the bias of the gyro as a function of temperature;

2) The set of coefficients describing the angle changes as a function of temperature. These coefficients are usually described as angular degrees/hour per ° F./hour but this is identical to angular degrees/° F.; and 3) The scale factor correction to correct the gyro output to the value of 1,165,120 counts per revolution corresponds to 1.112332 arc seconds per count. Any particular gyro may require a change in scale pitch by 0.2% corresponding to ±2,330 counts.

The scale factor must be corrected to <±5 counts/hour to achieve a 5 ppm precision.

Bias corrections.

The coefficients of the bias vs. temperature are determined for each unit during testing and expressed as shown in Table IA below.

TABLE IA

| Coefficient | Dimensions | Typical Value | Value at 200 F. |
|---|---|---|---|
| $K_1$ | deg/hour | 0.128 | 0.128 |
| $K_2$ | deg/hour/° F. | 0.000246 | 0.049 |
| $K_3$ | deg/hour/° F.$^2$ | 0.00000089 | 0.036 |

For operation in the microcontroller of one embodiment of the invention, the coefficients $K_1$, $K_2$, and $K_3$ may each be handled as a 16 bit number and all calculations may be performed to preserve an accuracy of at least $2\times10^{-4}$ deg/hour.

K' coefficients have values which are corrected for a scale factor (SF) and in one embodiment of the invention may be as shown in Table IIA below:

TABLE IIA

| Coef-ficient | Cal-culation | Maximum Value @ 200° F. | Minimum Value of Correction @ 200° F. (½ of LSB) | Q Value Per Least Sig. Bit | Typical Value |
|---|---|---|---|---|---|
| $K_1'$ | $K_1 \times 2^{13}/SF$ | 4.0 deg/hour | $0.60\times10^{-4}$/hour | $0.60\times10^{-4}$/hour | 943 |
| $K_2'$ | $K_2 \times 2^{21}/SF$ | 3.2 deg/hour | $0.48\times10^{-4}$/hour | | 464 |
| $K_3'$ | $K_3 \times 2^{29}/SF$ | 2.4 deg/hour | $0.38\times10^{-4}$/hour | | 430 |

These coefficients are then used to correct the gyro output as in the following equations.

| | |
|---|---|
| $\Delta\theta$ | $= 2^3[K_1' + K_2T/2^8 + K_3T^2/2^{16}]$ |
| $\theta c$ | $= \theta c + \Delta\theta$ (32 bit number) |
| $\theta c$ (out) | $= \theta c$ (upper 16 bits) |
| $\theta c$ | $= \theta c - \theta c$ (out) $\times$ 65,536 |

Example Using The Typical Values Above:

$\Delta\theta=2^3[819+262\times100/2^8=268\times10,000/2^{16}]$ $\Delta\theta=7,696$ $\Delta\theta=65,536$ every 8.5 seconds or an overflow of 0.117 Counts per sec correction These steps may advantageously be processed in background software programs since they do not depend on current gyro data with the exception of temperature which is filtered through a one second filter. The calculation may advantageously be done once per second so that in one hour this calculation may be performed 3600 times.

Temperature Angle Correction

Coefficients for correcting angle error as a function of temperature may be determined from gyro thermal tests for each gyro. Typical coefficients are expressed as shown below in Table IIIA.

TABLE IIIA

| Coefficient | Dimension | Typical Value | Value at 200 F. and 360° F./hour rate |
|---|---|---|---|
| $K_4$ | deg/° F. | $-0.35\times10^{-3}$ | −0.126 deg/hour |
| $K_5$ | deg/° F./° F. | $0.17\times10^{-5}$ | 0.122 deg/hour |

For the operation of the microcontroller, the $K_4$ and $K_5$ coefficients may each be handled as a 16 bit number and all calculations may be performed to an accuracy of at least $2\times10^{-4}$ deg/hour when exposed to an input thermal rate of 360° F./hour and at 200° F. The data stored in the microcontroller may advantageously be stored for 16 bit calculations to preserve accuracy. The values of K' coefficients which are corrected for a scale factor (SF) are as shown below in Table IVA.

TABLE IVA

| Coef-ficient | Calculations | Maximum Value @ 200° F. and 360° F. | Minimum Value Per Hour | Typical Value $K_4'$ & $K_5'$ |
|---|---|---|---|---|
| $K_4'$ | $K_4\times(3600)\times2^{10}/SF$ | 3.2 deg/hour | $0.48\times10^{-4}$ deg/hour | −1160 |
| $K_5'$ | $K_5\times(3600)\times2^{18}/SF$ | 2.5 deg/hour | $0.38\times10^{-4}$ deg/hour | +1442 |

The $K_4'$ & $K_5'$ coefficients may then be used to correct the gyro output θ as shown in the following equation:

$\Delta\theta=2^6[K_4'+(K_5'\times(T_N+T_{(N-1)}))/2^9]\times[T_N-T_{(N-1)}]$ $\Delta\theta=64[K_4'+(K_5'\times(T_N+T_{(N-1)})/512]\times[T_N-T_{(N-1)}]$ $\theta c=\theta c+\Delta\theta$ $\theta c(out)=\theta c$ (upper 16 bits)

$\theta c=\theta c-\theta c(out)$ where $T_N$ and $T_{(N-1)}$ are the successive gyro temperatures measured at one to ten second intervals.

Example For $K_4'$ & $K_5'$ Calculation Using The Typical Values At 100° F. and 720° F. Per Hour Thermal Rate $\Delta\theta=2^6[-1160+1442\times100/2^8]\times[0.02]$ $\Delta\theta=-764$ counts per second (assuming the temperature rate is 0.02° per second). This equates to a count of one every 86 seconds or 0.0120 per hour at 100° F. Note that at 0° F., the correction is 0.0230 per hour.

These steps may advantageously be done in background processing since they do not depend upon current gyro data with the exception of temperature which is filtered through a one second filter. Note it is not important that this be exactly one second. Two seconds may work equally well. The net output are the two coefficients multiplied by the total temperature change.

In one example of the invention, a difference in temperature of 0.1° F. produces an angle correction of about 0.05 counts. Therefore, this term, even at thermal rates of 360° F./hour, produces a correction of only 0.05 counts per second. A measurement of once per 10 seconds may keep the corrections to less than 1 count even in the presence of very high thermal rates of up to 700° F./hour. A measurement of once per second permits high resolution calculations at up to 7,000° F. per hour.

Scale Factor Correction

The scale factor correction may be accomplished to an accuracy of about one ppm by using a number N to make corrections. This value, N, is equal to the number of counts which are counted before making a correction of one count. "N" is calculated at calibration time by dividing a measured scale factor, SF, by the error counts as in the following equation:

$$N=SF/(SF-SF_0)$$

where:

SF is the measured scale factor counts per revolution, and $SF_0$ is a nominal trimmed scale factor counts per revolution.

The value of N is used in the microprocessor to correct the scale factor by adding or subtracting a count, as appropriate, every time the output increases or decreases by N counts.

Example Using The Above Data Where N=582 For A Scale Factor Error Of −2000 Counts Per Revolution For an input angle of 10 revolutions the non-corrected gyro counts are 11,631,120. In that angle, the above correction adds 19,985 counts for a total of 11,651,105 counts which is the equivalent of 1.3 ppm error. This correction of about 0.2% is at the maximum range of performance by an RLG. The nominal scale factor is 1.11234 arc seconds per count. The peak correction error is:

Peak Error (ppm)=50(correction{percent})$^2$. For a correction of 0.1%, the peak error is 0.5 ppm. The RMS error is equal to the peak error divided by $3^{1/2}$. For the above example, the RMS error is 0.29 ppm. At the maximum correction of 0.2%, the RMS error is 1.15 ppm.

Referring now to FIG. 1C, there shown is a simplified diagram of a modular ring laser gyro system wherein some of the components shown in FIG. 1B, such as the dither pickoffs, have been deleted for ease in explaining the mode hopping apparatus. It will be understood that the modular ring laser gyro of FIG. 1C may include all of the elements of FIG. 1B, although they are not all shown. The microcontroller 100 provides control of the A mirror 13 PLC transducer 29A through A+ signal 22 and A− signal 24, and control of the B mirror 15 PLC transducer 29B through B+ signal 26 and B− signal 28. Signal [(A+)−(A−)] are differential signals to transducer A. If [(A+)−(A−)] is positive the path length around the gyro is increased. If [(A+)−(A−)] is negative the path length around the gyro is decreased. This is also the case for transducer B.

A number of software modules are involved in the initialization and control of the microcontroller 100. The software modules are run by the microprocessor 120 contained within the microcontroller 100.

Mode Hopping

Referring again to FIGS. 44 and 45 which show a detailed circuit schematic for path length control, optimal mode acquisition, and mode hopping. During mode acquisition and mode hopping the bias drift improvement BDI pulse width modulation signal is set at 50% so that the output of integration amplifier 122 is 2.5 volts at midrange. The output of integration amplifier 122 is inverted through amplifier 130 which is also set at 2.5 volts. Both the BDI and not BDI signal, NBDI, may be midrange at 2.5 volts during both mode acquisition and mode hopping for ease of explanation but this is not required.

The PLC uses the digital logic 800 to generate the dither drive to the mirrors. During mode acquisition and mode hopping, the sweep signal 112 is enabled and notdither 119 and dither 118 are disabled. The switch signal 116 and not switch signal 114 are always enabled at a 3 Khz rate. These signals are digital logic levels. Dither 118 is the complement of notdither 119 and switch 116 is the complement of not switch 114. If the sweep 112 is in phase with switch 116 then the path length controller signal at node 176 is swept up. If sweep 112 is 180° out of phase with switch 116 then the path length controller signal at node 176 is swept down.

The dither signal and notdither signal introduce a small displacement in mirror position by AC coupling a small 90° phase shifted signal into transducer A associated with mirror 13 only. This enables the circuit of FIGS. 44 and 45 to lock in on a local maximum. The smart mode acquisition brings the circuit close to the local maximum LIM signal 20 and the dither part of the circuit locks in on the exact peak. The dither and notdither signal results in a small modulation in the power signal from the photodetector 160. This small modulation shows up as an AC component on top of the DC component of the LIM signal 20 and is AC coupled through capacitor 172. The signal then goes through register 174 to the summing junction of amplifier 4428 which amplifies by a gain of 150K/5.36K.

This signal 129 is then fed into the synchronous phase demodulator 4426.

The synchronous phase demodulator 4426 provides a sweep up signal on node 176 if signal 129 is in phase with the switch signal 116 and provides a sweep down signal on node 176 if signal 129 is out of phase with the switch signal 116.

The PLC differential amplifier pairs comprise transistors 131, 132, 136 and 138. In one example embodiment of the invention the four transistors are PNP transistors from Motorola, part number MMBT6520. In one embodiment of the invention the transistors have a maximum collector voltage of 350 volts, derated to 280 volts. One advantage of using PNP's over NPN's is that PNP's have higher beta parameters for lower current and at lower temperatures which lowers the power consumption of the modular gyro. Another advantage of this example is that constant current source transistors 140 and 142 are low voltage, "off the shelf," surface mounted PNP's. The current through transistors 140 and 142 are set up by two current source resistors, 190 and 194 respectively. The voltages of the bases of transistors 140 and 142 are set up by the network resistor 192, transistor 141, and resistor 196. Transistor 141 is added for temperature compensation so that the base emitter drop tracks between all three transistors, 140, 141, and 142. The invention maintains a relatively constant current source over the operating temperature range of the laser gyro using transistors 140, 141 and 142. The invention also uses a 10 volt reference 193. The prior art simply used a fixed resistor as a current source which made the transducer voltage a non-linear function of the PLC monitor voltage at node 176. Thus the present invention allows the calculation of volts per mode to be independent of the PLC voltage range.

The integration amplifier 124 uses a pole and zero compensation technique to match the pole that is created by the one megohm resistor and the base collector capacitance of transistors 136 and 131. This widens the closed loop frequency response of the closed loop system.

A peak detector 171 is connected to the output of amplifier 4428 which is filtered before it is sent to the A/D converter 110 to provide the SBS signal 36.

Figure 62:
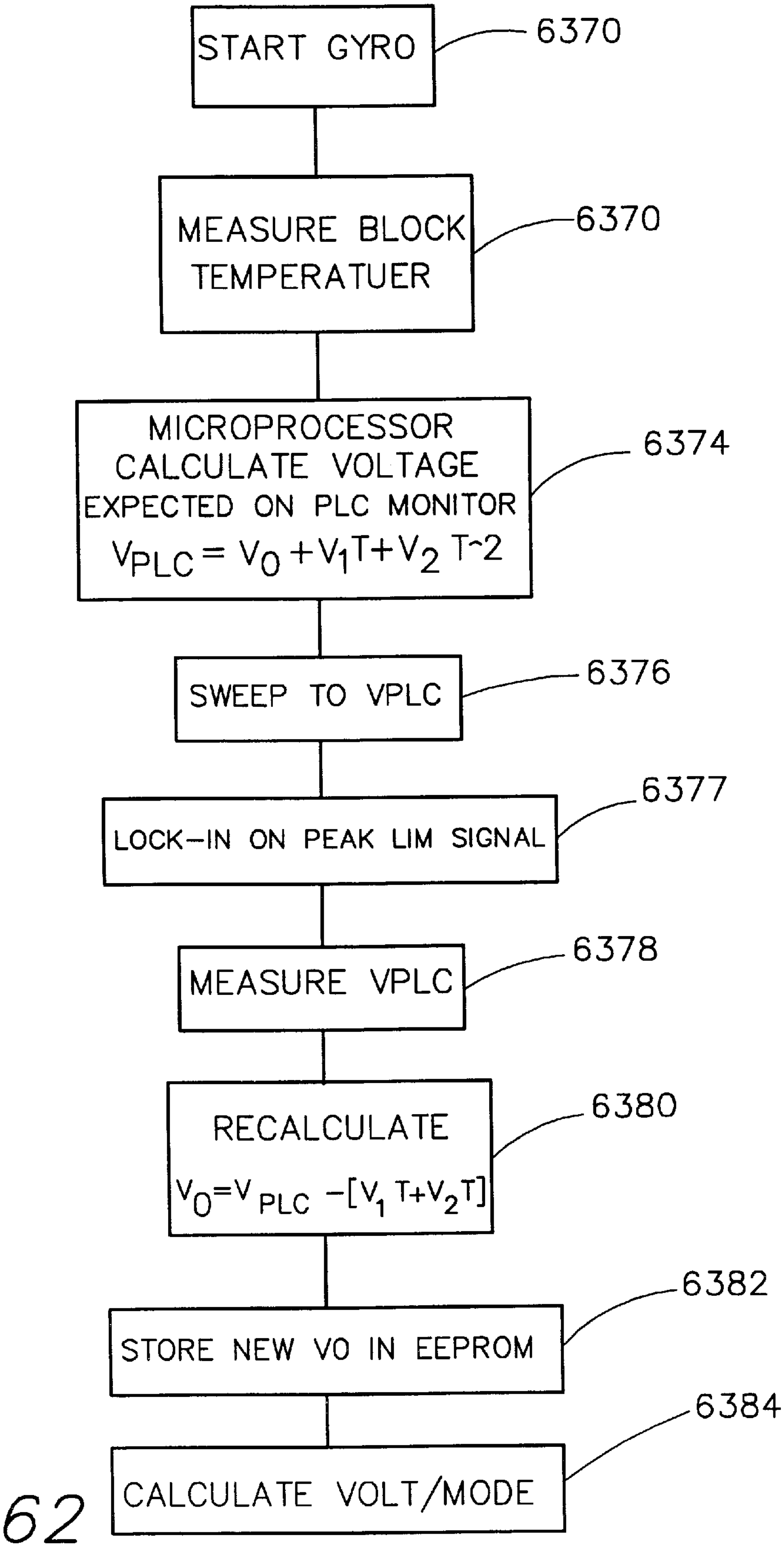
FIG. 62 shows a process flow diagram of the smart primary mode acquisition method of the invention.

FIG. 62 shows a schematic block diagram of the method of acquiring a primary laser operating mode. The method is implemented in a microcontroller 100 and is stored in the microprocessor 120 program memory. The method of finding the primary mode is useful upon gyro start-up to find which initial mode to operate the gyro on. FIG. 16 illustrates that there are a number of modes on which the gyro may be operated, and the job of the primary mode acquisition method defines the best mode for operating over the entire temperature range.

The process shown in FIG. 62 begins by starting the gyro in step 6370. The process then measures the block temperature in step 6372. The microprocessor 120 then calculates the voltage expected from the PLC monitor according to the equation $V_{PLC}$ equals the constants $V_0$, $V_1$, $V_2$ and $V_3$ used in the quadratic equation $V_{PLC}=V_0+V_1T+V_2T^2+V_3T^3$ where T is the measured temperature of the block. The initial $V_0$, $V_1$,$V_2$ and $V_3$ parameters are provided from measurements of the laser gyro 200 done when the gyro is constructed at the factory. The constants used in the method of the invention known as $V_0$, $V_1$, $V_2$, $V_3$, $K_1$ and $K_2$ are stored in an EEPROM which is shown in FIG. 6 as EEPROM 102. The process then moves to step 6376 where the PLC voltage is swept. The method of sweeping the PLC voltage is described below with reference to FIG. 63. Next the process locks in on LIM peak 6377. The process then moves to step 6378 where the voltage of the PLC monitor is measured. The process then advances to step 6380 where the new $V_0$ is calculated from the equation $V^0=V_{PLCMON}-V_1T-V_2T^2-V_3T^3$ where $V_{PLCMON}$ is now the measured monitor voltage. The new $V_0$ is stored in EEPROM in step 6382 to be used in the subsequent sweeping of the PLC monitor. The process then drops to step 6384 where the volts per mode is recalibrated for the gyro. The process of calculating volts per mode is further described in FIG. 64.

Figure 63:
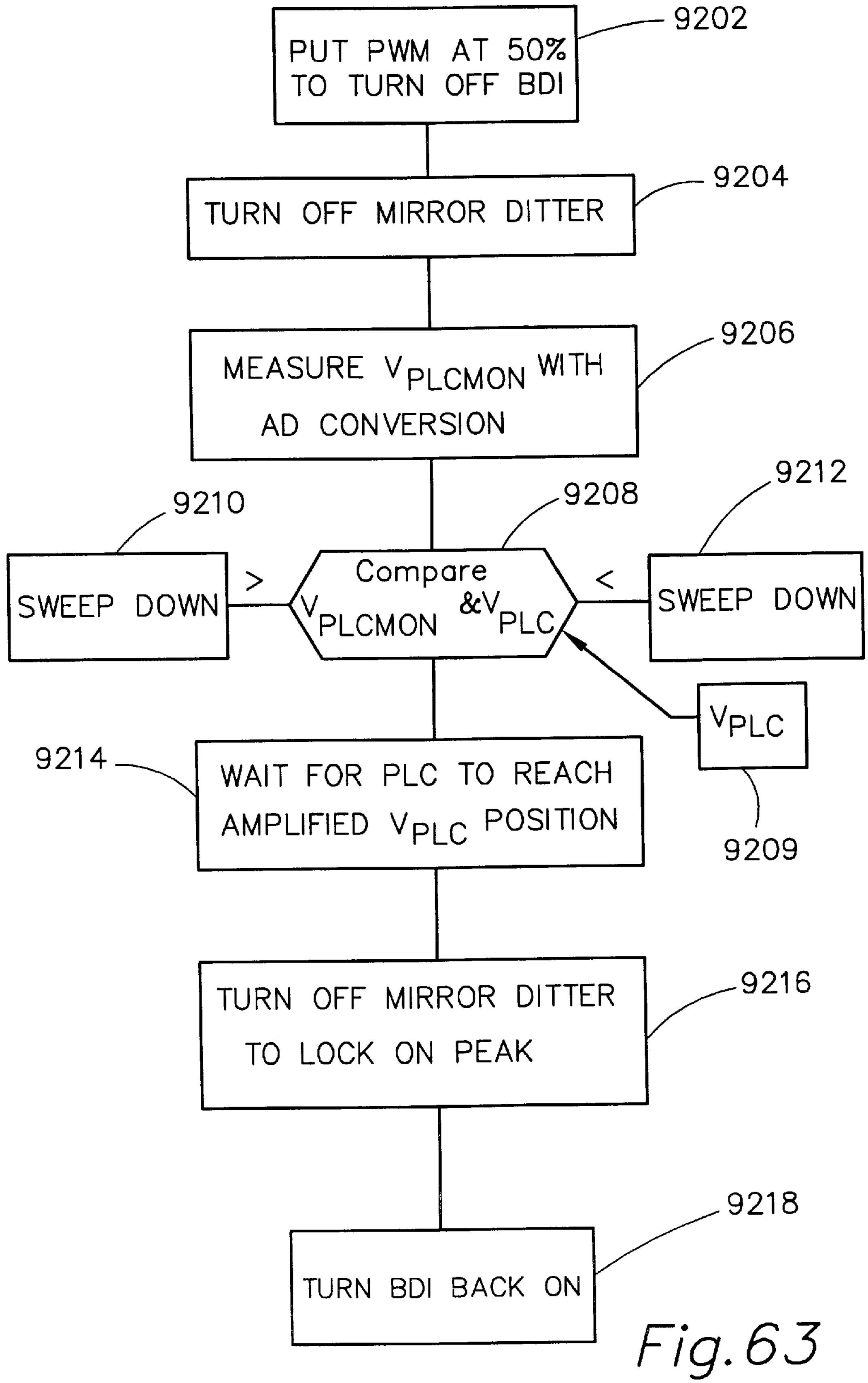
FIG. 63 shows a process flow diagram of the sweep method of the invention.

Now refer to FIG. 63, FIG. 63 shows a flow diagram of the method of the invention to sweep the path length control transducers through a number of modes looking for a mode maximum. The sweep method is used, for instance, in the method of FIG. 62, step 6376. The process of FIG. 63 starts by adjusting the pulse width modulator to 50% to turn off the bias drift improvement signal at step 9202. Maintaining the BDI at 50% PWM during mode acquisition and mode hopping is not a requirement but yields a more accurate volts/mode calculation. The process then proceeds to step 9204 where the mirror dither is shut off. This prevents the automatic maximum seeking closed loop apparatus from interfering with the method of FIG. 63. The process then steps to step 9206 where the PLC monitor voltage is measured with the A/D converter on the microcontroller 100. The process then steps to 9208 where the voltage of the PLC monitor is compared against the desired PLC voltage. The desired PLC voltage is input at step 9209. If the PLC monitor voltage measured from the system is greater than the desired PLC voltage, the process continues in step 9210 to sweep the PLC voltage down. If the measured voltage is less than the desired PLC voltage, the process steps to 9212 where the PLC voltage is swept up. The sweep down and sweep up of the path length controllers are accomplished using the circuit of FIGS. 44 and 45 where the path length controllers are adjusted accordingly. The process then flows to step 9214 where the process waits for the PLC voltage to achieve the specified PLC position, then the $V_{PLCMON}$ voltage equals the requested $V_{PLC}$. Otherwise in both cases of step 9212 and 9210 the process returns to continuously evaluating the measured voltage from the desired voltage. Once the process has waited for the path length control position to reach the indicated path length control position $V_{PLC}$ the process returns to step 9216 where the mirror dither is turned on to lock on the local maximum LIM signal 20. The process then flows to step 9218 where the BDI method is enabled.

Figure 64:
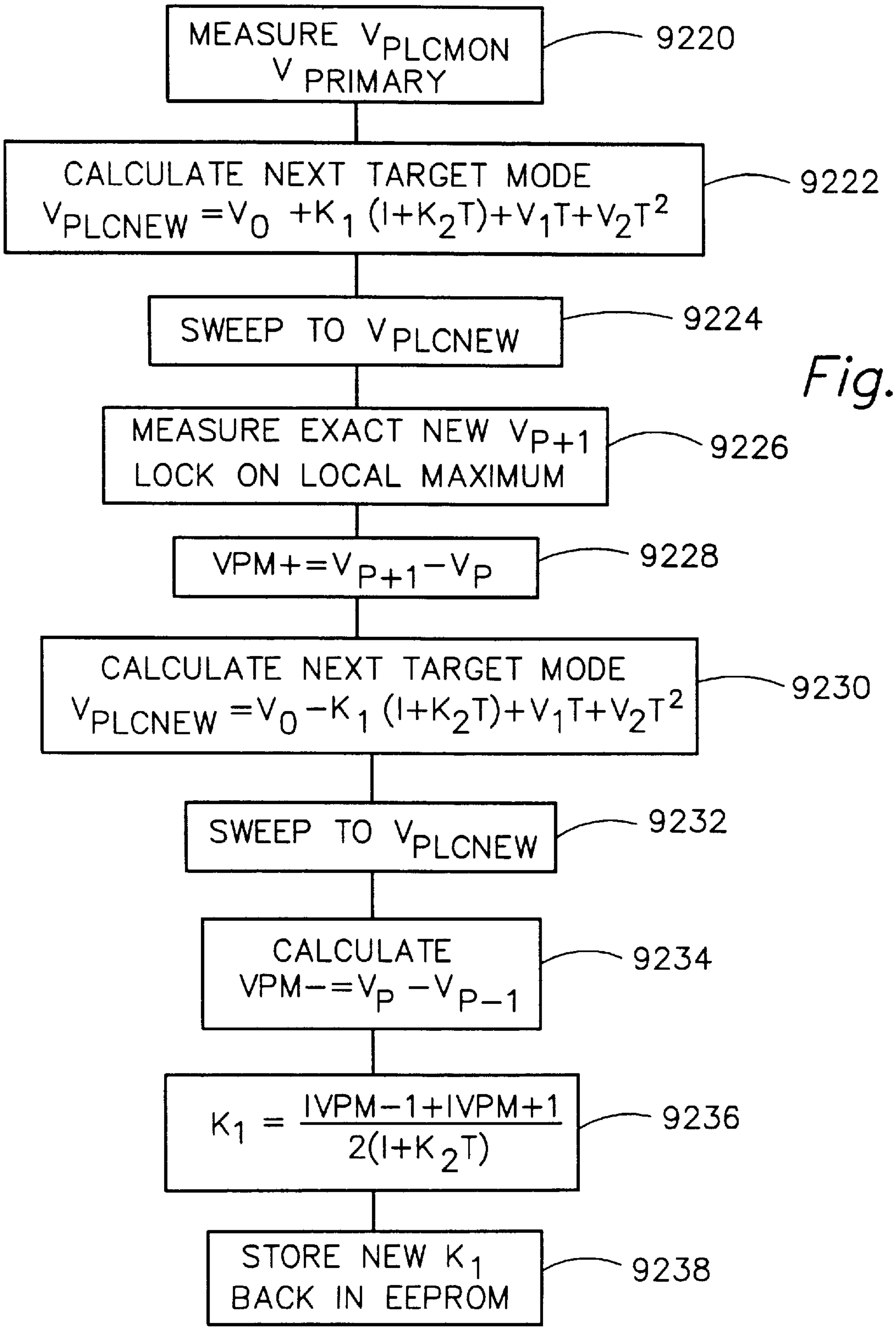
FIG. 64 shows the method of the invention to calculate volts per mode.

FIG. 64 shows a flow diagram of the method of the invention used to calculate the volts per mode of the laser gyro. The process starts by first measuring the path length control monitor voltage at step 9220. The process then flows to step 9222 where the target mode is calculated as $V_{PLCNEW}=V_0+K_1(1+K_2T)+V_1T+V_2T^2+V_3T^3$. The process then steps to step 9224 where the laser gyro is swept to the $V_{PLCNEW}$ voltage. The process steps to 9226 where the voltages referred to in this method are defined as follows. $V_P$ is the voltage of the path length controller at the primary mode which was found using the methods of FIG. 62. $V_{P+1}$ is the voltage of the path length control monitor at one mode higher than the primary mode. $V_{P-1}$ is the voltage of the path length control monitor at one mode lower than the primary mode. The process step 9222 calculates the next target mode as the $V_{P+1}$. In step 9226 the exact $V_{P+1}$ voltage is measured. A volts per mode is calculated for the positive direction and the negative direction. The positive volts per mode is called $VPM_+$ and the negative volts per mode is called $VPM_-$. The process then flows to step 9228 where the voltage per mode in the positive direction is calculated as the voltage difference of the primary mode $V_P$ and the voltage of the next higher mode to the primary mode $V_{P+1}$. The process then flows to 9230 where the $V_{PLCNEW}$ voltage for the new voltage in the negative direction is calculated as $V_0-K_1(1+K_2T)+V_1T+V_2T^2+V_3T^3$. The process of FIG. 64 then flows to process step 9232 where the PLC transducers are swept to $V_{PLCNEW}$ following the method of FIG. 63. The process then flows to process step 9234 where the new volts per mode in the negative direction is calculated as the difference between the primary volts of the path length control monitor and the new voltage $V_{P-1}$. In process step 9236 the new $K_1$ constant is computed as the absolute value of the negative volts per mode plus the absolute value of the positive volts per mode divided by two times the quantity $1+K_2T$. The process then flows to step 9238 where the new $K_1$ is stored in the EEPROM 102.

Figure 65:
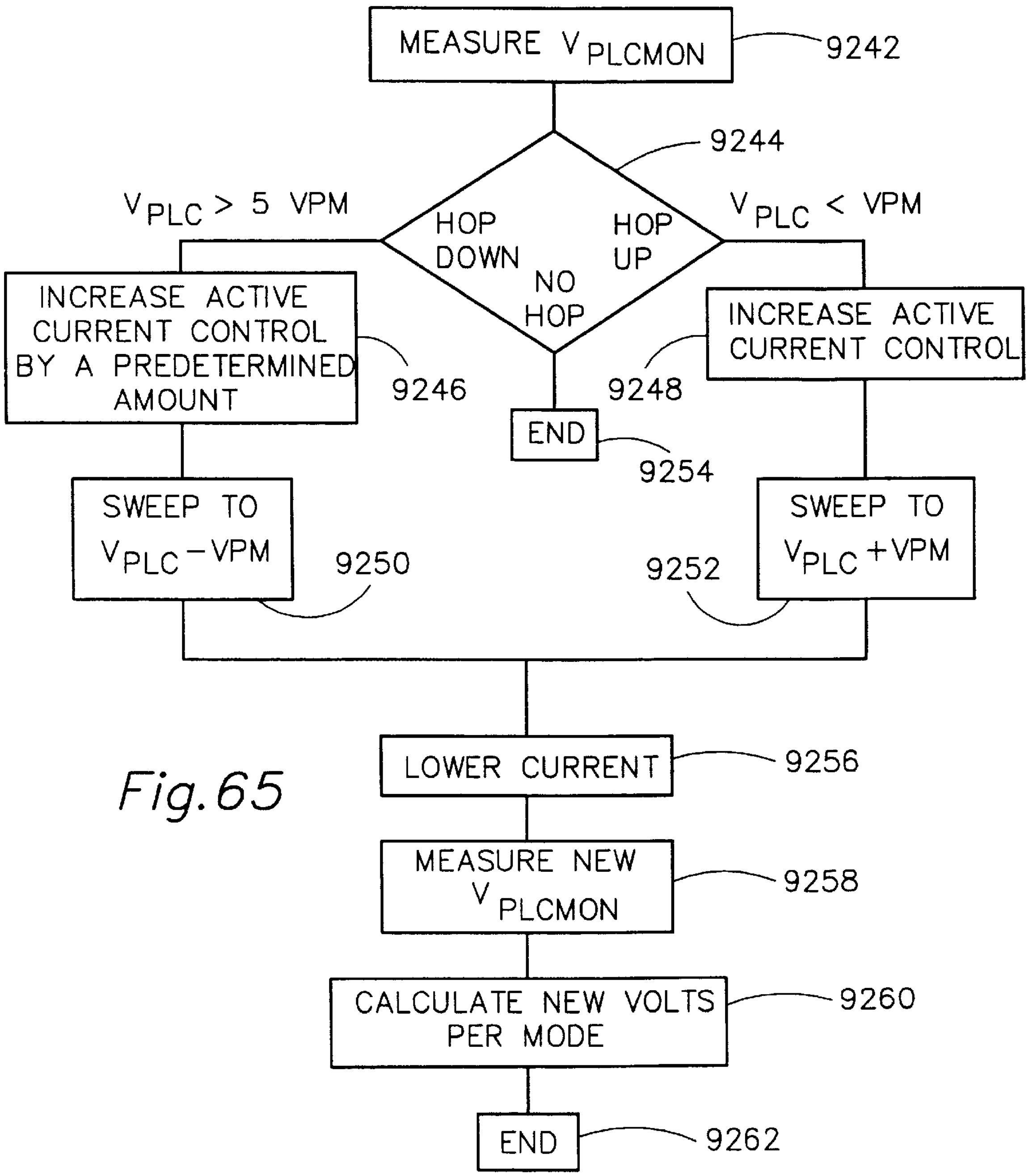
FIG. 65 shows the method of mode hopping of the invention.
Figure 66:
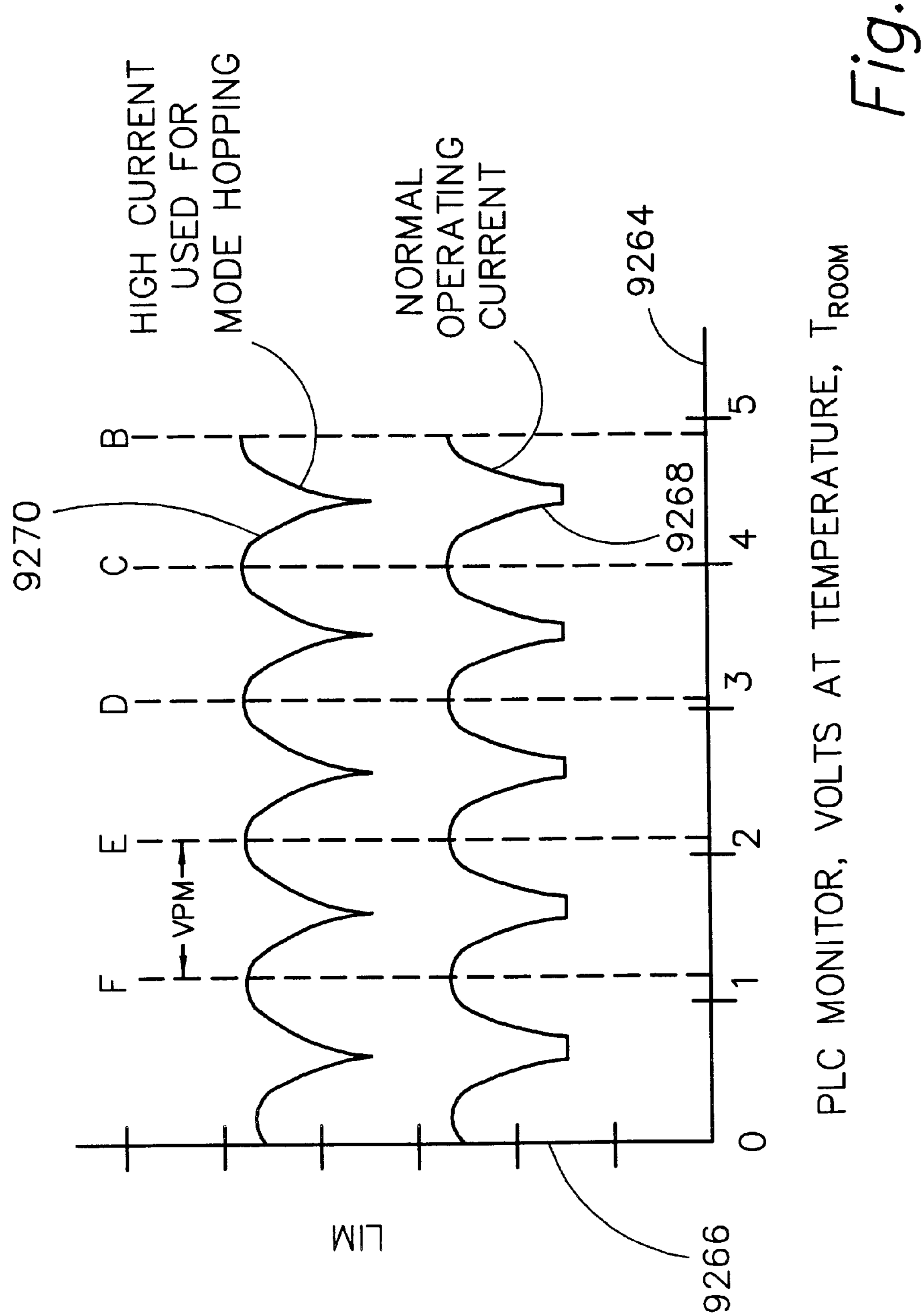
FIG. 66 shows the PLC monitor voltage mode diagram illustrating the LIM signal during mode hopping.

Now referring FIG. 65 which shows a flow diagram of the method of the invention to mode hop the laser gyro through multiple modes as shown in laser gyro mode diagram FIG. 16. FIG. 65 should be read with a view to FIG. 66 where the plot of laser intensity monitor signal 20 is shown for various modes F, E, D, C, and B of the laser gyro mode diagram of FIG. 16. The first step in mode hopping occurs at process step 9242 where the voltage of the path length control monitor is measured. The laser gyro operating the mode hopping method of the invention has a maximum and minimum path length control monitor voltage shown in FIG. 16 as 478 and 479 which is used as a limit for the swings of the path length control voltage. The process of mode hopping continues to process decision block 9244 where the process forks to a number of different process steps depending on whether the laser gyro using the method of the invention wants to hop down a mode or hop up a mode.

Those skilled in the art will recognize that either the positive volts per mode or negative volts per mode may be used.

The process of FIG. 65 flows to step 9254 to end the mode hopping if no mode hopping is desired. For the following discussion VPM is defined as difference between adjacent LIM maximums in turn of PLC monitor volts for one mode and therefor has units of volts. For this example VPM $\approx$1 volt. In one example embodiment of the invention the laser gyro does not have to hop a mode if either the measured path length control voltage is less than the maximum voltage minus VPM value, or the voltage of the path length control monitor is greater than VPM value. Either of these two conditions indicate that there is no need to mode hop because the laser gyro is currently operating in a comfortable mode. A comfortable mode is a mode that affords a voltage swing within the confines of the operating limits of the gyro. This allows operations such as bias drift improvement and mirror dither to maintain an appropriate mode range. An appropriate mode range is one that does not fall out of the maximum or minimum PLC monitor voltage as the mirrors are dithered or the mirrors are progressed through the bias drift improvement cycle.

The maximum/minimum PLC monitor voltage is arrived at by the specific drive electronics which may vary from alternate embodiments of the laser gyro.

Returning now to decision block 9244 for the analysis of the case of a hop down in mode. A hop down in mode occurs when the voltage of the path length control is greater than the maximum voltage minus VPM value. This means that there is no "head room" to swing a mode for BDI. The process of FIG. 65 then flows to step 9246 where the active current control current is increased. An increase in active current control is shown on FIG. 66 as an increase in a laser intensity monitor signal 9266 from plot 9268 to 9270. The high energy LIM curve 9270 represents the high current used for mode hopping. High current is needed when sweeping modes to insure that the output of the laser intensity monitor is at least as high as the normal mode's operating current maximum, even in the valleys of curve 9270. This higher current prevents the loss of any inertial navigation counts from the laser due to a drop off in laser signal because of low signal levels which result in error counts. Increase in active current control is made by a predetermined amount characterized for a particular gyro.

The process then flows to 9250 where the path length control voltage is swept to the current voltage minus VPM value. The volts per mode value for the laser gyro is calculated with reference to FIG. 64. The process then flows to step 9256 where the current of the active current control is lowered from a level represented by curve 9270 to a lower level represented by curve 9268, the normal operating current level. Gyro life time may be extended by lowering the current after mode hopping.

Referring now back to the process step 9244 where a hop up is indicated by the path length control voltage being less than the VPM value. This condition indicates that there is no more "bottom room" for the path length controller electronics. The process then flows to step 9248 where the active current control is again increased following the steps of 9246 to prevent the loss of any laser inertial navigation counts. The process then flows to process step 9252 where the path length controller voltage is swept to the new voltage computed as $V_{PLCMON}$ plus VPM value. The sweeping method is shown in FIG. 63. In either case of process step 9250 or 9252 the process flows to step 9256 where the active current control current is lowered. The process then flows to 9258 where a new path length control voltage is measured and the process flows to 9260 where a new volts per mode is calculated for the new position of the new mode. The process then flows to 9262 where the mode hopping has successfully occurred and control is returned to the monitor control loop.

Those skilled in the art will appreciate that mode hopping is useful for environments where the laser gyro system is undergoing large temperature extremes which tend to drive the current operating mode out of the operating range of the laser gyro.

Figure 67:
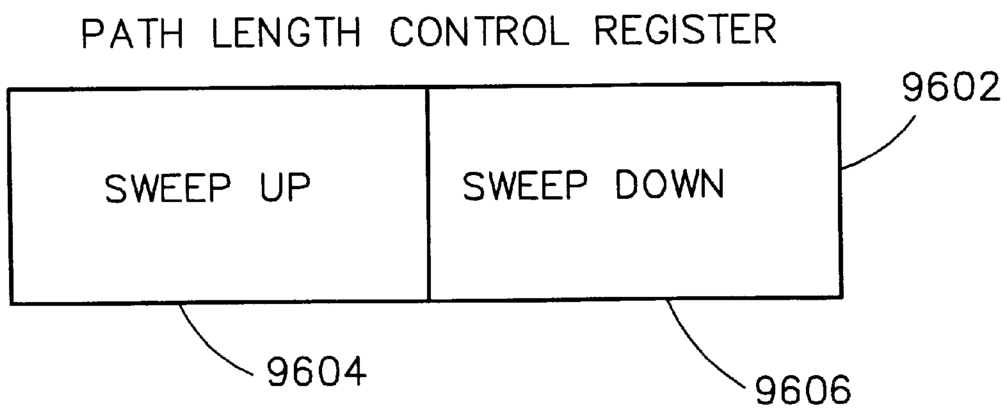
FIG. 67 shows an example of a path length control register.

Now referring to FIG. 67 which shows an example of a path length control register 602. In one embodiment of the laser gyro digital path length controller the microprocessor or microcontroller 100 interfaces through a digital register 602 to the path length controller. The path length control register 602 controls the direction of change of the laser path length in the laser gyro 200 to increase mode or decrease mode.

Figure 68:
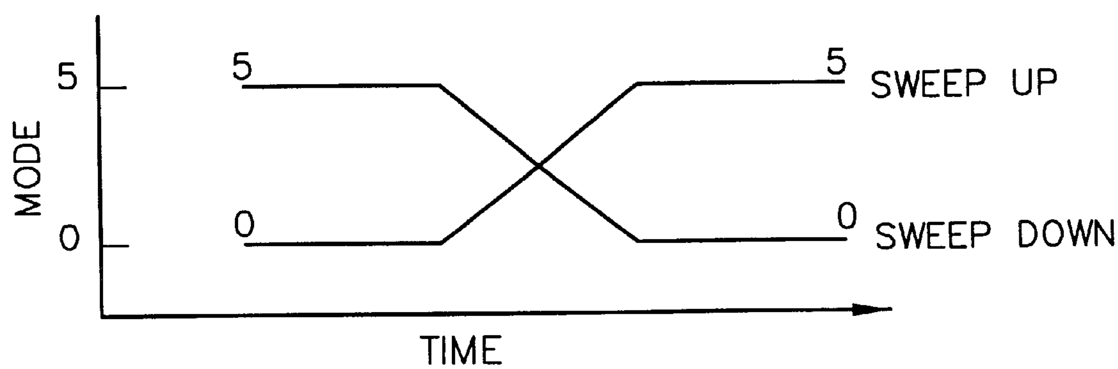
FIG. 68 shows an example of the state transitions possible with modes of the laser gyro.

FIG. 68 shows an example of the state transitions possible with 5 modes of the laser gyro 200. In one embodiment of the invention the path length control register 602 is divided between a sweep up portion 9604 and sweep down portion 9606. If the direction of change of laser path length is to increase the mode the 'sweep up' portion 9604 of the path length control register 9602 is active. If the direction of change of laser path length is to decrease the mode the 'sweep down' portion 9606 of the path length control register 9602 is active. In one embodiment of the invention the path length control register 9602 is a gate array register and the 'sweep up' portion 9604 and 'sweep down' portion 9606 comprise single bits.

In one embodiment of the invention the path length control monitor signal is used with the gate array register to sweep through the modes of the laser gyro 200. In one method the 'sweep down' portion 606 of the gate array register is activated to cause the path length to change in a down direction through lower numbered modes. Mode sweeping terminates when the voltage level from the path length control monitor reaches a predetermined level indicating a predetermined mode number. In an alternate method the path length control monitor is sensed for minimum and maximum values. The occurrence of a periodic change from one maximum to a next lower or upper maximum is defined as a mode. In such an embodiment the number of modes and their corresponding voltage values may be noted and used for subsequent operations.

Figure 69:
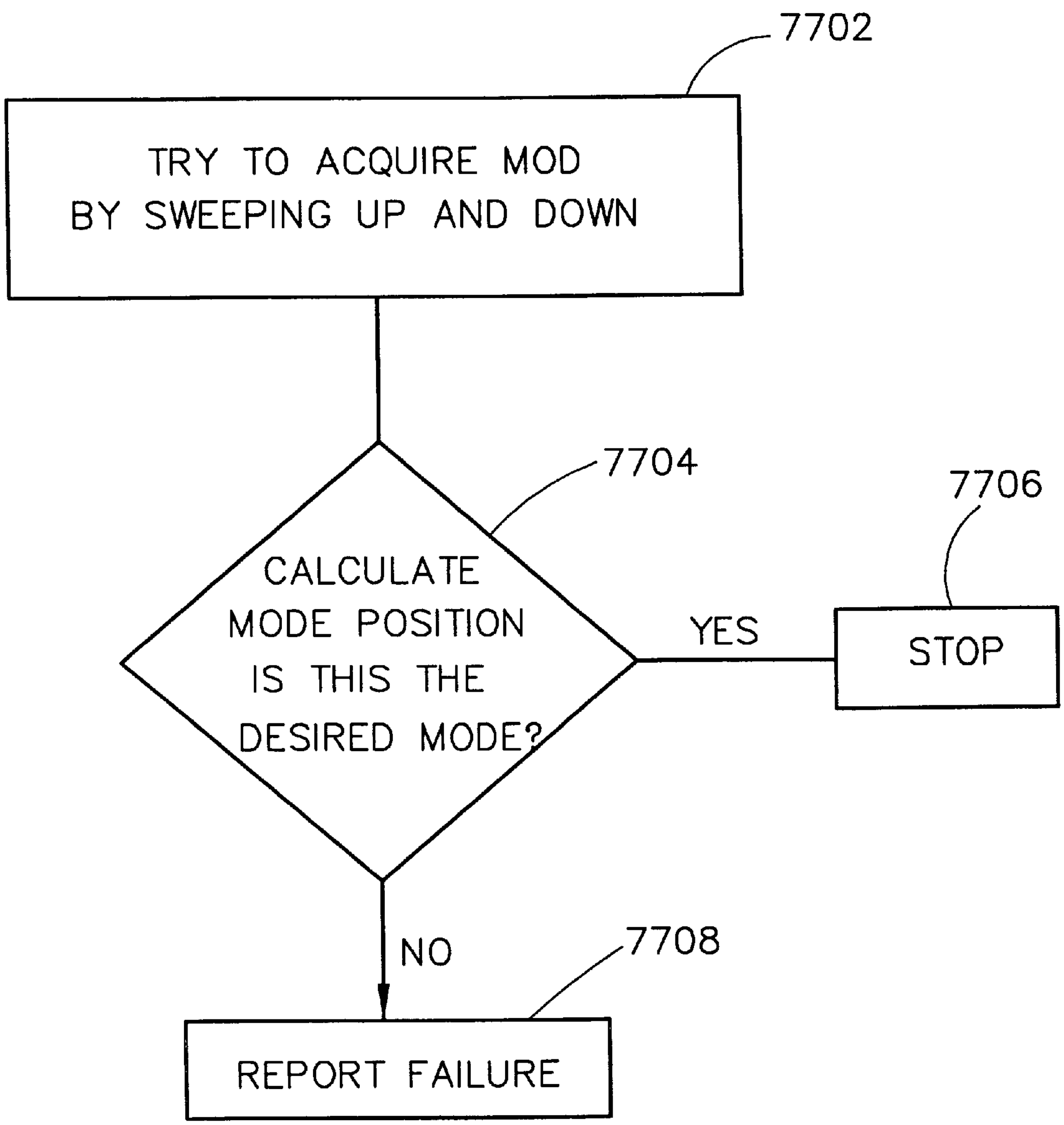
FIG. 69 shows a process flow diagram for one method of acquiring a mode at laser gyro start up.

Refer now to FIG. 69, FIG. 69 shows a method of acquiring a starting mode. At start up the laser gyro must find an operating mode. It is important to pick a mode that provides a full operating range. The method starts by acquiring a mode by sweeping the mode up and down at step 7702. In step 7704 the mode position is determined. If the mode position is at the desired mode the process stops at step 7706. If the desired mode or another close mode cannot be found a failure is reported in step 7708.

Figure 70:
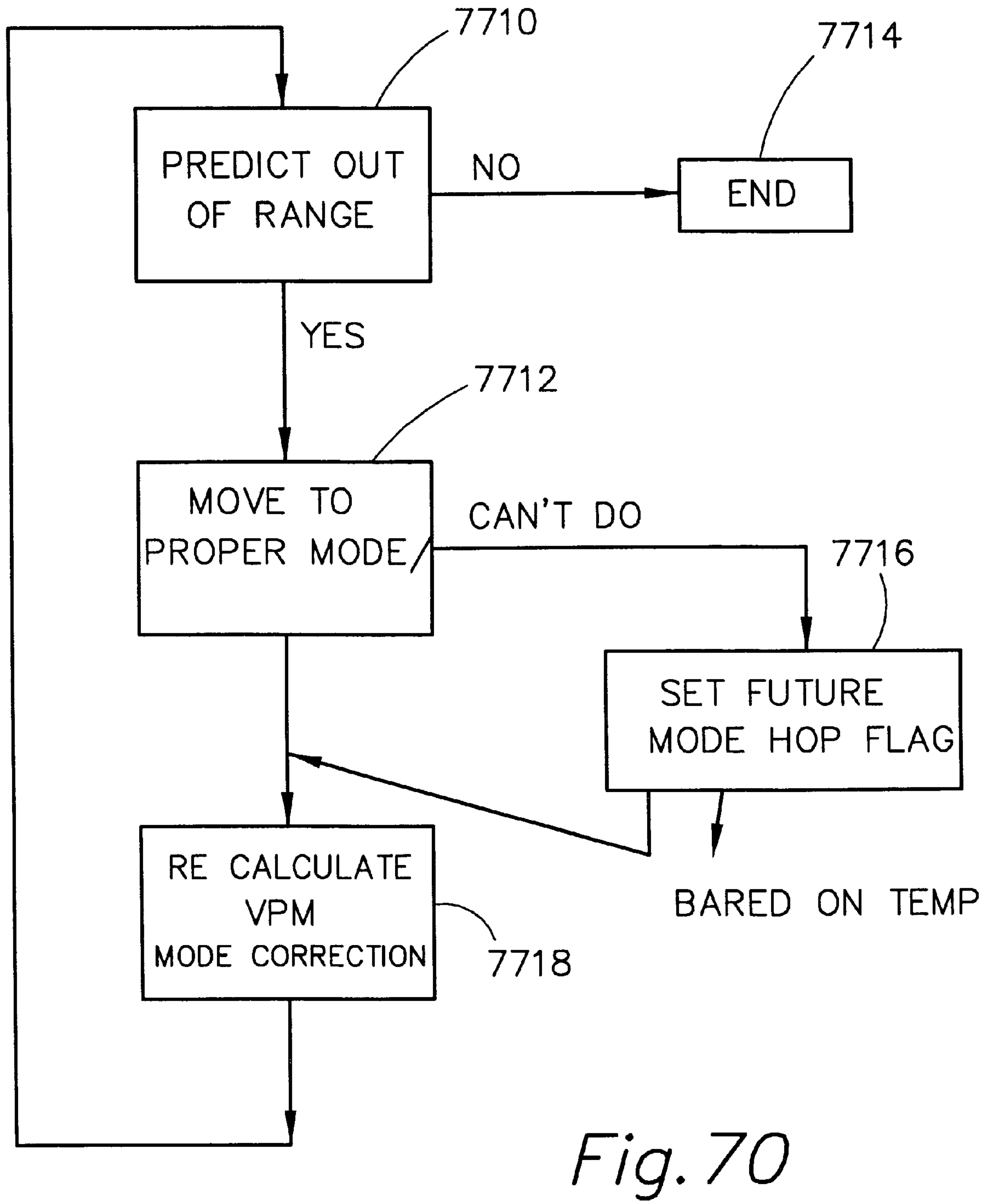
FIG. 70 shows a process flow diagram for one method of predicting whether the gyro will be out of range at a certain mode during the operation of the laser gyro.

Refer now to FIG. 70, FIG. 70 shows a method of predicting whether any selected operating mode will be adequate for the operation of the gyro over a wide temperature range. The process starts at step 7710 where the microprocessor predicts, based on the mode curve of the current mode, whether the gyro may be out of range over the operating temperature range of the gyro. If the gyro will not be out of range on the current mode the process stops at step 7714. If the gyro will fall out of range while in a mode the process moves the gyro to a better mode if one may be found in step 7712. If a better mode cannot be found, the gyro may have to hop a mode while operating. In one alternate embodiment of the invention a mode hop flag may be set in step 7716. In another alternate embodiment the gyro may continuously monitor the chance of falling out of range. If the mode is changed the process flows to step 7718 to recalculate the volts per mode.

Figure 71:
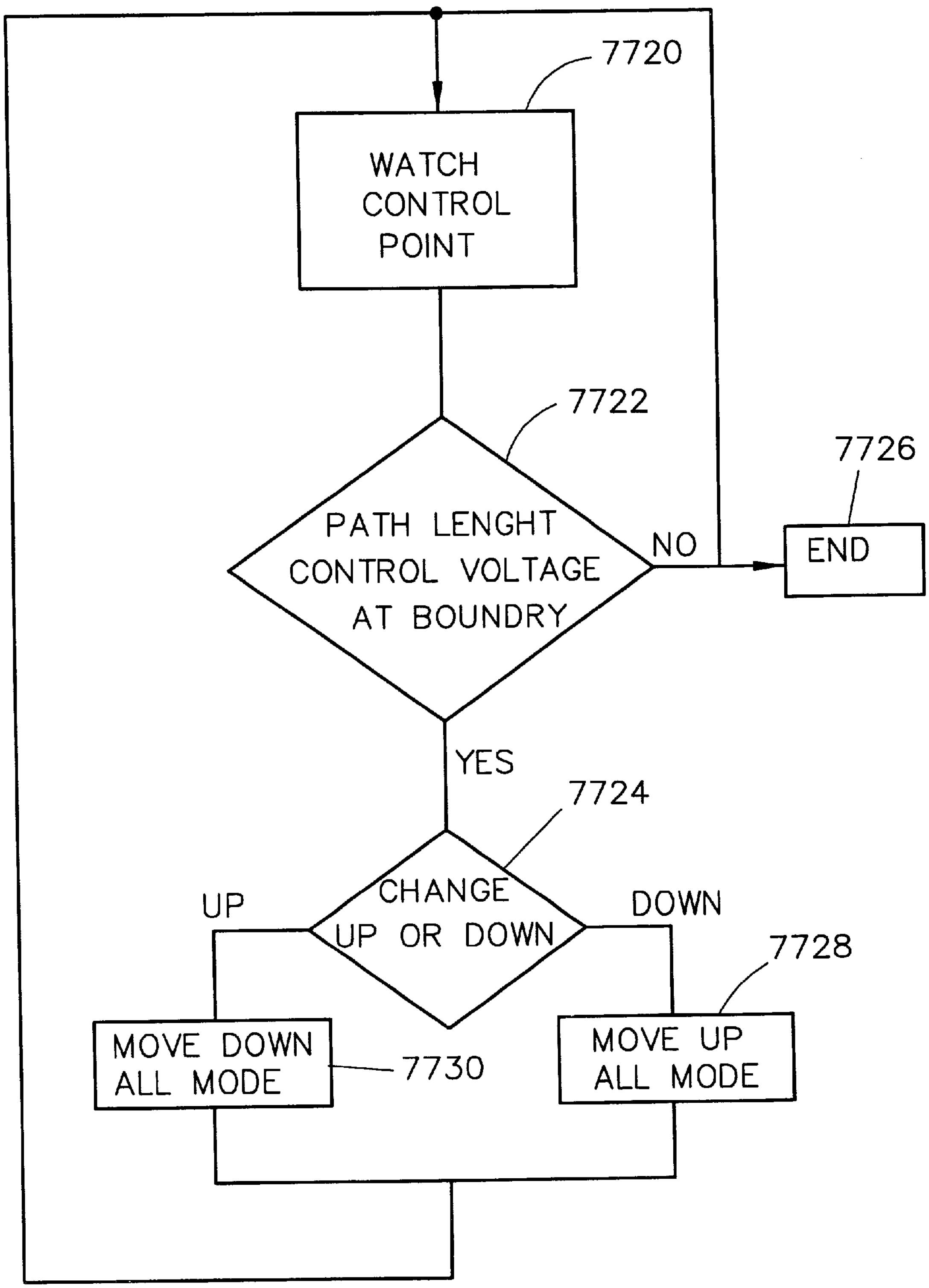
FIG. 71 shows a process flow diagram for mode moving in one embodiment of the invention.

Refer now to FIG. 71, FIG. 71 shows one method of watching a control point to determine whether or not to change modes. The process starts at step 7720 to watch a control point, such as path length control voltage. If in step 7722 the control point is passed, the path length control voltage moves out of range, the process flows to step 7724 to change modes. If in step 7722 the control point is not passed the process stops in step 7726 or alternately monitors the control point in step 7720. The process in step 7724 determines if the mode should be change up or down. If the mode is to be moved down the process flows to step 7730. Otherwise the process flows to step 7728 to move up one mode. The process then returns to monitor the control point in step 7720.

Those skilled in the art will recognize that as the mode of operation of the gyro is changed the gyro size changes. As a result the scale factor used to compensate the arcseconds per count of the gyro output need to change. In one example, when the path length changes approximately one wavelength the scale factor changes by 4 ppm and the change in scale factor may be compensated in the microprocessor.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A modular sensor apparatus for measuring at least one inertial property, the modular sensor apparatus comprising:

an inertial sensor means for sensing at least one inertial property, wherein the inertial sensor means has at least one sensor control input and a measured inertial property output that varies in response to the at least one sensor control input;

a digital control means for controlling the inertial sensor means, wherein the digital control means has at least one control output connected to the at least one sensor control input; and a self test means for performing a built in test of the modular sensor apparatus, wherein the self test means is connected to the digital control means.

2. The modular sensor apparatus of claim 1 wherein the inertial sensor means comprises a laser gyro.

3. The modular sensor apparatus of claim 1 wherein the digital control means further comprises a micro-controller.

4. The modular sensor apparatus of claim 1 further comprising an inertial sensor start up means connected to the inertial sensor means for start up of the inertial sensor means in a predetermined manner.

5. The modular sensor apparatus of claim 4 wherein the digital control means has at least one operating measurement output representing a health status for the modular sensor apparatus and the digital control means, further comprises a means for evaluating the health status connected to the at least one operating measurement output.

6. The modular sensor apparatus of claim 3 wherein the micro-controller further comprises a nonvolatile memory means, and wherein the micro-controller stores at least one operating parameter in the nonvolatile memory means.

7. The modular sensor apparatus of claim 6 further comprising at least one operating control input to set the modular sensor apparatus in at least one configuration, and wherein the modular sensor apparatus further comprises a configuration means for setting the modular sensor apparatus to the at least one configuration, wherein the configuration means has a configuration output connected to the at least one operating control input.

8. The modular sensor apparatus of claim 1 wherein the inertial sensor means and the digital control means are hermetically sealed in a housing, wherein the inertial sensor means is capable of being started with high voltage, the modular sensor apparatus further comprising:

(a) a low voltage power supply connection means for providing a hermetically sealed low voltage supply connection within the housing; and (b) a high voltage starting means for starting the inertial sensor means wherein the high voltage starting means is contained within the housing and is connected to the low voltage power supply connection means.

9. The modular sensor apparatus of claim 2 further comprising a direct digital dither drive apparatus for the laser gyro, wherein the laser gyro further comprises a dithered gyro block with a dither motor and a dither pickoff, the direct digital dither drive apparatus comprising:

(a) means for sensing the dither pickoff connected to the dither pickoff and having a dither pickoff output;

(b) means for amplifying the dither pickoff output having an amplified dither pickoff output;

(c) means for analog to digital conversion connected to the amplified dither pickoff output having a digital dither signal output;

(d) means for digital control connected to the digital dither signal output having a pulse width modulated signal output wherein the digital control means generates the pulse width modulated signal output in proportion to the digital dither signal output minus a reference displacement plus a predetermined amount of random noise; and (e) means for driving the dither motor in response to the pulse width modulated signal output having a dither drive signal connected to the dither motor.

10. The modular sensor apparatus of claim 2 further comprising a dither stripper apparatus for the laser gyro, the laser gyro further comprising a dithered gyro block with a dither motor and a dither pickoff, wherein the dither stripper apparatus comprises:

(a) means for sensing the dither pickoff connected to the dither pickoff and having a dither pickoff output;

(b) means for amplifying the dither pickoff output having an amplified dither pickoff output;

(c) means for analog to digital conversion connected to the amplified dither pickoff output having a digital dither signal output; and (d) means for digital control connected to the digital dither signal output having a dither stripped inertial navigation output wherein the digital control means converts the digital dither signal output to an angular displacement value, generates a change in angular displacement by subtracting the angular displacement value from a previous angular displacement value, generates a change in readout counter value by reading a new readout counter value and subtracting from the new readout counter value a previous readout counter value, and generating the dither stripped inertial navigation output to be the difference between the change in angular displacement and the change in readout counter value.

11. The modular sensor apparatus of claim 2 further comprising a bias drift rate improvement apparatus for the laser gyro, wherein the laser gyro further comprises a laser with a path length, a first path length control mirror with a first mirror position, a second path length control mirror with a second mirror position, and a bias drift rate that varies periodically with the first mirror position and the second mirror position, wherein the bias drift rate improvement apparatus comprises:

(a) a first mirror positioning means coupled to the first path length control mirror for positioning the first path length control mirror;

(b) a second mirror positioning means coupled to the second path length control mirror for positioning the second path length control mirror; and (c) a control means for controlling the first mirror positioning means and the second mirror positioning means, the control means being coupled to the first mirror positioning means and second mirror positioning means such that the first mirror position and second mirror position change over one period of the path length volts per mode.

12. The modular sensor apparatus of claim 6, wherein the micro-controller further comprises a means for predicting when the modular sensor apparatus will fail based on the at least one operating parameter.

13. The modular sensor apparatus of claim 1 wherein the inertial sensor means has an inertial sensor lifetime, the modular sensor apparatus further comprising a lifetime estimation means for determining the inertial sensor lifetime, wherein the lifetime estimation means is connected to the digital control means and wherein the lifetime estimation means has a lifetime output.

14. The modular sensor apparatus of claim 2 further comprising an active current control apparatus for the laser gyro comprising:

(a) means for generating a digital control signal representative of a current value;

(b) means, coupled to the digital control signal generating means, for translating the digital control signal into an analog signal; and (c) means, coupled to the analog signal, for supplying driving current to an anode of the modular sensor apparatus in response to the analog signal and in proportion to the digital control signal.

15. The modular sensor apparatus of claim 2 comprising an active current control apparatus for the laser gyro further comprising a laser with a path length and a wavelength and an intensity, a first path length control mirror and a second path length control mirror, the modular sensor apparatus further comprising:

(a) a digital logic means for providing a plurality of modulation signals including a SWEEP signal, a SWITCH signal, a NOTSWITCH signal, a DITHER signal, and a NOTDITHER signal;

(b) a first invertor means coupled to the digital logic means at a first input and including an output;

(c) means for switching coupled at a signal input to the output of the first invertor means, coupled at a first control input to the SWITCH signal and coupled at a second control input to the NOTSWITCH signal, wherein the means for switching has a first output corresponding to a first switch position and a second output corresponding to a second switch position;

(d) means for integrating coupled at a first input to a first switching means output, coupled at a second input to a second switching means output, and including an output providing a path length control signal;

(e) means for monitoring laser beam intensity and providing a laser beam intensity monitor (LIM) signal;

(f) means for controlling the digital logic means, including means for providing a pulse width modulated signal, a first analog-to-digital input, and a second analog-to-digital input, wherein the controlling means is coupled at a logic control output to a control input of the digital logic means, wherein the controlling means is coupled at the first analog-to-digital input to the path length control signal, wherein the means for controlling the digital logic means is coupled at the second analog-to-digital input to the LIM signal, wherein the controlling means provides control signals to the digital logic means to operate the plurality of modulating signals in response to the path length control signal, wherein the controlling means further determines a pulse width modulation duty cycle range for a pulse width modulation signal in response to the path length control signal and the LIM signal; and (g) means, coupled to the means for providing a pulse width modulated signal and coupled to the path length control signal, for differentially driving the first path length control mirror and the second path length control mirror in response to the pulse width modulation signal.

16. The modular sensor apparatus of claim 1 further comprising a power supply apparatus comprising:

(a) a DC voltage supply means having a voltage supply output; and (b) a DC to DC converter means connected to the voltage supply output to provide at least one high voltage power supply output.

17. The modular sensor apparatus of claim 1 further comprising a power supply apparatus comprising:

(a) a transformer means having a first and second low voltage center-tapped windings connected to a low voltage supply; and (b) a first and second high voltage center-tapped windings providing a first and a second high voltage output.

18. The modular sensor apparatus of claim 2 in which at least one laser beam is generated by a current flowing in at least a portion of a cavity between an anode and a cathode, an active current control system comprising in combination:

(a) monitor means to generate a monitor signal indicative of a beam intensity;

(b) power supply means coupled to the anode and the cathode to supply the current; and (c) means responsive to the monitor signal to control the current to maintain the beam intensity constant.

19. The modular sensor apparatus of claim 1 further comprising a self test apparatus comprising:

(a) a microprocessor with a high speed universal asynchronous receiver transmitter (UART) and a peripheral transaction system controlling the UART;

(b) a transmit line connected to the UART;

(c) a receive line connected to the UART;

(d) a microprocessor controller external system;

(e) a serial to parallel converter connected to the transmit line to convert serial data on the transmit line to parallel data having a parallel output;

(f) a first in first out (FIFO) register means connected to the parallel output having an interface output;

(g) an interface logic unit connected to an output of the FIFO register means connected to the microprocessor controller external system to receive commands from the microprocessor controller external system; and (h) a parallel to serial converter connected to the interface logic unit and the receive line to convert parallel data from the interface logic unit to serial data for communication to the UART.

20. The modular sensor apparatus of claim 1 wherein the inertial sensor means comprises a dithered laser gyro with a dither pickoff, wherein the dither pickoff has a dither pickoff output, the modular sensor apparatus further comprising:

(a) first analog to digital conversion means for converting the dither pickoff output to a first digital dither pickoff output; and (b) second analog to digital conversion means for converting the dither pickoff output to a'second digital dither pickoff output.

21. The modular sensor apparatus of claim 20 wherein the second analog to digital conversion means is connected to the digital control means.

22. The modular sensor apparatus of claim 2 wherein the laser gyro further comprises a laser path having a laser path length, and a laser beam having a plurality of modes, wherein the digital control means further comprises a path length control register comprising a sweep up portion and a sweep down portion, and wherein the laser path length increases to one of the plurality of modes in response to the sweep up portion and the laser path length decreases to one of the plurality of modes in response to the sweep down portion.

23. A modular laser gyro having a laser within a cavity within a gyro block, a photodiode means connected to the gyro block to detect the laser, a dither drive motor connected to the gyro block to drive the gyro block, a dither pickoff connected to the gyro block to sense motion of the gyro block, and a cathode and a first and a second anode for maintaining the laser within the cavity, wherein the modular laser gyro further comprises:

(a) a microcontroller connected to control the laser gyro having an A/D converter wherein the A/D converter is integral to the microcontroller and wherein the microcontroller has an active current control output to control cathode and anode current and a pulse width modulated output;

(b) a direct digital dither drive connected to drive the dither drive motor and to receive the pulse width modulated output from the microcontroller;

(c) a path length control connected to control a PLC transducer means and connected to receive input from a PLC pickoff located on the gyro block and used for sensing laser path length wherein the path length control further has an A/D converter output used by the microcontroller to process laser path length data;

(d) an active current control means connected to the laser gyro to maintain the laser within the gyro block having a microcontroller input, a first active current control output connected to the cathode, a second active current control output connected to the first anode, and a third active current control output connected to the second anode; and (e) means for high voltage start-up contained within a gyro housing and connected to the active current control means to allow for laser gyro start-up.

24. The modular laser gyro of claim 23 wherein the gyro block further comprises a block temperature sensor connected to the gyro blockto measure block temperature wherein the block temperature sensor has an output connected to an A/D converter input.

25. The modular laser gyro of claim 23 wherein the microcontroller further comprises a universal asynchronous receiver transmitter (UART) which is integral to the microcontroller and connected through transmitting and receiving means to an external system used for controlling means for inertial sensing.

26. The modular laser gyro of claim 23 wherein the dither pickoff has a dither pickoff amplifier having a dither pickoff output connected to an A/ID converter input.

27. The modular laser gyro of claim 23 wherein a readout for detecting the laser is connected to the laser gyro and has a photodiode means input, a readout output connected to an A/D converter input, and a readout output connected simultaneously to a digital logic means and to ring laser gyros.

28. A method of measuring a random drift rate of a laser gyro with at least one mirror, comprising the steps of:

(a) operating the laser gyro over a bias drift rate cycle;

(b) measuring the random drift rate at a plurality of positions of the at least one mirror; and (c) noting an occurrence of a lowest random drift rate.

29. A modular laser gyro comprising:

(a) a modular laser gyro housing;

(b) a laser gyro having a laser beam, and including laser gyro electrodes contained within the modular laser gyro housing, wherein the laser gyro generates a gyro angle;

(c) a digital control processor having a current control output, a dither drive output, an onboard analog to digital convertor, and a microprocessor contained within the modular laser gyro housing;

(d) an active current control means for controlling lasing current in the laser gyro, the active current control means having a control input connected to the current control output, the active current control means further including electrode outputs connected to the laser gyro electrodes and further including high voltage inputs, the active current control means being contained within the modular laser gyro housing;

(e) a high voltage start circuit including a high voltage start module and high voltage pulse generator apparatus connected to the high voltage inputs wherein the high voltage start circuit is contained within the modular laser gyro housing;

(f) means embedded in the digital control processor for calibrating volts per mode and system configuration;

(g) a direct digital dither drive for controlling dithering of the laser gyro is connected to the dither drive output;

(h) a dither pickoff means coupled to the onboard analog to digital convertor for transmitting a dither signal to the digital control processor; and (i) a dither stripper means embedded in the digital control processor for receiving the dither signal and stripping the dither signal from the gyro angle.

* * * * *